US010126927B1

(12) United States Patent
Fieldman

(10) Patent No.: US 10,126,927 B1
(45) Date of Patent: Nov. 13, 2018

(54) COLLABORATIVE, SOCIAL ONLINE EDUCATION AND WHITEBOARD TECHNIQUES

(71) Applicant: Study Social, Inc., Gainesville, FL (US)

(72) Inventor: Ethan Fieldman, Gainesville, FL (US)

(73) Assignee: Study Social, Inc., Gainesville, FL (US)

( * ) Notice: Subject to any disclaimer, the term of this patent is extended or adjusted under 35 U.S.C. 154(b) by 464 days.

(21) Appl. No.: 14/641,840

(22) Filed: Mar. 9, 2015

Related U.S. Application Data

(63) Continuation-in-part of application No. 14/216,688, filed on Mar. 17, 2014, now abandoned.

(60) Provisional application No. 62/076,049, filed on Nov. 6, 2014, provisional application No. 61/799,332, filed on Mar. 15, 2013, provisional application No. 61/954,419, filed on Mar. 17, 2014.

(51) Int. Cl.
| | |
|---|---|
| *G06F 3/0484* | (2013.01) |
| *H04L 29/08* | (2006.01) |
| *G09B 5/12* | (2006.01) |
| *G06F 3/0481* | (2013.01) |
| *G09B 7/00* | (2006.01) |
| *G06F 15/16* | (2006.01) |

(52) U.S. Cl.
CPC ........ *G06F 3/04847* (2013.01); *G06F 3/0481* (2013.01); *G06F 3/04842* (2013.01); *G06F 15/16* (2013.01); *G09B 5/12* (2013.01); *G09B 7/00* (2013.01); *H04L 67/10* (2013.01)

(58) Field of Classification Search
USPC ......................................... 434/322
See application file for complete search history.

(56) References Cited

U.S. PATENT DOCUMENTS

| | | | | |
|---|---|---|---|---|
| 6,807,566 B1 * | 10/2004 | Bates | ..................... | H04L 51/12 709/206 |
| 7,509,382 B1 * | 3/2009 | Jania | ................... | H04L 12/1831 709/206 |
| 7,827,054 B2 * | 11/2010 | Campbell | .............. | G06Q 30/02 705/7.31 |
| 8,051,057 B2 * | 11/2011 | Abu-Hakima | .... | G06F 17/30864 455/466 |

(Continued)

OTHER PUBLICATIONS

Patterson; "How to send a photo from your iPhone directly to Facebook (updated)"; Oct 31, 2011; http://heresthethingblog.com/2011/10/31/send-photo-iphone-facebook/.*

(Continued)

*Primary Examiner* — Eddy Saint-Vil
*Assistant Examiner* — William Ermlick
(74) *Attorney, Agent, or Firm* — Beyer Law Group LLP

(57) ABSTRACT

Various techniques are disclosed for facilitating a computer-supported collaborative session that includes at least two participants using different computing devices to view a canvas that is configured to contain objects added by one or more of the participants. The computer-supported collaborative session is configured to permit participants to mark and/or edit selected objects presented on the canvas. Participants may use a mobile device camera to capture images or video clips, and post the captured images or video clips to the canvas by emailing or text messaging the captured image to a designated email address or phone number.

23 Claims, 100 Drawing Sheets

(56) References Cited

U.S. PATENT DOCUMENTS

| | | | | |
|---|---|---|---|---|
| 8,230,015 B2* | 7/2012 | Suzuki | G06Q 10/10 | 709/204 |
| 8,769,417 B1* | 7/2014 | Robinson | G06F 17/30867 | 715/708 |
| 9,641,356 B2* | 5/2017 | Hamilton | H04L 12/581 | |
| 9,686,222 B2* | 6/2017 | Carter | H04L 51/32 | |
| 2004/0147248 A1* | 7/2004 | Will | H04L 12/1818 | 455/413 |
| 2005/0191605 A1* | 9/2005 | Nguyen | G09B 7/02 | 434/188 |
| 2007/0156824 A1* | 7/2007 | Thompson | G06Q 10/107 | 709/206 |
| 2009/0083637 A1* | 3/2009 | Skakkebaek | G06Q 10/10 | 715/751 |
| 2009/0202965 A1* | 8/2009 | Lee | G09B 7/00 | 434/191 |
| 2010/0122163 A1* | 5/2010 | Goldberg | G09B 5/00 | 715/705 |
| 2010/0151431 A1* | 6/2010 | Miller | G09B 7/00 | 434/350 |
| 2011/0137811 A1* | 6/2011 | Patel | G06Q 30/08 | 705/313 |
| 2011/0153747 A1* | 6/2011 | Will | H04L 12/1818 | 709/205 |
| 2011/0302506 A1* | 12/2011 | Noyes | G06F 17/24 | 715/753 |
| 2012/0107787 A1* | 5/2012 | Zimmerman | G09B 7/02 | 434/322 |
| 2012/0210252 A1* | 8/2012 | Fedoseyeva | G06Q 10/06398 | 715/753 |
| 2012/0231441 A1* | 9/2012 | Parthasarathy | G09B 7/02 | 434/362 |
| 2012/0244506 A1* | 9/2012 | Lang | G09B 7/00 | 434/322 |
| 2012/0254773 A1* | 10/2012 | Viswanathan | G06F 3/0483 | 715/753 |
| 2012/0264099 A1* | 10/2012 | Craft, IV | G09B 7/02 | 434/350 |
| 2012/0315616 A1* | 12/2012 | Fourman | G09B 7/02 | 434/350 |
| 2013/0183647 A1* | 7/2013 | Miller | G06Q 10/00 | 434/247 |
| 2013/0290433 A1* | 10/2013 | Park | G06Q 30/02 | 709/204 |
| 2013/0307920 A1* | 11/2013 | Cahill | H04N 7/152 | 348/14.03 |
| 2014/0162239 A1* | 6/2014 | Roach | G09B 5/125 | 434/350 |
| 2014/0173638 A1* | 6/2014 | Anderson | G09B 5/062 | 719/320 |
| 2014/0199675 A1* | 7/2014 | Zajfman | G09B 5/00 | 434/350 |
| 2014/0220536 A1* | 8/2014 | Dow | G09B 7/00 | 434/350 |
| 2014/0234824 A1* | 8/2014 | Schepman | G09B 7/02 | 434/350 |
| 2014/0297876 A1* | 10/2014 | Aquilina | G06F 3/0488 | 709/227 |
| 2014/0321834 A1* | 10/2014 | Segal | H04N 5/265 | 386/282 |
| 2015/0170529 A1* | 6/2015 | Hafeez | G09B 5/00 | 434/350 |
| 2016/0085381 A1* | 3/2016 | Parker | G06F 8/34 | 715/753 |
| 2016/0148522 A1* | 5/2016 | Rowland | G09B 5/14 | 434/362 |
| 2016/0253912 A1* | 9/2016 | Heilman | G09B 5/08 | |

OTHER PUBLICATIONS

Osborne; 2007; Have a text or picture message appear on NYC jumbotron; https://www.geek.com/mobile/have-a-text-or-picture-message-appear-on-nyc-jumbotron-572011/.*

* cited by examiner

*Try It!*
What are the solutions to the quadratic equation graphed below?
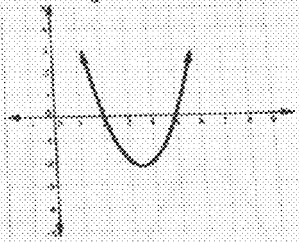
Aaron shoots a water bottle rocket from the ground. A graph of height over time is shown below.
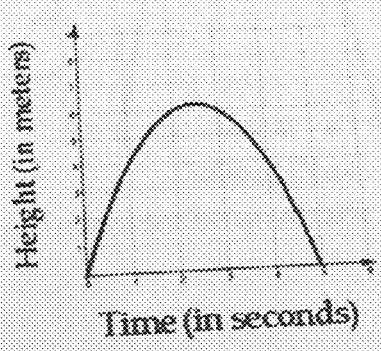
*What type of function best models the rocket's motion?*
*After how many seconds did the rocket hit the ground?*
*the maximum height of the rocket.*
Fig. 11  ↙1101

2.53 Calculate the mode, mean, and median of the following data:
NW  18  10  15  13  17  15  12  15  16  15

2.54 Construct one data set consisting of five measurements, and another consisting of six measurements, for which the medians are equal.

2.55 Calculate the mean for samples for which
NW  a. $n = 10$, $\sum x = 85$
    b. $n = 16$, $\sum x = 400$
    c. $n = 45$, $\sum x = 35$
    d. $n = 18$, $\sum x = 242$ 2.56 Calculate the mean, median, and mode for each of the following samples:
a. 7, −2, 3, 3, 0, 4

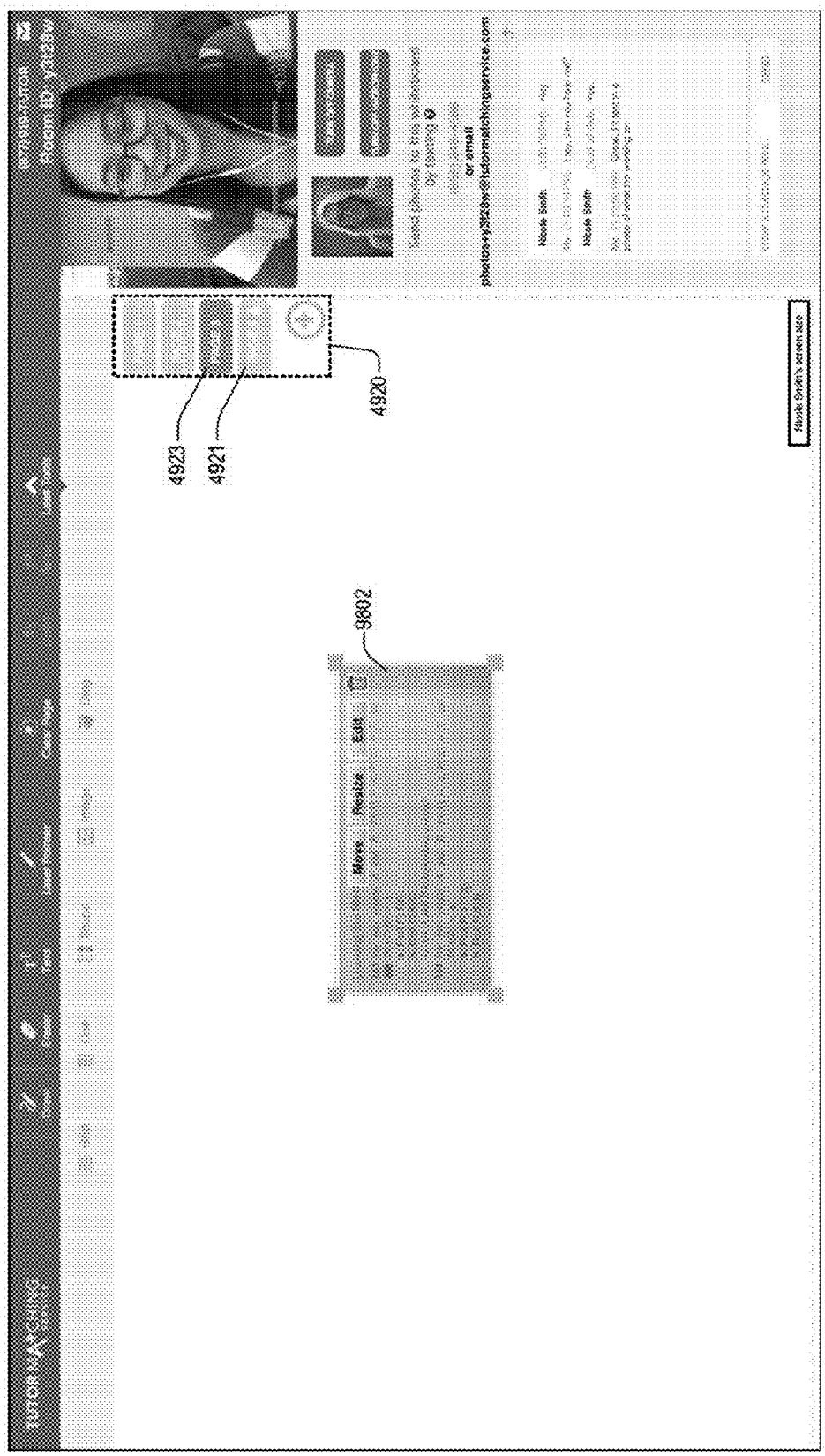

COLLABORATIVE, SOCIAL ONLINE EDUCATION AND WHITEBOARD TECHNIQUES

RELATED APPLICATION DATA

The present application claims benefit, pursuant to the provisions of 35 U.S.C. § 119, of U.S. Provisional Application Ser. No. 62/076,049, titled "COLLABORATIVE, SOCIAL ONLINE EDUCATION AND WHITEBOARD TECHNIQUES", naming Fieldman et al. as inventors, and filed Nov. 6, 2014, the entirety of which is incorporated herein by reference for all purposes.

This application is a continuation-in-part application, pursuant to the provisions of 35 U.S.C. § 120, of prior U.S. patent application Ser. No. 14/216,688 titled "METHODS FOR ONLINE EDUCATION" by Fieldman et al., filed on Mar. 17, 2014, which claims benefit of U.S. Provisional Application Ser. No. 61/799,332, titled "PROVISION OF ONLINE EDUCATION", naming Fieldman et al. as inventors, and filed Mar. 15, 2013. Each of these applications is incorporated herein by reference in its entirety and for all purposes.

The present application claims benefit, pursuant to the provisions of 35 U.S.C. § 119, of U.S. Provisional Application Ser. No. 61/954,419, titled "PROVISION OF ONLINE EDUCATION", naming Ethan Fieldman as inventor, and filed Mar. 17, 2014, the entirety of which is incorporated herein by reference for all purposes.

BACKGROUND

The present disclosure relates to online education. More particularly, the present disclosure relates to collaborative, social online education and whiteboard techniques implemented via computer networks.

Online education is increasing in popularity and user participation. The strength and appeal of online education is that users do not have to be in the same location, either physically or academically, in order to collaborate and learn. However, this strength is undermined by existing limitations in online learning platforms.

Despite advances in online education techniques, it remains problematic to engage in discussions and/or collaborations focused on non-textual material in online discussion forums, chat rooms, discussion walls, etc. For example, currently, there are no easy or convenient ways for users to discuss math and science topics in the traditional online chat room environments. Similarly, there are no easy or convenient ways for users to illustrate mathematical and scientific concepts, which include but are not limited to writing complex equations, drawing graphs, drawing molecular structures, etc. There is also no easy, user-intuitive method of capturing a problem or image in a textbook and sharing and discussing the problem or image on the online discussion forum. There are also issues with users attempting to type symbols or describe images that do not adequately communicate the scenario, leading to problematic learning situations. Additionally, copying and/or reproduction errors may be introduced when users attempt to type out a problem. Such issues are detrimental to the online learning experience, particularly in situations involving concepts that need to be illustrated in order to be understood and/or discussed.

BRIEF DESCRIPTION OF THE DRAWINGS

FIGS. 11-17, 19-87, and 90-101 include various example screenshots of graphical user interfaces (GUIs) which help to illustrate at least a portion of the different types of collaborative online interactions, whiteboard editing and Message-to-Post features/aspects which may be implemented and/or enabled in one or more embodiments of the Online Social Education System(s) described and/or referenced herein.

DETAILED DESCRIPTION OF EXAMPLE EMBODIMENTS

Overview

Figure 1:
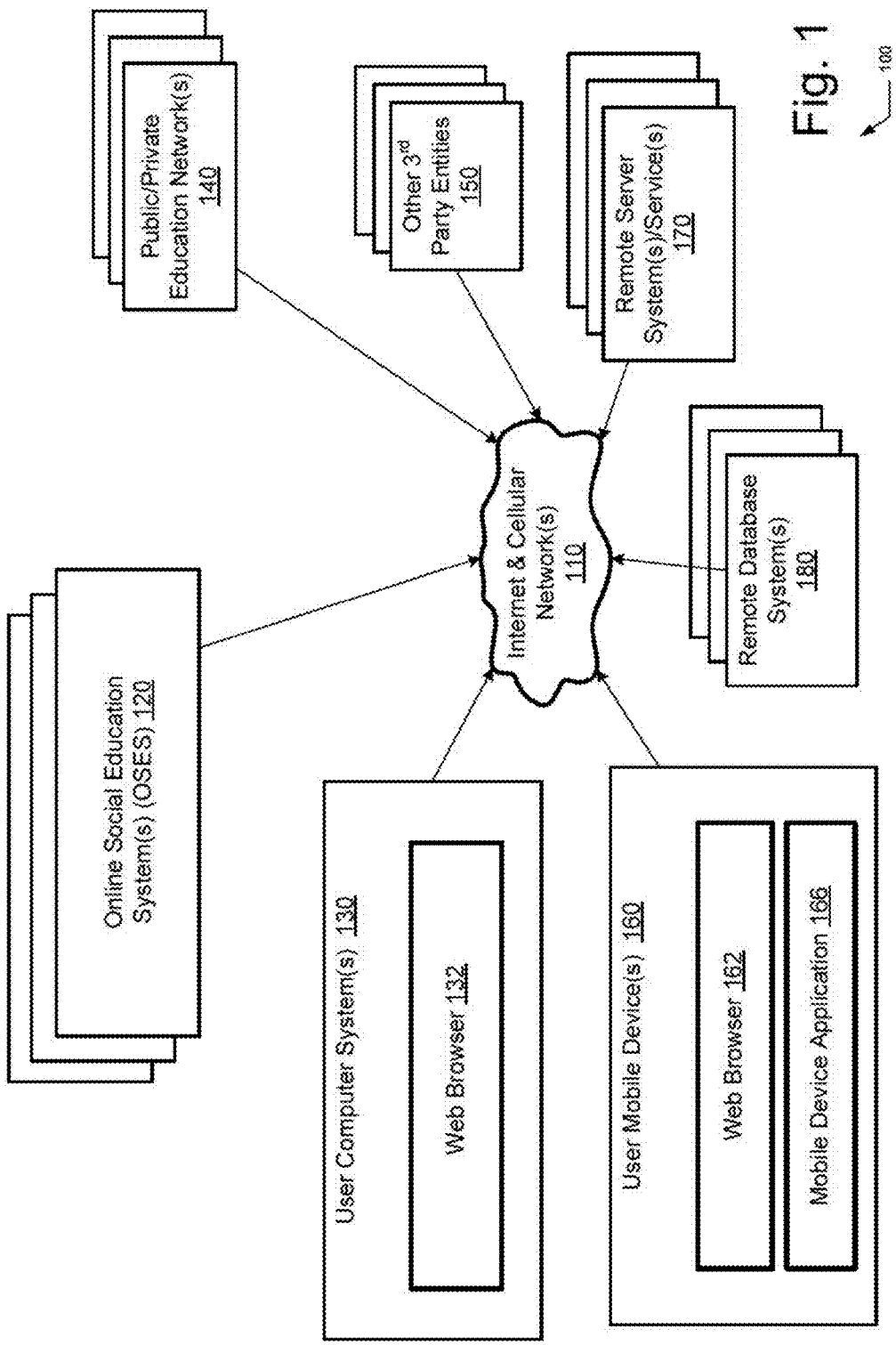
FIG. 1 illustrates a simplified block diagram of a specific example embodiment of an Online Social Education Network (OSEN) or Online Social Education System (OSES) which may be implemented via a computerized data network.

Various aspects described or referenced herein are directed to different methods, systems, and computer program products relating to online education techniques, functions and features.

Various aspects described or referenced herein are directed to different computer-implemented methods and systems for facilitating a computer-supported collaborative session that includes at least two participants using different computing devices to view a canvas, wherein the canvas is configured to contain objects added by one or more of the participants and the computer-supported collaborative session is configured to permit participants to mark and/or edit selected objects presented on the canvas. In at least one embodiment, various method(s) and/or system(s) may be operable to cause at least one processor to execute a plurality of instructions for: configuring the canvas to contain objects added by one or more of the participants; permitting participants to mark and/or edit selected objects presented on the canvas to contain objects added by one or more of the participants; receiving a message that contains an image from one of the participants in the collaborative session; and; adding or posting the image to the canvas, whereby the image becomes an image object presented on the canvas that can be marked and/or edited by at least one of the participants in the collaborative session.

In some embodiments, the received message has associated therewith a first sender who sent the message, and the various method(s), system(s) may be further operable to cause at least one processor to execute additional instructions for: enabling the image object to be annotated and/or edited by at least one of the participants in the collaborative session who is not the sender of the message. In some embodiments, the message is received from a mobile device having a camera that captured the image. In some embodiments, the message may correspond to either a text message or an email message. In some embodiments, additional instructions relating to the processing and/or posting of the image may be provided via additional text messages and/or via content included in the subject and/or body of the email message.

In some embodiments, wherein the message is received at an address or location that is not directly associated with the collaborative session, and the various method(s), system(s) may be further operable to cause at least one processor to execute additional instructions for determining that the message is associated with the collaborative session based at least in part on at least one of: an identity of the sender of the message; mobile phone number; IP address; email address; geolocation information; time/date information; user biometric information; mobile device MAC address; and/or other types of information which may be used to uniquely identify the sender.

In some embodiments, the collaborative session is a first collaborative session, the message does not include an explicit identifier of the first collaborative session, and the message is received at an address or location that is configured to receive messages associated with a multiplicity of other collaborative sessions in addition to the first collaborative session, and the various method(s), system(s) may be further operable to cause at least one processor to execute additional instructions for determining that the message is associated with the collaborative session based at least in part on at least one of: an identity of the sender of the message; mobile phone number; IP address; email address; geolocation information; time/date information; user biometric information; mobile device MAC address; and/or other types of information which may be used to uniquely identify the sender.

In some embodiments, the collaborative session corresponds to an online, collaborative educational session. In some embodiments, at least one of the participants is selected from a group consisting of: a student, an instructor, a study expert, a tutor and a teacher. In some embodiments, the collaborative session corresponds to an online, collaborative tutoring session that includes at least one tutor and at least one tutee. In some embodiments, the canvas is an on-line discussion wall comprising a plurality of collaborative discussion threads. In some embodiments, the canvas is a collaborative whiteboard canvas that is part of the collaborative session.

Additional aspects described or referenced herein are directed to different computer-implemented methods and systems for posting information to a first canvas selected from the group consisting of: an on-line discussion wall having multiple participants, and a whiteboard used in a computer-supported collaborative session that includes at least two participants, wherein the participants use different computing devices to view the canvas. In at least one embodiment, various method(s) and/or system(s) may be operable to cause at least one processor to execute a plurality of instructions for: receiving a message that contains an image from one of the participants wherein the message does not include an explicit identifier of the first canvas, and the message is received at a number or address that is configured to receive messages associated with a multiplicity of other canvases in addition to the first canvas; determining that the message is associated with the first canvas based at least in part on an identity of the sender of the message and a knowledge that the sender is a participant in the on-line discussion wall or collaborative session; and; adding the image to the first canvas, whereby the image becomes an image object presented on the first canvas that can be viewed, edited, and/or manipulated by the participants.

In some embodiments, the message is received from a mobile device. In some embodiments, the message is received from a mobile device having a camera that captured the image. In some embodiments, the message may correspond to either a text message or an email message. In some embodiments, the participant that sent the message is viewing the canvas on a device that is different than the mobile device from which the message is received. In some embodiments, the canvas is used in one selected from the group consisting of: an educational discussion wall associated with an academic subject; and a collaborative education session that includes at least one of: a tutor, an instructor, and a teacher, and at least one of a student and a tutee.

Additional aspects described or referenced herein are directed to different computer-implemented methods and systems for facilitating an online collaborative session between at least two remote participants via a computer network. In at least one embodiment, various method(s) and/or system(s) may be operable to cause at least one processor to execute a plurality of instructions for: providing, as part of the online collaborative session, a collaborative whiteboard canvas, wherein the collaborative whiteboard canvas is configured to contain objects added by one or more of the participants; wherein the online collaborative session is configured to permit participants to simultaneously and/or asynchronously perform one or more of the following operation(s), action(s), and/or feature(s) (or combinations thereof): mark and/or edit selected objects presented on the collaborative whiteboard canvas; draw graphs and diagrams; plot graphs based upon data points, equations, etc.; record and upload annotated/animated whiteboard diagrams; edit/annotate images; assign/configure editing permissions of objects displayed on the whiteboard canvas; and/or show/hide/identify edits/annotations made by other users.

Additional aspects described or referenced herein are directed to different computer-implemented methods and systems for facilitating an online collaborative session between at least two remote participants via a computer network. In at least one embodiment, various method(s) and/or system(s) may be operable to cause at least one processor to execute a plurality of instructions for providing, as part of the online collaborative session, a collaborative shared workspace, wherein the shared workspace is configured to contain objects added by one or more of the participants. In some embodiments, the shared workspace may be partitioned into distinctly identifiable pages. In some embodiments, the online collaborative session may include functionality for enabling automated synchronization of participant navigation. For example, in one embodiment, when a first participant of the online collaborative session navigates from one page of the shared workspace to another page of the shared workspace, the online collaborative session may be configured to automatically detect such first participant navigation, and may automatically cause navigation of the other participant(s) to be mirrored, in synchronization, with the navigation activity of the first participant. In this way, such automated synchronization of participant navigation helps to ensure that all participants of online collaborative session are on the same page, and are viewing the same thing, thereby eliminating distinctions and/or differences between "presenter screens", "participant screens" and "viewer screens".

Additional aspects described or referenced herein are directed to different computer-implemented methods and systems for facilitating an online collaborative session between at least two remote participants via a computer network. In at least one embodiment, various method(s) and/or system(s) may be operable to cause at least one processor to execute a plurality of instructions for providing, as part of the online collaborative session, a collaborative shared workspace, wherein the shared workspace is configured to contain objects added by one or more of the participants. In some embodiments, the online collaborative session may include functionality for automatically and/or dynamically determining and displaying information relating the display screen size(s) of one or more participants of the online collaborative session. In at least one embodiment, various method(s) and/or system(s) may be operable to cause at least one processor to execute a plurality of instructions to: identify the current participants of the online collaborative session; identify or determine the approximate viewable display screen size (and/or screen boundaries) for each respective, identified participant; determine the relatively smallest viewable display screen size from among the identified participants; display to each (or selected) identified participant(s), the viewable display screen size boundaries (and associated participant information) corresponding to the approximate dimensions of the relatively smallest viewable display screen size of the current participants of the online collaborative session. In some embodiments, the displayed screen size boundary may be automatically and/or dynamically adjusted/resized based on detected event(s)/condition(s) such as, for example, one or more of the following (or combinations thereof): participants joining and/or exiting online collaborative session; change of participant screen size detected (e.g., user resized browser or switched display device orientation); change in participant device detected; etc.

Various objects, features and advantages of the various aspects described or referenced herein will become apparent from the following descriptions of its example embodiments, which descriptions should be taken in conjunction with the accompanying drawings.

SPECIFIC EXAMPLE EMBODIMENTS

Various techniques will now be described in detail with reference to a few example embodiments thereof as illustrated in the accompanying drawings. In the following description, numerous specific details are set forth in order to provide a thorough understanding of one or more aspects and/or features described or reference herein. It will be apparent, however, to one skilled in the art, that one or more aspects and/or features described or reference herein may be practiced without some or all of these specific details. In other instances, well known process steps and/or structures have not been described in detail in order to not obscure some of the aspects and/or features described or reference herein.

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Headings of sections provided in this patent application and the title of this patent application are for convenience only, and are not to be taken as limiting the disclosure in any way. Devices that are in communication with each other need not be in continuous communication with each other, unless expressly specified otherwise. In addition, devices that are in communication with each other may communicate directly or indirectly through one or more intermediaries. A description of an embodiment with several components in communication with each other does not imply that all such components are required. To the contrary, a variety of optional components are described to illustrate the wide variety of possible embodiments of one or more of the invention(s).

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (whether or not they cooperate) may be used in place of a single device/article. Similarly, where more than one device or article is described (whether or not they cooperate), it will be readily apparent that a single device/article may be used in place of the more than one device or article. The functionality and/or the features of a device may be alternatively embodied by one or more other devices that are not explicitly described as having such functionality/features. Thus, other embodiments of one or more of the invention(s) need not include the device itself. Techniques and mechanisms described or reference herein will sometimes be described in singular form for clarity. However, it should be noted that particular embodiments include multiple iterations of a technique or multiple instantiations of a mechanism unless noted otherwise.

Online education is increasing in popularity and user participation. The strength and appeal of online education is that users do not have to be in the same location, either physically or academically, in order to collaborate and learn. However, this strength is undermined by existing limitations in online learning platforms.

Despite advances in online education techniques, it remains problematic to engage in discussions and/or collaborations focused on non-textual material in online discussion forums, chat rooms, discussion walls, etc. For example, currently, there are no easy or convenient ways for users to discuss math and science topics in the traditional online chat room environments. Similarly, there are no easy or convenient ways for users to illustrate mathematical and scientific concepts, which include but are not limited to writing complex equations, drawing graphs, drawing molecular structures, etc. There is also no easy, user-intuitive method of capturing a problem or image in a textbook and sharing and discussing the problem or image on the online discussion forum. There are also issues with users attempting to type symbols or describe images that do not adequately communicate the scenario, leading to problematic learning situations. Additionally, copying and/or reproduction errors may be introduced when users attempt to type out a problem. Such issues are detrimental to the online learning experience, particularly in situations involving concepts that needs to be illustrated in order to be understood and/or discussed.

As described in greater detail herein, various aspects of the present application describe different techniques which may be used to improve online education techniques, and to overcome at least a portion of the issues relating to online education and online learning, such as those described above. More specifically, various different techniques are described herein for improving online education techniques by enabling users to communicate and collaborate on online social education platforms using images, graphs, drawings, etc. Such techniques significantly enhance the online learning experience, and provides a heretofore missing piece to online learning platforms. For example, using the various image posting techniques described herein, users can now easily show tutors, teachers, peers, etc. the exact problem they are working on, and communicate regarding the problem without dealing with how to express the problem itself. These techniques are suitable for a wide range of online learning environments, including, but not limited to, facilitating 1-on-1 tutoring scenarios, small group interactions (in which a small group of peers exchange ideas, or, a small group of students are lead by a teacher), and universal group learning (in which discussion area is not segmented to only include a subset of users, but rather, all who visit the area can see the ongoing discussion.) This solution may also be extended beyond the online realm and into real-world classrooms. For example, using the various image posting techniques described herein, students in real-world (physical) classrooms may capture images and/or compose text (e.g., relating to potential solutions, comments, and/or questions) using their mobile devices, and may easily transmit or convey such images/text (e.g., via email, mobile app, text message, MMS message, chat, etc.) to teachers, without a teacher having to visit each individual, desk, or group of students. In this way, students can contribute ideas even if they are hesitant to verbally express ideas simply by, for instance, texting in a graphed solution.

As described herein, a text message or MMS (Multimedia Messaging Service) message is a standard way to send messages that include multimedia content to and from mobile phones. MMS messages extend the core SMS (Short Message Service) capability that allowed exchange of text messages only up to 160 characters in length.

FIG. 1 illustrates a simplified block diagram of a specific example embodiment of an Online Social Education Network (OSEN) or Online Social Education System (OSES) 100, which may be implemented via a computerized data network. As described in greater detail herein, different embodiments of Online Social Education Systems may be configured, designed, and/or operable to provide various different types of operations, functionalities, and/or features generally relating to Online Education technology. More specifically, the Online Education (OE) techniques described herein utilize social learning and technological breakthroughs to construct and stage a vibrant online learning system for students, teachers, parents, and educators. These Online Education techniques help to foster a dynamic online education environment via social interaction (e.g., non-linear, hands-on, effective and fun).

For example, one aspect of the Online Social Education System (OSES) 100 is directed to an online, "Interactive Study Wall", where students can ask/post questions and receive answers from peers (e.g., other students), teachers, and/or other educators (such as, for example, Study Experts). The OE System may include functionality for enabling participants to post questions/responses via drawing graphs, inserting equations, taking/uploading photos and/or videos. In at least one embodiment, Study Experts may function as Interactive Study Wall moderators, and monitor the interactions in real time and/or non-real time, answering questions and reviewing posted threads to ensure the accuracy of the posted replies/responses.

In at least one embodiment, the Interactive Study Wall is configured or designed to encourage students to feel free to ask even the simplest of questions. The discussions which these questions spark, and the answers/responses they elicit are individualized, yet also universally applicable (e.g., a response describing a solution to a math problem).

According to different embodiments, multiple different instances of online Interactive Study Walls may be instantiated (e.g., concurrently instantiated) for different topic or fields of study such as, for example, one or more of the following (or combinations thereof):

Algebra;
Geometry;
Physics;
Accounting;
Chemistry;
etc.

In at least one embodiment, an Interactive Study Wall may be configured or designed to be completely searchable and transparent. For example, in one embodiment, a specific Interactive Study Wall (e.g., Algebra Wall) may be accessible to all students and teachers of a given district or region (such as, for example, school district, county, state, country etc.). For example, question asked by a student in Miami, Fla. might prove useful to a student in Boulder, Colo., and a teacher or Study Expert in Phoenix, Ariz. may use the Interactive Study Wall to provide assistance to students in Dallas, Tex.

In some embodiments, manual and/or automated mechanisms may be provided to identify and filter out unrelated, negative or derogatory comments/responses. Additionally, unlike most existing social networks and online forums, in at least some embodiments, the Interactive Study Wall may be configured or designed to prohibit personal or private messaging (e.g., between or among peers). This helps to foster a publically collaborative, socially interactive environment among all users. Further, in at least some embodiments, the Interactive Study Wall may be configured or designed to prohibit or prevent students (and/or other users) from accessing other users' pictures and personal profiles. For example, participants' profile pages may be blocked, thereby preventing access to participants' personal information. Additionally the Interactive Study Wall may be continuously monitored (e.g., via automated and/or human mechanisms), and may be configured or designed to provide notification to Study Experts (e.g., moderators) whenever a question and/or response is posted on an Interactive Study Wall.

In at least one embodiment, students may be allocated points or awards or incentives for posting questions and/or for answering peers' questions on the Interactive Study Wall. In the following embodiments, the awards are called Karma points, but do not necessarily need to be named so. For example, in one embodiment, the Interactive Study Wall may include functionality for enabling Study Experts or moderators to award students with differing amounts of "Karma points" for asking questions and/or answering peers' questions. In some embodiments, Karma points may be shown next to a student's name, and a "Karma Leader Board" may be maintained and automatically updated to track, for example, the top n (e.g., n=5) karmic leaders in a specified group, region or district. Accumulated Karma points may be redeemable for physical (e.g., real-world) prizes. For example, according to different embodiments, the OE System may award incentive prizes to various different entities such as, for example: students, teachers, schools, grades, classes, school districts, etc.

According to different embodiments, at least some Online Social Education System(s) may be configured, designed, and/or operable to provide additional features, advantages and/or benefits and/or may be operable to initiate, and/or enable various different types of operations, functionalities, and/or features, such as, for example, one or more of the following (or combinations thereof):

- Automated functionality for detecting and preventing students/users from posting answers/solutions to homework and/or test related questions.
- Automated functionality for detecting and preventing students/users cheating with other students/users.
- Interactive Study Wall discussion board functionality which, for example, may be restricted to specific video or topic, and not personalized dependent on the needs/interests of user.
- Collaborative, non-hierarchical Interactive Study Wall features. For example, the Interactive Study Wall may be configured or designed to enable teachers to use the Interactive Study Wall to interact with their students, but the Wall may be configured as a shared Wall across school, district, state, country, etc., thereby creating a substantially collaborative and open environment among all users, while simultaneously maximizing security for students.
- Filtering functionality for enabling personalization of users' Interactive Study Wall interactions, such as, for example, filtering posts to specific students (e.g. based on level of student, student's district, school, course enrollment, etc.). In some embodiments, filtering personalization for one or more students/users may be based, at least partially, on one or more of the following criteria (or combinations thereof):
  posts for which a student/user has flagged as being of interest (e.g., user has clicked on "like" button);
  posts with which a student/user has actively engaged/interacted;
  student performance (e.g., how well student performs on practice tools);
  student inputs/self-assessment;
  tags/classifications associated with one or more Interactive Study Wall posts (e.g., high difficulty, medium difficulty, low difficulty, geometry, algebra, fractions, etc.)
- Functionality for enabling moderators and Study Experts to managing Interactive Study Wall posts, threads, and conversations. For example, in at least one embodiment, the Interactive Study Wall may be configured or designed to automatically close a discussion thread upon detection of various events/conditions such as, for example, one or more of the following (or combinations thereof):
  when a Study Expert or Teacher is the last person to post a comment in the discussion thread;
  when a Study Expert or Teacher clicks on a "like" icon or other designated button/icon associated with the discussion thread.
- Dynamic whiteboard functionality. For example, in at least one embodiment, the Interactive Study Wall may include functionality for providing users with access to a dynamic Whiteboard GUI which may be configured or designed to provide various tools for enabling users to initiate various activities such as, for example, one or more of the following (or combinations thereof):
  draw diagrams;
  draw graphs, either freehand or using pre-set grid lines
  plot graphs based upon data points, equations, etc.;
  capture and upload images (e.g., via mobile device, email, MMS, etc.);
  record and upload videos (e.g., via mobile device, email, MMS, etc.);
  record and upload annotated/animated whiteboard diagrams;
  etc.
  In at least one embodiment, where multiple whiteboard pages exist, the dynamic whiteboard may provide navigation links for enabling users to navigate to specific pages, page positions, previously bookmarked pages, etc.
- Leaderboard Functionality, which may be configured or designed to display various types of rankings among selected groups of users. For example, in at least one embodiment, the Interactive Study Wall leaderboard results/rankings may be filtered according to various criteria such as, for example, one or more of the following (or combinations thereof):
  class;
  grade level;
  school;
  school district;
  geographic region;
  district middle schools;
  district high schools;
  district elementary schools;
  user experience level (e.g., novice vs. advanced user);
  etc.
- Status update functionality such as, for example, "check in"/"check out", "Do Not Disturb", etc.

User Incentive functionality (e.g., awarding of Karma points at +100/+200/+500 increments) for facilitating and encouraging learning and user participation.

And/or other aspects/features described and/or referenced herein.

According to different embodiments, the Online Social Education System 100 may include a plurality of different types of components, devices, modules, processes, systems, etc., which, for example, may be implemented and/or instantiated via the use of hardware and/or combinations of hardware and software. For example, as illustrated in the example embodiment of FIG. 1, the Online Social Education System may include one or more of the following types of systems, components, devices, processes, etc. (or combinations thereof):

Online Social Education System (OSES) (s) 120—In at least one embodiment, the Online Education Server System(s) may be operable to perform and/or implement various types of Online Social Education functions, operations, actions, and/or other features such as those described or referenced herein.

Public/Private Education Network(s) 140, including, for example, Student Information System(s) (SIS), Student Data Management Networks, etc.

User Computer System(s) 130—In at least one embodiment, the User Computer System(s) may be operable to perform and/or implement various types of Online Social Education functions, operations, actions, and/or other features such as those described or referenced herein.

$3^{rd}$ Party System(s) 150, including, for example social networks (e.g., Facebook, Twitter, You Tube, etc.), Online conferencing and webinar systems (e.g., Webex, Adobe Connect, Skype, etc.), etc.

Internet & Cellular Network(s) 110

Remote Database System(s) 180

Remote Server System(s)/Service(s) 170, which, for example, may include, but are not limited to, one or more of the following (or combinations thereof):
Content provider servers/services
Media streaming servers/services
Database storage/access/query servers/services
Financial transaction servers/services
Payment gateway servers/services
Electronic commerce servers/services
Event management/scheduling servers/services
Etc.

User Mobile Device(s) 160—In at least one embodiment, the User Mobile Device(s) may be operable to perform and/or implement various types of Online Social Education functions, operations, actions, and/or other features such as those described or referenced herein.

etc.

According to different embodiments, at least a portion of the various types of Online Social Education functions, operations, actions, and/or other features provided by the Online Social Education System may be implemented at one or more client systems(s), at one or more server systems (s), and/or combinations thereof.

In at least one embodiment, the Online Social Education System may be operable to utilize and/or generate various different types of data and/or other types of information when performing specific tasks and/or operations. This may include, for example, input data/information and/or output data/information. For example, in at least one embodiment, the Online Social Education System may be operable to access, process, and/or otherwise utilize information from one or more different types of sources, such as, for example, one or more local and/or remote memories, devices and/or systems. Additionally, in at least one embodiment, the Online Social Education System may be operable to generate one or more different types of output data/information, which, for example, may be stored in memory of one or more local and/or remote devices and/or systems. Examples of different types of input data/information and/or output data/information which may be accessed and/or utilized by the Online Social Education System may include, but are not limited to, one or more of those described and/or referenced herein.

According to specific embodiments, multiple instances or threads of the Interactive Study Wall may be concurrently implemented and/or initiated via the use of one or more processors and/or other combinations of hardware and/or hardware and software. For example, in at least some embodiments, various aspects, features, and/or functionalities of the Interactive Study Wall may be performed, implemented and/or initiated by one or more of the various systems, components, systems, devices, procedures, processes, etc., described and/or referenced herein.

In at least one embodiment, a given instance of the Online Social Education System may access and/or utilize information from one or more associated databases. In at least one embodiment, at least a portion of the database information may be accessed via communication with one or more local and/or remote memory devices. Examples of different types of data which may be accessed by the Online Social Education System may include, but are not limited to, one or more of those described and/or referenced herein.

According to different embodiments, various different types of encryption/decryption techniques may be used to facilitate secure communications between devices in Online Social Education System(s) and/or Online Social Education Network(s). Examples of the various types of security techniques which may be used may include, but are not limited to, one or more of the following (or combinations thereof): random number generators, SHA-1 (Secured Hashing Algorithm), MD2, MD5, DES (Digital Encryption Standard), 3DES (Triple DES), RC4 (Rivest Cipher), ARC4 (related to RC4), TKIP (Temporal Key Integrity Protocol, uses RC4), AES (Advanced Encryption Standard), RSA, DSA, DH, NTRU, and ECC (elliptic curve cryptography), PKA (Private Key Authentication), Device-Unique Secret Key and other cryptographic key data, SSL, etc. Other security features contemplated may include use of well-known hardware-based and/or software-based security components, and/or any other known or yet to be devised security and/or hardware and encryption/decryption processes implemented in hardware and/or software.

According to different embodiments, one or more different threads or instances of the Interactive Study Wall functionality may be initiated in response to detection of one or more conditions or events satisfying one or more different types of minimum threshold criteria for triggering initiation of at least one action and/or operation. Various examples of conditions or events which may trigger initiation and/or implementation of one or more different threads or instances of the Interactive Study Wall functionality may include, but are not limited to, one or more of those described and/or referenced herein.

It may be appreciated that the Online Social Education System of FIG. 1 is but one example from a wide range of Online Social Education System embodiments which may be implemented. Other embodiments of the Online Social Education System (not shown) may include additional, fewer and/or different components/features that those illustrated in the example Online Social Education System embodiment of FIG. 1.

Generally, the Online Social Education techniques described herein may be implemented in hardware and/or hardware+software. For example, they can be implemented in an operating system kernel, in a separate user process, in a library package bound into network applications, on a specially constructed machine, or on a network interface card. In a specific embodiment, various aspects described herein may be implemented in software such as an operating system or in an application running on an operating system.

Hardware and/or software+hardware hybrid embodiments of the Online Social Education techniques described herein may be implemented on a general-purpose programmable machine selectively activated or reconfigured by a computer program stored in memory. Such programmable machine may include, for example, mobile or handheld computing systems, PDA, smart phones, notebook computers, tablets, netbooks, desktop computing systems, server systems, cloud computing systems, network devices, etc.

Online Social Education GUIs

FIGS. 6-10 illustrate example screenshots of various GUIs which may be used for facilitating activities relating to one or more of the online social education aspects disclosed herein. In at least one embodiment, at least a portion of the GUIs may be configured or designed for use at one or more user computer devices and/or mobile devices.

For illustrative purposes, each of the example screenshots of FIGS. 6-10 relate to specific embodiments of an Interactive Study Wall which has been specifically configured for facilitating online social education relating to algebra (herein referred to as "Algebra Wall"). However, it will be appreciated that other embodiments of Interactive Study Walls may be specifically configured for facilitating online social education relating to other educational topics/curriculum. Additionally, as illustrated and described with respect to the example screenshots of FIGS. 6-10, the display of Interactive Study Wall content and/or access to various Interactive Study Wall functionality may differ, for example, based on the user's identity and/or user classification type (e.g., Teacher, Study Expert, Student). Additionally, in at least some embodiments, at least a portion of the Interactive Study Wall content which is displayed to a given user may be dynamically generated and/or dynamically filtered.

Figure 6:
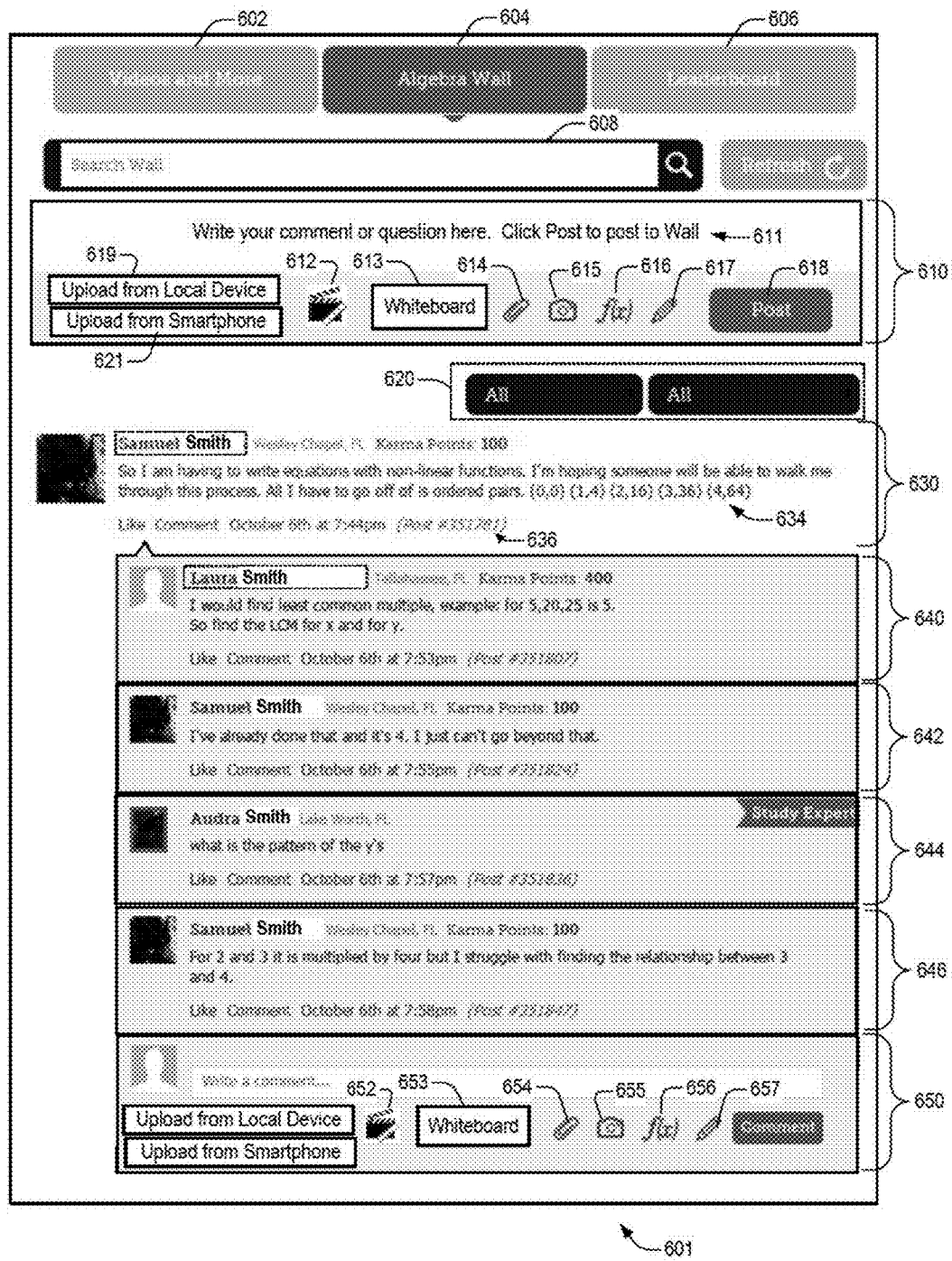
FIGS. 6-10 illustrate example screenshots of various GUIs which may be used for facilitating activities relating to one or more of the online social education aspects disclosed herein.

FIG. 6 shows an example screenshot of a Student Interactive Study Wall GUI 601 in accordance with a specific embodiment. According to different embodiments, the Student Interactive Study Wall GUI 601 may be configured or designed to enable students to perform a variety of activities such as, for example:
  Browsing questions, comments, threads and discussions posted to the Interactive Study Wall;
  Viewing Interactive Study Wall posts (e.g., 630) such as those posted by the student user, other students, teachers, and/or Study Experts;
  Viewing comments/replies to Interactive Study Wall posts (e.g., 640, 642, 644, 646) such as those posted by the student user, other students, teachers, and/or Study Experts;
  Searching for posts relating to specific content, keywords, topics, etc.;
  Drafting and posting questions to the Interactive Study Wall;
  Drafting and posting comments or replies to the Interactive Study Wall;
  And/or other types of activities described and/or referenced herein.

As illustrated in the example embodiment of FIG. 6, the Student Interactive Study Wall GUI 601 may be configured or designed to provide a student user with access to a variety of functions and/or features of the Interactive Study Wall such as, for example, one or more of the following (or combinations thereof):
  Access to tutorials, videos, and other educational content 602
  Access to Interactive Study Wall Leaderboard(s) 606
  Keyword search functionality 608
  Interfaces (e.g., 610, 650) for enabling student user to initiate new posts (e.g., via 610), post comments/questions/replies to existing threads/posts (e.g., via 650), etc.

As illustrated in the example embodiment of FIG. 6, the Interface portions 610 and 650 may include features and/or functionality for enabling the student user to initiate and/or perform one or more of the following operation(s)/action(s) (or combinations thereof):
  Select, upload and post attachments (614).
  Select, capture, edit, annotate, upload and post images or photos (615).
  Create and post equations via equation editor functionality (616).
  Record, edit, upload and post video content (612).
  Access various types of whiteboard functionality (e.g., 613, 617), which, for example, may be used to create and post drawings, graphs, animated tutorials, etc. For example, as illustrated in the example embodiment of FIG. 6, Student Interactive Study Wall GUI 601 includes buttons or icons (e.g., Whiteboard Buttons 613, 653) which, when selected by the user, may provide the user with access to various types of whiteboard functionality, as illustrated, for example, in the Interactive Whiteboard GUI 901 of FIG. 9. According to different embodiments, whiteboard functionality may be built directly into the user interface, which, for example, may be configured or designed to as a discussion wall, a discussion board, a discussion thread, a chat box, etc.
  Post an image or video captured from the user's smartphone (621).
  Post an image or video captured from the user's computer, tablet, etc. (619).
  In at least one embodiment, students may preview their post before publishing their post on the Interactive Study Wall.
Post/Thread filtering functionality (e.g., 620) for enabling student users to selectively include or exclude display of posts/threads by defining, configuring and/or setting various filtering criteria such as, for example, one or more of the following (or combinations thereof):
  Students' Teacher
  Students' Section/Class
  Students' School
  Students' District
  Students' Grade Level
  Students' Educational curriculum such as, for example: class/grade/school/state curriculum information.
  Student's profile data such as, for example: User ID, User email address, User IP address, User messaging address, etc.
  Students' Region (e.g. Panhandle, Southern Florida, etc.)
  Students' Consortiums (e.g. NEFEC schools, etc.)

Students' School Rankings
Students' Gender
Students' Demographics
Students' test scores from previous formative assessments (e.g. benchmarks)
Students' test scores from previous summative assessments (e.g. end of course exams)
Post difficulty level (e.g., as ranked by algorithms)
Post difficulty level (e.g., as ranked by humans)
Number of posts started by students
Number of comments (replies) made by students
Number of karma points made by students
Number of videos watched by students
Difficulty level of videos watched by students
Number of "Test Yourself!" questions attempted by students
Number of "Test Yourself!" questions correctly answered by students
Percentage of "Test Yourself!" questions correctly answered by students
Posts/threads which have been identified as being closed or correctly answered
Posts/threads which have been identified as still being open or unanswered,
Etc.

Figure 7:
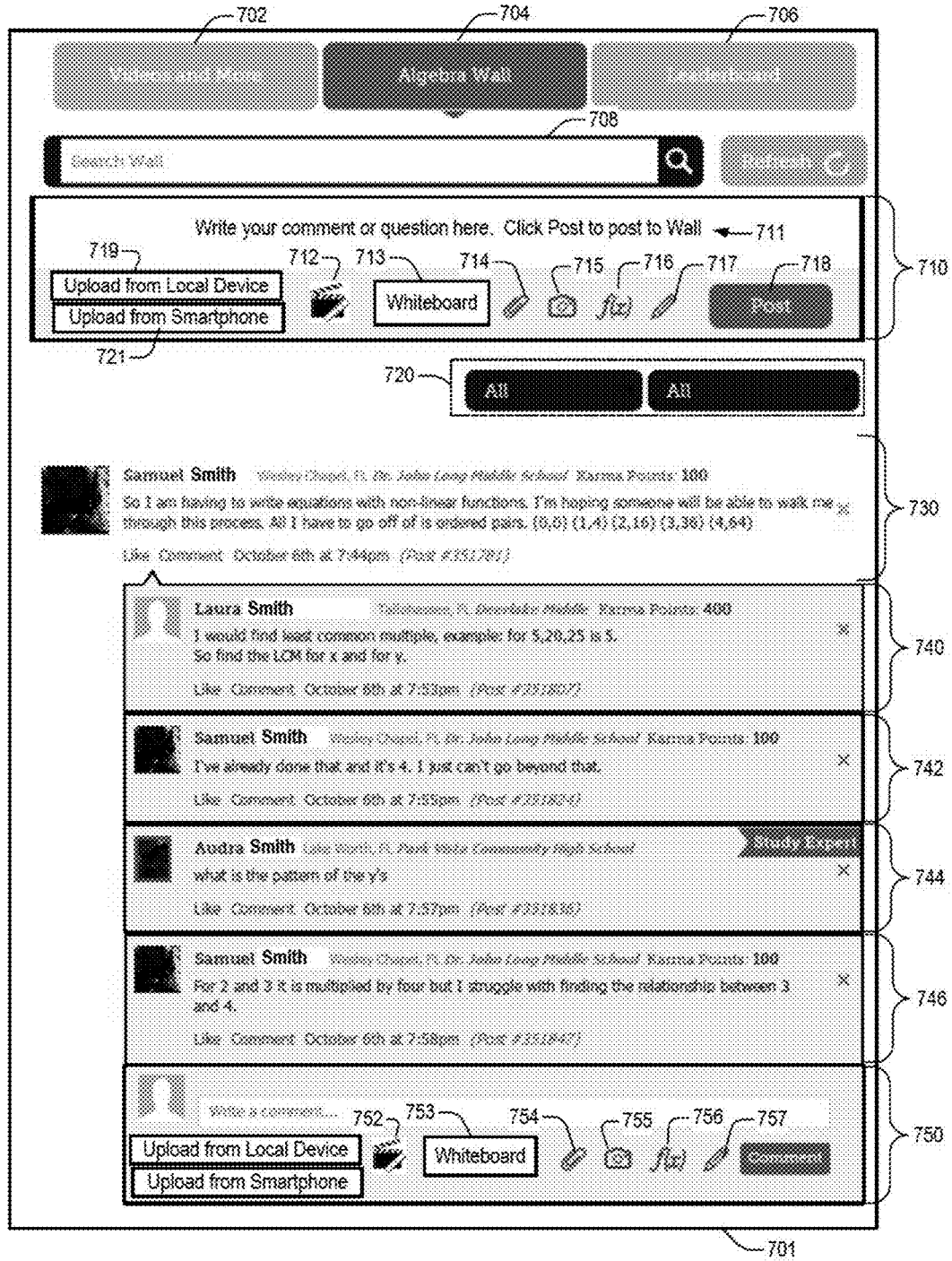

FIG. 7 shows an example screenshot of a Teacher Interactive Study Wall GUI 701 in accordance with a specific embodiment. According to different embodiments, the Teacher Interactive Study Wall GUI 701 may be configured or designed to enable school teachers and/or other school educators to perform a variety of activities such as, for example:

Browsing questions, comments, threads and discussions posted to the Interactive Study Wall;
Viewing Interactive Study Wall posts (e.g., 730) such as those posted by the Teacher user, students, other teachers, and/or Study Experts;
Viewing comments/replies to Interactive Study Wall posts (e.g., 740, 742, 744, 746) such as those posted by the Teacher user, students, other teachers, and/or Study Experts;
Searching for posts relating to specific content, keywords, topics, etc.;
Drafting and posting questions to the Interactive Study Wall;
Drafting and posting comments or replies to the Interactive Study Wall;
And/or other types of activities described and/or referenced herein.

In at least one embodiment, a "Teacher" as described herein may refer to an educator (e.g., teacher, professor, instructor, math coach, etc.) who is a member of a school staff or administration. Typically, such Teachers may have associated identities and/or profiles in the school district's computer network(s) which may be used to authenticate and verify a Teacher's credentials.

As illustrated in the example embodiment of FIG. 7, the Teacher Interactive Study Wall GUI 701 may be configured or designed to provide a Teacher user with access to a variety of functions and/or features of the Interactive Study Wall such as, for example, one or more of the following (or combinations thereof):

Access to tutorials, videos, and other educational content 702
Access to Interactive Study Wall Leaderboard(s) 706
Keyword search functionality 708
Interfaces (e.g., 710, 750) for enabling Teacher user to initiate new posts (e.g., via 710), post comments/questions/replies to existing threads/posts (e.g., via 750), etc.

As illustrated in the example embodiment of FIG. 7, the Interface portions 710 and 750 may include features and/or functionality for enabling the Teacher user to initiate and/or perform one or more of the following operation(s)/action(s) (or combinations thereof):

Select, upload and post attachments (714).
Select, capture, edit, annotate, upload and post images or photos (715).
Create and post equations via equation editor functionality (716).
Record, edit, upload and post video content (712).
Access various types of whiteboard functionality (e.g., 713, 717), which, for example, may be used to create and post drawings, graphs, animated tutorials, etc. For example, as illustrated in the example embodiment of FIG. 7, Teacher Interactive Study Wall GUI 701 includes buttons or icons (e.g., Whiteboard Buttons 713, 753) which, when selected by the user, may provide the user with access to various types of whiteboard functionality, as illustrated, for example, in the Interactive Whiteboard GUI 901 of FIG. 9. According to different embodiments, whiteboard functionality may be built directly into the user interface, which, for example, may be configured or designed to as a discussion wall, a discussion board, a discussion thread, a chat box, etc.
Post an image or video captured from the user's smartphone (721).
Post an image or video captured from the user's computer, tablet, etc. (719).
In at least one embodiment, Teachers may preview their post before publishing their post on the Interactive Study Wall.

Post/Thread filtering functionality (e.g., 720) for enabling Teacher users to selectively include or exclude display of posts/threads by defining, configuring and/or setting various filtering criteria such as, for example, one or more of the following (or combinations thereof):

Students' Teacher
Students' Section/Class
Students' School
Students' District
Students' Grade Level
Students' Region (e.g. Panhandle, Southern Florida, etc.)
Students' District Consortiums (e.g. NEFEC schools, etc.)
Students' Educational curriculum such as, for example: class/grade/school/state curriculum information.
Student's profile data such as, for example: User ID, User email address, User IP address, User messaging address, etc.
Students' School Rankings
Students' Gender
Students' Demographics
Students' test scores from previous formative assessments (e.g. benchmarks)
Students' test scores from previous summative assessments (e.g. end of course exams)
Post difficulty level (e.g., as ranked by algorithms)
Post difficulty level (e.g., as ranked by humans)
Number of posts started by Students
Number of comments (replies) made by Students Number of karma points made by Students
Number of videos watched by Students
Difficulty level of videos watched by Students
Number of "Test Yourself!" questions attempted by Students
Number of "Test Yourself!" questions correctly answered by Students
Percentage of "Test Yourself!" questions correctly answered by Students
Teachers' Section/Class
Teachers' School
Teachers' District
Teachers' Grade Level
Teachers' Region (e.g. Panhandle, Southern Florida, etc.)
Teachers' District Consortiums (e.g. NEFEC schools, etc.)
Teachers' School Rankings
Teachers' Gender
Teachers' Demographics
Post difficulty level (e.g., as ranked by algorithms)
Post difficulty level (e.g., as ranked by humans)
Number of posts started by Students
Number of comments (replies) made by Students
Number of karma points made by Students
Number of videos watched by Students
Difficulty level of videos watched by Students
Number of "Test Yourself!" questions attempted by Students
Number of "Test Yourself!" questions correctly answered by Students
Percentage of "Test Yourself!" questions correctly answered by Students
Number of posts started by Teachers
Number of comments (replies) made by Teachers
Number of karma points awarded by Teachers
Number of videos watched by Teachers
Difficulty level of videos watched by Teachers
Posts/threads which have been identified as being closed or correctly answered
Posts/threads which have been identified as still being open or unanswered,
Etc.

In at least some embodiments, teachers and Study Experts may be provided with functionality for filtering posts based on one or more of the following types of filtering criteria (or combinations thereof):
Classroom,
Teacher,
Grade,
Section,
School,
District,
State,
Etc.

Figure 8:
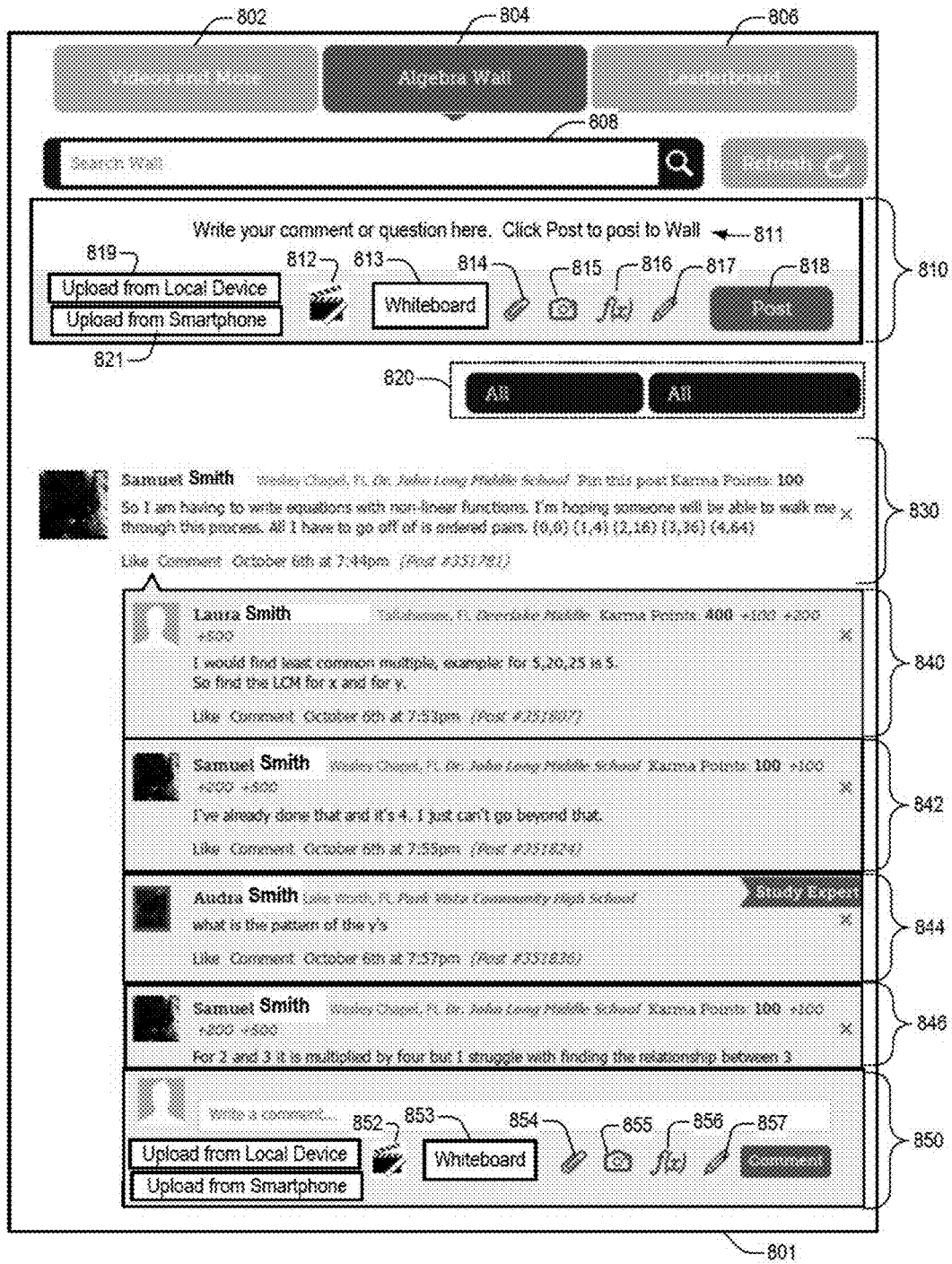

FIG. 8 shows an example screenshot of a Study Expert Interactive Study Wall GUI 801 in accordance with a specific embodiment. According to different embodiments, the Study Expert Interactive Study Wall GUI 801 may be configured or designed to enable school Study Experts and/or other teachers and school educators to perform a variety of activities such as, for example, one or more of those described and/or referenced herein with respect to the Teacher Interactive Study Wall GUI 701 of FIG. 7.

In at least one embodiment, a "Study Expert" as described herein may refer to any third-party person who has been provided with proper authorization/authority (e.g., from the Interactive Study Wall administration) to serve as an "educational moderator/facilitator" of one or more portions of the Interactive Study Wall.

As illustrated in the example embodiment of FIG. 8, the Study Expert Interactive Study Wall GUI 801 may be configured or designed to provide a Study Expert user with access to a variety of functions and/or features of the Interactive Study Wall such as, for example, one or more of the following (or combinations thereof):
Access to tutorials, videos, and other educational content 802
Access to Interactive Study Wall Leaderboard(s) 806
Keyword search functionality 808
Interfaces (e.g., 810, 850) for enabling Study Expert user to initiate new posts (e.g., via 810), post comments/questions/replies to existing threads/posts (e.g., via 850), etc.
As illustrated in the example embodiment of FIG. 8, the Interface portions 810 and 850 may include features and/or functionality for enabling the Study Expert user to initiate and/or perform one or more of the following operation(s)/action(s) (or combinations thereof):
Select, upload and post attachments (814).
Select, capture, edit, annotate, upload and post images or photos (815).
Create and post equations via equation editor functionality (816).
Record, edit, upload and post video content (812).
Access various types of whiteboard functionality (e.g., 813, 817), which, for example, may be used to create and post drawings, graphs, animated tutorials, etc. For example, as illustrated in the example embodiment of FIG. 8, Study Expert Interactive Study Wall GUI 801 includes buttons or icons (e.g., Whiteboard Buttons 813, 853) which, when selected by the user, may provide the user with access to various types of whiteboard functionality, as illustrated, for example, in the Interactive Whiteboard GUI 901 of FIG. 9. According to different embodiments, whiteboard functionality may be built directly into the user interface, which, for example, may be configured or designed to as a discussion wall, a discussion board, a discussion thread, a chat box, etc.
Post an image or video captured from the user's smartphone (821).
Post an image or video captured from the user's computer, tablet, etc. (819).
In at least one embodiment, Study Experts may preview their post before publishing their post on the Interactive Study Wall.
Change the permissions level of an edited image, allowing images to be edited by one or more specified user(s) and/or group(s) of user(s) (e.g., one student, a group of students, teachers associated with a specific grade, teachers associated with a specific school, all students, all teachers, etc.).
Award Karma Points (and/or other incentives/rewards) to Student users.
Edit posts/discussion threads.
Mark selected discussion threads as "closed".
Etc.
Post/Thread filtering functionality (e.g., 820) for enabling Study Expert users to selectively include or exclude display of posts/threads by defining, configuring and/or setting various filtering criteria such as, for example, one or more of those described and/or referenced herein.

In at least some embodiments, Study Experts and Study Experts may be provided with functionality for filtering posts based on one or more of the following types of filtering criteria (or combinations thereof):
Classroom,
Teacher,
Grade,
Section,
School,
District,
State,
Subject,
Difficulty level of questions,
Date,
Etc.

Online Discussion Thread Whiteboard Functionality

Several aspects of the present application relate to the provisioning or integration of discussion thread whiteboard functionality in online learning environments such as discussion forums, discussion threads, chat rooms, discussion walls, Interactive Study Walls, etc. (collectively referred to as "collaborative online discussion mediums") Example embodiments of features relating to this aspect are illustrated, for example, in FIGS. 6, 9, 10, 14, 33.

Figure 9:
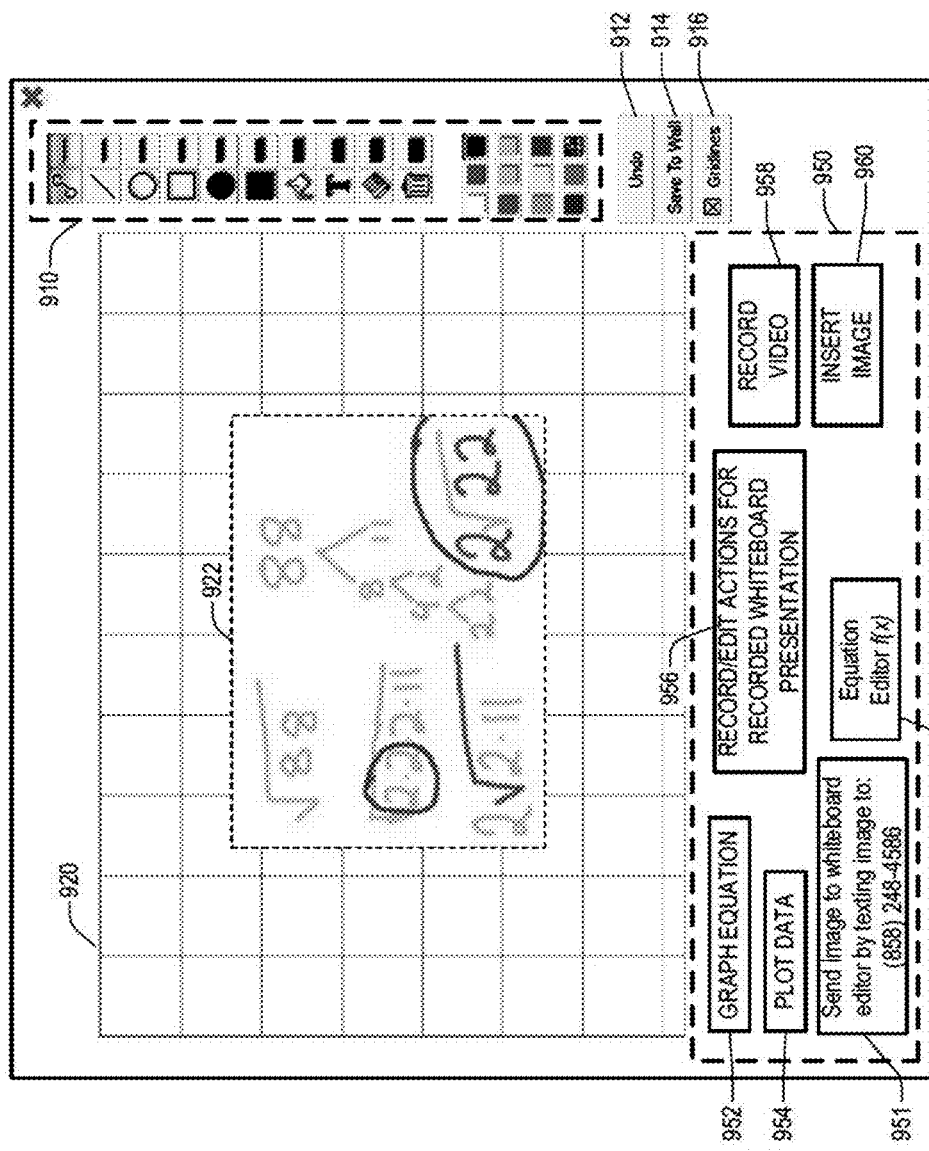
Figure 10:
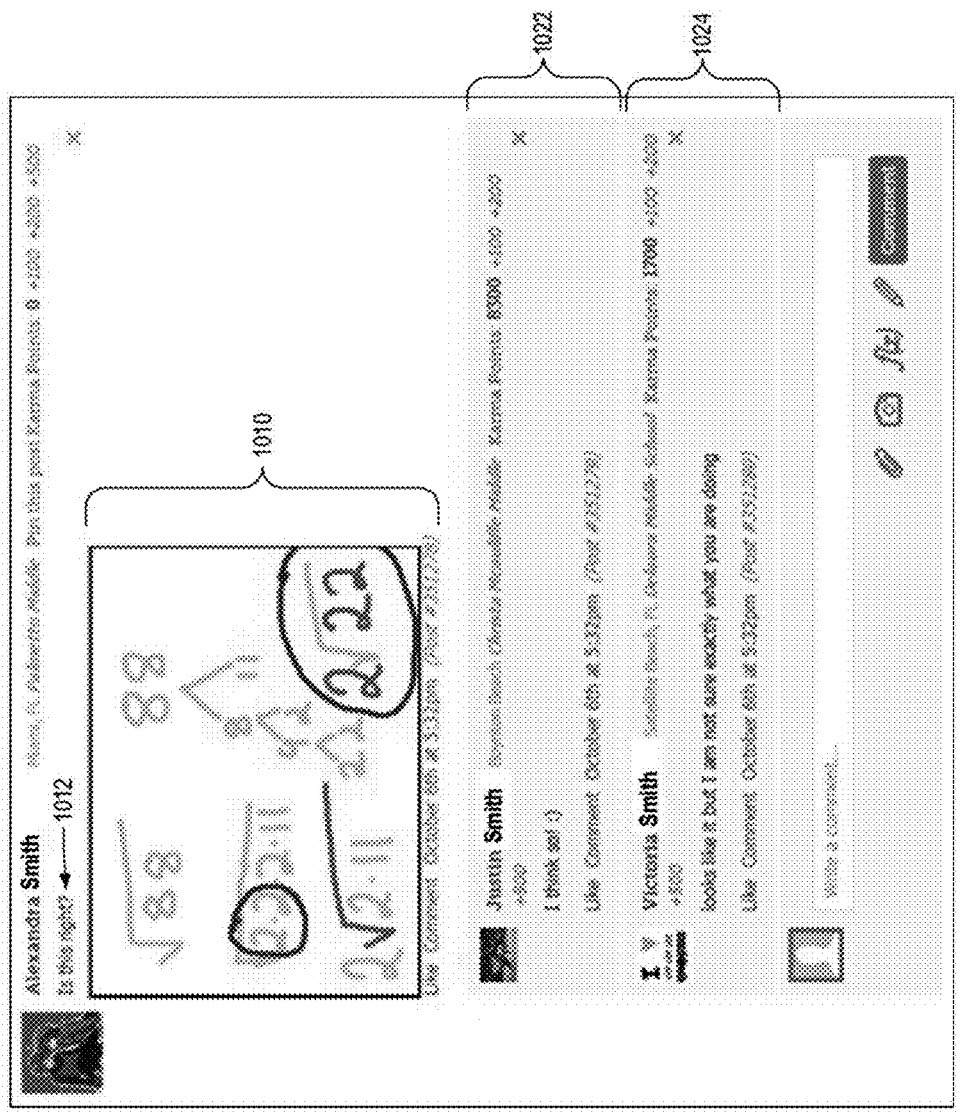

For example, as illustrated in the example embodiment of FIG. 6, Student Interactive Study Wall GUI 601 includes buttons or icons (e.g., Whiteboard Buttons 613, 653) which, when selected by the user, may provide the user with access to various types of whiteboard functionality, as illustrated, for example, in the Interactive Whiteboard GUI 901 of FIG. 9. According to different embodiments, whiteboard functionality may be built directly into the user interface, which, for example, may be configured or designed to as a discussion wall, a discussion board, a discussion thread, a chat box, etc.

FIG. 9 shows an example screenshot of an Interactive Whiteboard GUI 901 in accordance with a specific embodiment. As illustrated in the example embodiment of FIG. 9, the Interactive Whiteboard GUI 901 includes a variety of different whiteboard tools (e.g., 910, 920, 950) for enabling users to perform a variety of activities such as, for example, one or more of the following (or combinations thereof):
Create/draw/edit notes, pictures, and/or diagrams (e.g., via whiteboard editing tools 910).
Create/draw/edit graphs (e.g., via freehand, using pre-set grid lines, etc.).
Create data tables
Plot graphs based upon data points, equations, etc. (e.g., via Graph Equation functionality 952, Plot data functionality 954, etc.).
Capture/upload/edit/annotate images (e.g., via Insert Image functionality 960, via mobile device, email, MMS (951), etc.);
Record/upload/edit videos ((e.g., via Record Video functionality 958, via Record/Edit Actions functionality 956, via mobile device, email, MMS, etc.).
Scan/upload/edit/annotate documents (e.g., via mobile device, email, MMS, reference library pre-populated by the system, etc.).
Record and upload annotated/animated whiteboard diagrams.
Write out complex equations (e.g., via Equation Editor functionality 953).
Draw formulas.
Draw molecular structures, which may or may not be pre-populated by the system.
And/or other types of graphical illustration, editing, annotating operations/activities.

In the specific example embodiment of FIG. 9, it is assumed that a Student user desires to submit a post on the Interactive Study Wall relating to a specific mathematical problem. The Student user accesses an instance of the Interactive Whiteboard GUI 901 to graphically illustrate (e.g., at 922) a portion of steps for solving the mathematical problem. In this particular example, it is assumed that the user accesses the whiteboard drawing tools 910 to draw various equations 922 on the whiteboard canvas 920. The user then intends to post the whiteboard drawing into a new discussion thread which requests other users to review/confirm/comment on whether (or not) the Student user's work/proposed solution is correct. After drawing/annotation is completed, the user can choose to save the edited whiteboard canvas (or whiteboard drawing) and/or post directly to the online discussion thread (e.g., Interactive Study Wall), which causes the whiteboard drawing to be inserted into a new (or existing) discussion thread, as shown, for example, in at 1010 of FIG. 10.

In at least some embodiments, the user may also be provided with the option to add or attach additional commentary/text to the whiteboard drawing before and/or after posting to the discussion thread. The whiteboard drawing (with or without the additional text/commentary, as the user elects) may then be posted directly to the identified discussion thread, with no interruption in the flow of the discussion. Thus, for example, as illustrated in the example embodiment of FIG. 10, the Interactive Study Wall Discussion Thread GUI 1001 shows that the Student user (Alexendra Smith) has posted a new discussion thread which includes the whiteboard drawing 1010 (created via the Interactive Whiteboard GUI 901) and an associated comment/question 1012 (e.g., "Is this right?"). Other online users of the Interactive Study Wall may view the discussion thread post, and (if desired) submit comments/replies (e.g., as indicated, for example, at 1022 and 1024).

According to different embodiments, users may interact with the various discussions or threads of the Interactive Study Wall both synchronously and/or asynchronously. In some embodiments, users may reply to the entire thread generally, or to a comment specifically.

In some embodiments, the OSES whiteboard functionality may be configured or designed to enable or provide different types of whiteboard functionalities and/or privileges to different users who are collaborating together via the Interactive Study Wall and/or other OSES discussions/threads/forums. In some embodiments, at least a portion of such permissions/restrictions in functionalities, editing capabilities, and/or privileges may be dynamically configured by users via one or more Interactive Study Wall GUIs. For example, in some embodiments, some instances of Interactive Whiteboard GUIs may be configured or designed to include functionality for enabling users to configure different levels of permissions/restrictions/privileges for different users (and/or groups of users) with respect to accessing and/or editing posted content at one or more OSES discussions/threads/forums. In some embodiments, some instances of the Interactive Whiteboard GUI (e.g., such as that illustrated in FIG. 33) may include functionality (e.g., 3310, 3320) for configuring different levels of permissions/restrictions/privileges for different users (and/or groups of users). In some embodiments, permissions/restrictions/privileges for accessing and/or editing posted content at one or more OSES discussions/threads/forums may be automatically configured (e.g., by the OSES Server), based on one or more criteria such as, for example, one or more of the following (or combinations thereof):
- Class/type of User (e.g., Student, Teacher, Study Expert)
  Students' Educational curriculum such as, for example: class/grade/school/state curriculum information.
  Student's profile data such as, for example: User ID, User email address, User IP address, User messaging address, etc.
- And/or other types of criteria described and/or referenced herein.

For example, in one embodiment, one or more user(s) may be provided with access to editing privileges (e.g., for editing posted images and/or text), while the other users in the discussion may be provided with only viewing privileges (and may be prevented from having access to editing privileges). In some embodiments, one or more user(s) may be granted permissions for allowing the identified user(s) to grant/remove/modify/configure editing privileges for one or more other users. In some embodiments, more than one user (e.g., multiple different users) may be provided with whiteboard editing privileges, and may concurrently (e.g., in real-time) (or asynchronously) draw, annotate and/or edit images, drawings and/or other objects displayed on the whiteboard canvas. In embodiments where multiple users are granted whiteboard editing privileges, visual indicators (e.g., 1425, FIG. 14; 1525, FIG. 15) may be optionally enabled to identify and associate specific edits, annotations, revisions with the respective user(s) who performed such actions/operations.

Figure 33:
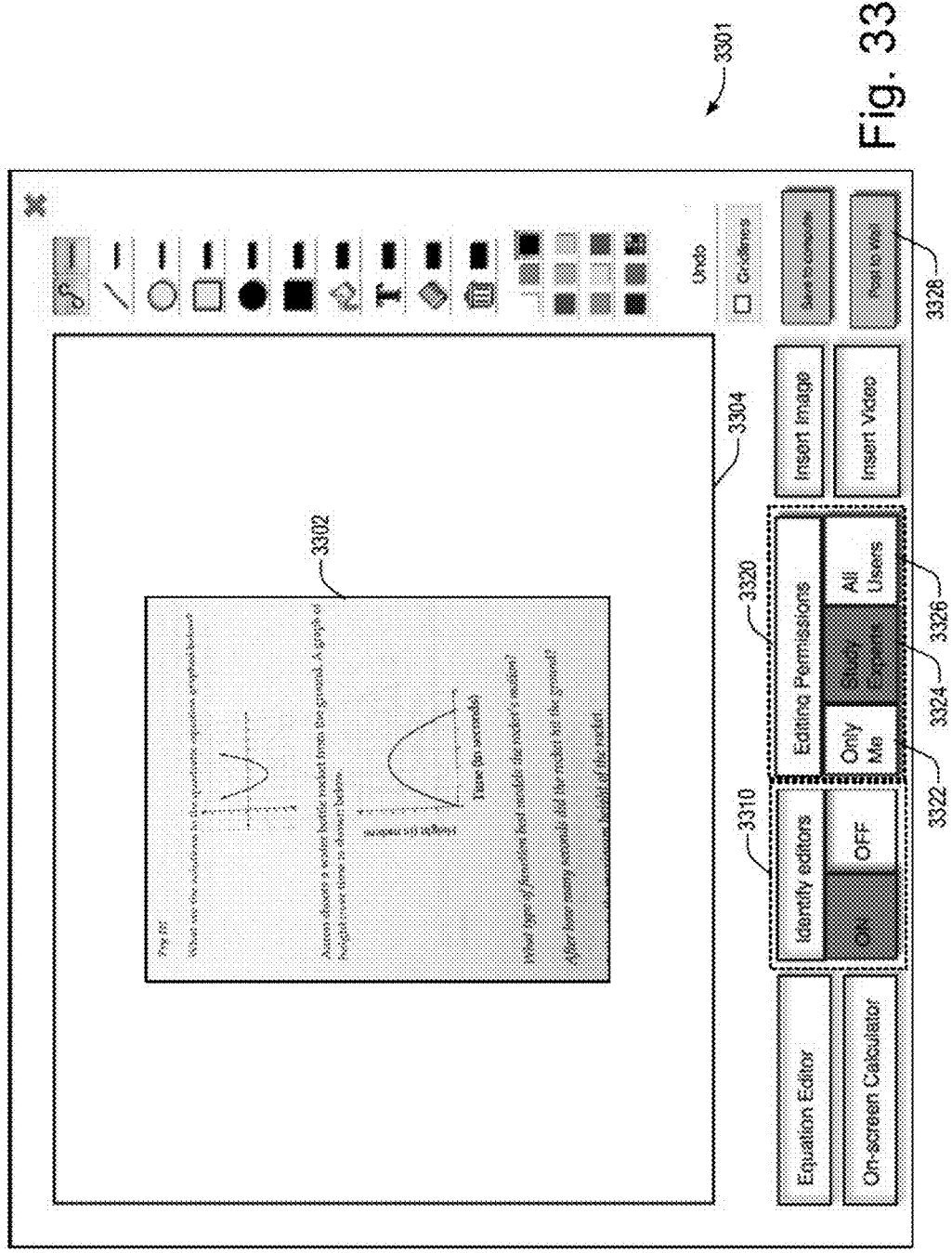

For example. as illustrated in the example embodiment of FIG. 33, the Interactive Whiteboard GUI 3301 may include functionality for:
- Enabling the user to enable/disable the feature of "Identify Editors" (3310) which, when enabled, may cause the OSES server to display visual indicators which may be used to visually identify and associate specific edits, annotations, revisions with the respective user(s) who performed such actions/operations.
- Enabling the user to access and configure "Editing Permissions" (3320) which, for example, may be configured or designed to allow the identified user to grant/remove/modify/configure editing privileges for one or more other users (or groups of users) such as, for example, one or more of the following (or combinations thereof):
  - Only Me (the user associated with posting of the content) 3322.
  - Study Experts 3324.
  - All Users 3326.
  - And/or other specified group(s) and/or type(s) of users.

Figure 34:
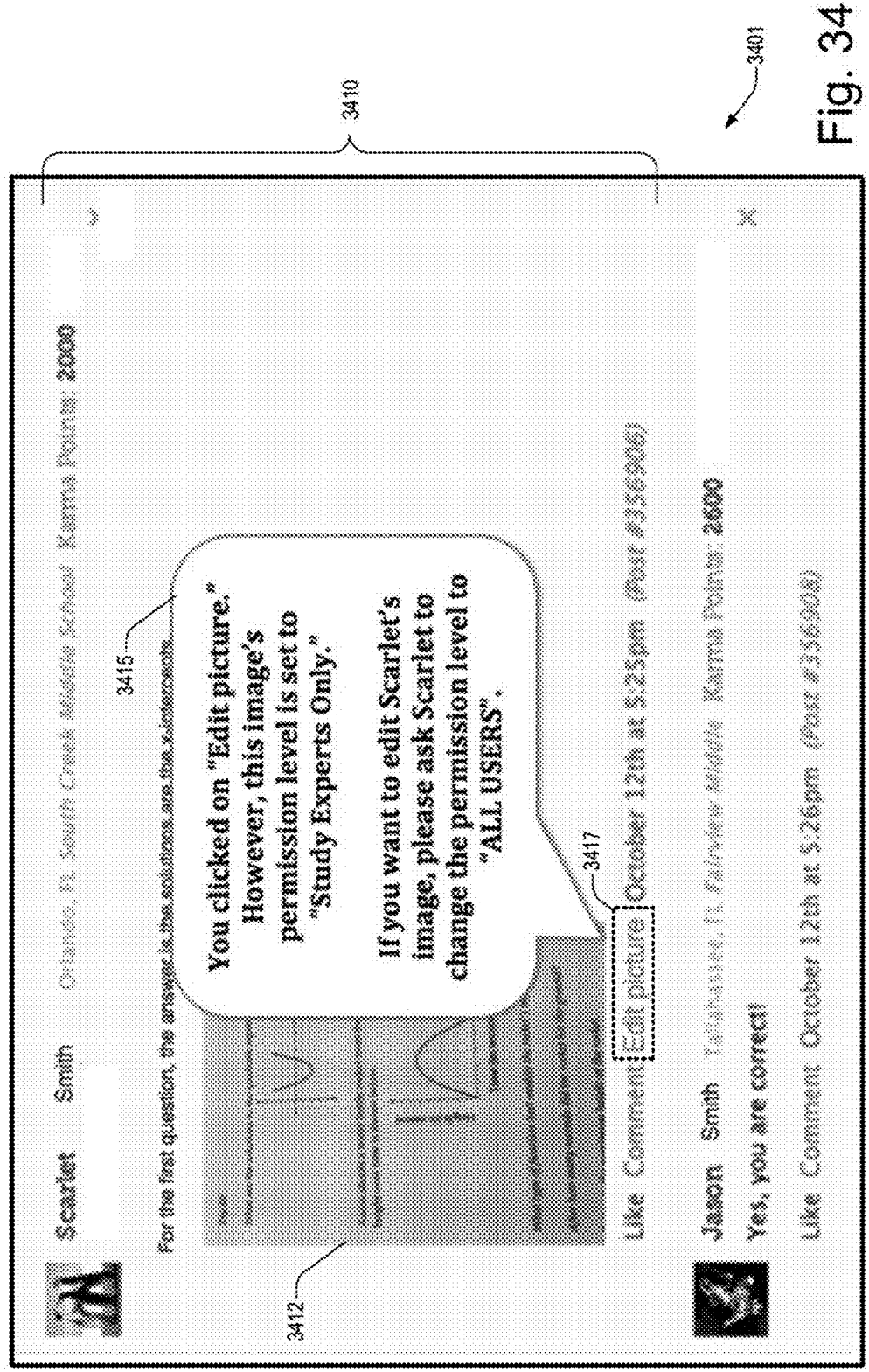

In the specific example embodiment of FIG. 33, it is assumed that the user has configured the Interactive Whiteboard GUI 3301 to:
- enable the "Identify Editors" feature (3310); and
- permit only Study Experts to edit/annotate the image 3302, which is to be posted to the Interactive Study Wall (e.g., as shown, for example, in FIG. 34).

Accordingly, as illustrated in the example embodiment of FIG. 34, the whiteboard image 3412 has been posted at the Interactive Study Wall as part of a new discussion thread. Additionally, as illustrated in the example embodiment of FIG. 34, the Discussion Thread GUI 3401 includes an "edit picture" link 3417, which, when selected by a user, may allow the user to edit and/or annotate the image/picture, if the user has sufficient permissions to do so. In the specific example embodiment of FIG. 34, it is assumed that a non Study Expert user has clicked on the "Edit picture" icon 3417, and in response, the OSES Server has determined that the user does not have sufficient privileges for editing the posted image, and responds by displaying a message 3415 to the user, such as, for example "You clicked on 'Edit picture.' However, this image's permission level is set to 'Study Experts Only' If you want to edit Scarlet's image, please ask Scarlet to change the permissions level to 'ALL USERS'." In some embodiments, a Study Expert can override the permission level of the posted image.

Figure 35:
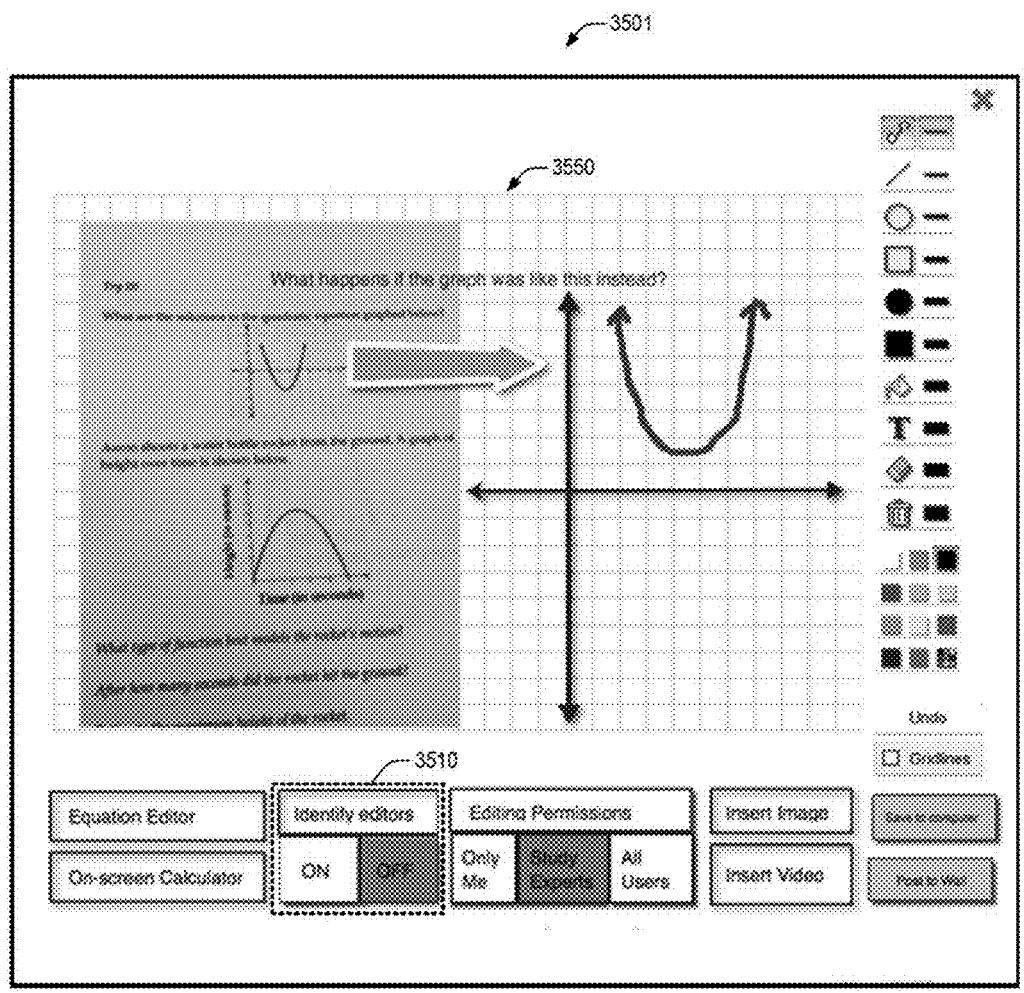
Figure 36:
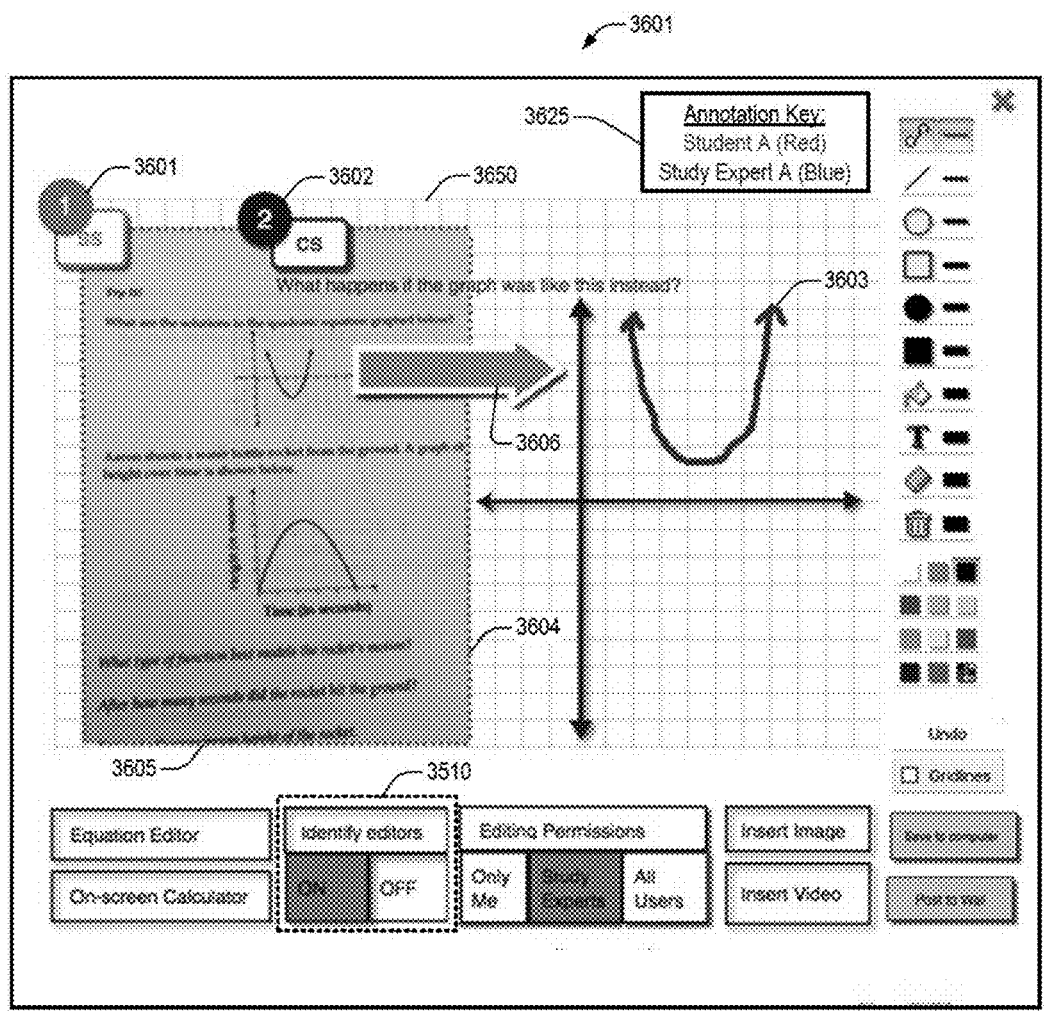

FIGS. 35 and 36 illustrate different example embodiments of a Collaborative Whiteboard GUI 3501, illustrating various aspects of the "Identify Editors" feature (3510) described herein. In the specific example embodiment of FIG. 35, it is assumed that the Collaborative Whiteboard GUI 3501 is configured or designed to permit both the user-creator (user who originally uploaded the image) and Study Experts to access the Collaborative Whiteboard GUI 3501 and perform one or more edits/annotations to the whiteboard canvas 3550 (or contents thereof). According to different embodiments, edits may be performed synchronously and concurrently (e.g., in real-time) by multiple different users (e.g., user-creator and one or more Study Experts). Further, in some embodiments, edits may be performed asynchronously (e.g., in non-real time) by multiple different users.

In at least one embodiment, the OSES Server may be configured or designed to automatically track each of the various edits/annotations/modifications which each user contributes to a given portion of posted content (e.g., posted image, video, whiteboard content, and/or other types of posted content), and to associate each tracked edit/annotation/modification with the respective user who performed such action(s).

In the specific example embodiment of FIG. 35, it is assumed that the "Identify Editors" feature (3510) has been disabled, and that both the user-creator and a Study Expert have each contributed respective edits/annotations to the whiteboard canvas 3550. In the specific example embodiment of FIG. 36, it is assumed that the "Identify Editors" feature (3510) has been enabled, which causes the OSES Server to present additional visual content (e.g., red/blue colored content 3601-3605) to help users visually distinguish (e.g., by color, mouseover/tool tip text, etc.) each user's respective edits/annotations (e.g., the Student user's edits/annotations shown in red, Study Expert's edits/annotations shown in blue).

In at least some embodiments, any user who has been granted permission to annotate/edit/modify a posted image, may elect to edit/annotate the posted image, and re-post the image in the appropriate discussion medium (e.g., where the original image was posted). For example, as illustrated in the example embodiment of FIG. 37, it is assumed that a Student user (e.g., Scarlet Smith) posted a non-annotated version of the image (e.g., 3712) as a post 3710 to a discussion thread of the Interactive Study Wall. In one embodiment, the posted image 3712 corresponds to an image that was captured by the student-users smartphone and uploaded to the OSES Server (e.g., via Message-to-Post).

Figure 37:
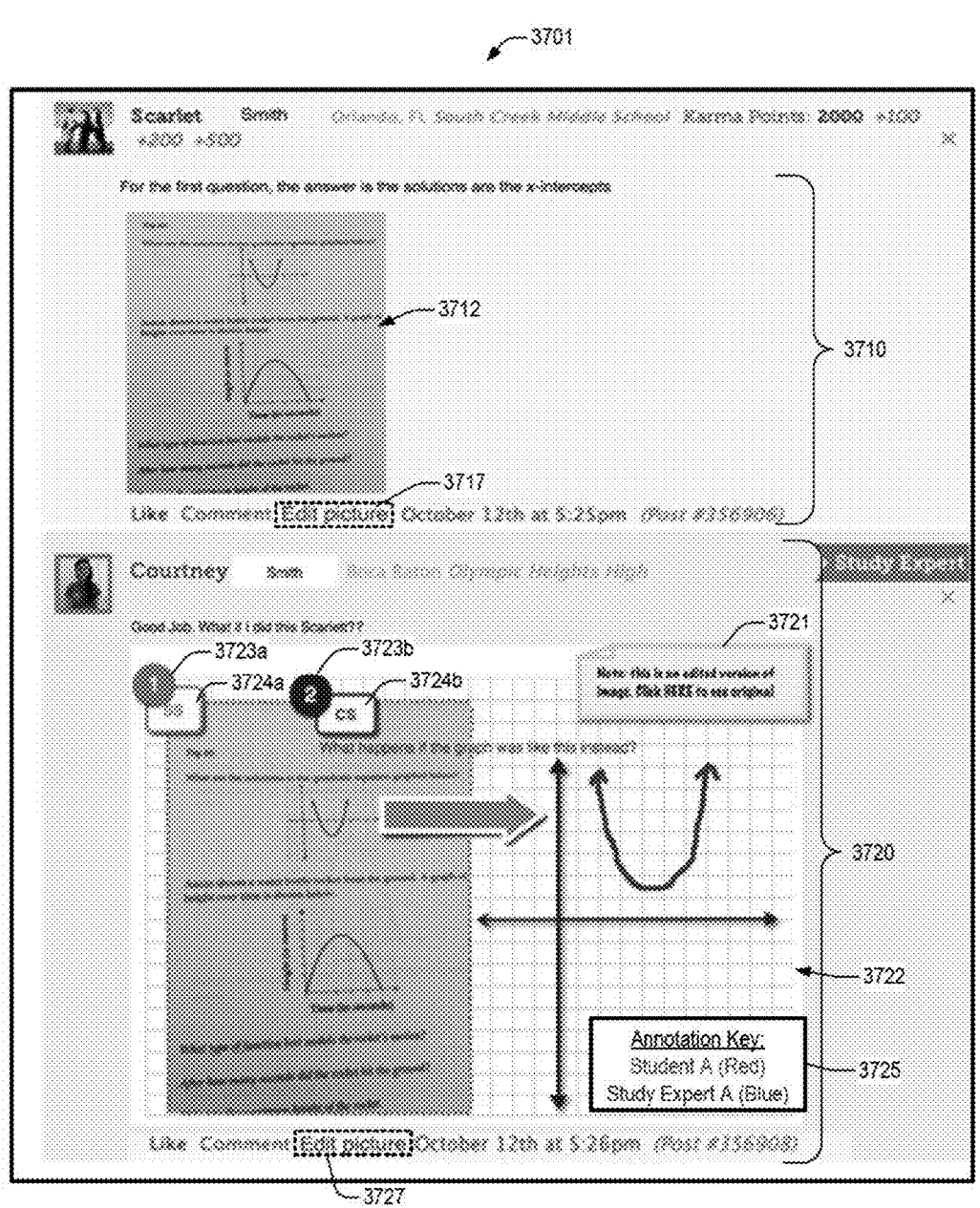

Thereafter, in the specific example embodiment of FIG. 37, it is assumed that a Study Expert user (e.g., Courtney Smith) added annotations to the posted image (e.g., via OSES Whiteboard Editor GUI 3601), enabled the "Identify Editors" feature, and posted the annotated image/edited whiteboard canvas (e.g., 3722) as a reply post/comment 3720 of the same discussion thread. Users who subsequently view the content of this discussion thread are able to view the annotated image/edited whiteboard canvas (e.g., 3722), and visually distinguish (e.g., by color, mouseover/tool tip text, etc.) the Student user's contributions (e.g., shown in red) from the Study Expert's contributions (shown in blue). Additionally, as illustrated in the example embodiment of FIG. 37, the OSES Server may automatically display a notice (e.g., 3721) adjacent to the edited image (3722) advising viewers that "this is an edited version of image. Click HERE to see the original". In one embodiment, users may access/view the original version of the image (as well as historical versions of edits/modifications to the image, if available) by clicking on the "HERE" portion of the notice 3721. The link and notice "HERE" is just one example embodiment. The link can be represented by an icon, symbol, another phrase, etc. In another embodiment, by clicking the link, icon, symbol, etc. the user may be directed to the original post with the original, unedited image.

Figure 19:
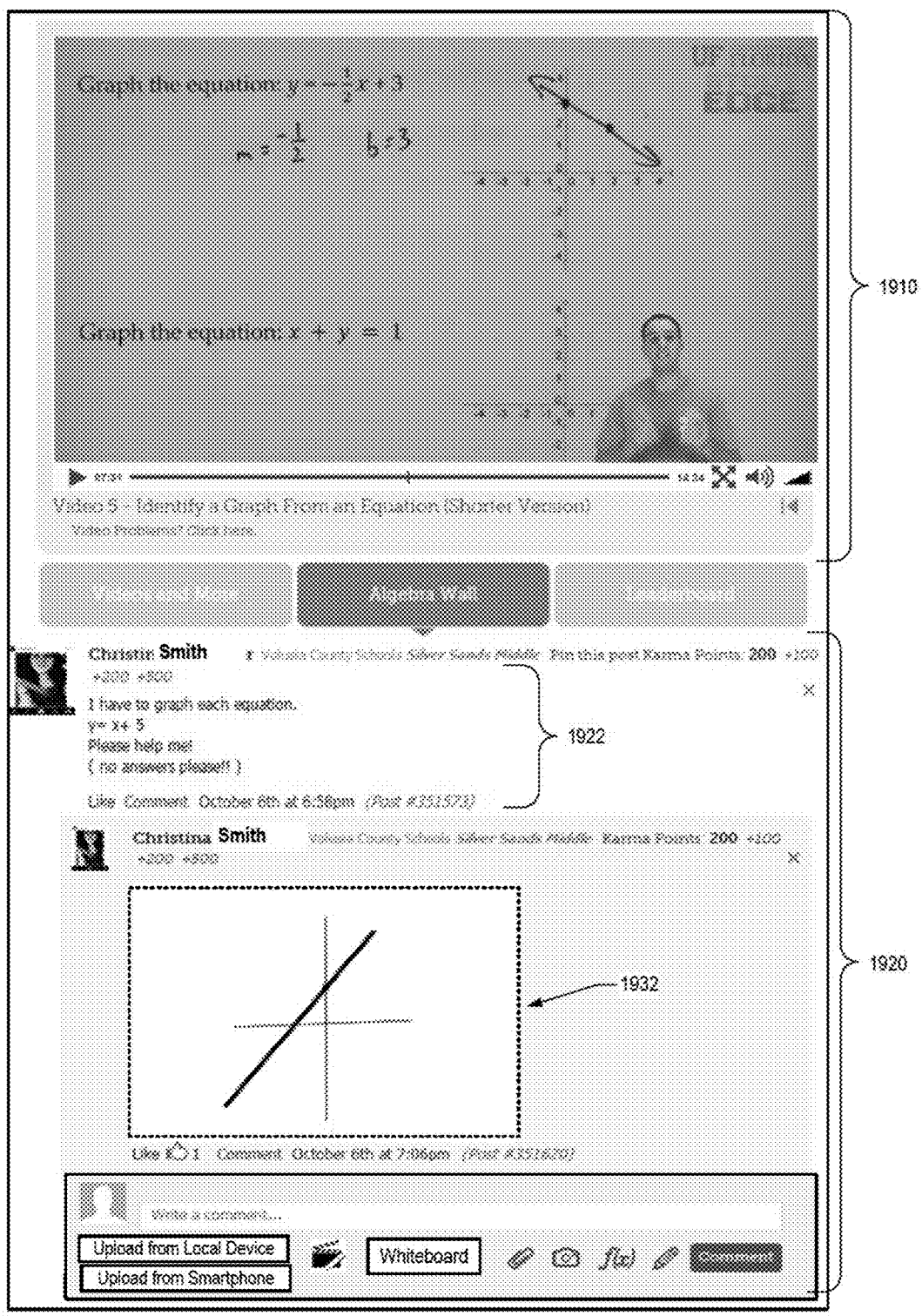
Figure 20:
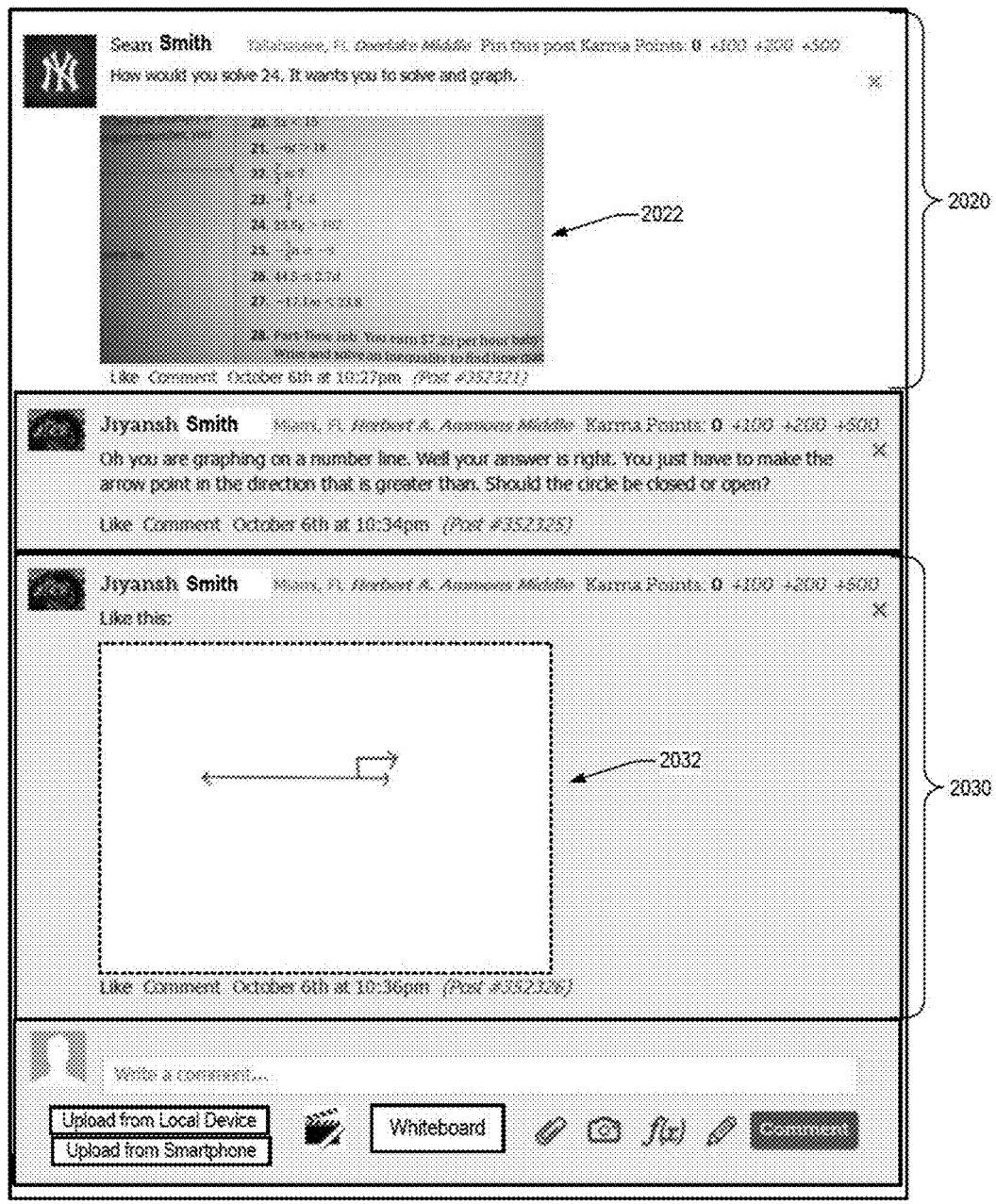
Figure 21:
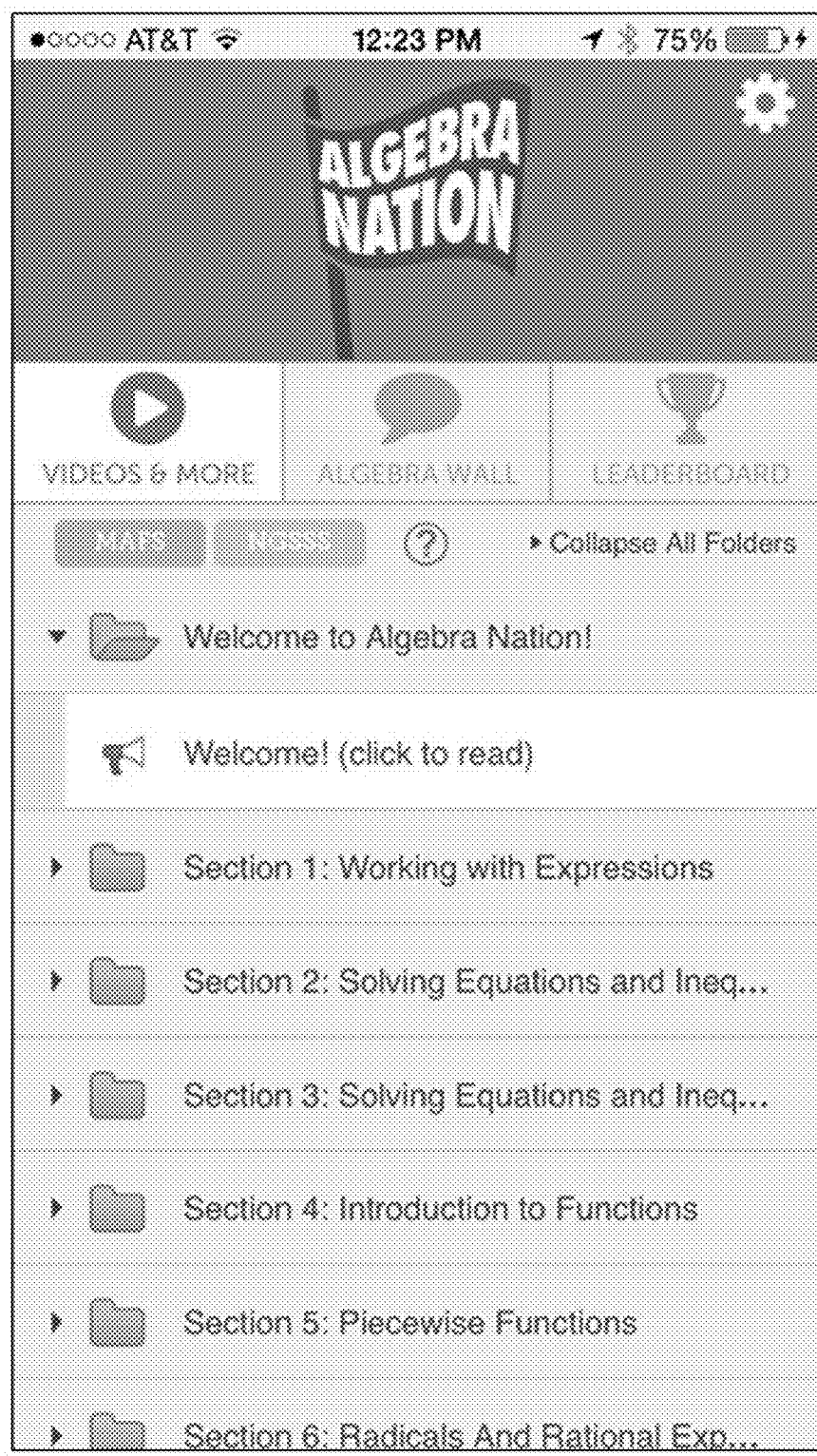
Figure 23:
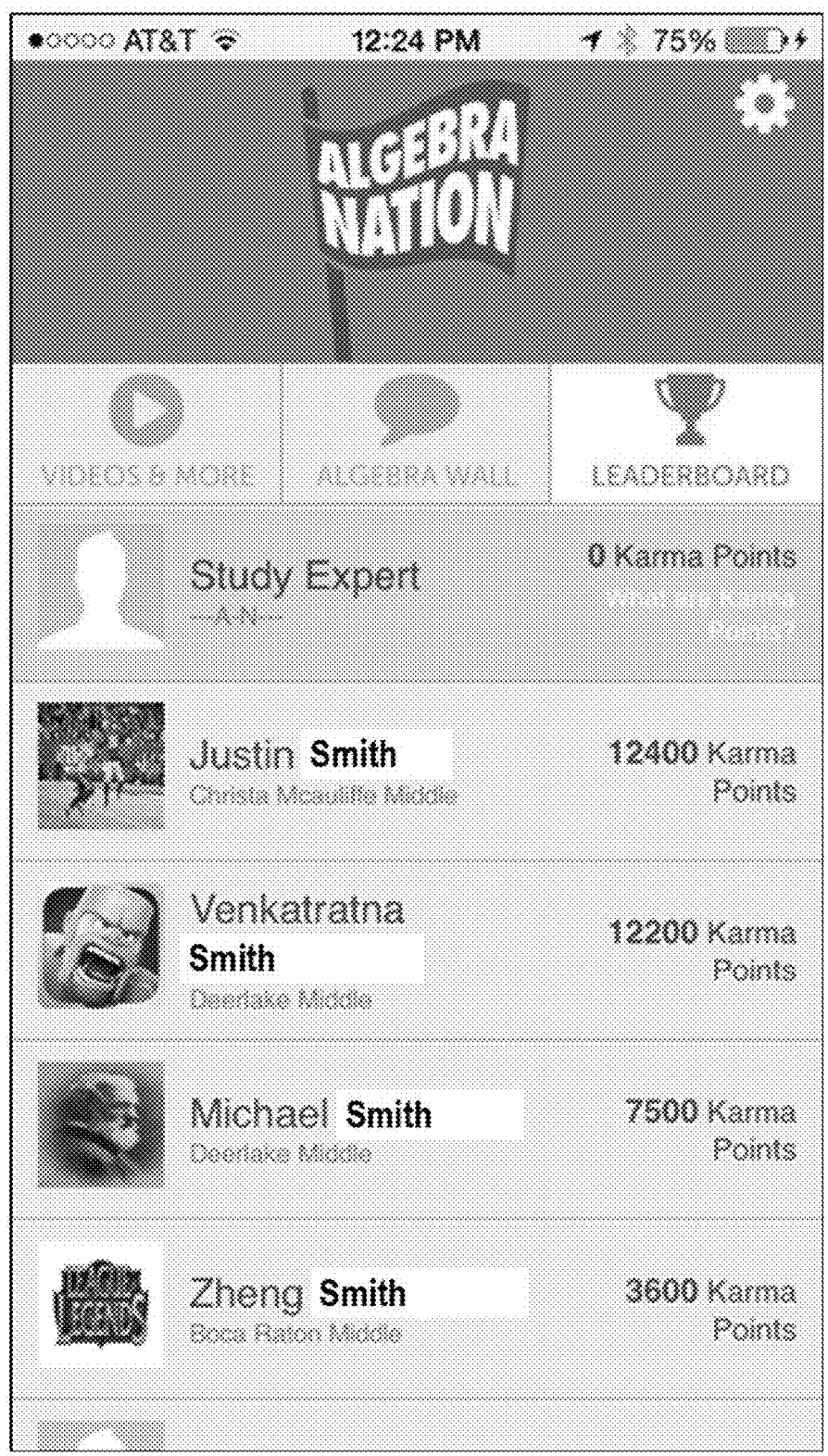
Figure 24:
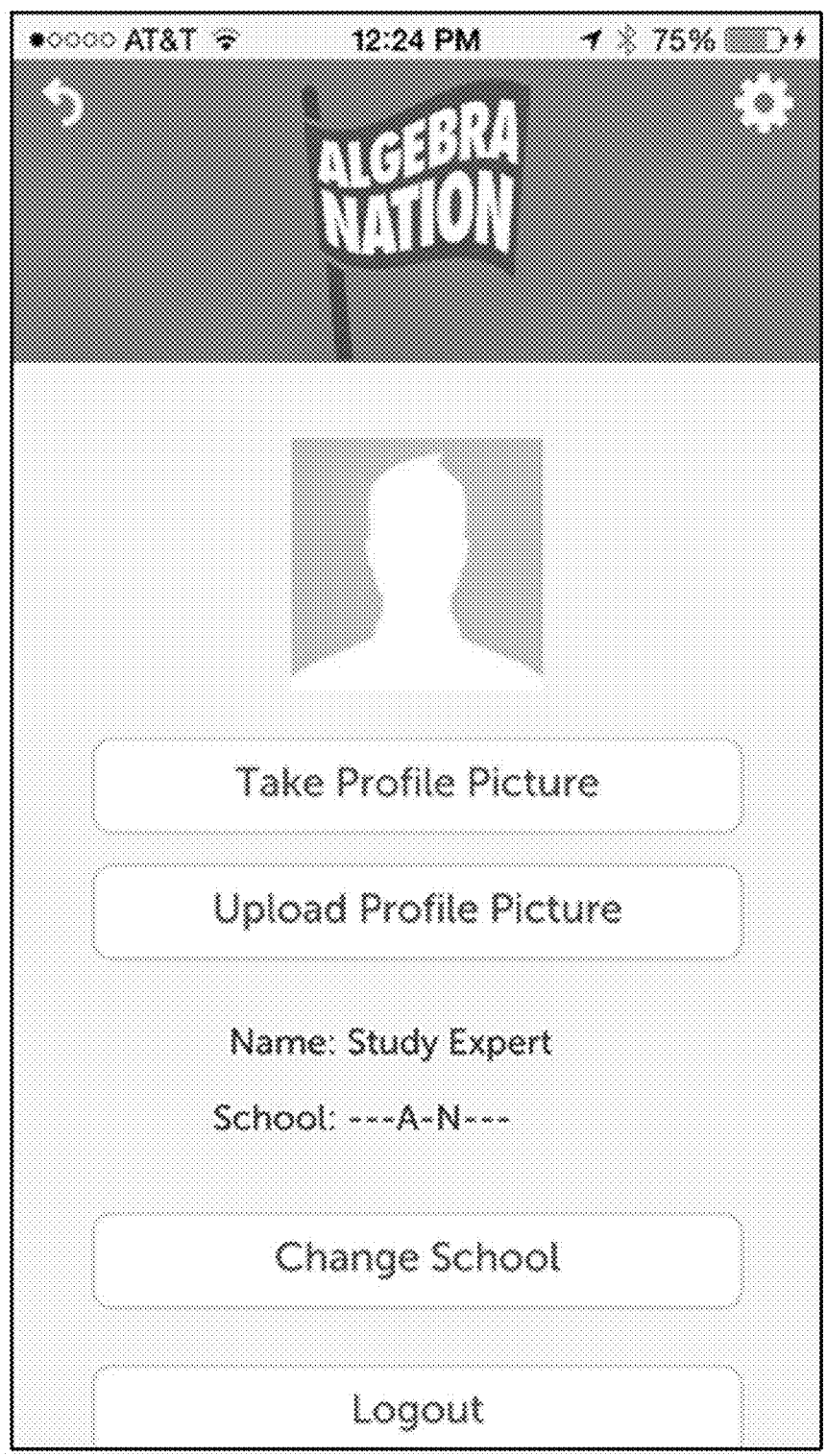
Figure 25:
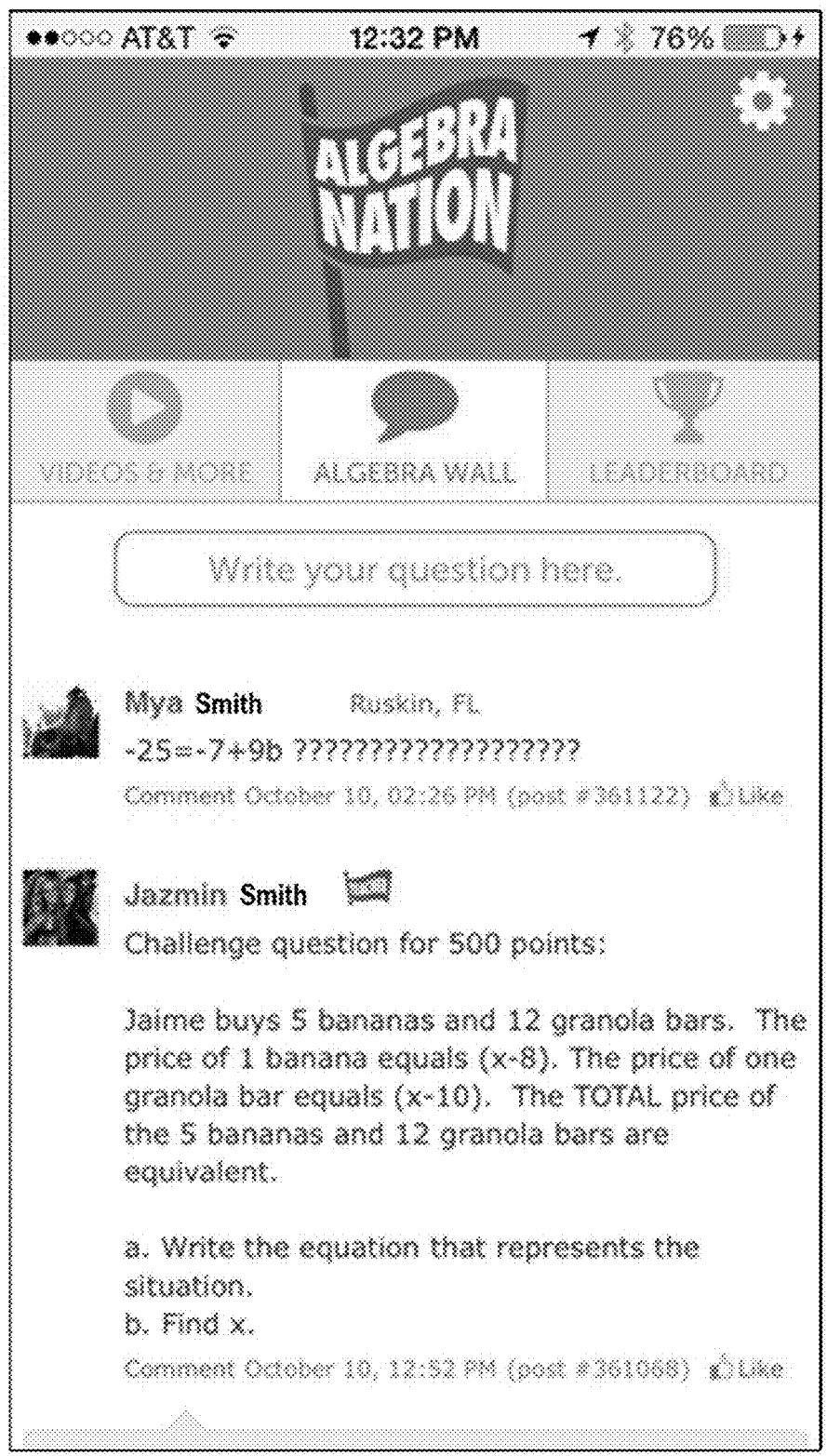
Figure 26:
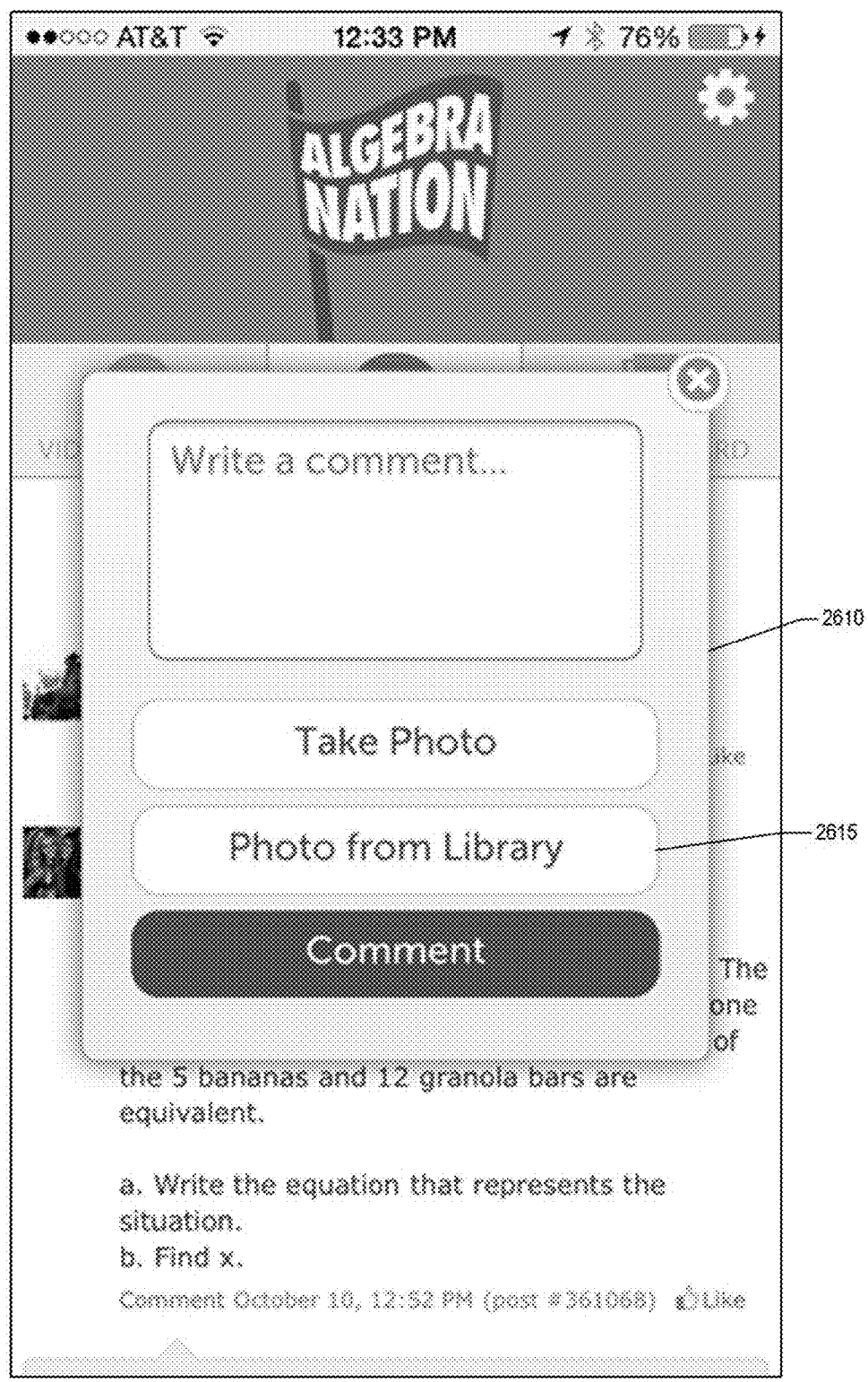

FIGS. 19 and 20 illustrate screenshots of other example embodiments where the OSES whiteboard functionality may be used to create and post graphical drawings, images, etc.

For example, FIG. 19 shows an example screenshot of an Interactive Study Video Discussion Thread GUI 1901 in accordance with a specific embodiment. As illustrated in the example embodiment of FIG. 19, the Interactive Study Video Discussion Thread GUI 1901 may include, but are not limited to, one or more of the following (or combinations thereof):

Video Presentation portion 1910, which may be configured or designed to display one or more educational/tutorial videos relating to specific subject matter selected by the user (e.g., "Identify A Graph From An Equation")

Discussion Thread portion 1920, which may be configured or designed to enable users to post questions and/or comments relating to the video being presented in the Video Presentation portion 1910.

As illustrated in the example embodiment of FIG. 19, a student user has posted (at 1922) an initial question relating to the video tutorial (e.g., "Identify A Graph From An Equation"), requesting assistance in graphing the equation "y=x+5". In this particular example, it is assumed that the user subsequently accesses the OSES whiteboard functionality to create a drawing of a graph showing how the equation "y=x+5" may be graphed on an X-Y Axis, which is then posted (e.g., at 1932) as a comment/reply in the discussion thread.

In the specific example embodiment of FIG. 20, it is assumed that a first student user (e.g., Sean Smith) posts a question (2020) on the Interactive Study Wall, requesting assistance and how to solve problem 24 in the accompanying image 2022. In this particular example, it is assumed that the image 2022 represents a photo of a page from an algebra workbook, which was captured by the user (e.g., via the user's smartphone) and uploaded to the OSES Server. In this particular example, it is assumed that a second user (e.g., Jayansh Smith) accesses the OSES whiteboard functionality to create a graphical drawing of an annotated number line showing how problem 24 may be graphed, and then posts the graphical drawing (2032) as a comment/reply in the discussion thread.

Image Capture and Upload Using Mobile/Smartphone App

One aspect of the present application relates to smartphone application functionality for facilitating online education, and for enabling users to use their smartphones (and/or other types of mobile devices such as tablets, PDAs, etc.) to engage with learning environments such as discussion forums, chat rooms, discussion walls, Interactive Study Walls, etc. Example embodiments of features relating to this aspect are illustrated, for example, in FIGS. 21-32. More specifically, FIGS. 21-32 illustrate example screenshots of various Smartphone App GUIs which may be used for facilitating activities relating to one or more of the online education aspects disclosed herein.

For example, in at least one embodiment, as users are collaborating and learning online via the Interactive Study Wall (e.g., FIG. 25), a user may elect to add an image, drawing, video, document, etc. to his/her online discussion via an Interactive Study Wall software application (Smartphone App) running on the user's smartphone or mobile device. The user may use the camera on the phone to snap a picture (e.g., which a user has drawn by hand, a problem in a textbook, etc.) and/or or film a video clip of the problem, and post the captured image/video to the discussion wall.

Figure 27:
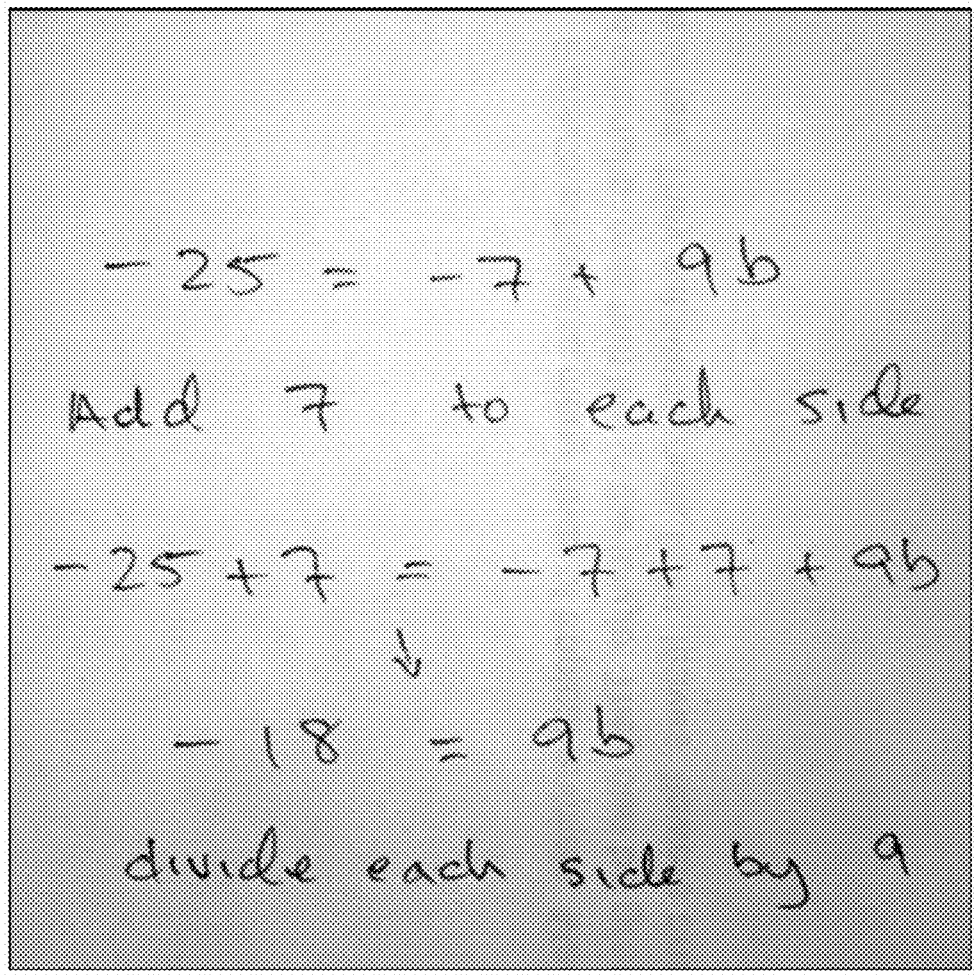
Figure 28:
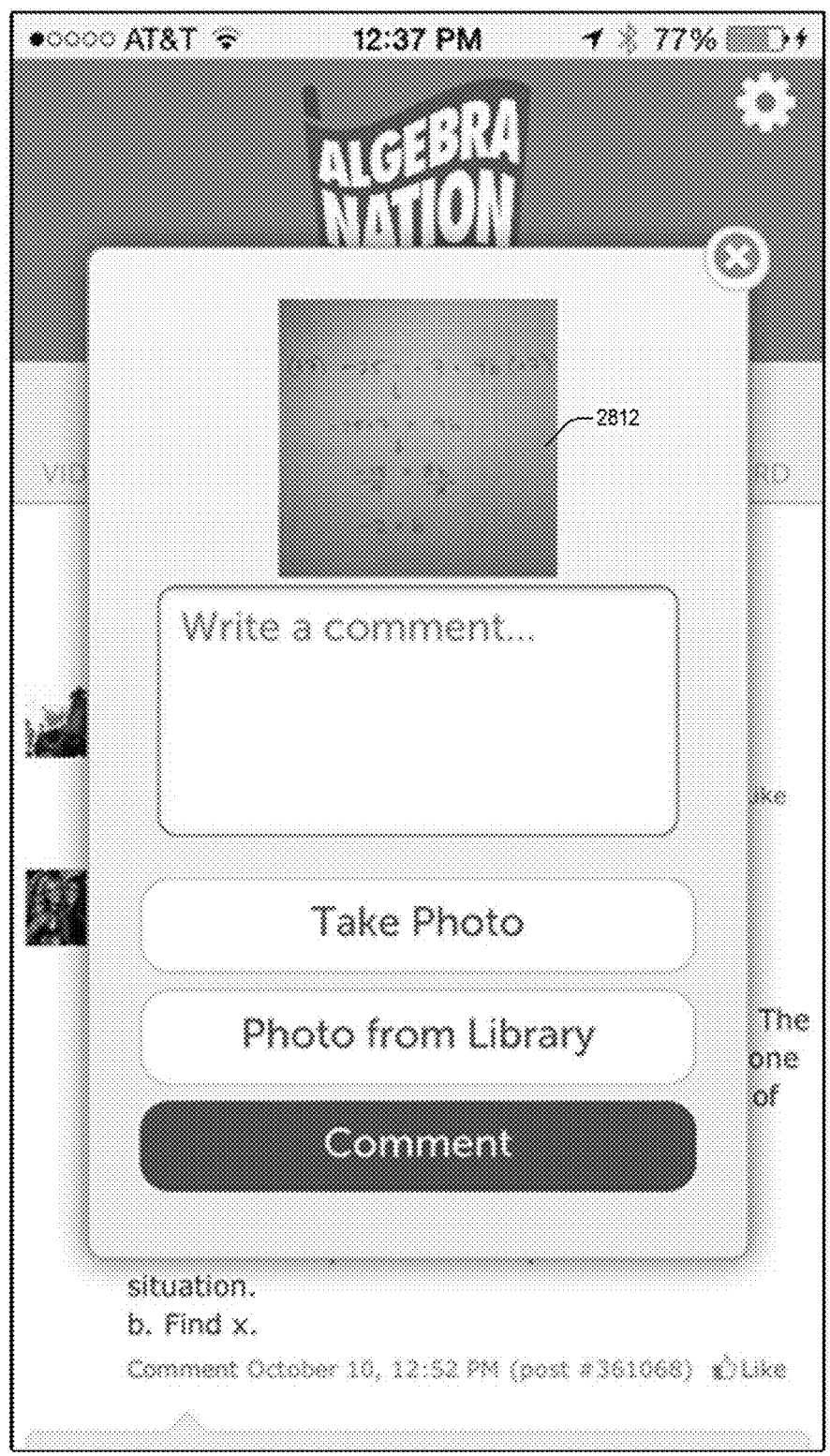
Figure 29:
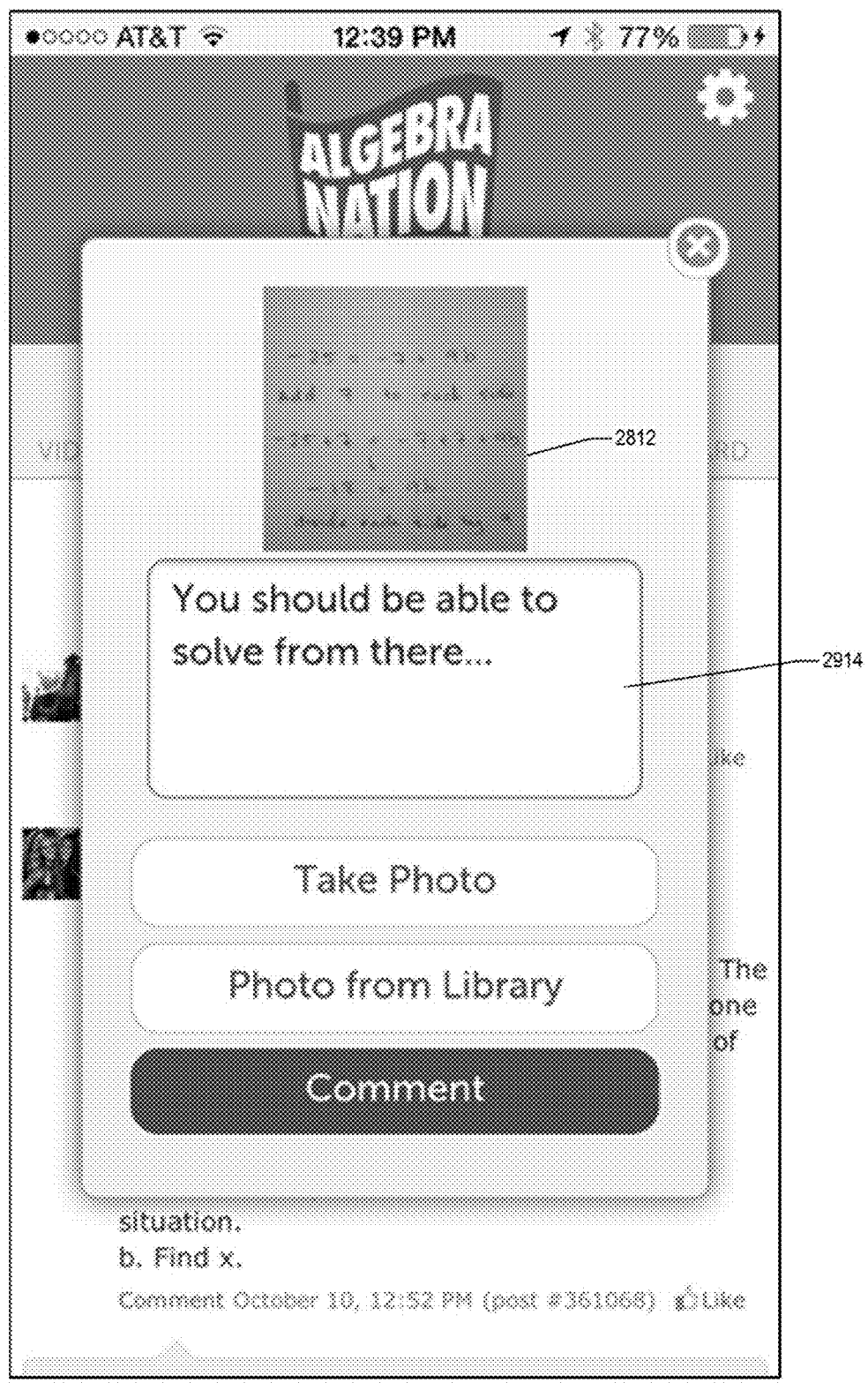

In this particular example embodiment, it is assumed that the user performs the following operations/activities:

User creates hand-drawn page of notes explaining steps for solving a particular math problem (e.g., FIG. 27).

User accesses the "post comment/image/video" feature of the OSES Smartphone Application running on the user's smartphone. (e.g., 2610, FIG. 26)

User uses the smartphone to capture an image of the page of hand-drawn notes (or user uses the smartphone to access a previously-captured image, which may be saved on phone or retrieved from a remote source). (e.g., 2812).

User adds a text commentary (2914, FIG. 29) to the content of the reply post to be posted, and posts the image (2812) and text commentary (2914) to as a reply post to a specific discussion thread.

Figure 30:
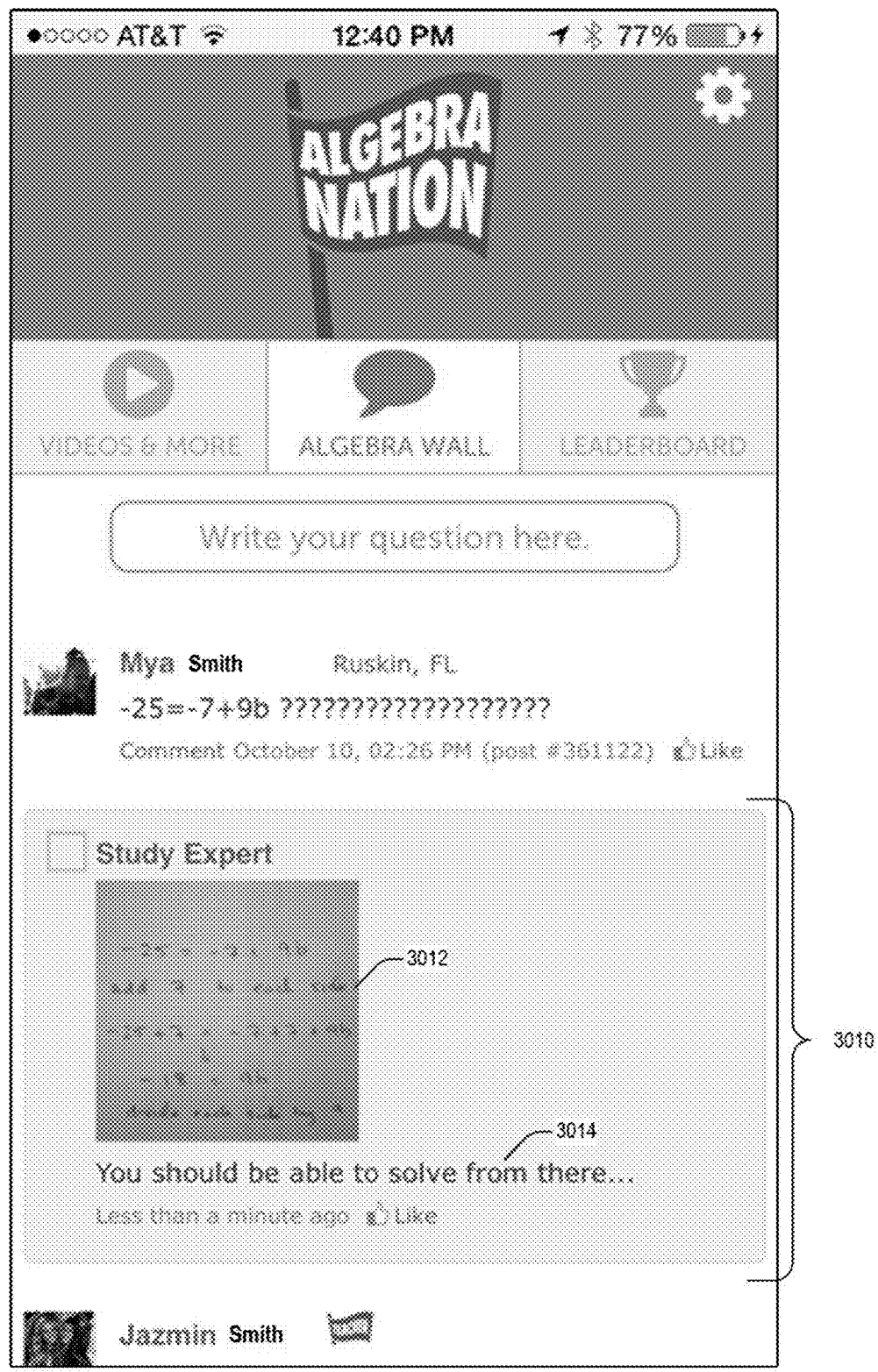
Figure 31:
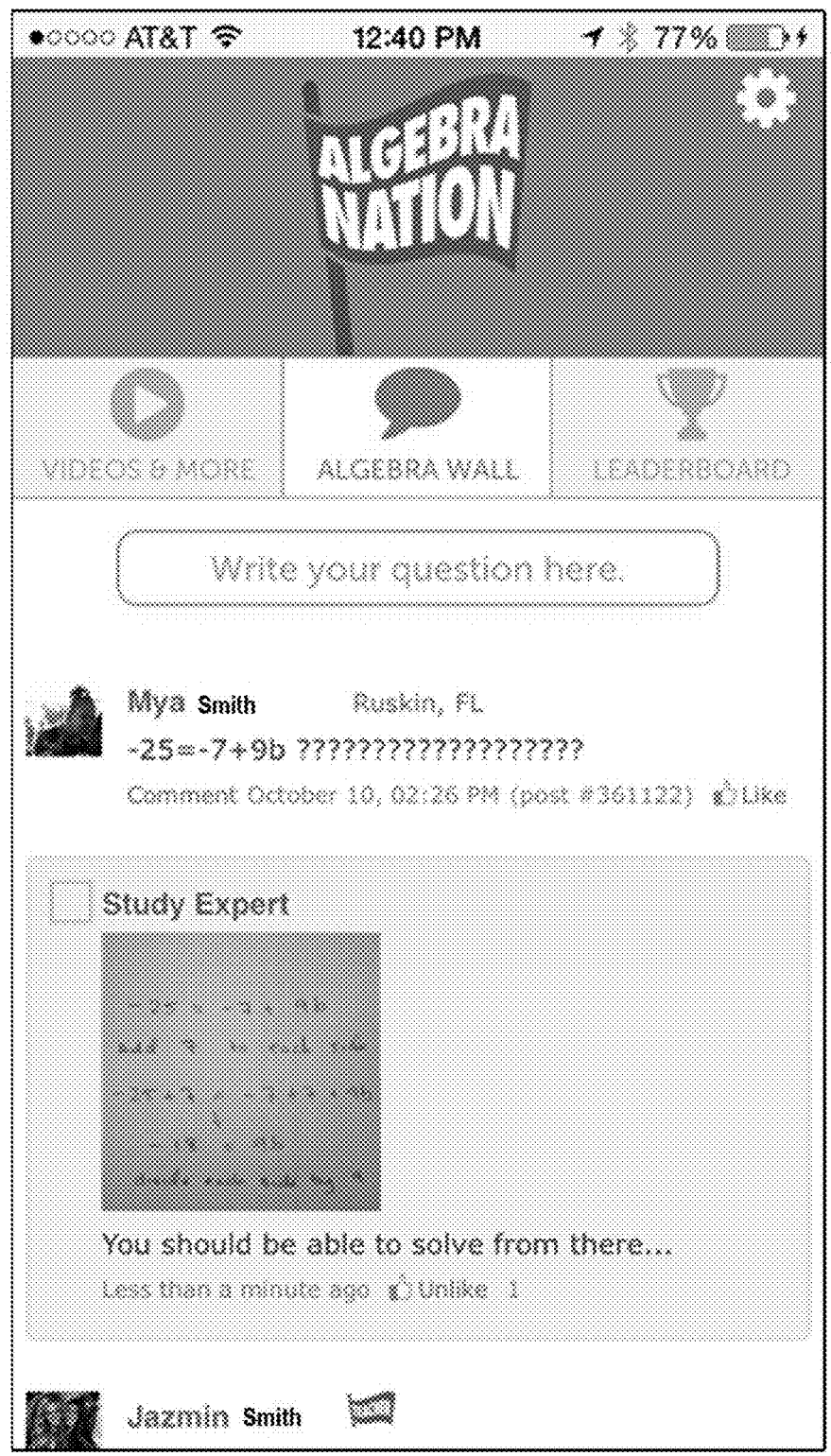
Figure 32:
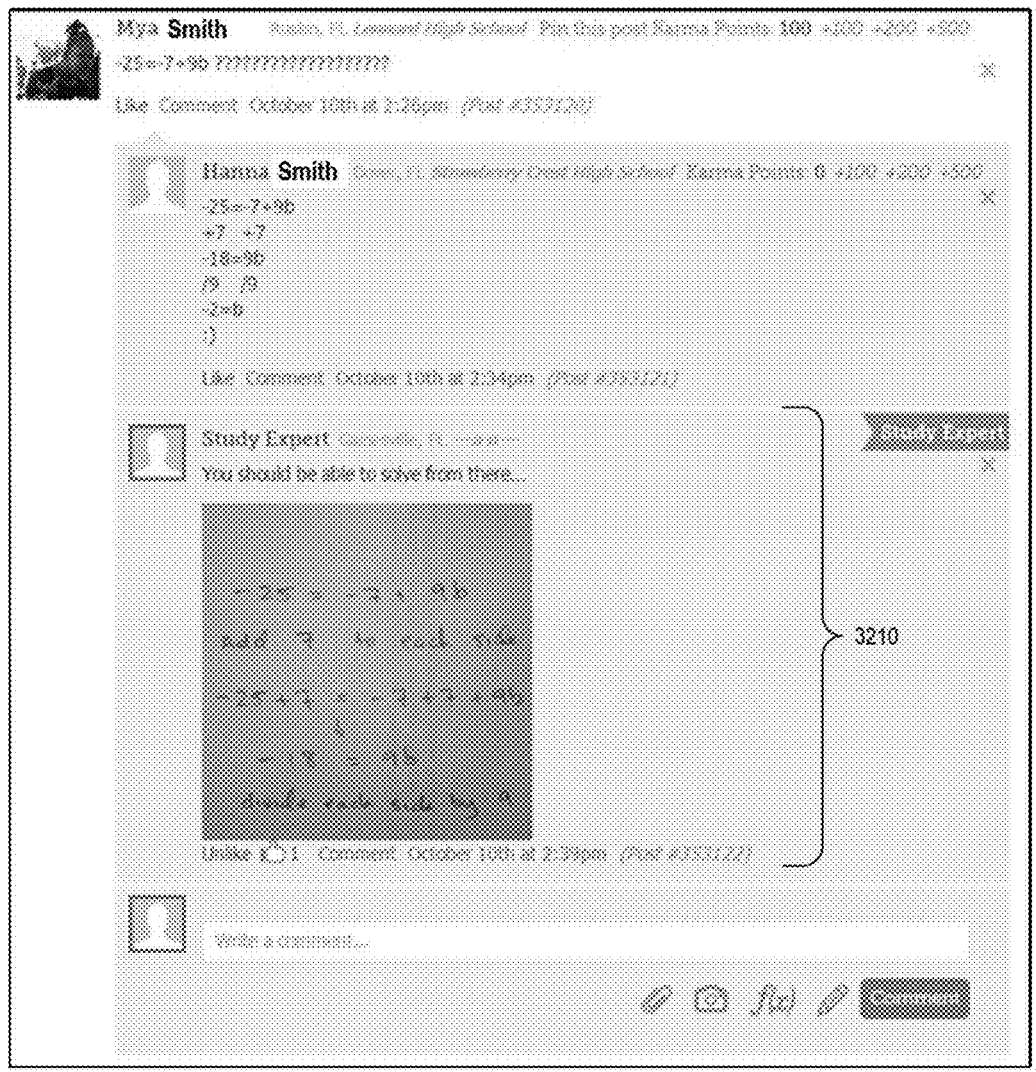

As illustrated in the example embodiment of FIG. 30, the user's reply post 3010 is displayed (via the OSES Smartphone Application) as a comment of the discussion thread, and includes the uploaded image content 3012 and text commentary content 3014. Users accessing the Interactive Study Wall via a computer web browser may view the reply post as illustrated, for example, at 3210 of FIG. 32.

According to different embodiments, captured images which are uploaded by a given user to the OSES Server may be processed and posted directly to the appropriate (e.g., currently active) discussion medium for that specific user. Alternatively, in some embodiments, the user may elect to post the captured image directly to wall, or may elect to annotate/comment/edit media (e.g., via OSES whiteboard editor) before posting (as illustrated, for example, in FIGS. 13, 14, 17, 32, 72).

The user may also elect to use the phone to upload an existing photo or video stored at the phone (e.g. 2614, FIG. 26), so that the user does not have to repeat capturing the same photos or videos. Additionally, in at least some embodiments, the captured image may be uploaded directly to the appropriate discussion medium, where the user can elect to post directly to the wall, or elect to add comments/annotations/edits to the captured image prior to posting.

Because the Smartphone App authenticates the user, the OSES Server (and/or other components of the backend of the OE System) may be configured or designed to automatically recognize and/or verify that the identity of the user sending the image (e.g., from an identified smartphone) matches the identity of the user posting online on the original discussion medium. Accordingly, in at least some embodiments, there may be no need for the user to perform any additional steps relating to user authentication step(s) and/or identifying where the uploaded image should be posted.

Remote Image Capture and "Message-to-Post" Functionality

Another aspect of the present application relates to remote image capture and "message-to-post" functionality for facilitating online education, whereby users may use their smartphones (and/or other mobile devices with cameras, such as, for example, flip-phones, cell phones, PDAs, and/or other mobile devices which have the ability to send text and/or email messages) to capture images or video clips (e.g., using the mobile phone's built-in camera functionality, and without using the Smartphone App), and post the captured images or video clips to the Interactive Study Wall by emailing or text messaging the captured image to a designated email address or phone number.

According to various embodiments, different images, videos, documents, and/or other types of content may be remotely sent (e.g., from one or more user mobile devices) via text message or email to a backend system (e.g., OSES Server) for posting/insertion into an appropriate collaborative online discussion medium (e.g., discussion thread, chat room, webinar, etc.).

Example embodiments of features relating to the various Remote Image Capture and "Message-to-Post" Functionality described herein are illustrated, for example, in FIGS. 11-18, and 38-87. More specifically, FIGS. 11-18, and 38-87 illustrate example screenshots and procedural flows of various Message-to-Post GUIs which may be used for facilitating activities relating to one or more of the online education aspects disclosed herein.

According to different embodiments, users may use their mobile devices (e.g., smartphones, mobile phones, PDAs, tablets, etc.) to capture images (e.g., of handouts, problems which the user has drawn by hand, problems in textbooks, etc.), and post the captured images to the Interactive Study Wall and/or other online discussion walls, online discussion boards, chat rooms, webinars, online presentation forums, etc. (collectively referred to herein as "collaborative online discussion mediums") by emailing and/or text messaging the captured image to a designated email address or phone number. Users may also use images already saved on their mobile devices (e.g. already saved in their devices, or images that were saved from their mobile email or messages), and email and/or text message the saved image to a designated email address or phone number associated with the OSES Server.

Figure 18:
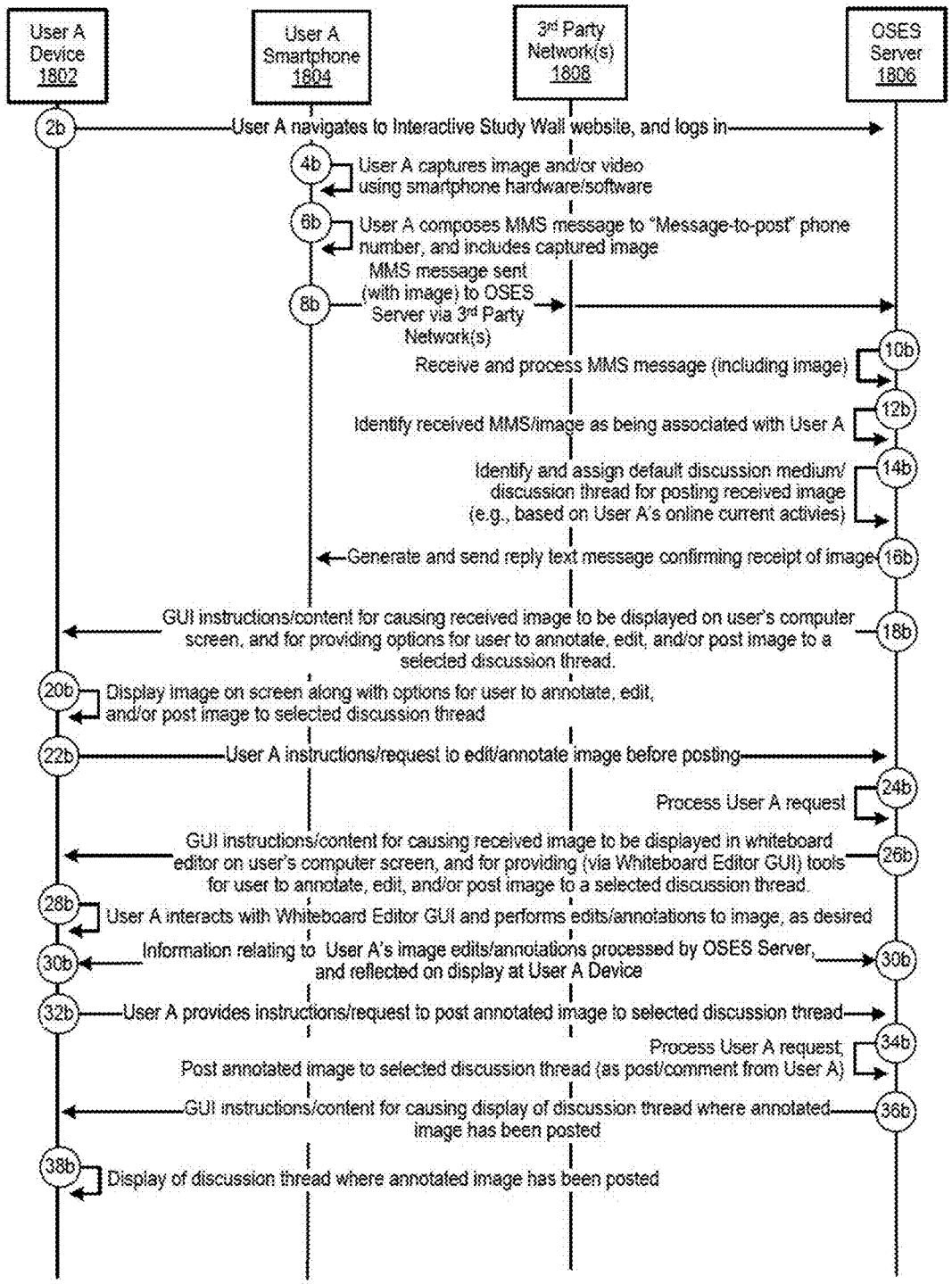
FIGS. 18, 88, and 89 illustrate various flow and interaction diagrams describing various processes, actions, and/or operations which may be implemented in connection with the various features and aspects of the Online Social Education System(s) described herein.

FIG. 18 shows a specific example embodiment of an interaction diagram between various systems/devices, which may be utilized for implementing various aspects described herein. In at least one embodiment, the interaction diagram of FIG. 18 illustrates one example embodiment of the various interactions which may be initiated and/or performed in connection with the "Message-to-Post" features described herein.

According to different embodiments, at least a portion of the various types of Online Social Education functions, operations, actions, and/or other features provided by the Online Social Education Procedure of FIG. 18 may be implemented at one or more client systems(s), at one or more server systems (s), and/or combinations thereof.

In at least one embodiment, one or more of the Online Social Education procedure(s) described herein (e.g., including those illustrated in FIGS. 18, 88, and 89) may be operable to utilize and/or generate various different types of data and/or other types of information when performing specific tasks and/or operations. This may include, for example, input data/information and/or output data/information. For example, in at least one embodiment, the Online Social Education procedure(s) may be operable to access, process, and/or otherwise utilize information from one or more different types of sources, such as, for example, one or more local and/or remote memories, devices and/or systems. Additionally, in at least one embodiment, the Online Social Education procedure(s) may be operable to generate one or more different types of output data/information, which, for example, may be stored in memory of one or more local and/or remote devices and/or systems. Examples of different types of input data/information and/or output data/information which may be accessed and/or utilized by the Online Social Education procedure(s) may include, but are not limited to, one or more of those described and/or referenced herein.

In at least one embodiment, a given instance of one or more of the Online Social Education procedure(s) may access and/or utilize information from one or more associated databases. In at least one embodiment, at least a portion of the database information may be accessed via communication with one or more local and/or remote memory devices. Examples of different types of data which may be accessed by the Online Social Education procedure(s) may include, but are not limited to, one or more of those described and/or referenced herein.

According to specific embodiments, multiple instances or threads of the Online Social Education procedure(s) may be concurrently implemented and/or initiated via the use of one or more processors and/or other combinations of hardware and/or hardware and software. For example, in at least some embodiments, various aspects, features, and/or functionalities of the Online Social Education procedure(s) may be performed, implemented and/or initiated by one or more of the various systems, components, systems, devices, procedures, processes, etc., described and/or referenced herein.

According to different embodiments, one or more different threads or instances of the Online Social Education procedure(s) may be initiated in response to detection of one or more conditions or events satisfying one or more different types of minimum threshold criteria for triggering initiation of at least one instance of the Online Social Education procedure(s). Various examples of conditions or events which may trigger initiation and/or implementation of one or more different threads or instances of the Online Social Education procedure(s) may include, but are not limited to, one or more of those described and/or referenced herein.

According to different embodiments, one or more different threads or instances of the Online Social Education procedure(s) may be initiated and/or implemented manually, automatically, statically, dynamically, concurrently, and/or combinations thereof. Additionally, different instances and/or embodiments of the Online Social Education procedure(s) may be initiated at one or more different time intervals (e.g., during a specific time interval, at regular periodic intervals, at irregular periodic intervals, upon demand, etc.).

In at least one embodiment, initial configuration of one or more instances of the Online Social Education procedure(s) may be performed using one or more different types of initialization parameters. In at least one embodiment, at least a portion of the initialization parameters may be accessed via communication with one or more local and/or remote memory devices. In at least one embodiment, at least a portion of the initialization parameters provided to an instance of the Online Social Education procedure may correspond to and/or may be derived from the input data/information.

For purposes of illustration, the example procedural flow/interaction diagram of FIG. 18 will now be described by way of example with reference to FIGS. 11-17 of the drawings. FIGS. 11-17 illustrate example screenshots of various GUIs which may be used for facilitating activities relating to one or more of the Message-to-Post aspects disclosed herein.

In the specific example embodiment of FIG. 18, it is assumed at 2b that a user (e.g., Student User) directs his computer/web browser (e.g., 1802) to navigate to the Interactive Study Wall website, and logs in. After logging in, the user begins navigating the Interactive Study Wall website and viewing posts/discussion threads. In this particular example, it is assumed that the user is a student who desires assistance with a math problem printed on one of the pages of the student's math workbook, and desires to post a copy of the workbook page with the math problem on the Interactive Study Wall via use of the Message-to-Post functionality.

Accordingly, as shown at 4b it is assumed that the user uses his smartphone (e.g., 1804) (or other mobile image capturing device) to take a picture (capture an image) of the workbook page with the math problem, as illustrated, for example, in FIG. 11. According to different embodiments, a user may use a mobile device (e.g., mobile phone, smartphone, and/or other mobile image capturing device etc.) to take a picture of a reference (e.g., a handout, hand-written notes, a page of a document, a page of a textbook or workbook, etc.), and send the captured image as an MMS text message (e.g., FIG. 12) to a specified phone number, which may be received at the OSES Server. The user may also attach existing images/videos that are already stored or saved on the mobile device (or are accessible via the mobile device), and send such media as an MMS text message to the OSES Server.

Figure 12:
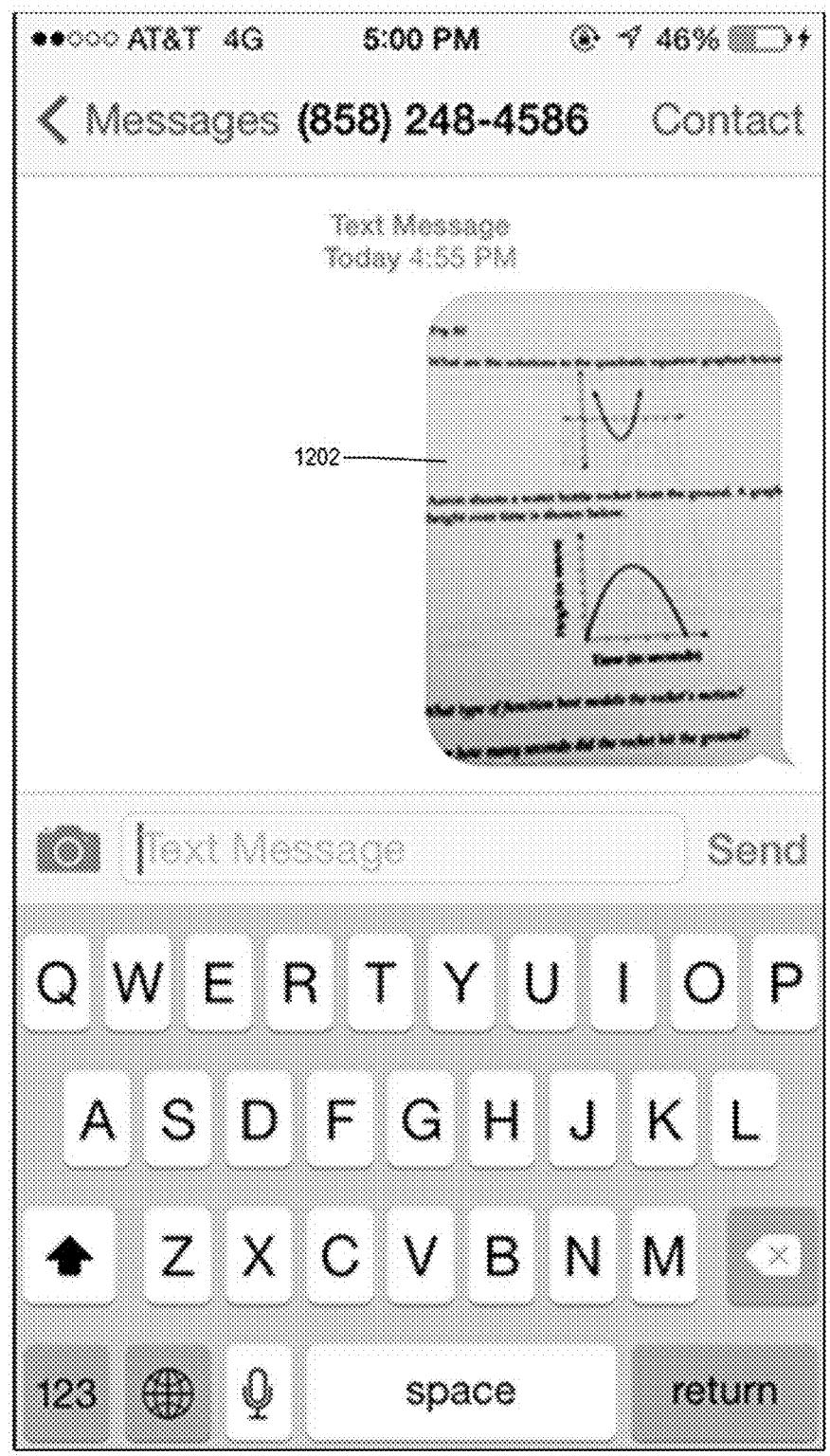

As shown at 6b, the user operates his smartphone to compose an MMS message (which includes the captured image of the math problem) to be sent to a "Message-to-Post" phone number. In the example illustration of FIG. 12, the "Message-to-Post" phone number corresponds to: (858) 248-4586. In one embodiment, "Message-to-Post" functionality may be implemented such that users of a collaborative online discussion medium (e.g., Interactive Study Wall, online discussion wall, online discussion board, chat room, webinar, online presentation forum, etc.) may text their captured images to a common phone number (such as, for example, (858) 248-4586, as illustrated in FIG. 12). In such embodiments, one "text-to-post" (or "Message-to-Post") phone number may be used for texting images to the OSES Server for posting at the collaborative online discussion medium. This provides an added degree of uniformity and simplicity to the "Message-to-Post" functionality.

In other embodiments, multiple different "text-to-post" phone numbers may be used to receive (at the OSES Server) multiple different text/MMS images from multiple different users (concurrently and/or non-concurrently). In yet other embodiments, the OSES Server may be configured or designed to provide multiple different customizable phone numbers, wherein each phone number is uniquely associated with one or more of the following (or combinations thereof):

- a respective discussion medium (e.g., online discussion wall, online discussion board, chat room, webinar, online presentation forum, etc.),
- a respective Interactive Study Wall topic (e.g., Algebra, Geometry, Pre-Algebra, etc.),
- a respective user,
- a respective wall posting or discussion thread,
- etc.

Figure 38:
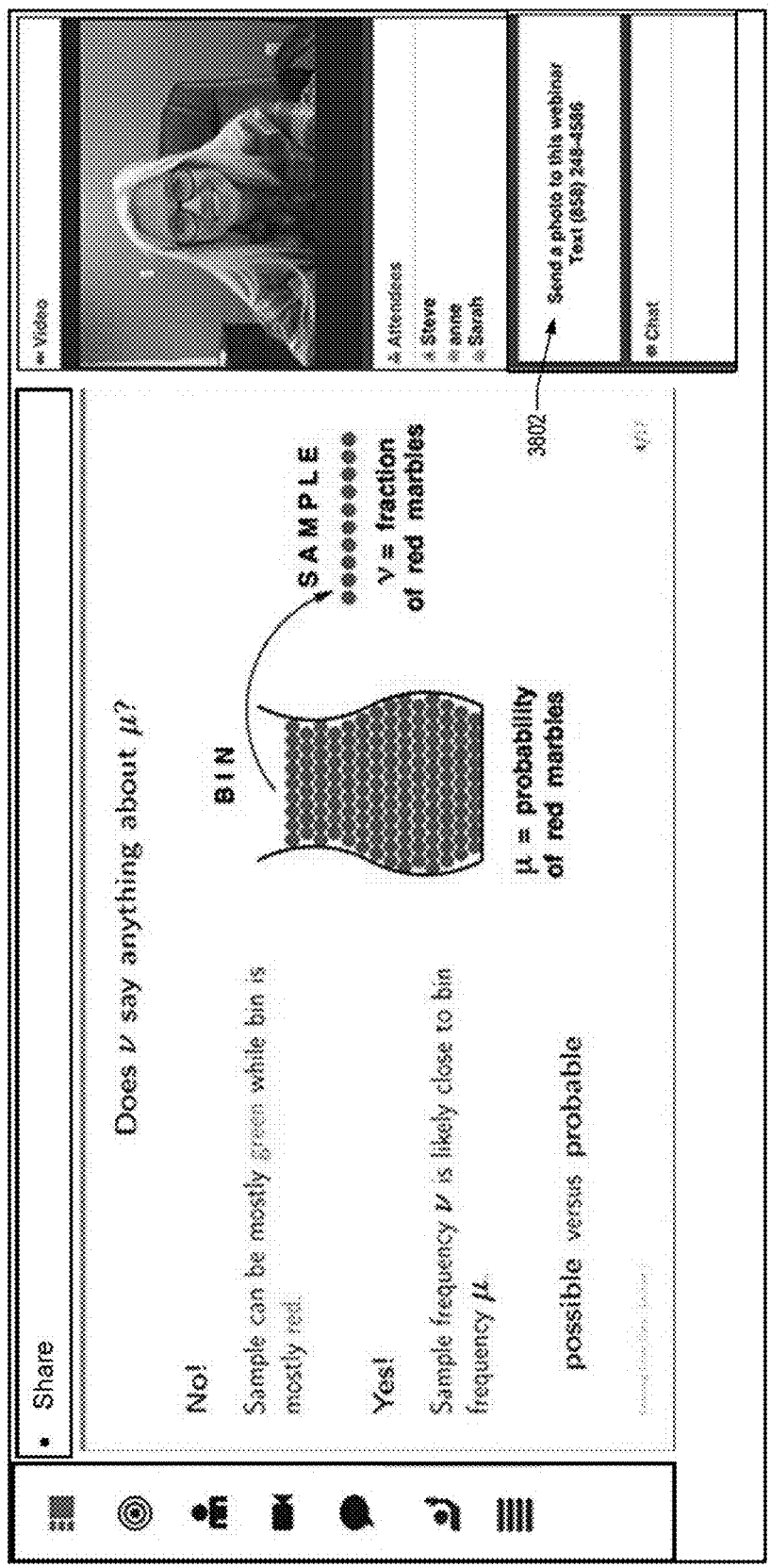
Figure 41:
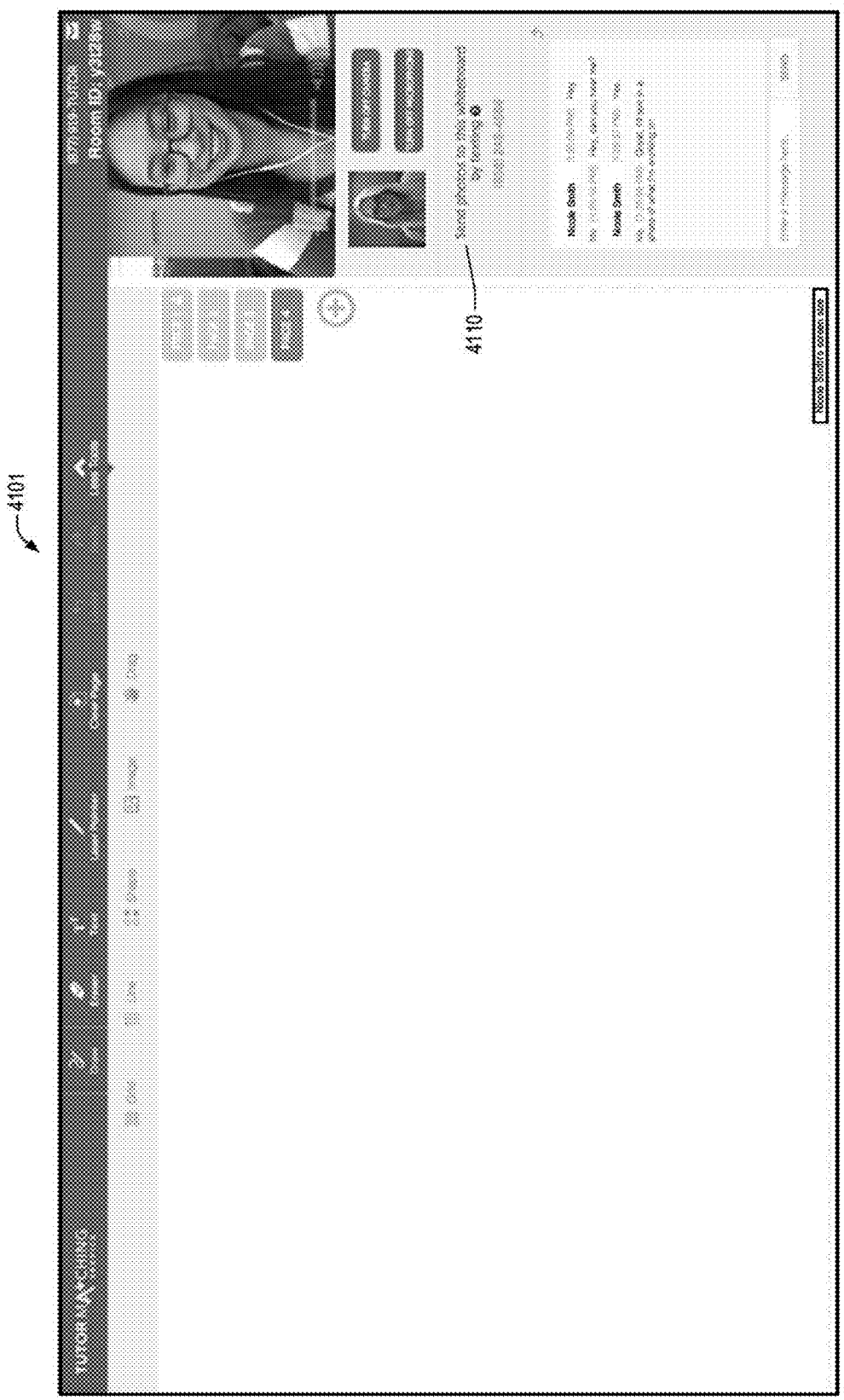
Figure 76:
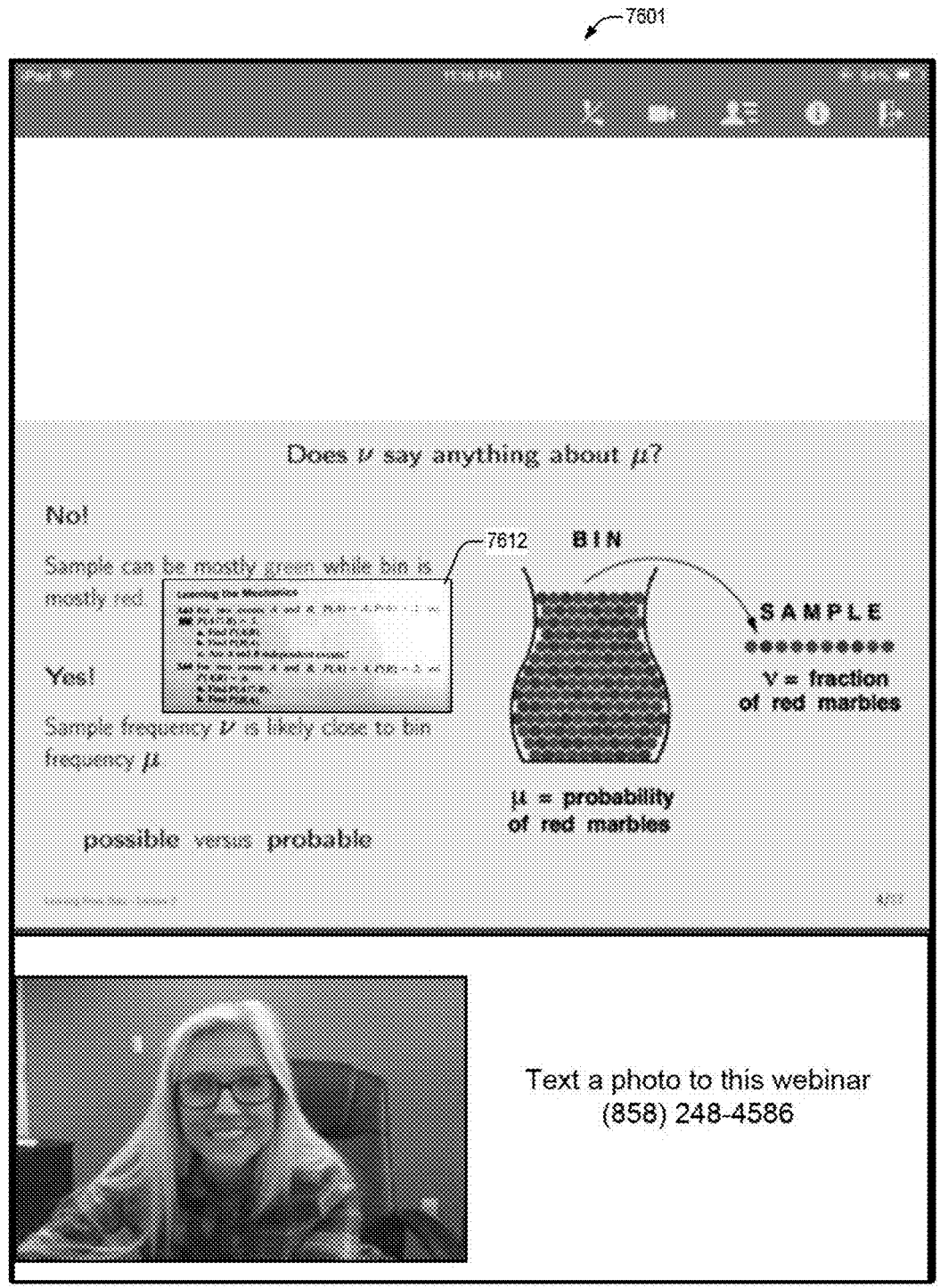

In at least one embodiment, the "Message-to-Post" phone number may be displayed as part of the viewable content of the Interactive Study Wall (or other online, collaborative education media). Examples of this are illustrated in FIGS. 38, 41, 76 (e.g., "Send photos to this whiteboard by texting (858) 248-4586").

Returning to FIG. 18, as shown at 8b, the user sends an MMS message (with captured image) from the user's smartphone 1804 to the "Message-to-Post" phone number, whereupon the MMS message is routed via 3rd Party Network(s) to the OSES Server 1806.

At the backend, the OSES Server may be configured or designed to initiate, implement or perform various tasks/activities such as, for example, one or more of the following (or combinations thereof):

- receive (10b) each incoming text/MMS message;
- determine sender identifier information (associated with the received text/MMS message), which may be used to identify the sender (user) who sent the text/MMS message;
- match the sender identifier information with a respective user of the Interactive Study Wall system (e.g., identify received MMS/image as being associated with User A (12b));
- identify and assign (14b) default discussion medium/discussion thread for posting received image (e.g., based on User A's online current activities)
- and/or other operations/activities described and/or referenced herein.

In at least one embodiment, the sender identifier information may be compared against similar user-related information stored at one or more OSES Server database(s) in order to find a match and determine the identity of the appropriate user who is to be associated as the sender of the received text/MMS message. In one embodiment, if a match is identified, the OSES Server may associate the received text/MMS message (and corresponding image) with the identified user.

In some embodiments, the sender identifier information may include, but is not limited to, one or more of the following types of information:

- mobile phone number,
- IP address,
- email address,
- geolocation information,
- time/date information,
- user biometric information,
- mobile device MAC address,
- and/or other types of information which may be used to uniquely identify the sender.

As shown at 16b, the OSES Server may generate and send a reply text message confirming receipt of image. An example screenshot of such a reply text message is illustrated at 5814 of FIG. 58.

In one embodiment, after the OSES Server has received the text/MMS message and identified the user associated with the received text/MMS message, the OESS Server may automatically perform a check to see whether (or not) the identified user is currently online and/or logged in at the appropriate collaborative online discussion medium where the image from the text/MMS message is to be posted. In one embodiment, if the OSES Server determines that the identified user is not currently online, the OSES Server may store the received image, and set a flag to notify the identified user of the received text/MMS image when it is next detected that the identified user is online. In other embodiments, if the OSES Server determines that the identified user is not currently online, the server may send a text reply back to the user to alert the user and/or to prompt user to sign on. In at least one embodiment, if an incoming text/MMS message cannot be matched to an existing user, one or more reply text messages may be automatically generated by the OSES Server, and sent to the Message-to-Post phone number associated with the incoming text/MMS message, notifying the sender of the error/issue and/or prompting users with possible solutions. As illustrated in the example screenshot GUI embodiments of FIGS. 58-75 (described in greater detail below), additional communications may take place between the user's smartphone and the OSES Server(s), at least a portion of which may be one or more reply text messages from the user's smartphone, which may be automatically interpreted at the OSES Server as instructions for initiating or performing specific actions/activities.

In some embodiments, if the OSES Server determines that the identified user is currently online, the OSES Server may identify or determine the user's current activities at the collaborative online discussion medium, and may associate the received text/MMS image with the user's current activities at the collaborative online discussion medium. For example, in some embodiments, the OSES Server may detect the location of the users cursor, identify the discussion thread associated with the user's current cursor location, and select the identified discussion thread as the default discussion thread to which the image may be posted. In another embodiment, the image may be inserted directly into a whiteboard GUI, which may be displayed to the user, thereby enabling the user to elect to further edit the image, save image, or post to a given discussion wall, etc. In some embodiments, the user may be presented with one or more choice(s) of where to post the image (e.g., a specific thread, board, room, chat, etc.). In some embodiments, if the OSES Server determines that user is in the process of composing a post on the Interactive Study Wall, it may associate the received text/MMS image with the post being composed by the user (e.g., as a default association, which may be changed by the user), and present one or more options to the user to include the received text/MMS image as part of the post (e.g., either with commentary or without commentary). Similarly, if the OSES Server determines that user is in the process of composing a reply comment to an existing Algebra-related post on the Interactive Study Wall, it may associate the received text/MMS image with the reply comment being composed by the user (e.g., as a default association, which may be changed by the user), and present one or more options to the user to include the received text/MMS image as part of the reply comment. In yet another embodiment, the OSES Server may show the new image along with a user's nth most recently used images/videos on the Interactive Wall (e.g., where n>0, such as, for example, n=1, n=3, n=5, n=10, etc.) and give the user a choice of which image(s) to use/post.

Returning to FIG. 18, as shown at 18b, the OSES Server may generate and send GUI instructions/content for causing the received MMS/text image to be displayed on user's computer screen, and for providing options for the user to annotate, edit, and/or post image to a selected discussion thread. As shown at 20b, the user's system displays received MMS/text image on the user's computer display (e.g., device 1802) along with options for the user to annotate, edit, and/or post image to selected discussion thread. Example screenshots of these features are illustrated, in FIGS. 13 and 17. For example, in the example screenshot of FIG. 13, the OSES Server may cause to a Message-to-Post Confirmation GUI (e.g. 1302) to be displayed at the user's computer display. The Message-to-Post Confirmation GUI may include display of the MMS/text image (e.g., 1310), and may also display various user-selectable options (e.g., 1312, 1314, 1316) for enabling the user to annotate, edit, and/or post image to a selected discussion thread. In at least one embodiment, the received text/MMS image may be displayed to the user along with one or more user-selectable options for processing or handling the received text/MMS image, such as, for example, one or more of the following (or combinations thereof):

Edit/annotate image (e.g., via whiteboard GUI or other image editing GUI);
Post image to identified thread;
Post image to a different thread;
Add text commentary/annotation to image (e.g., before posting);
Save image (e.g., for future use);
Configure image editing privileges;
Etc.

Figure 13:
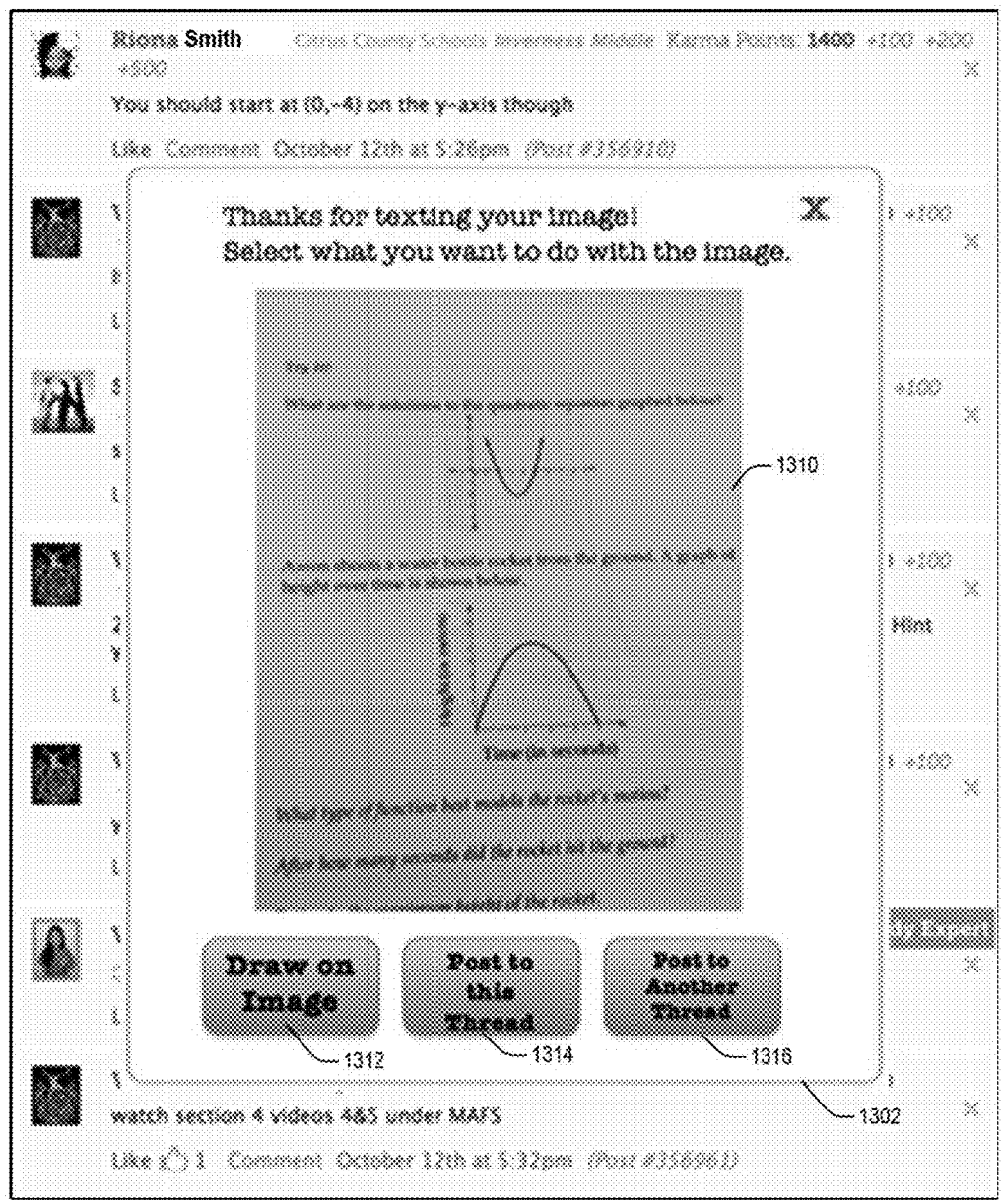

For example, as illustrated in the example embodiment of FIG. 13, when the received text/MMS image (1310) is displayed to the user, the OSES Server may present the user with one or more user-selectable options (e.g., 1312, 1314, 1316) for processing/handling the received text/MMS. Users may be offered the choice of posting image to currently identified discussion thread (1314), adding text (caption, description) to image before posting, posting image to a different discussion thread (1316), or editing the received image using a whiteboard/image editor (1312) before posting to discussion wall/thread. In one embodiment, the image my be posted directly to where the user was last discussing/interacting (e.g., open discussion board, where user's cursor is located, etc.).

Figure 14:
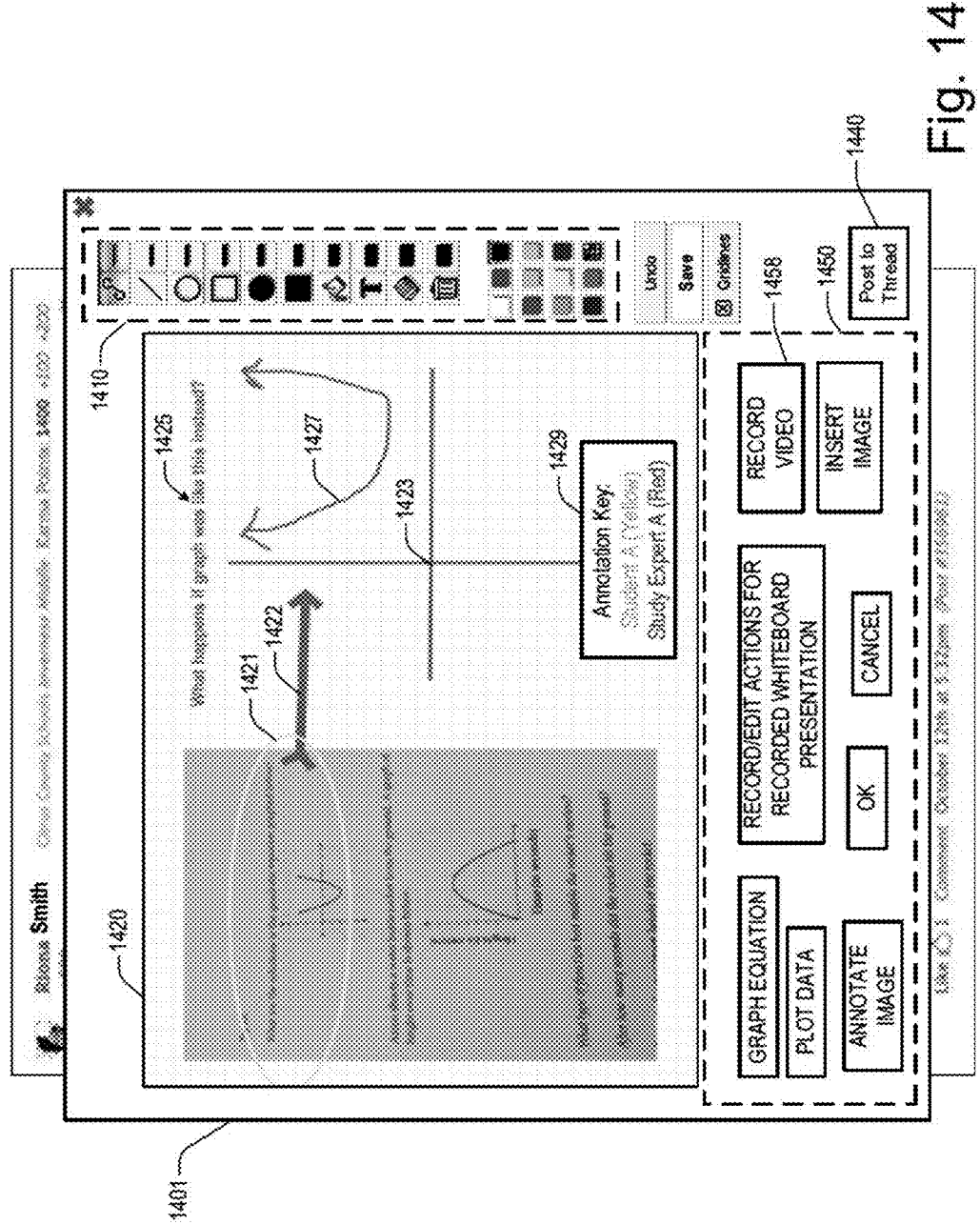
Figure 15:
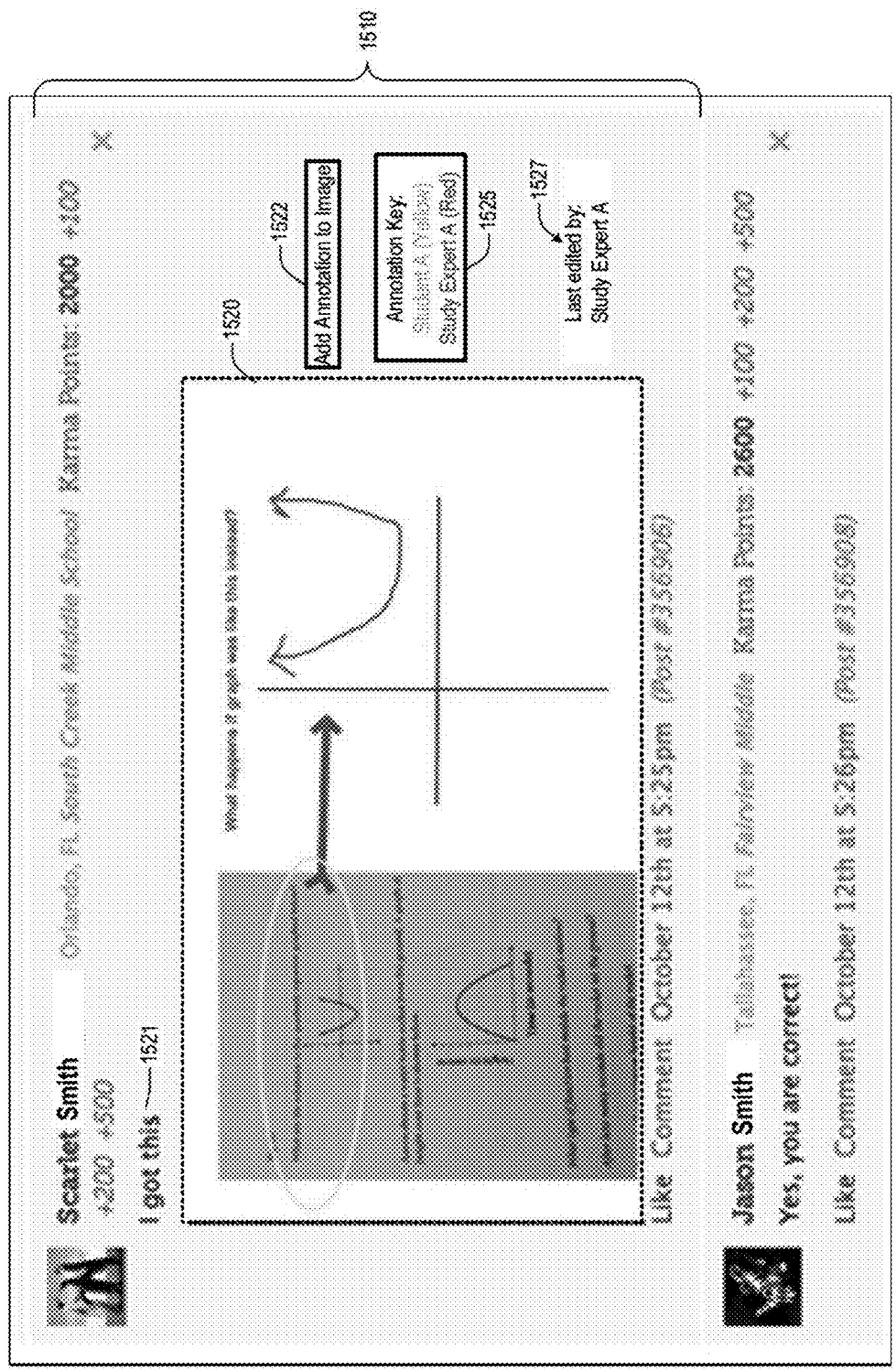
Figure 16:
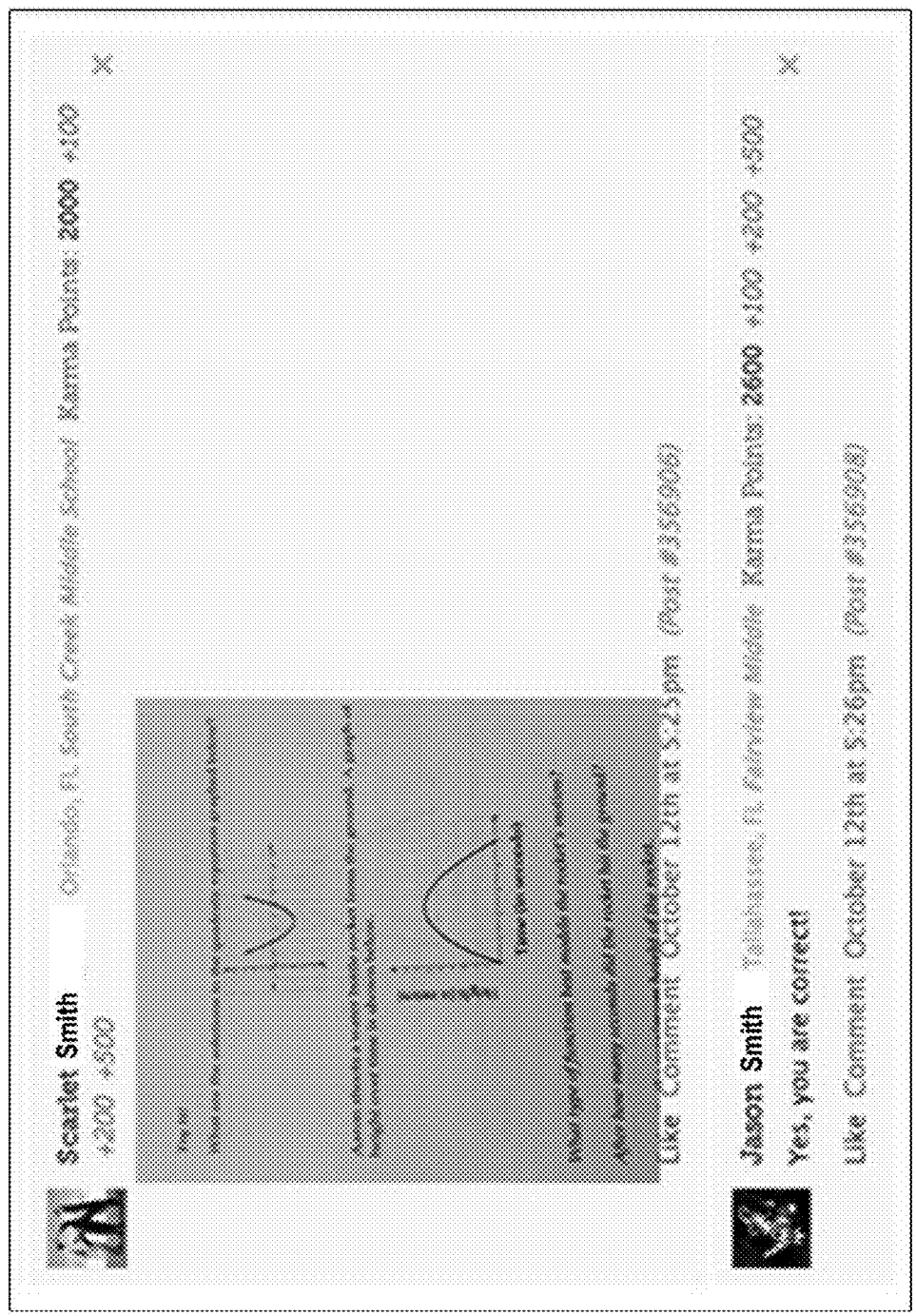

Referring to the example screenshot of FIGS. 13-15, the user may select the "Draw on Image" button 1312 to cause the image to be loaded into in a whiteboard editor GUI (e.g., 1401, FIG. 14), and then posted to a specified collaborative online discussion medium (as shown, for example, in FIG. 15). Alternatively, as illustrated in the example screenshot of FIG. 17, User A may provide input instruction(s) (e.g., by clicking on the "Post to Another Thread" button 1716) for enabling the user to select/identify where the image is to be posted, and for causing the image to be posted "as is" to a specific collaborative online discussion medium, such as, for example a specific thread of an Interactive Study Wall (e.g., Algebra Wall, Teacher Wall, Geometry Wall, etc.), as illustrated, for example, in FIG. 16. In at least some embodiments, the user may save the image to be used in a future thread, board, room, chat, etc.

In the specific example of FIG. 18, at 22, it is assumed that User A has provided input instruction(s)/request(s) for causing the image to be edited/annotated before being posted. In response, the OSES Server may process (24b) the input instructions, and generate and send (26b), to the user's device 1802, instructions/content for causing a Whiteboard Editor GUI to be displayed at the user's device display, with the MMS/text image pasted into the whiteboard canvas, as illustrated, for example, in FIG. 14. As illustrated in the example embodiment of FIG. 14, the Whiteboard Editor GUI may be configured or designed to include functionality/tools for enabling the user (and/or other authorized users) to annotate, edit, and/or post image to a selected discussion thread. In at least one embodiment, after the image has been loaded into the whiteboard editor GUI 1401, the user (e.g., Student A) and/or other authorized users (e.g., Study Expert A) may modify the image and/or add annotations (and/or other content) (e.g., 1421, 1422, 1423, 1425, 1427, 1429) to the whiteboard canvas 1420.

Returning to FIG. 18, as shown at 28*b*, it is assumed that User A (and/or other authorized user(s)) interacts with Whiteboard Editor GUI and performs edits/annotations to the image/whiteboard canvas, as desired. Information relating to User A's image edits/annotations may be processed (30*b*) by the OSES Server, and reflected (e.g., in real-time) on the display at the User A Device.

After making the desired edits/annotations, the modified whiteboard canvas (e.g., 1420) may then be posted to an appropriate collaborative online discussion medium (e.g., via selecting "Post to Thread" button 1440). According to different embodiments, identification of the appropriate collaborative online discussion medium (e.g., where the modified whiteboard canvas 1420 is to be posted) may be automatically identified by the OSES Server (e.g., based, for example, on the user's recent activities), and/or may be selected/specified by the user. For example, in the specific example embodiment of FIG. 14, it is assumed that the modified whiteboard canvas portion 1420 is to be posted as a reply/comment to an existing thread of the Interactive Study Wall, as illustrated, for example, in FIG. 15. Accordingly, at 32*b* (FIG. 18), it is assumed that User A provides instructions/request to post the annotated image/modified whiteboard canvas to the identified discussion thread. The OSES Server may process the image/whiteboard posting request, and post the annotated image/modified whiteboard canvas to the identified collaborative online discussion medium (e.g., a reply/comment to an existing thread of the Interactive Study Wall). The OSES Server may provide (36*b*) GUI instructions/content for causing display (38*b*) of a collaborative online discussion medium GUI (e.g., Interactive Study Wall Post GUI) showing the posting of the annotated image/modified whiteboard canvas at the identified collaborative online discussion medium, as illustrated in FIG. 15.

As illustrated in the example embodiment of FIG. 15, the modified whiteboard canvas portion 1520 is posted as part of a reply/comment post 1510 to an existing thread of the Interactive Study Wall. Additionally, as illustrated in the example embodiment of FIG. 15, the Interactive Study Wall Post GUI 1501 may be configured or designed to include additional functionality such as, for example, one or more of the following (or combinations thereof):

functionality 1522 for enabling selected users to edit/add annotations to the posted image/canvas 1520;
functionality 1525 for automatically and/or dynamically tracking the various edits/annotations and entities which performed such edits, and for enabling users to visually distinguish one or more of the edits/annotations when displaying the annotated/edited image in the discussion forum/thread;
functionality (e.g., 1527) for identifying information about the revision history such as, for example: identity of user who performed most recent edit(s), timestamp information relating to the most recent edit, etc.
functionality for enabling the user to post additional text comment(s) (e.g., "I got this", 1521) to accompany the post of the edited/annotated image.

Alternate Example High-Level Message-to-Post Flow:
A. User is online and logged into the Interactive Study Wall. User navigates to a discussion wall about Chemistry.
B. User encounters question in Chemistry textbook for which he desires help from tutor/peers on the Interactive Study Wall.
C. User takes a picture of Chemistry textbook problem with his phone.
D. User may text the photo to the Interactive Study Wall "Message-to-Post" phone number.
E. Text message (with captured image) is received at the OSES Server. OSES Server identifies received text/image as being associated with user on discussion wall about Chemistry. In one embodiment, OSES Server may recognize sender phone number (of received text message) as one associated with user on discussion wall about Chemistry.
F. OSES Server may generate and send a text reply message, and confirm receipt of image.
G. OSES Server causes received image to be displayed on user's computer screen, and provides options for user to annotate, edit, post image to a selected discussion thread, post image to a different thread, or decline to do anything with image (cancel the image).

Different embodiments of "message-to-post" functionality may be implemented using other types of communication and/or messaging techniques such as, for example, "Message-to-Post" via email, facsimile, instant messenger, and/or other types of communication and/or messaging techniques which provide the ability to exchange images via the internet and/or cellphone networks. For example, in one embodiment, a user can use a mobile phone to take a picture and send the image via email message to a specified email address, which may be received at the OSES Server. In one embodiment, all (or selected) users of the Interactive Study Wall may email their captured images to the same email address (e.g., there is one "Email-to-Post" email address for emailing images to be posted on the Interactive Study Wall). This provides an added degree of uniformity and simplicity to the "Message-to-Post" functionality. At the backend, the OSES Server may be configured or designed to facilitate, enable, initiate, and/or perform one or more of the following operation(s), action(s), and/or feature(s) (or combinations thereof):

receive each incoming email message,
automatically determine sender identifier information (associated with the received email message), which may be used to identify the sender (user) who sent the email message,
automatically match the sender identifier information with a respective user of the Interactive Study Wall system, and
automatically identify a selected collaborative online discussion medium where the "Email-to-Post" image is to be posted.

In other embodiments, one or more Interactive Study Wall GUIs may provide a button or icon which may be selected/engaged by the user in order to initiate a "text-to-post" (or "Email-to-Post" procedure). When selected, the user may enter a mobile phone number (or other identifier) of the mobile device which is to be used to capture the image. The OSES Server may then generate and send a text message to the identified mobile phone number, which may be received at the mobile device. Then user of the mobile device may then compose a reply MMS message to the received text message, and attach one or more selected image(s) (e.g., captured by the mobile device) to the reply message. Thereafter, the reply MMS message may be sent to the OSES Server, and processed (e.g., as described previously) to thereby enable the received image to be edited and/or posted to a discussion thread of the Interactive Study Wall.

In other embodiments, multiple different "text-to-post" phone numbers may be used to receive (at the OSES Server) multiple different text/MMS images from multiple different users (concurrently and/or non-concurrently). In yet other embodiments, the OSES Server may be configured or designed to provide multiple different customizable phone numbers, wherein each phone number is uniquely associated with one or more of the following (or combinations thereof):

- a respective collaborative online discussion medium (e.g., online discussion wall, online discussion board, chat room, webinar, online presentation forum, etc.),
- a respective Interactive Study Wall topic (e.g., Algebra, Geometry, Pre-Algebra, etc.),
- a respective user,
- a respective wall posting or discussion thread,
- etc.

In some embodiments, the OSES Server need not perform backend matching of the originating text message to an identified user of the collaborative online discussion medium. For example, in one embodiment, the captured image may be sent via text to a unique phone number, and received at the OSES Server. The user may receive a confirmation that the image was received, and the received image may be displayed in a specific room/discussion medium that is associated with the unique phone number, without the need to perform any backend matching for identifying or determining the identity of the user (sender) who sent the text.

In other embodiments (as previously described in the example "single number" embodiment above), a single number may be used as the "text-to-post" phone number for all users. It may be appreciated that the "single number" embodiment may be more convenient for users, as it reduces potential confusion and simplifies support for users. In addition, the single number embodiment facilitates reduced operating costs and increased scalability. For example, using the single number embodiment, a user may text a captured image from the user's mobile phone to the "text-to-post" phone number. The OSES Server may reply with a text message addressed to the user (e.g., reply text message may be addressed/sent to the incoming phone number which is associated with the incoming text message), and confirm the image was received (e.g. "Thanks, Dave! Your image was received and may show up on your discussion wall shortly!"). On the back end, OSES Server may be configured or designed to recognize that the Message-to-Post phone number associated with the incoming text message (with image) is associated with specific user, and, in response, may display the received image to the user (e.g., via popup window, overlay layer (e.g., 1302, FIG. 13), on the original discussion medium where the user is chatting, etc).

In some embodiments, after the OSES Server has received a Message-to-Post message, the OSES Server may generate and send one or more reply message(s) (e.g., via the same communication platform as the received message) to the sender. For example, after the OSES Server has received a Message-to-Post message, the OSES Server may generate/send one or more reply text message(s), and/or receive/process additional reply text messages from the sender as illustrated, for example, in the example screenshots of FIGS. 56-73. In other embodiments, after the OSES Server has received an Email-to-Post message, the OSES Server may generate/send one or more reply email message(s), and/or process additional reply email messages from the sender, as illustrated, for example, in the example screenshots of FIGS. 77-85.

In some embodiments, the reply text message (from the OSES Server) may prompt the user for further action. For instance, the OSES Server may generate and send a reply text message which requests the user to provide a caption for the received image (although, in at least some embodiments, users may not be required to provide captioning or additional text for providing context to image). In some embodiments, the OSES Server may generate and send a reply confirmation text message to the sender providing information about where image is to be posted, and asking user to provide approval for posting the image (as indicated), and/or to provide additional information as to where the image is to be posted. In some embodiments, users may also use text and/or email message to initiate and/or perform other tasks such as, for example, one or more of the following (or combinations thereof):

- post image captioning information;
- post comments relating to the posted image and/or associated discussion thread;
- post replies to other users' comments on the associated discussion thread;
- receive notification that another user liked, responded to, or commented on their texted image;
- and/or perform other activities/actions described and/or referenced herein.

FIG. 11 shows an example of a picture (or image) captured by a user's mobile device (e.g., smartphone, mobile phone, iPad, etc.), which may be posted to a collaborative online discussion medium (e.g., Interactive Study Wall) using the Message-to-Post technique(s) described herein. In this specific example, it is assumed that the user has used his/her smartphone to capture an image from a page in the user's textbook. As described above, a user can take a picture with his phone and send the captured image via text/MMS message to a specified phone number, which causes the image to be sent via text/MMS to the OSES Server. According to different embodiments, specified phone number may be unique to a given discussion medium, to a given topic, to a given person, or may be a universal number for the entire collaborative online discussion site, and/or for one or more groups of collaborative online discussion mediums.

Smartphone-OSES Server Messaging Functionality

Figure 85:
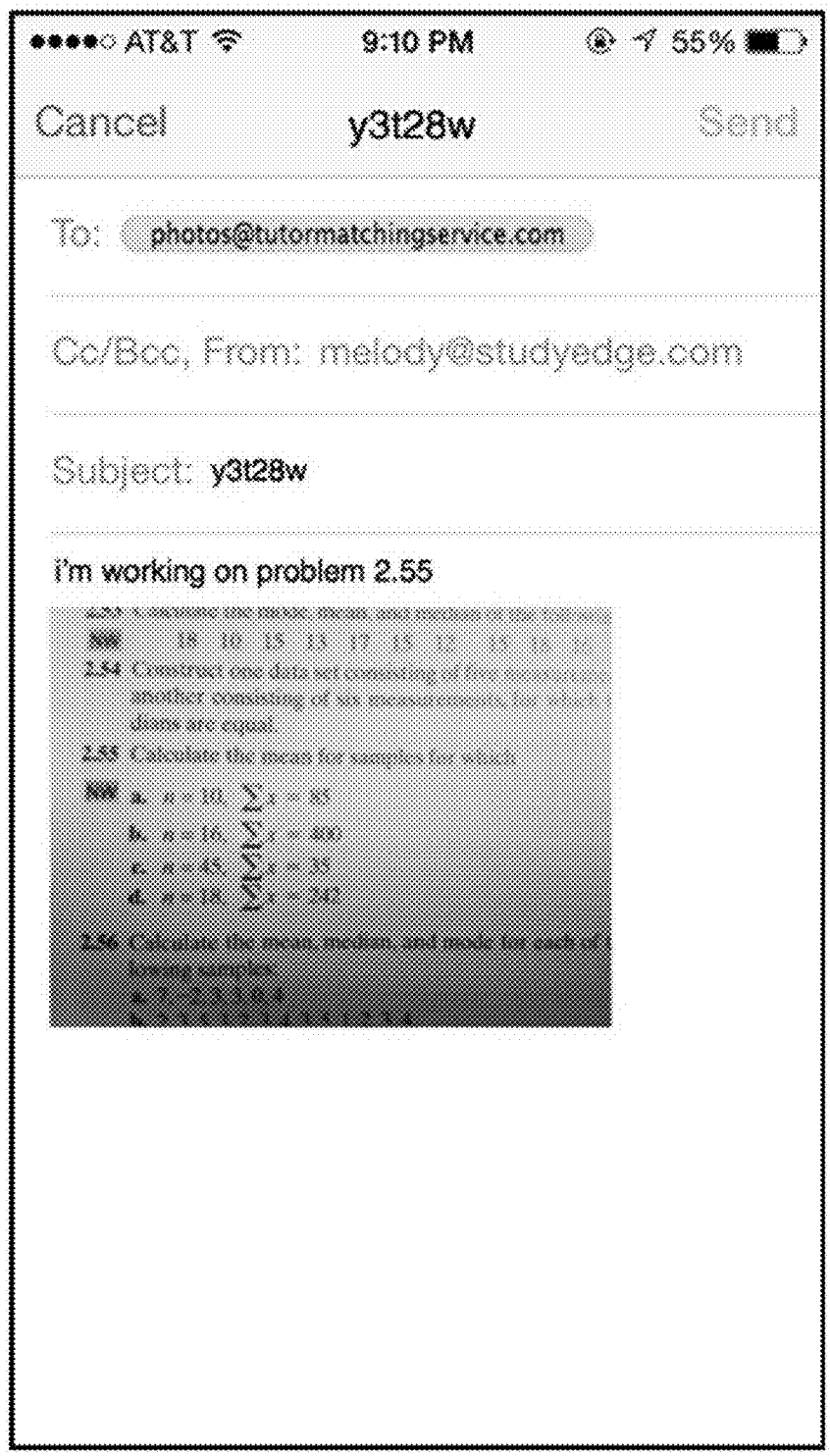

FIGS. 12-85 include various example screenshots and GUIs which may help to illustrate at least a portion of the different types of Whiteboard Editing and Message-to-Post features/aspects which may be implemented and/or enabled in one or more embodiments of the Online Social Education System(s) described and/or referenced herein. A brief description of at least some of these Whiteboard Editing and Message-to-Post features/aspects are described in greater detail below.

FIGS. 12, 56-70 illustrate various example screenshots of different types of messaging functionality which may be conducted between the user's smartphone and the OSES Server.

Message to Post—Sending Text/MMS Message of Captured Image to OSES Server. FIG. 12 shows an example screenshot of a captured image 1202 being send via MMS service from the user's smartphone to a specified MMS message recipient (e.g., "(858) 248-4586"), which may correspond to the OSES Server.

Figure 56:
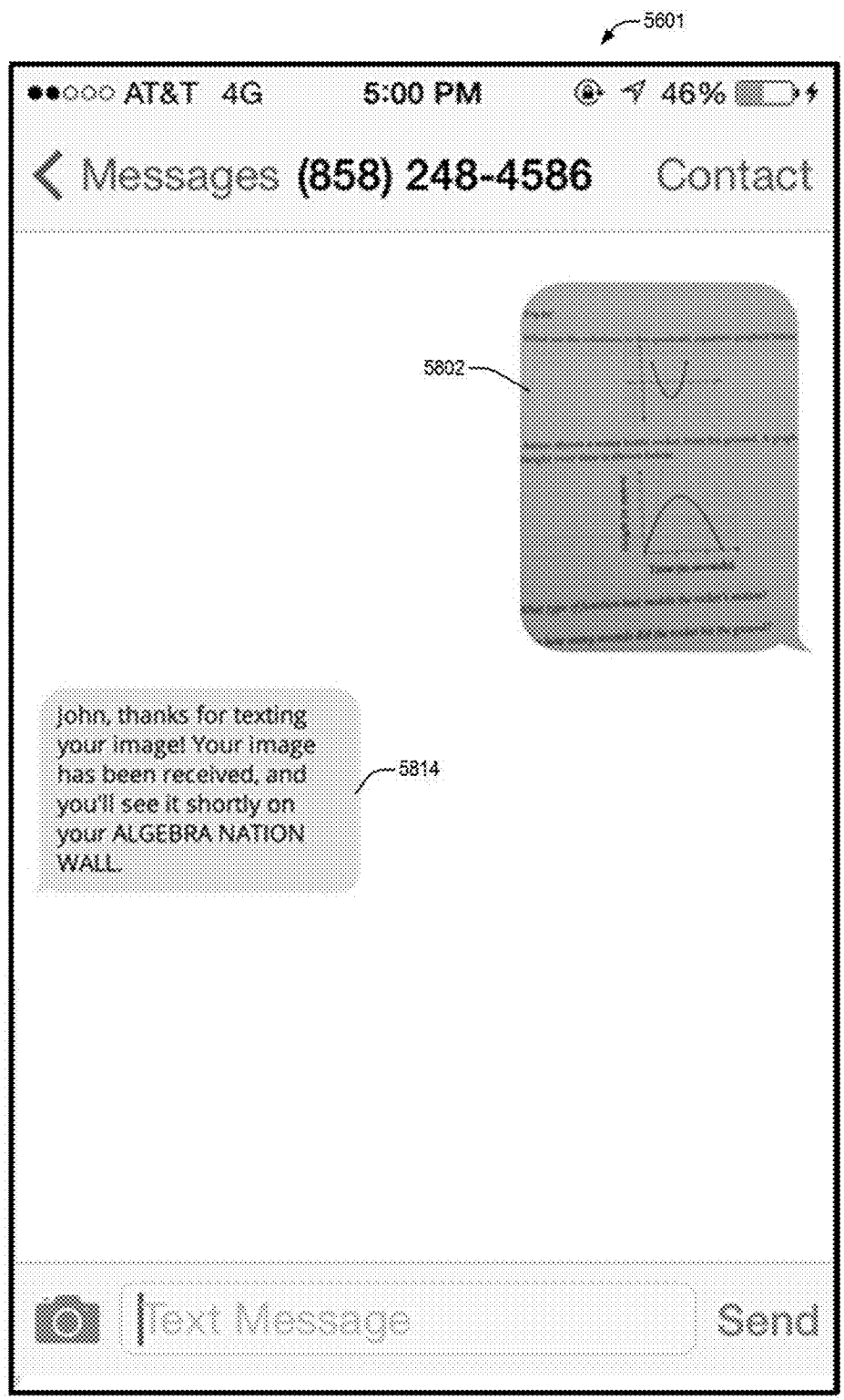

Message to Post—Simple Confirmation—As illustrated in the example screenshot GUI of FIG. 56:

- OSES Server may receive incoming text/MMS image and may identify user using one or more user identification techniques such as, for example, via identification of the smartphone number associated with the incoming text/MMS message. As illustrated in the example embodiment of FIG. 56, the OSES Server may address the identified user by the user's first name on record (e.g., John).

A simple confirmation message 5814 may be generated by OSES Server and sent to the user's smartphone, confirming that the image has been received.

Figure 57:
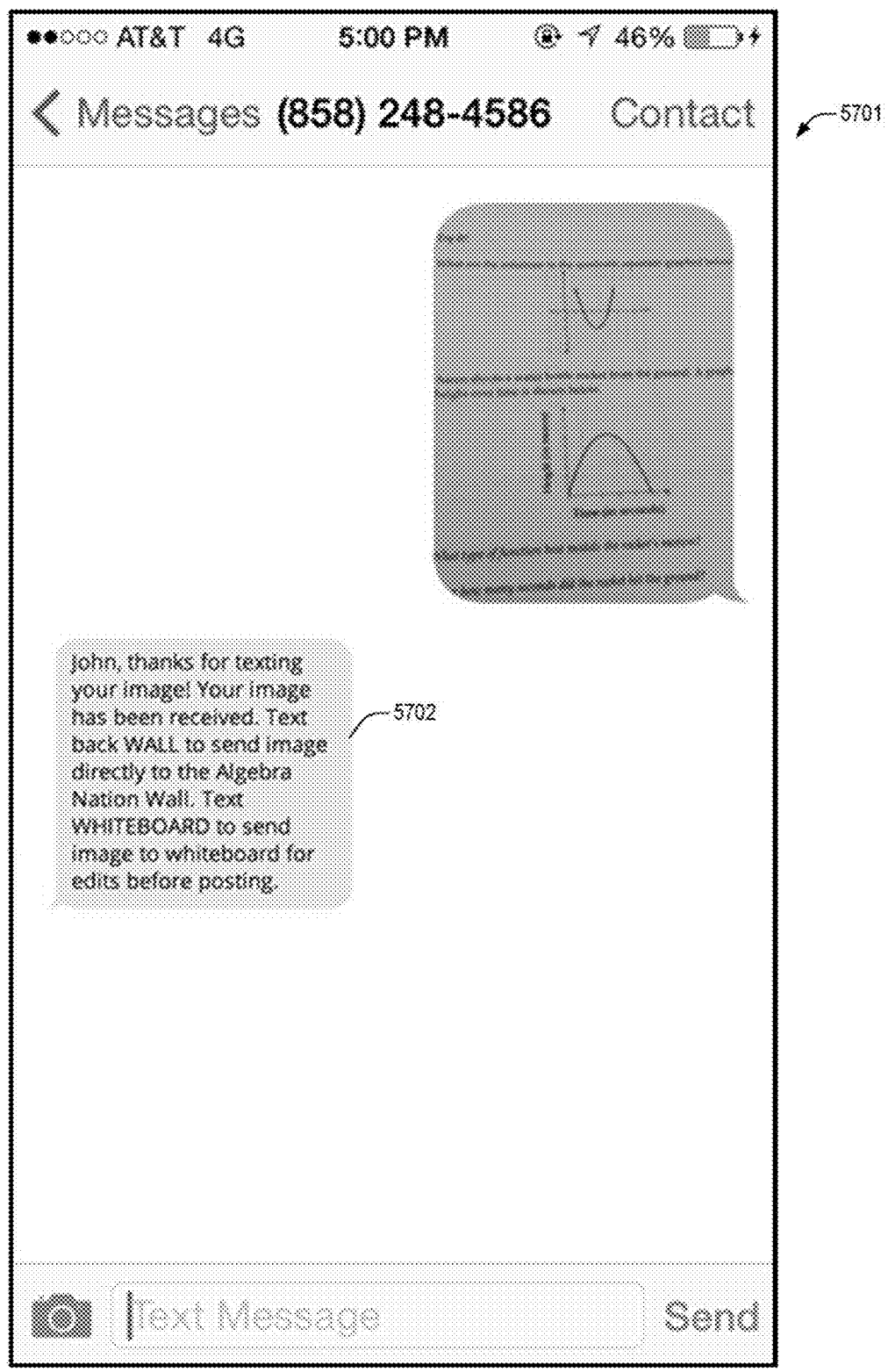

Message to Post—Reply Back Options 1—As illustrated in the example screenshot GUI of FIG. 57:

OSES Server may receive incoming text/MMS image and may determine identity of user using one or more user identification techniques such as, for example, via identification of the smartphone number associated with the incoming text/MMS message.

OSES Server may respond with reply text message 5702 offering the user various different options to post directly into current discussion, to open image in the whiteboard, etc. For example, according to different embodiments, the OSES Server may present the user with various different options for handling the received image, and request appropriate input from the user (e.g., via text message). According to different embodiments, the user may respond by texting preset phrases or words to indicate certain actions. For example, users may reply with one or more of the following words/phrases (or combinations thereof):

"WALL" to cause the OSES Server to automatically send/post the image directly to the Interactive Study Wall;

"WHITEBOARD" (or "WB") to cause the OSES Server to automatically load the image into a whiteboard GUI for allowing the user to edit the image before posting;

"NEW" to cause the OSES Server to automatically post the image to a new discussion thread on the Interactive Study Wall;

"COMMENT" to cause the OSES Server to automatically post the image as a comment or reply to the most recent discussion thread which the user has interacted with.

"DELETE" or "DISCARD" or "TRASH" to cause the OSES Server to discard the identified image.

SIMILAR to cause the OSES Server to automatically search for and/or identify similar images which have been uploaded to the OSES Server and/or which have been posted to one or more collaborative online discussion mediums.

PARSE to cause the OSES Server to automatically identify, parse, and extract out any embedded equations, formulas, numbers, text, and/or other content included in the Message-to-Post image.

CROP <crop_parameter(s)> to cause the OSES Server to automatically crop the identified image in accordance with the specified crop_parameter(s). For example:

CROP 10% may cause the OSES Server to automatically crop all sides of the identified image by 10%;

CROP ALL 12% may cause the OSES Server to automatically crop all sides of the identified image by 12%;

CROP TOP 13% may cause the OSES Server to automatically crop the top part of the identified image by 13%

CROP 10%, 12%, 13%, 14% may cause the may cause the OSES Server to automatically crop the identified image by 10% off top, 12% off right, 13% off bottom, and 14% off left.)

RESIZE <resize_parameter(s)> to cause the OSES Server to automatically resize the identified image in accordance with the specified resize_parameter(s). For example:

RESIZE 60% may cause the OSES Server to automatically resize the identified image to 60% of original size;

RESIZE AUTOFIT may cause the OSES Server to automatically determine the appropriate amount of resizing needed to enable the entirety of the resized image to be fully viewable within the viewable display window of each participant's respective display screen, and to automatically resize the identified image by the determined resizing amount to thereby enable the resized image to be fully viewable within the viewable display window of each participant's respective display screen;

SAVE may cause the OSES Server to automatically save the image and associate the saved image with the identified user's account to thereby allow the saved image to be accessed and/or used for future use SENDTO <User ID(s)> may cause the OSES Server to automatically send the image directly to one or more other user(s) (e.g., tutor, peer, student, teacher, study expert, etc.), as determined by the specified <User ID(s)> parameter(s).

Etc.

According to different embodiments, one or more of these preset (e.g., predetermined or predefined) phrases or words may be preconfigured (e.g., at the OSES Server), and/or may be suggested by the OSES Server to the user. In some embodiments, a user can set or configure preferences to define one or more words/phrases and their respective action(s) to be implemented by the OSES Server. For example, in one embodiment, a user can define the shortcut "cmt" to correspond to the action of posting a Message-to-Post image as a comment or reply to the discussion thread with which the user has most recently interacted. When the user texts term "cmt" to the OSES Server, the server may interpret the "cmt" message as instructions to post the Message-to-Post image as a comment or reply to the discussion thread with which the identified user has most recently interacted.

Figure 17:
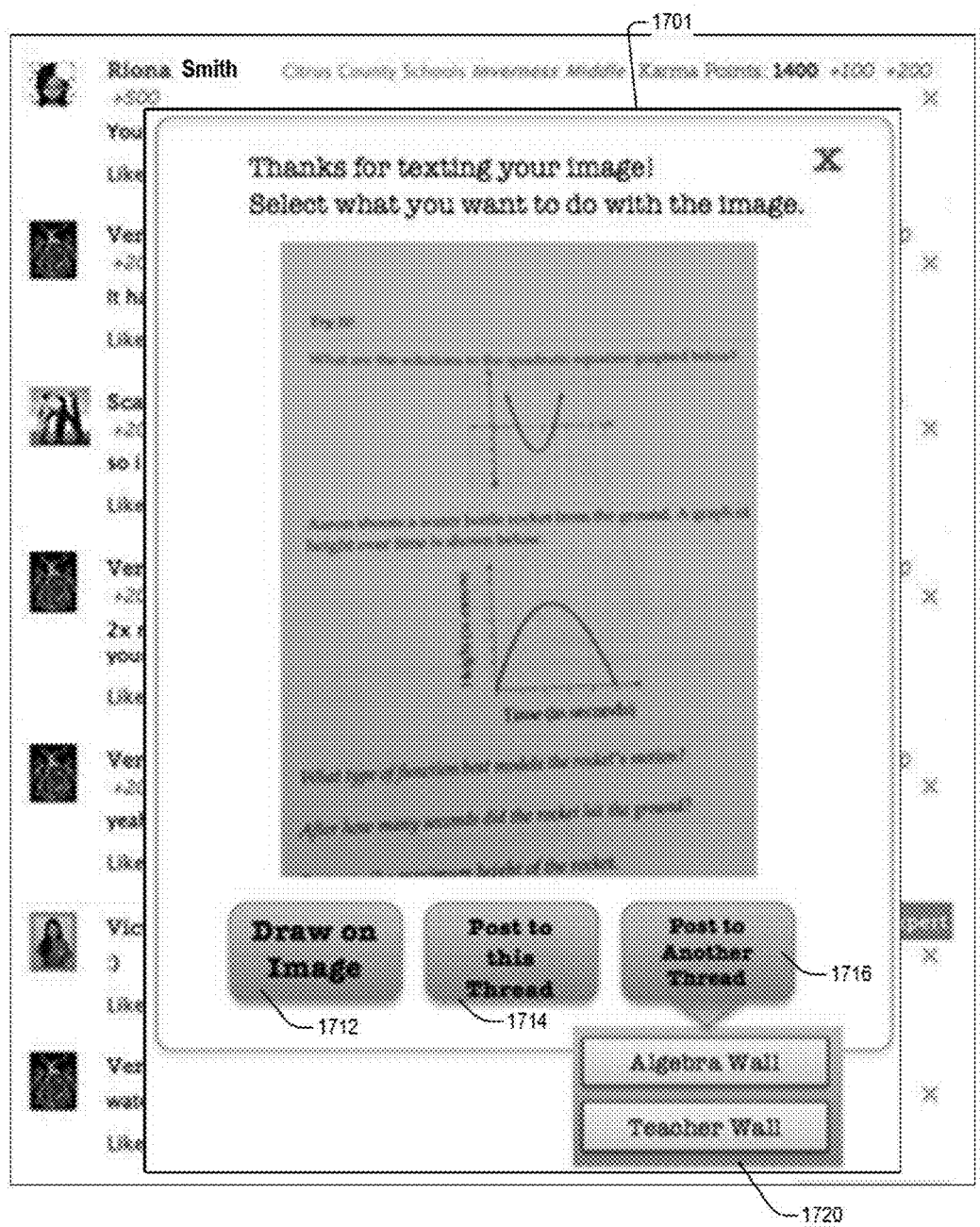

In some embodiments, at least some of these choices/options may be presented or displayed via one or more GUIs of collaborative online discussion mediums, as illustrated, for example, in FIG. 17. In some embodiments, such choices/options may be presented via one or more GUIs of the collaborative online discussion medium, thereby avoiding any requirements for the user to text back further instructions regarding the handling and/or posting of the received image.

Figure 58:
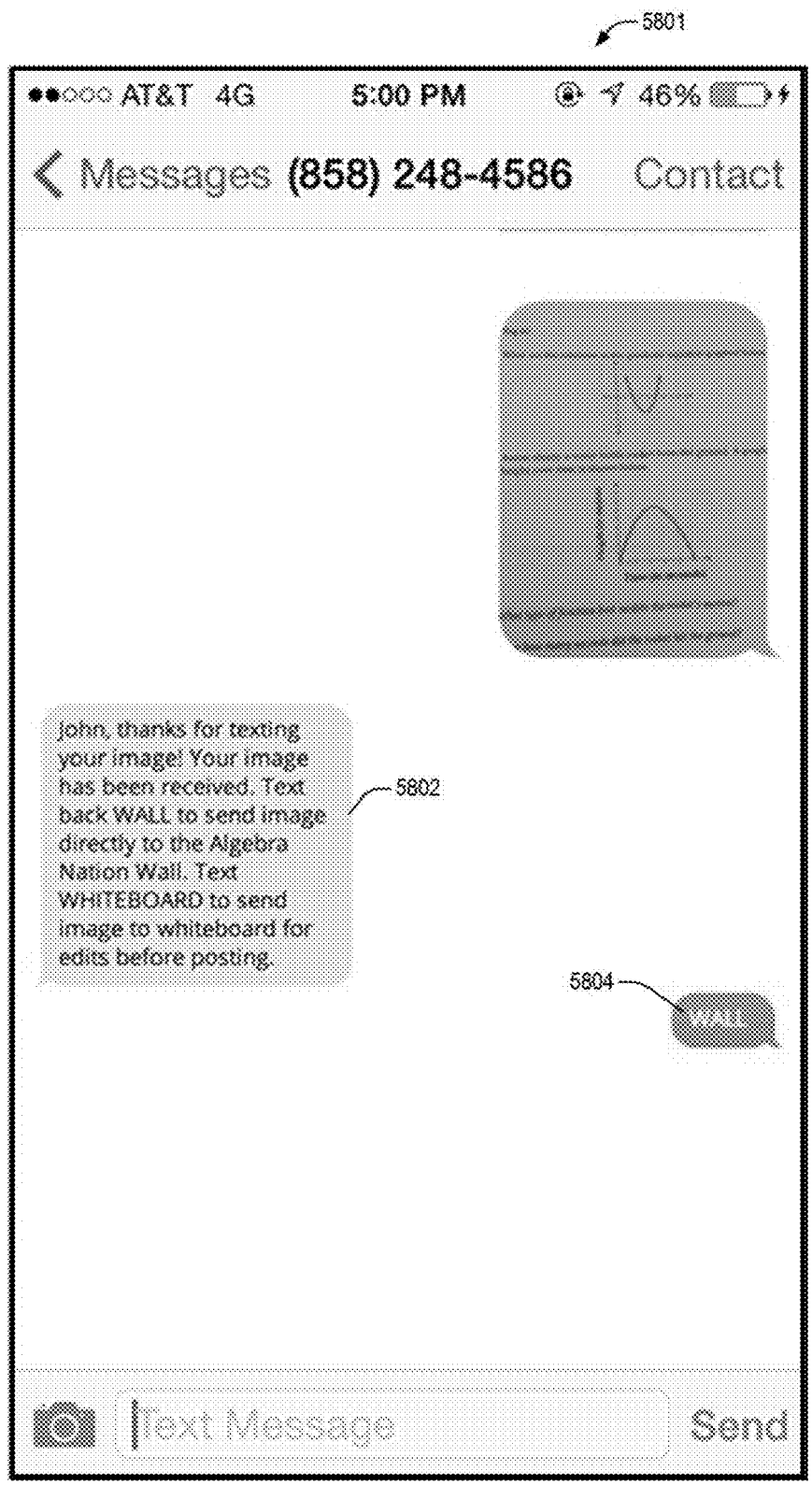

Message to Post—Reply Back Options 2—As illustrated in the example screenshot GUI of FIG. 58:

OSES Server may receive incoming text/MMS image and may identify user using one or more user identification techniques such as, for example, via identification of the smartphone number associated with the incoming text/MMS message.

OSES Server may respond with reply text message 5802 offering the user various different options to post directly into current discussion, to open image in the whiteboard, etc. For example, according to different embodiments, the OSES Server may present the user with various different options for handling the received image, and request appropriate input from the user (e.g., via text message).

As illustrated in the example embodiment of FIG. 58, the user has provided the OSES Server with instructions to post directly into current discussion by texting "WALL" as a reply message 5804.

Figure 59:
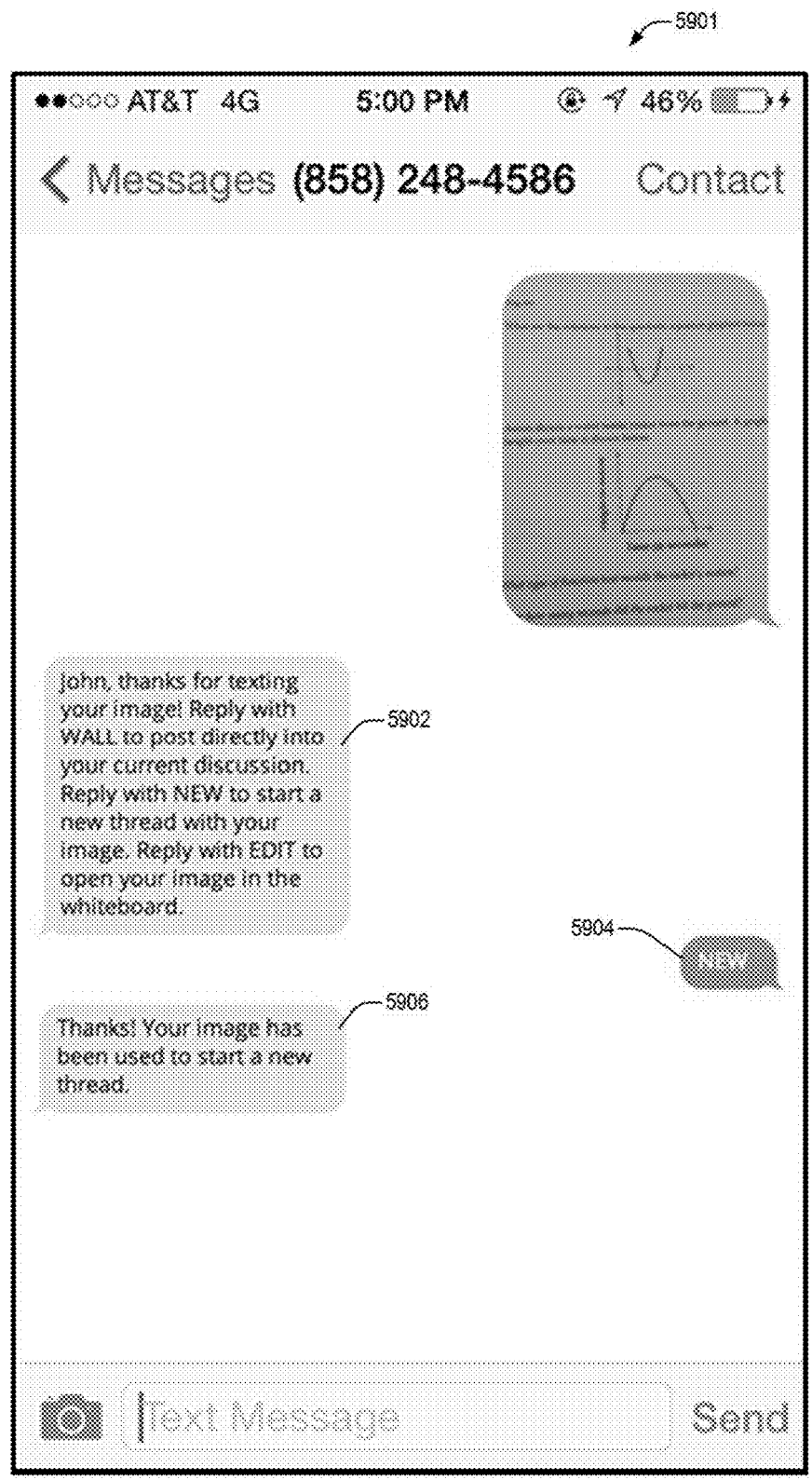

Message to Post—Reply Back Options 3—As illustrated in the example screenshot GUI of FIG. 59:

OSES Server may receive incoming text/MMS image and may identify user using one or more user identification techniques such as, for example, via identification of the smartphone number associated with the incoming text/MMS message.

OSES Server may respond with reply text message 5902 offering user options to post directly into current discussion (e.g., by texting reply "WALL"), start new thread with image (e.g., by texting reply "NEW"), to open image in the whiteboard (e.g., by texting reply "EDIT"), etc.

In some embodiments, the case of the reply text (e.g., upper case/lower case) does not matter.

In some embodiments, multiple different types of reply text instructions may be accepted (e.g., texting back "EDIT" or "WHITEBOARD" may cause the received image to be loaded into a whiteboard editor before posting).

As illustrated in the example embodiment of FIG. 59, the user has provided the OSES Server with instructions to post the captured image into a new discussion thread by texting "NEW" as a reply message 5904.

In some embodiments, when the OSES Server receives the user instructions via a reply text message, the OSES Server may generate and send a confirmation text message 5906 back to the user's smartphone, confirming receipt of the user's texted instructions 5904.

Figure 60:
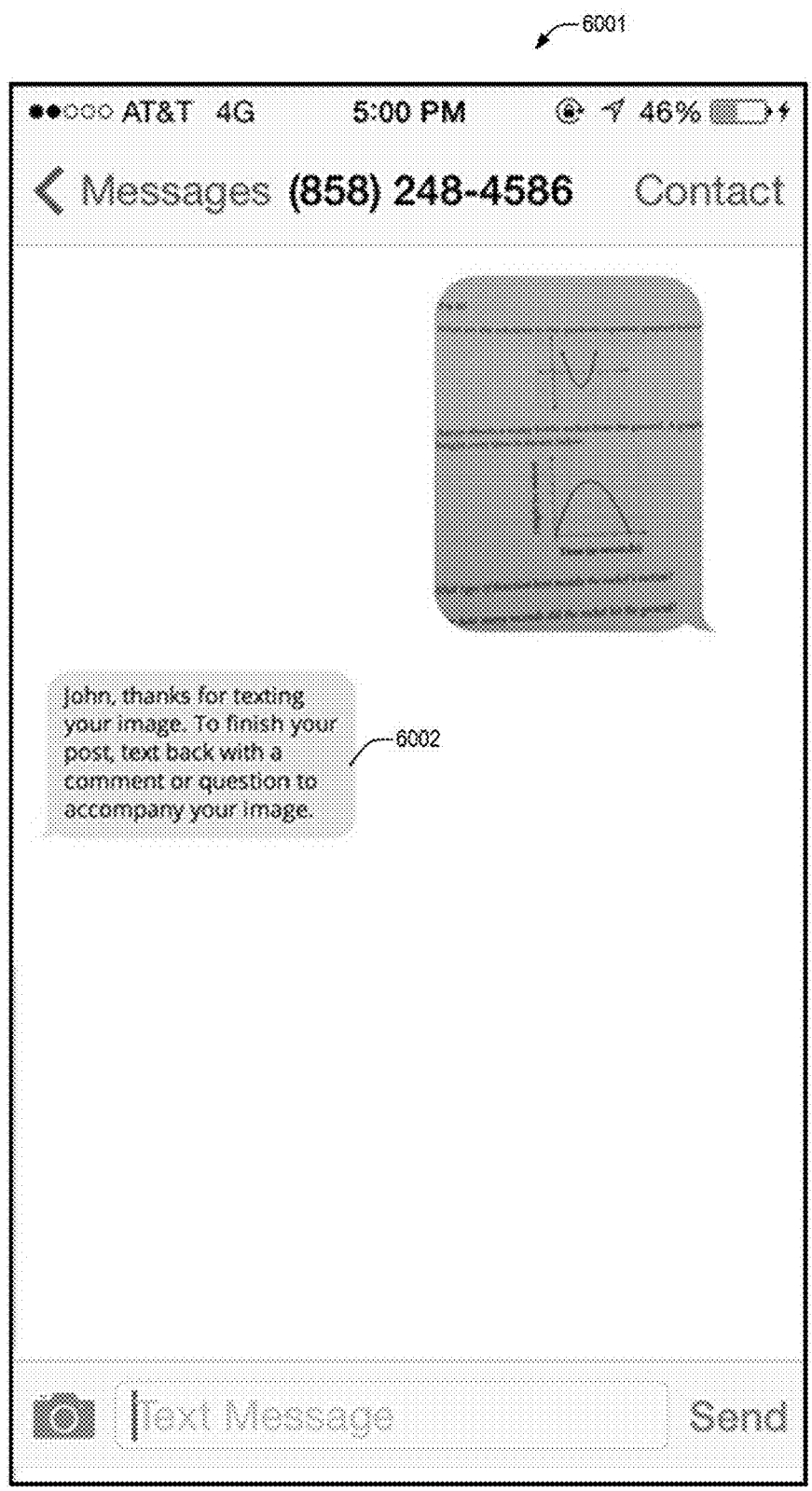

Message to Post—Reply Caption Prompt—As illustrated in the example screenshot GUI of FIG. 60:

OSES Server may receive incoming text/MMS image and may identify user using one or more user identification techniques such as, for example, via identification of the smartphone number associated with the incoming text/MMS message.

OSES Server may generate and send a reply text message 6002 prompting the user to text back a caption/question/comment to accompany the received image. According to different embodiments, this feature may be optional (or, in some embodiments, may be required).

Figure 61:
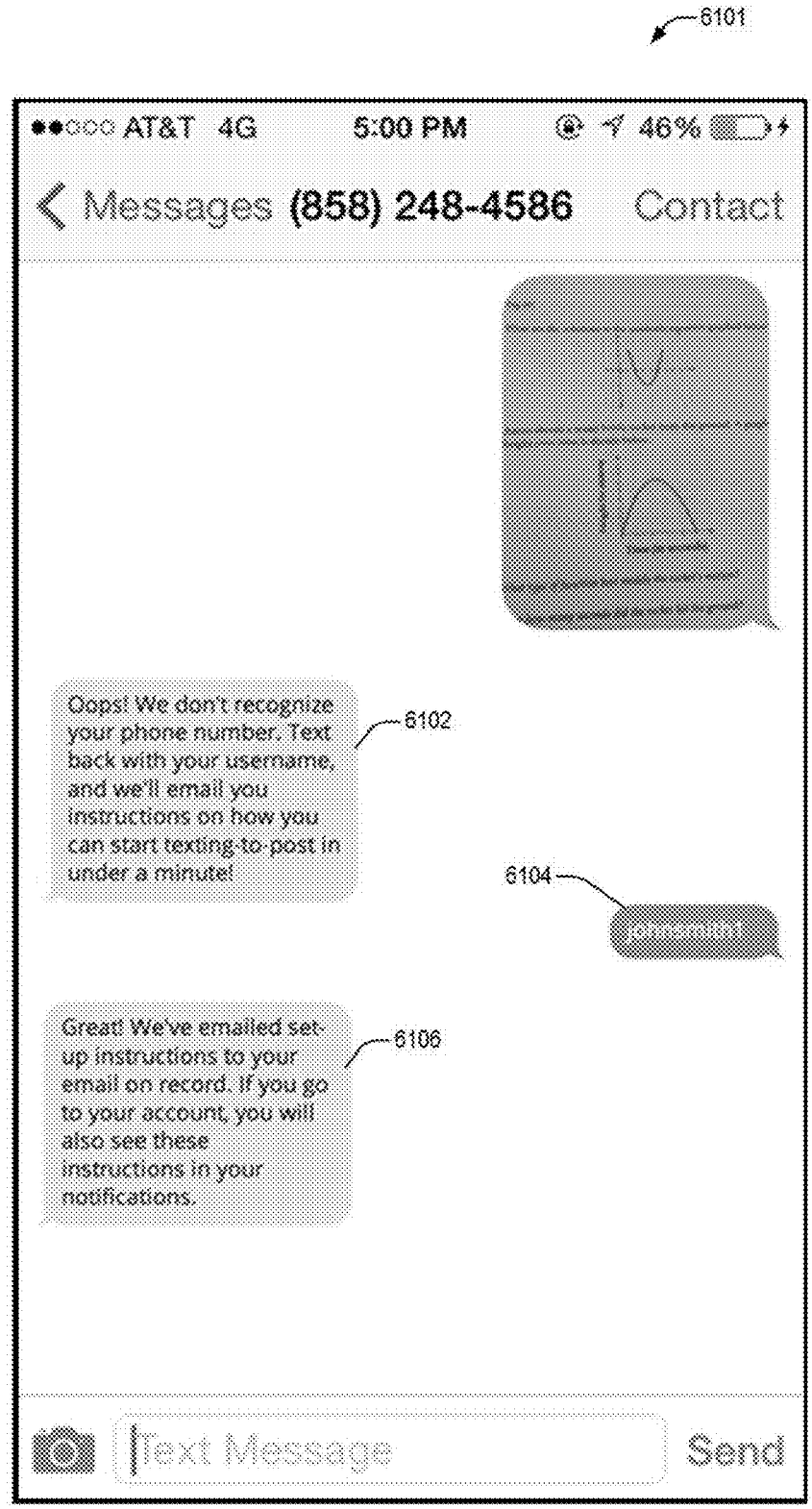

Message to Post—Unknown User Response 1—As illustrated in the example screenshot GUI of FIG. 61:

It is assumed, in this example, that the OSES Server does not recognize the incoming number as one currently associated with a user account. Accordingly, the OSES Server may respond with a reply text message 6102 requesting the user to provide his/her username (and/or other user identification credentials/information).

The user provides his/her username or User ID (e.g., "johnsmith1") via reply text message 6104.

Once username information has been received at the OSES Server, the system may process the username data in order to identify and/or recognize the username as one that is on record. In this example, it is assumed that the OSES Server recognizes the identified username as one that already exists in system (and which is associated with a specific user account).

OSES Server may email user instructions on how to perform various tasks such as, for example, set up an account, linking of mobile phone number to user's account, set up/enable Message-to-Post functionality, etc. In some embodiments, such emails may be sent to an email address associated with the identified username. In some embodiments, the OSES Server may also display instructions to the user via the collaborative online discussion medium's notification center. In some embodiments, the user may text back instructions to the OSES Server to complete activities requested by the OSES Server. In some embodiments, the OSES Server may generate and send a text or email message to the user which includes a link to webpage where the user can view various instructions and/or perform various activities such as one or more of those described and/or referenced herein.

As illustrated in the example embodiment of FIG. 61, the OSES Server may generate and send a confirmation reply text message 6106 to the user, which may also include information about other communications (e.g., email messages, etc.) which the OSES Server has sent to the user.

Figure 62:
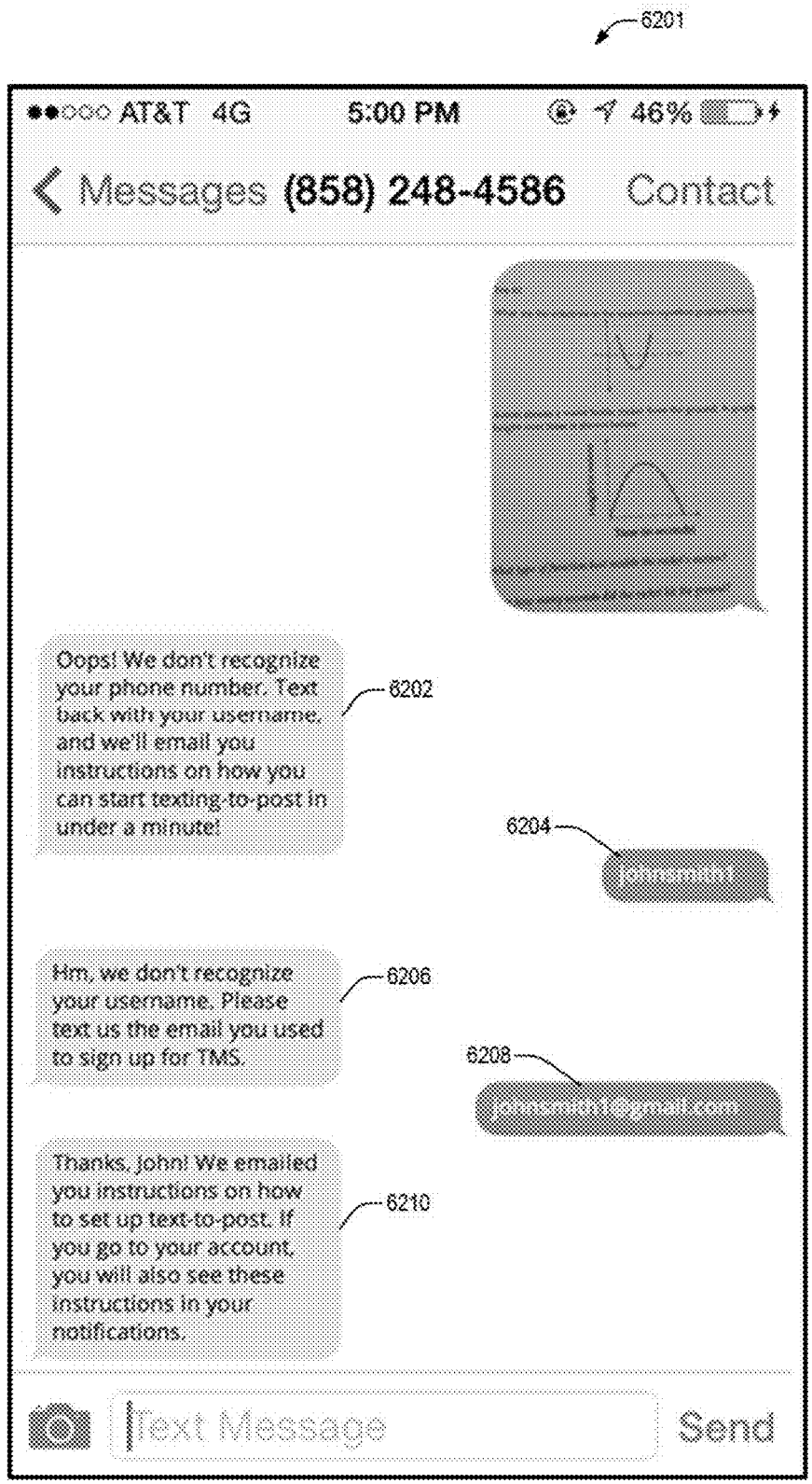

Message to Post—Unknown User 2—As illustrated in the example screenshot GUI of FIG. 62:

It is assumed, in this example, that the OSES Server does not recognize the incoming number as one currently associated with a user account. Accordingly, the OSES Server may respond with a reply text message 6202 requesting the user to provide his/her username (and/or other user identification credentials/information).

The user provides his/her username or User ID (e.g., "johnsmith1") via reply text message 6204.

Once username information has been received at the OSES Server, the system may process the received username to determine whether the username is recognized as one that is on record. In the specific example embodiment of FIG. 62 it is assumed that the OSES Server does not recognize the identified username as one that is on record (in connection with the collaborative online discussion medium).

The OSES Server may generate and send a text message 6206 to the user, informing the user that the username is not recognized, and prompting the user for additional information (e.g., the email address which was used to set up an account on the collaborative online discussion medium) which may be used to authenticate and/or verify the identity of the user (and/or the user's account).

In the specific example embodiment of FIG. 62, the email address of record is used to identify or determine the user's identity. Other embodiments may utilize other types of identifiers such as, for example, one or more of the following (or combinations thereof):

User PIN #,
User Birthdate,
User IP address,
User phone number,
User profile, biographic, or account related information,
User geolocation information,
User security questions
etc.

In at least one embodiment, collaborative online discussion mediums may include one or more of the following (or combinations thereof): discussion board forums (OCDs), Interactive Study Walls such as, for example, Algebra Nation, Study Edge, and/or other collaborative online educational platforms.

The User may text 6208 the requested email address (e.g., johnsmith1@gmail.com) to the OSES Server.

In this example, it is assumed that the OSES Server recognizes the identified email address as one that already exists in system (and associated with a specific user account). Accordingly, the OSES Server may email user instructions on how to perform various tasks such as, for example, set up an account, linking of mobile phone number to user's account, set up/enable Message-to-Post functionality, etc. In some embodiments, such emails may be sent to an email address associated with the identified username. In some embodiments, the OSES Server may also display instructions to the user via the collaborative online discussion medium's notification center. In some embodiments, the user may text back instructions to the OSES Server to complete activities requested by the OSES Server. In some embodiments, the OSES Server may generate and send a text or email message to the user which includes a link to webpage where the user can view various instructions and/or perform various activities such as one or more of those described and/or referenced herein.

As illustrated in the example embodiment of FIG. 62, the OSES Server may generate and send a confirmation reply text message 6210 to the user, which may also include information about other communications (e.g., email messages, etc.) which the OSES Server has sent to the user.

Figure 63:
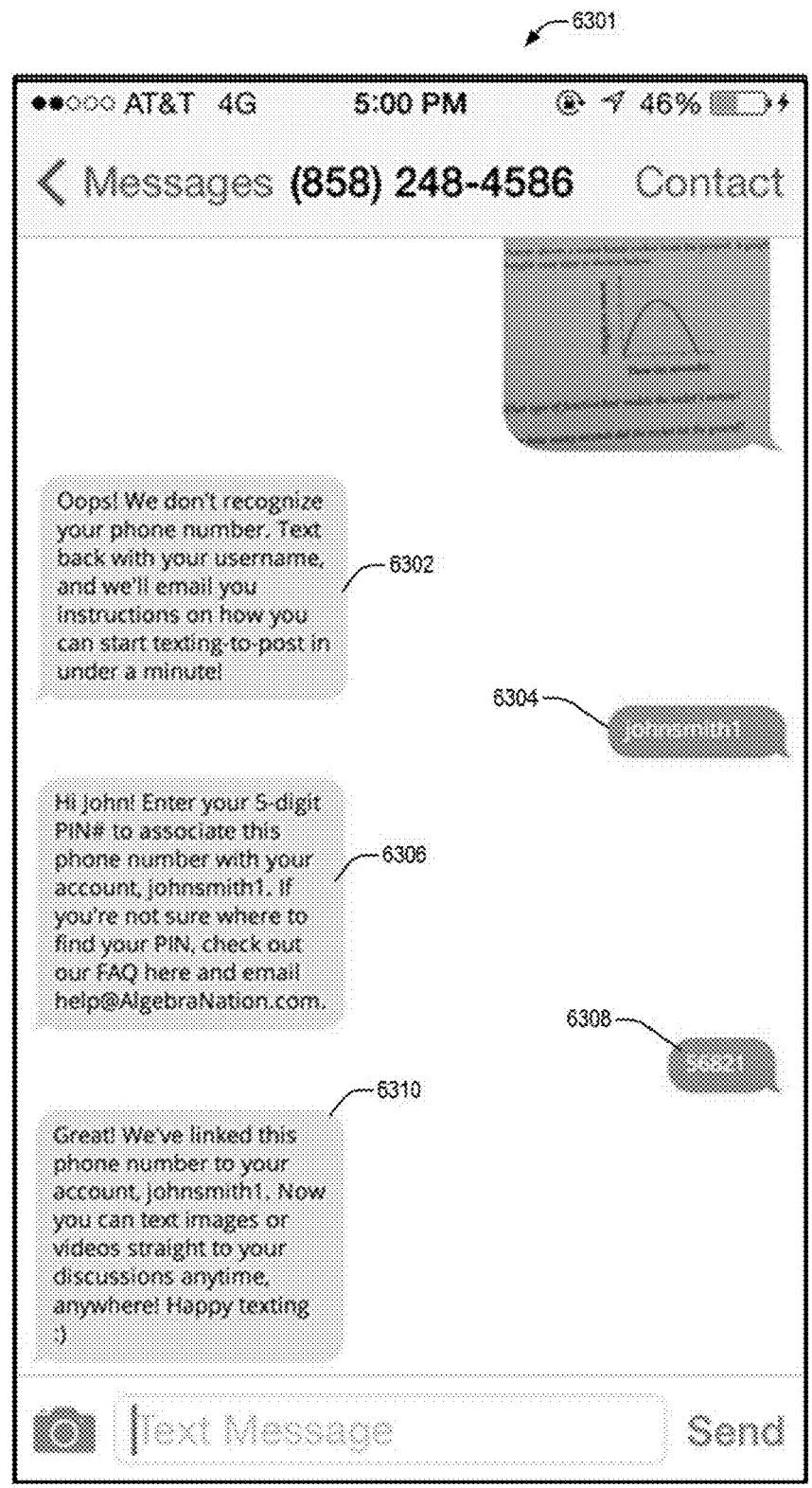

Message to Post—Unknown User 3—As illustrated in the example screenshot GUI of FIG. 63:

It is assumed, in this example, that the OSES Server does not recognize the incoming number as one currently associated with a user account. Accordingly, the OSES Server may respond with a reply text message 6302 requesting the user to provide his/her username (and/or other user identification credentials/information).

The user provides his/her username or User ID (e.g., "johnsmith1") via reply text message 6304.

Once username information has been received at the OSES Server, the system may process the received username to determine whether the username is recognized as one that is on record. In the specific example embodiment of FIG. 62 it is assumed that the OSES Server recognizes the identified username as one that is on record (in connection with the collaborative online discussion medium).

The OSES Server may prompt 6306 the user for a PIN # (or other type of security information) associated with the identified username, for extra level of security (e.g., optional or mandatory $2^{nd}$ level verification). In the specific example embodiment of FIG. 63, the OSES Server generates and sends a text message requesting the user to provide a PIN # (e.g., which is associated with the user's mobile device phone number, or which is associated with the identified username's account). In some embodiments, other types of security information may be requested/accepted such as, for example, birthdate, security questions, email verification, IP address, phone number, User profile/biographic/account related information, geolocation information etc.

User may text back PIN # (6308).

OSES Server may determine and/or recognize PIN # as a match with a specific username in the OSES Server database, and may automatically link the user's mobile phone number with the user's account. As illustrated in the example embodiment of FIG. 63, the OSES Server may inform the user (e.g., via text message 6310) that the user's mobile phone number has been linked with the identified user's account.

In some embodiments, the OSES Server may automatically email and/or text further requests and/or instructions to the user or provide a link to a webpage with instructions on how to link the user's phone number with his corresponding account.

Figure 64:
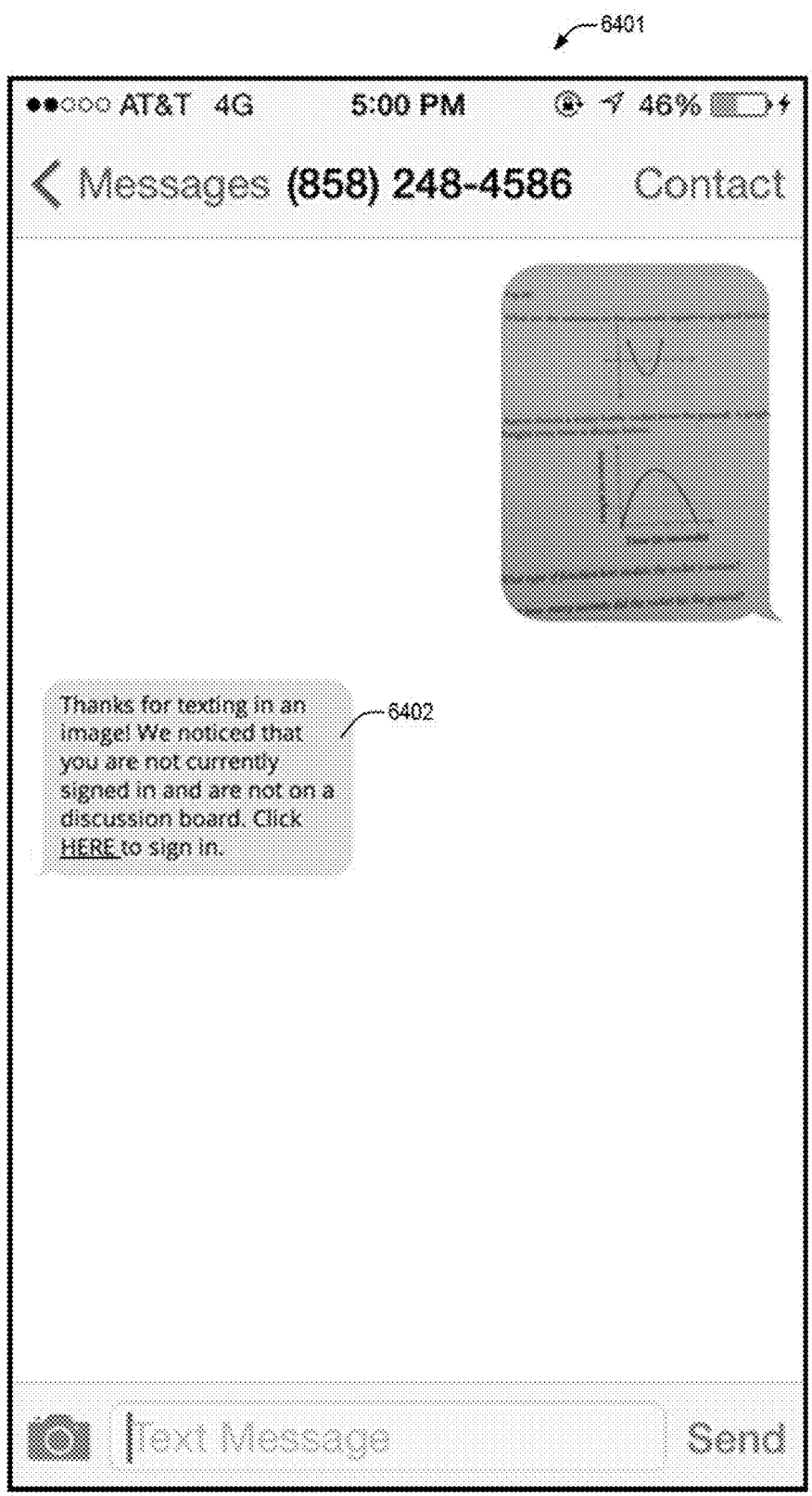

Message to Post—User not signed in 1—As illustrated in the example screenshot GUI of FIG. 64:

OSES Server may receive incoming text/MMS image and may identify user (e.g., via identification of the smartphone number associated with the incoming text/MMS message).

OSES Server may also automatically and/or dynamically perform (e.g., in real-time) a check to determine one or more of the following (or combinations thereof):
  if the identified user is currently signed in (or logged on) to the collaborative online discussion medium; and/or
  if the identified user is currently viewing and/or interacting with a discussion thread/chat room/forum/etc. of the collaborative online discussion medium.

In the specific example embodiment of FIG. 64, it is assumed that the OSES Server determines that the identified user is not currently signed in (and/or is not currently interacting with a discussion board of the collaborative online discussion medium).

OSES Server may generate and send a reply message 6402 to user's smartphone, along with a link which may be selected by the user to enable the user to sign in to the collaborative online discussion medium.

Figure 65:
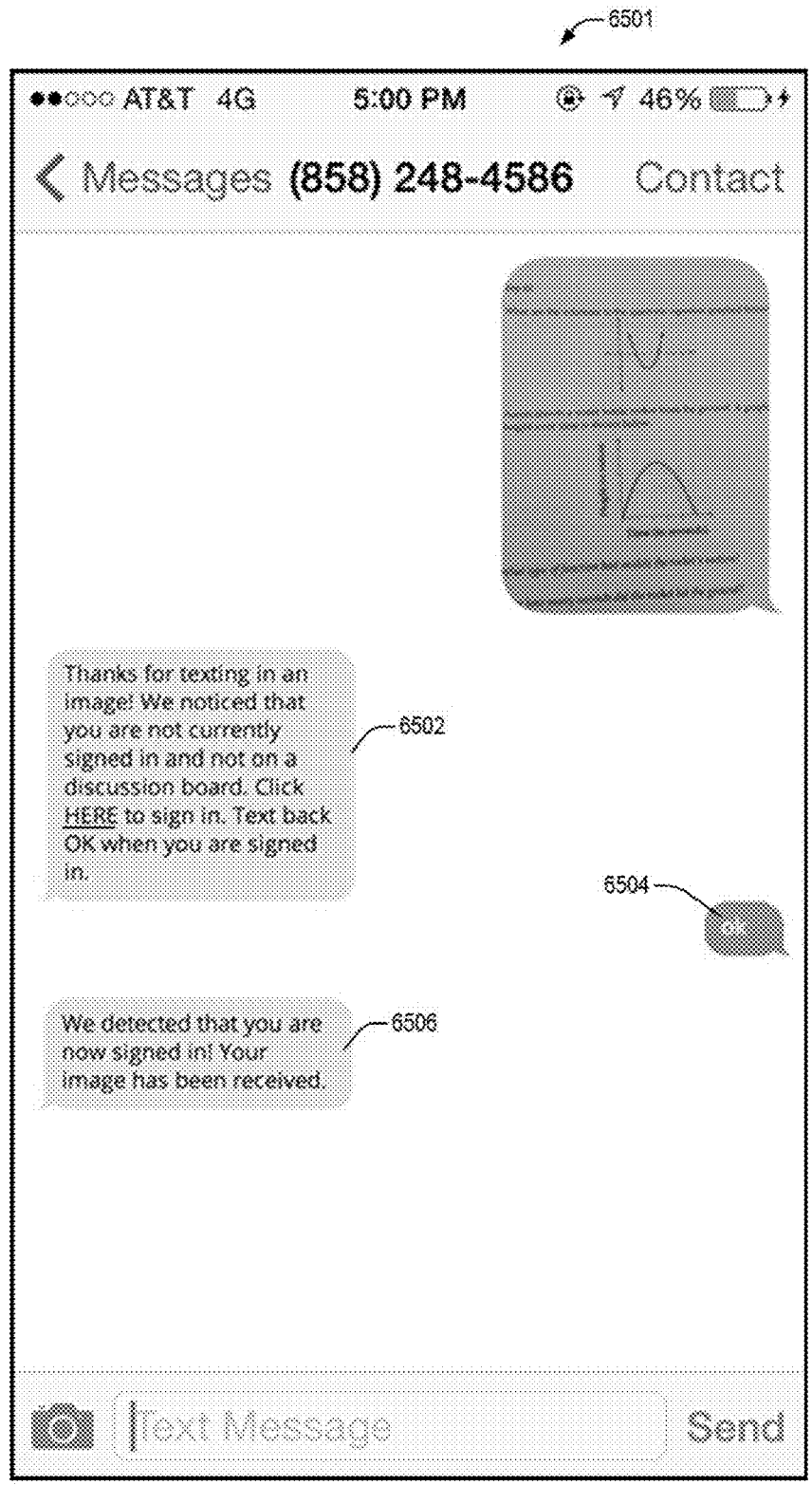

Message to Post—User not signed in 2—As illustrated in the example screenshot GUI of FIG. 65:

OSES Server may receive incoming text/MMS image and may identify user (e.g., via identification of the smartphone number associated with the incoming text/MMS message).

OSES Server may also automatically and/or dynamically perform (e.g., in real-time) a check to determine one or more of the following (or combinations thereof):
  if the identified user is currently signed in (or logged on) to the collaborative online discussion medium; and/or
  if the identified user is currently viewing and/or interacting with a discussion thread/chat room/forum/etc. of the collaborative online discussion medium.

The OSES Server may generate and send a text message 6502 to the user, informing the user that it has been detected that the user is not currently signed in to the collaborative online discussion medium, and prompting the user to complete the sign-in process, and send a reply text message back to the OSES Server with a specified word or phrase (e.g., "OK") after the user has signed in to the collaborative online discussion medium. In some embodiments, the OSES Server may also provide a link which may be selected by the user to enable the user to sign in to the collaborative online discussion medium.

In the specific example embodiment of FIG. 65, it is assumed that the user signs in to the collaborative online discussion medium, and then texts back "OK" 6504 to the OSES Server.

In one embodiment, when the OSES Server received the "OK" text message, it may automatically and/or dynamically perform (e.g., in real-time) another check to determine if the identified user is currently signed in (or logged on) to the collaborative online discussion medium.

In the specific example embodiment of FIG. 65, it is assumed that the OSES Server detects or determines that the user is signed in, and generates and sends a reply text message 6506 confirming that the user is now signed in, and confirming receipt of the text/MMS image.

In some embodiments, subsequent messaging functionality may be enabled and conducted between the users smartphone and the OSES Server.

Figure 66:
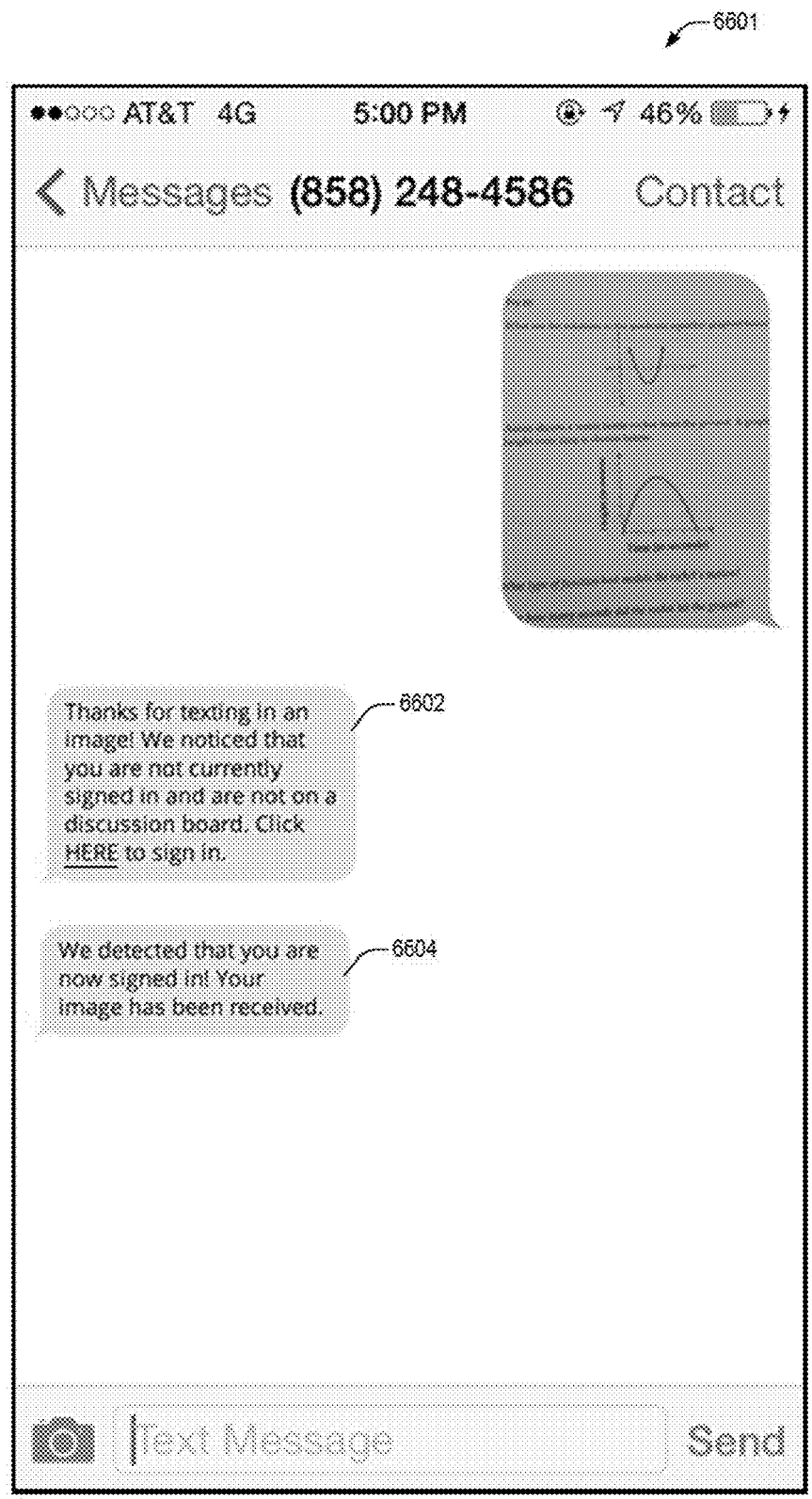

Message to Post—User not signed in 3—As illustrated in the example screenshot GUI of FIG. 66:

OSES Server may receive incoming text/MMS image and may identify user (e.g., via identification of the smartphone number associated with the incoming text/MMS message).

OSES Server may also automatically and/or dynamically perform (e.g., in real-time) a check to determine one or more of the following (or combinations thereof):
  if the identified user is currently signed in (or logged on) to the collaborative online discussion medium; and/or
  if the identified user is currently viewing and/or interacting with a discussion thread/chat room/forum/etc. of the collaborative online discussion medium.

The OSES Server may generate and send a text message 6602 to the user, informing the user that it has been detected that the user is not currently signed in to the collaborative online discussion medium, and prompting the user to complete the sign-in process. In some embodiments, the OSES Server may also provide a link (e.g., "Click HERE") which may be selected by the user to enable the user to sign in to the collaborative online discussion medium.

OSES Server may automatically detect when the user has signed in. OSES Server may text 6604 user that it confirms that user is signed in and that the OSES Server has received text/MMS image.

In some embodiments, the OSES Server may flags any received texted images/videos that are sent by users who are not detected as being signed in. The OSES Server may save such received images/videos in a designated "holding area" until the associated user(s) has signed in. In one embodiment, the OSES Server may tag or associate each received image/video with respective identifier information corresponding to the specific user who sent the received text/MMS image/video. After the user has signed in, the OSES Server may then provide that user with access to the saved or held image(s)/video(s) which that user sent to the OSES Server (e.g., via text, email, etc.).

In some embodiment, the OSES may periodically and/or continuously scan for users who have flagged texted images/videos to verify if they are signed in. Once user is detected to sign in, the OSES Server may send a confirmation text 6604 confirming that the user has been detected as being signed in, and that the text/MMS image has been received.

In some embodiments, subsequent messaging functionality may be enabled and conducted between the users smartphone and the OSES Server.

Figure 67:
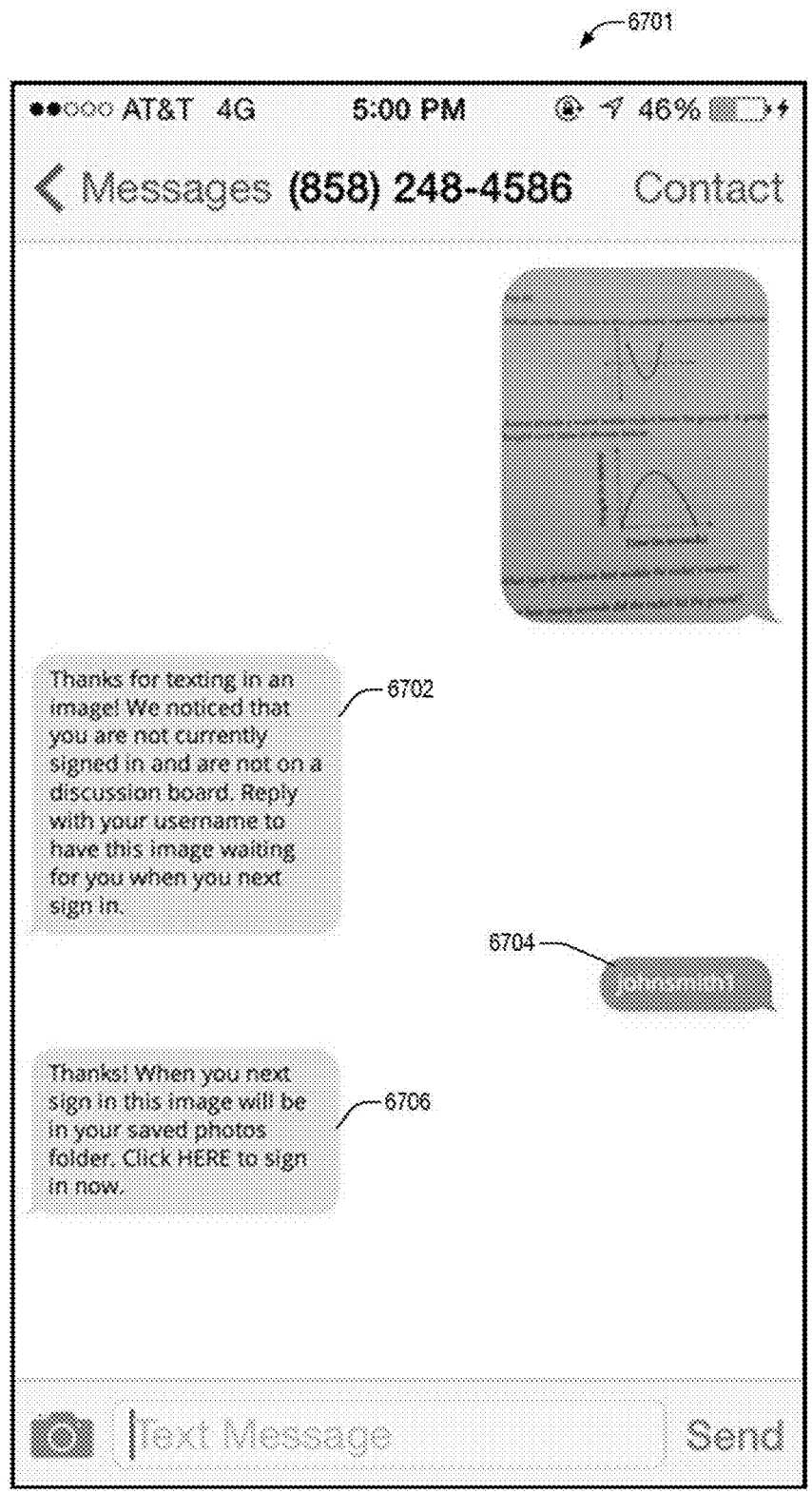

Message to Post—User not signed in 4—As illustrated in the example screenshot GUI of FIG. 67:

OSES Server may receive incoming text/MMS image and may identify user (e.g., via identification of the smartphone number associated with the incoming text/MMS message).

OSES Server may also automatically and/or dynamically perform (e.g., in real-time) a check to determine one or more of the following (or combinations thereof):
  if the identified user is currently signed in (or logged on) to the collaborative online discussion medium; and/or
  if the identified user is currently viewing and/or interacting with a discussion thread/chat room/forum/etc. of the collaborative online discussion medium.

The OSES Server may generate and send a text message 6702 to the user, prompting the user to send a reply text message with the user's username back to the OSES Server The user provides his/her username or User ID (e.g., "johnsmith1") via reply text message 6704.

Once username information has been received at the OSES Server, the system may process the username data in order to identify and/or recognize the username as one that is on record.

In this example, it is assumed that the OSES Server recognizes the identified username as one that already exists in system (and which is associated with a specific user account). In response, the OSES Server may automatically and/or dynamically generate and send a text message 6706 to the user confirming that the received image will be saved at the OSES Server (e.g., in user's "saved photos" account folder) and will be accessible to the user after the user has signed on. In some embodiments, the OSES Server may also provide a link which may be selected by the user to enable the user to sign in to the collaborative online discussion medium.

Figure 68:
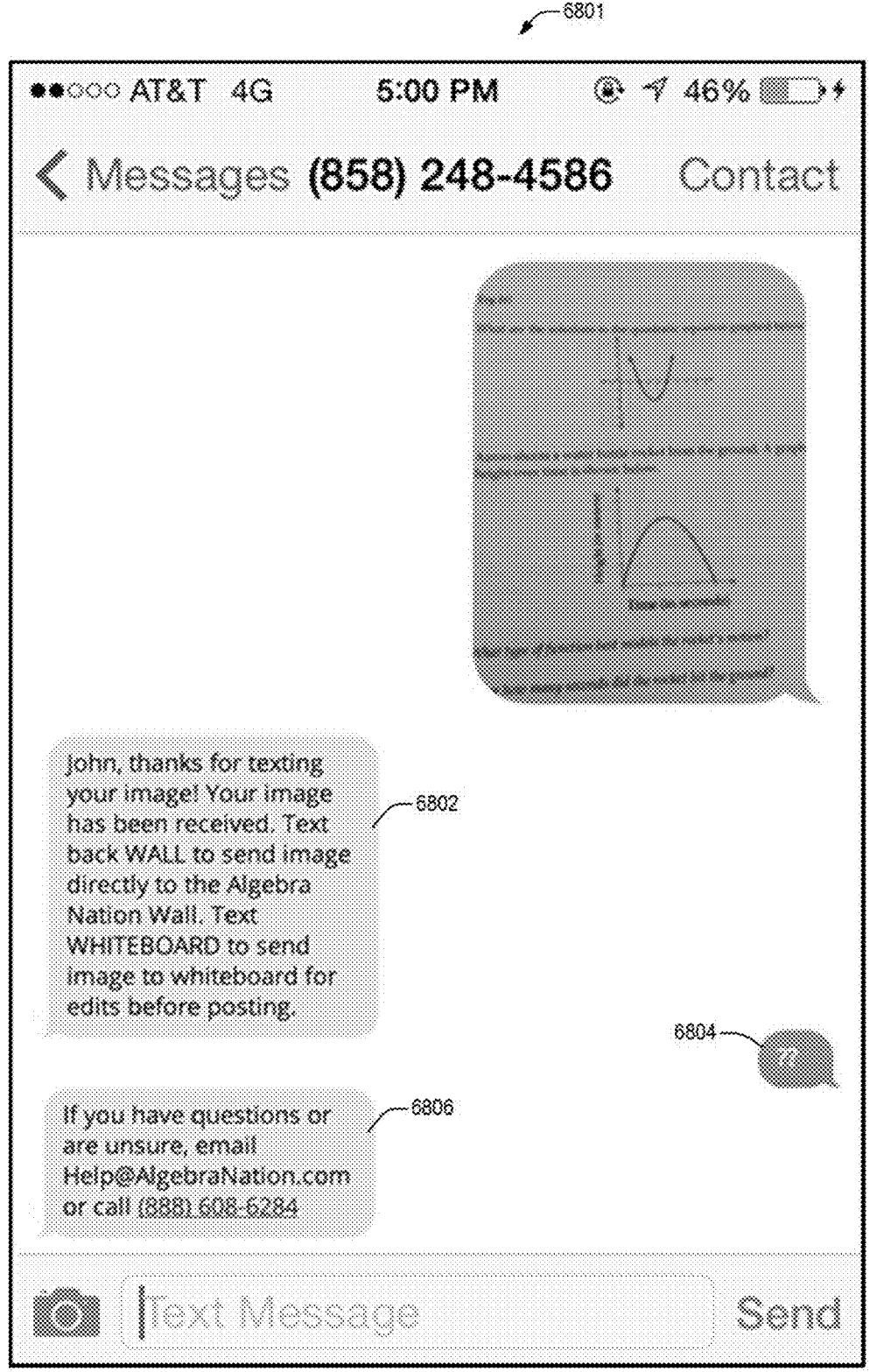

Message to Post—Reply Back Help—As illustrated in the example screenshot GUI of FIG. 68:

OSES Server may receive incoming text/MMS image and may identify user (e.g., via identification of the smartphone number associated with the incoming text/MMS message).

OSES Server may respond with reply text message 6802 offering the user various different options to post directly into current discussion, to edit image in the whiteboard, etc. For example, according to different embodiments, the OSES Server may present the user with various different options for handling the received image, and request appropriate input from the user (e.g., via text message).

In at least some embodiments, whenever user texts a specific series of characters or words (e.g., "?", "HELP", "??", and/or other specific words/phrases/symbols, etc.) the OSES Server may interpret the text message as a request for help by the user. In response, the OSES Server may determine the appropriate context of the help request, and provide the user (e.g., via text, email, web, etc.) with contextually appropriate help information 6806.

In some embodiments, when a help request message is received at the OSES Server, the OSES Server may automatically and/or dynamically dispatch a customer service representative to contact the user (e.g., via email, text, phone, etc.) in order to provide further assistance.

Figure 69:
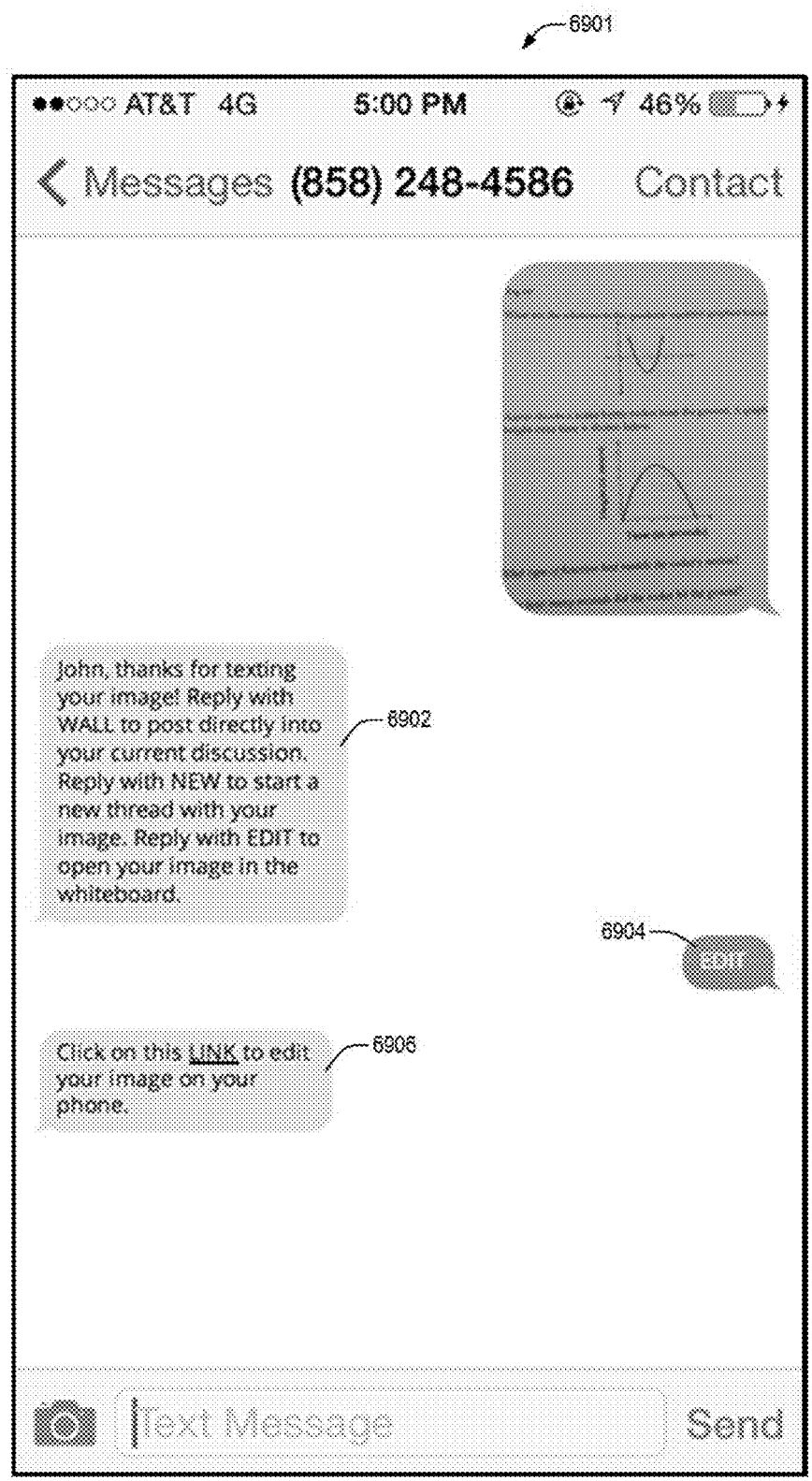

Message to Post—Edit in Whiteboard—As illustrated in the example screenshot GUI of FIG. 69:

OSES Server may receive incoming text/MMS image and may identify user (e.g., via identification of the smartphone number associated with the incoming text/MMS message).

OSES Server may respond with reply text message 6902 offering the user various different options to post directly into current or new discussion, to edit image in the whiteboard, etc. For example, according to different embodiments, the OSES Server may present the user with various different options for handling the received image, and request appropriate input from the user (e.g., via text message).

As illustrated in the example embodiment of FIG. 69, the user provides the OSES Server with instructions to open the image in a whiteboard editor by texting "EDIT" as a reply message 6904.

In response to receiving the EDIT text message, the OSES Server may generate and send a text message to the user which includes a user-selectable link or button for enabling the user to edit the received image in a Whiteboard Editor GUI, such as, for example, one of the Whiteboard Editor GUIs illustrated in FIGS. 14, 33, 70, 75, etc.

In some embodiments, the OSES Server may identify or detect one or more photo editing applications installed on user's smartphone, and may prompt the user to open the image in user's local photo editing application (e.g., installed on the user's smartphone). In some embodiments, the OSES Server may maintain a list of the most commonly used/popular photo editing apps, and may suggest that the user open the image in one or more recommended photo editing application(s).

Figure 70:
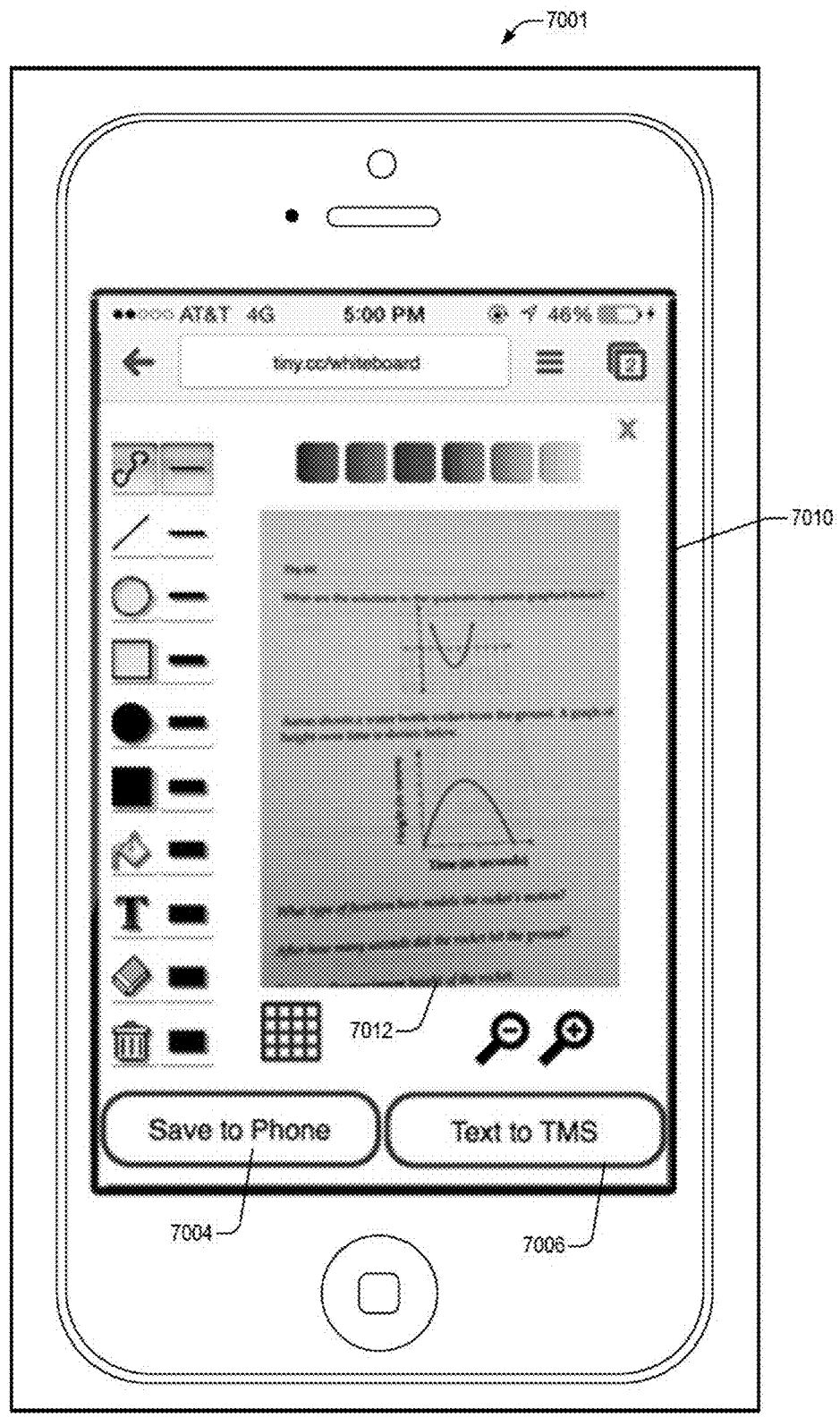

Message to Post—Mobile Whiteboard—As illustrated in the example screenshot GUI of FIG. 70:

The OSES Server may provide the capability for the user to edit and/or annotate the text/MMS image (received at the OSES Server) via a mobile friendly Whiteboard Editor GUI 7010, which allows users to edit/annotate the image 7012 (and/or other portions of the whiteboard canvas) on their mobile phone before posting the edited/annotated image/canvas to a discussion board or collaborative online discussion medium. User is able to edit and/or annotate image using the whiteboard image editing tools.

After editing, user may elect to save (e.g., 7004) the edited/annotated image/canvas to the user's Phone, and/or may elect to post the edited/annotated image/canvas to a desired collaborative online discussion medium via Message-to-Post (e.g., 7006). In some embodiments, the user may also choose to save newly annotated/edited image to personal device for future use/reference.

In some embodiments, the Whiteboard Editor GUI may provide the user with the option(s) of posting the image to one or more selected collaborative online discussion mediums.

Image Editing, Annotation, and Permissions

FIGS. 33-37 illustrate example screenshots of various GUIs which may be used for facilitating activities relating to one or more of the image editing, annotation, and permissions aspects disclosed herein.

According to different embodiments, the OSES whiteboard functionality may be configured or designed to enable or provide different types of whiteboard functionalities and/or privileges to different users who are collaborating together via the Interactive Study Wall and/or other OSES discussions/threads/forums. In some embodiments, at least a portion of such permissions/restrictions in functionalities, editing capabilities, and/or privileges may be dynamically configured by users via one or more Interactive Study Wall GUIs. For example, in some embodiments, some instances of Interactive Whiteboard GUIs may be configured or designed to include functionality for enabling users to configure different levels of permissions/restrictions/privileges for different users (and/or groups of users) with respect to accessing and/or editing posted content at one or more OSES discussions/threads/forums. In some embodiments, some instances of the Interactive Whiteboard GUI (e.g., such as that illustrated in FIG. 33) may include functionality (e.g., 3310, 3320) for configuring different levels of permissions/restrictions/privileges for different users (and/or groups of users). In some embodiments, permissions/restrictions/privileges for accessing and/or editing posted content at one or more OSES discussions/threads/forums may be automatically configured (e.g., by the OSES Server), based on one or more criteria such as, for example class/type of User (e.g., Student, Teacher, Study Expert), identity or user, user editing privileges, and/or other types of criteria described and/or referenced herein.

For example, according to different embodiments, edits/annotations to a posted image may be performed by the user, teachers, Study Experts, and/or other students, depending upon permissions/privileges granted. The OSES Server may automatically and/or dynamically track the various edits/annotations and entities which performed such edits, and may visually distinguish one or more of the edits/annotations when displaying the annotated/edited image in the discussion forum/thread. For example, in some embodiments, it may be preferable to visually distinguish (e.g., by color, mouseover/tool tip text, etc.) a teacher's or Study Expert's edits/annotations from those performed by students, so as to allow subsequent viewers of the edited/annotated image to easily identify which edits/annotations were made by the Teacher/Study Expert. For example, in the specific example embodiment of FIG. 36, annotations to the drawing canvas (3650) which were added by the student (SS, 3601) are shown in red color, and annotations added by a Study Expert (CS, 3602) are shown in blue color. In at least one embodiment, annotation key information (3625) may be displayed to help users identify ownership of the various edits/annotations made to the image/canvas.

In the example screenshot embodiment of FIG. 37, a non-annotated version of a Message-to-Post image 3712 is displayed as part of a post 3710 of a discussion thread of the Interactive Study Wall. Additionally, an annotated version of the Message-to-Post image and accompanying annotated canvas 3722 is posted as a reply/comment 3720 of the same discussion thread. According to different embodiments, the OSES Server may be configured or designed to permit and facilitate other users (e.g., students, teachers, Study Experts, etc.) to subsequently edit/annotate and re-post one or more of the posted image(s) (e.g., by clicking on one of the "Edit Picture" links 3717, 3727).

Additional aspects relating to one or more of the image editing, annotation, and permissions features of FIGS. 33-37 are described below.

Whiteboard—Permission Level—As illustrated in the example screenshot GUI of FIG. 33:

The GUI of FIG. 33 provides functionality for enabling a user to customize image editing/annotation permissions associated with images which the user posts to the Interactive Study Wall. For example, users can choose to enable and/or limit image editing/annotation permission to categories such as, for example, one or more of the following (or combinations thereof):
- User only (e.g., Only Me)—only the user can edit this image after edited image is posted to the wall
- Study Expert—only the user and the Study Experts (e.g. tutors, teachers, administrators) can edit this image after edited image is posted to the wall
- All users—all users (including tutors, teachers, peers, etc.) can edit this image after edited image is posted to the wall In some embodiments, there may be additional and/or alternate levels by which a user may enable and/or limit image editing/annotation permissions such as, for example:
- black list or white list,
- permission levels by groups like "students in my school/my district/my state" etc.
- content level like students in physics, algebra, etc.
- etc.

After editing, users can save to computer or post to wall

Other features of the Whiteboard GUI(s) may include, but are not limited to, one or more of the following (or combinations thereof):
- equation editor (typing in complicated equations or symbols),
- on-screen calculator,
- inserting other images/videos
- etc.

User can toggle "identifying editors" feature 3310 ON/OFF
- ON means edits may be classified by user (by initials, pop up of profile picture or name when part of problem is selected, roll over pop up, etc.)
- In some embodiments, ON may also mean edits/changes can be classified by versioning ($1^{st}$ edit/$2^{nd}$ edit/$3^{rd}$ edit)

Whiteboard—Permission level—denied—As illustrated in the example screenshot GUI of FIG. 34:
- After image is posted on the discussion wall, the OSES Server may provide additional option(s) for enabling authorized users to perform editing and/or annotating of the posted image (e.g., by clicking on the "Edit Picture" link 3417).
- When a user attempts to edit an image that has an associated permission level which excludes the user (e.g., user is another student, and editing privileges associated with the posted image have been configured so as to permit only "Study Experts" to edit/annotate the posted image), the OSES Server may display a message 3415 notifying the user of the of such.
- According to different embodiments, image editing privileges may be restricted and/or granted to one or more of the following (or combinations thereof):
  - Study Experts;
  - Teachers;
  - Selected Student Groups (e.g., in the same class as student who posted image);
  - User who posted original image (herein referred to as "User-Owner";
  - Specific users or groups of users (e.g., classmates, friends, etc.) which the User-Owner has specifically identified.

Whiteboard—ID editors 2—As illustrated in the example screenshot GUI of FIG. 35:
- Whiteboard Editor GUI 3501 shows the "Identify editors" option 3510 set to OFF, thereby preventing display of tracked changes indicating which user(s) performed which edit(s) to the image/canvas.

Whiteboard—ID editors 3—As illustrated in the example screenshot GUI of FIG. 36:
- Whiteboard Editor GUI 3601 shows the "Identify editors" option 3510 set to ON.
- With the "Identify editors" option 3510 set to ON, annotations to the drawing canvas (3650) which were added by the first user (student "SS", 3601) are shown in red color, and annotations added by a second user (Study Expert "CS:, 3602) are shown in blue color. In at least one embodiment, annotation key information (3625) may be displayed to help users identify ownership of the various edits/annotations made to the image/canvas.

Whiteboard—Different Versions of Images—As illustrated in the example screenshot GUI of FIG. 37:
- In at least some embodiments, any users who have adequate permission(s) to annotate/edit/modify a posted image, may elect to edit/annotate the posted image, and re-post the image in the appropriate discussion medium (e.g., in the discussion thread where the original image was posted).
- According to different embodiments, the Whiteboard Editor GUI may be configured or designed to permit and facilitate other users (e.g., students, teachers, Study Experts, etc.) to subsequently edit/annotate and re-post one or more of the posted image(s).
- In the specific example embodiment of FIG. 37, a user may click on one of the "Edit Picture" links (e.g., 3717, 3727) in order to edit and/or annotate the posted image. In one embodiment, when a user clicks on an "Edit Picture" link (e.g., 3717), the OSES Server may determine the identity of the user (who is requesting access to edit the picture), and may determine whether or not the identified user has sufficient privileges to be able to edit/annotate the identified image.
- Assuming that the requested user has sufficient editing privileges, the OSES Server may cause the identified image to be loaded into a Whiteboard Editor GUI and displayed to the user for performing desired edits/annotations.
- After editing, the user can post or re-post the newly edited/annotated image back on the collaborative online discussion medium (e.g., as a new post, as a reply/comment to an existing discussion thread, etc.).
- Users who subsequently view the content of this discussion thread are able to view the annotated image/edited whiteboard canvas (e.g., 3722), and visually distinguish (e.g., by color, mouseover/tool tip text, etc.) the Student user's contributions (e.g., shown in red) from the Study Expert's contributions (shown in blue). Additionally, as illustrated in the example embodiment of FIG. 37, the OSES Server may automatically display a notice (e.g., 3721) adjacent to the edited image (3722) advising viewers that "this is an edited version of image. Click HERE to see the original". In one embodiment, users may access/view the original version of the image (as well as historical versions of edits/modifications to the image, if available) by clicking on the "HERE" portion of the notice 3721.
- In the specific example embodiment of FIG. 37, reference numbers (e.g., 3723a, 3723b) may be used to indicate the sequential order of edits/versioning, and the boxed letters (e.g., 3724a, 3724b) may represent the respective initials of editor(s).

Other embodiments may provide additional features such as, for example, one or more of the following (or combinations thereof):
IDing by initials or versioning,
pop up of profile picture or name when part of problem is selected,
roll over information pop-up,
rolling over user's name or profile picture would highlight part of the image that user edited
etc.

OCD Features/Functionality

Although many of the example embodiments and screenshot GUIs described above have been directed to specific embodiments relating to Interactive Study Wall posts, it will be appreciated that many of the Online Social Education System techniques described herein may also be applied to other types of online, collaborative educational environments such as, for example, webinars, audio/video chat rooms, video whiteboards, video conferences, online forums, online presentations, online collaborative tutorial sessions, and the like. For example, as described in greater detail herein, features and functionality relating to the Message-to-Text techniques, collaborative whiteboard techniques, and/or image editing techniques described herein may be implemented and/or utilized in other types of online, collaborative educational environments including, for example, webinars, audio/video chat rooms, video conferences, online forums, online collaborative tutorial sessions, online presentations, and the like.

For reference purposes, such other online collaborative educational environments may collectively be referred to as Online Collaborative Discussion (OCD) Environments (or OCD Rooms). According to different embodiments, various different types of OCD Rooms may be hosted by the Online Social Education System and/or 3rd party entities (such as, for example, Webex, Adobe Connect, Skype, etc.). Additionally, one or more of the various OCD Rooms may include functionality for providing Whiteboard GUIs, and/or for hosting collaborative whiteboard forums.

Interaction with Inserted Photos in OCD Environments
OCD whiteboard functionality may be configured or designed to enable or provide different types of whiteboard functionalities and/or privileges to different users who are collaborating together via the Interactive Study Wall and/or other OSES discussions/threads/forums.

In at least one embodiment, photos inserted into an OCD Room may be annotated, edited (e.g., cropped, drawn on, resized, have filters applied, etc.), moved both within the page and between pages, hidden, deleted, and/or otherwise manipulated. These changes may be visible to all users in the OCD Room.

In one embodiment, clicking a photo displayed in an OCD Room GUI causes one or more overlays button to be displayed, which allows users/participants of the OCD Room to edit, annotate, move, resize, and/or delete the photo. In some embodiments, hovering the mouse cursor over the photo causes the overlay buttons to be displayed.

In some embodiments, clicking and/or hovering causes displays a bounding box to be displayed around the photo. A user may then interact with the borders of the bounding box to drag, move, and/or resize the photo in any direction.

In at least some embodiments, editing permission(s)/restriction(s) may be configured to permit only selected user(s) to edit/annotate/modify a given image displayed in an OCD Room. For example, in one embodiment, editing/annotation permissions for a given photo being displayed in a given OCD Room may be limited to the user who inserted or uploaded the photo into the OCD Room. In another embodiment, editing/annotation permissions may be granted to all users/participants in the OCD Room. In other embodiments, editing/annotation permissions may be granted only to hosts, presenters, moderators, and/or organizers of the OCD Room.

In at least one embodiment, a user may draw lines, shapes, or text on top of (or adjacent to) the photo using the provided Whiteboard GUI editing tools. Additionally, such edits/annotations may be concurrently synced and displayed (e.g., in real-time) for all other users/participants in the OCD Room to see.

In one embodiment, a photo can be moved by simply clicking, holding, and then dragging to the new desired location. In another embodiment, clicking the photo shows buttons to allow dragging within the page, or to drag to another page. In one embodiment, an OCD Room GUI may be configured or designed to permit a user to move a selected photo to another page of the OCD Room by specifying the desired page number, without requiring any dragging of the photo.

In one embodiment, clicking on (or hovering over) a photo displayed in an OCD Room may cause an "Edit" button to be displayed. Clicking the "Edit" button allows the user to perform one or more manipulations on the selected photo such as, for example: crop, draw on, annotate, edit, resize, apply filters, highlight the photo, etc. After the user confirms the changes, the changes may be applied to the image in the OCD Room and visible to all users in the room.

OCD Example A: User Sends Image to Webinar Using Message-to-Post

In one embodiment, users in a webinar or group presentation may use the Message-to-Post functionality described herein to send in one or more photos, images, videos to the webinar room/presentation.

In one embodiment, an inserted photo may be manipulated by some or all users.

In one embodiment, only a presenter or host of the webinar may be permitted to insert photos into the webinar room/presentation using Message-to-Post.

In one embodiment, the user who inserted a photo may choose or specify which other user(s) (if any) have permission to edit/manipulate the image.

In some embodiments, a "send via Message-to-Post" feature (e.g., implemented as a user selectable GUI button for inserting an image into a webinar or group presentation) may be presented as an available feature in connection with various different types of cloud services (e.g. Dropbox) and/or local storage (e.g. Mobile Device Camera Roll).

Message-to-Post Functionality Implemented in OCD Environments

FIGS. 38-55, and 74-76 illustrate example screenshots of various GUIs which may be used for facilitating activities relating to Message-to-Post functionality implemented in different types OCD Environments. For example, 38-55, and 74-76 illustrate example screenshots of various GUIs which may be used for facilitating activities relating to Message-to-Post functionality implemented in online collaborative webinar and/or presentation environments, such as, for example, webinar and/or video conferencing services offered by Webex, Adobe Connect, Skype, Google hangouts, and the like.

Various aspects relating to one or more of the Message-to-Post, image editing, annotation, and other features of OCD Environments are described below, by way of illustration, with reference to FIGS. 38-53 and 74-101 of the drawings.

For purposes of illustration, it is assumed that:

FIG. 52 shows an example screenshot of a first image 5201 of Textbook Page A which was captured with a user's smartphone or mobile phone.

Figure 53:
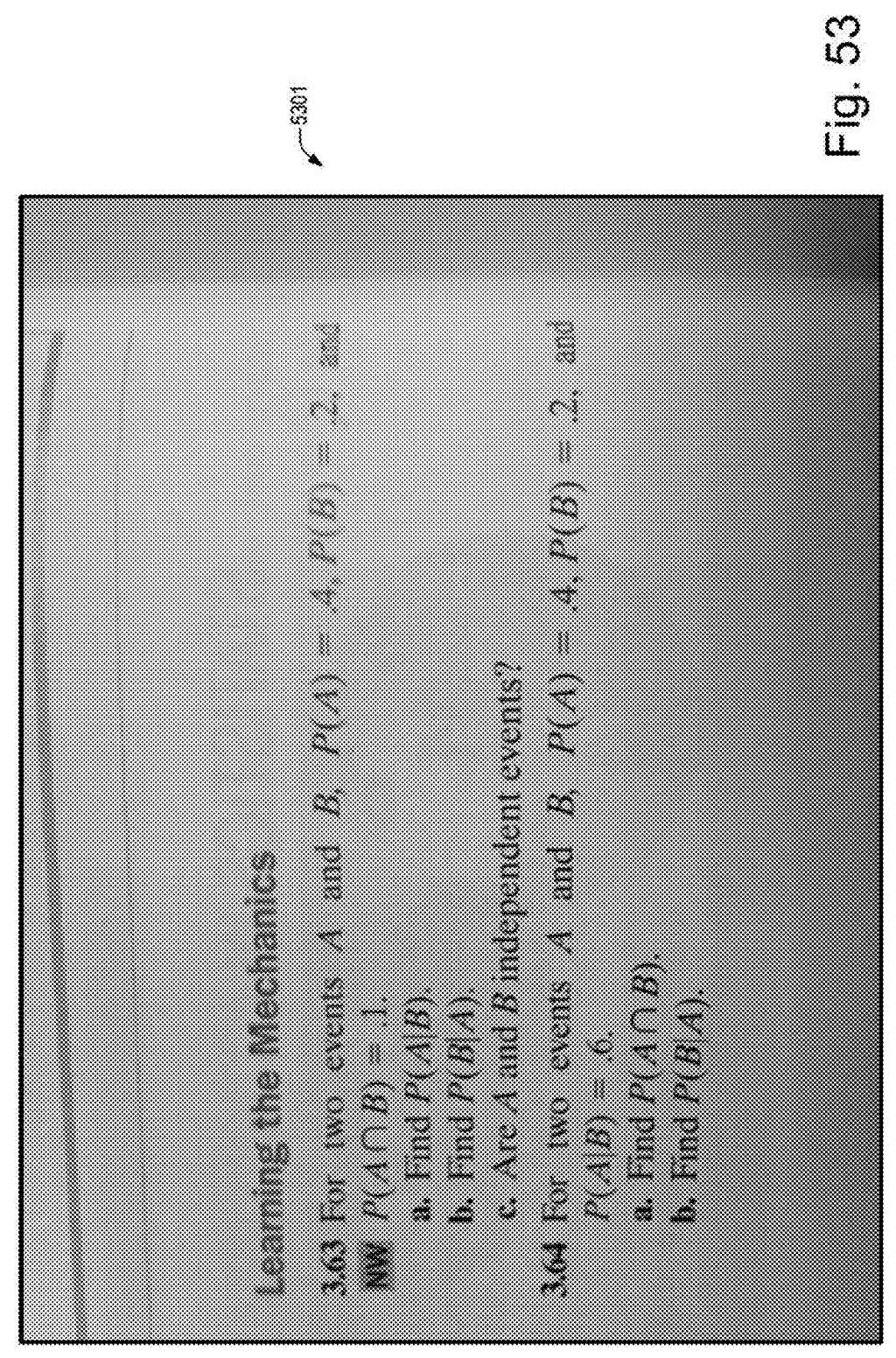

FIG. 53 shows an example screenshot of a second image 5202 of Textbook Page B which was captured with a user's smartphone or mobile phone.

OCD_ADOBECONNECT_1—As illustrated in the example screenshot GUI of FIG. 38:

In an Adobe Connect Webinar GUI 3801, a message 3802 may be displayed to participants which includes a Message-to-Post phone number that participants can use to send images via text message from their mobile devices to the server hosting the webinar. (e.g., "Send a photo to this webinar. Text (858) 248-4586")

The Message-to-Post phone number can be universal (same for all webinars) or specific to the discussion room. If the number is universal, the backend system may recognize which discussion the user is participating in based on identifying features as described previously (e.g., phone number, IP address, phone MAC address, etc.) and/or by participants entering a room-specific code.

Figure 71:
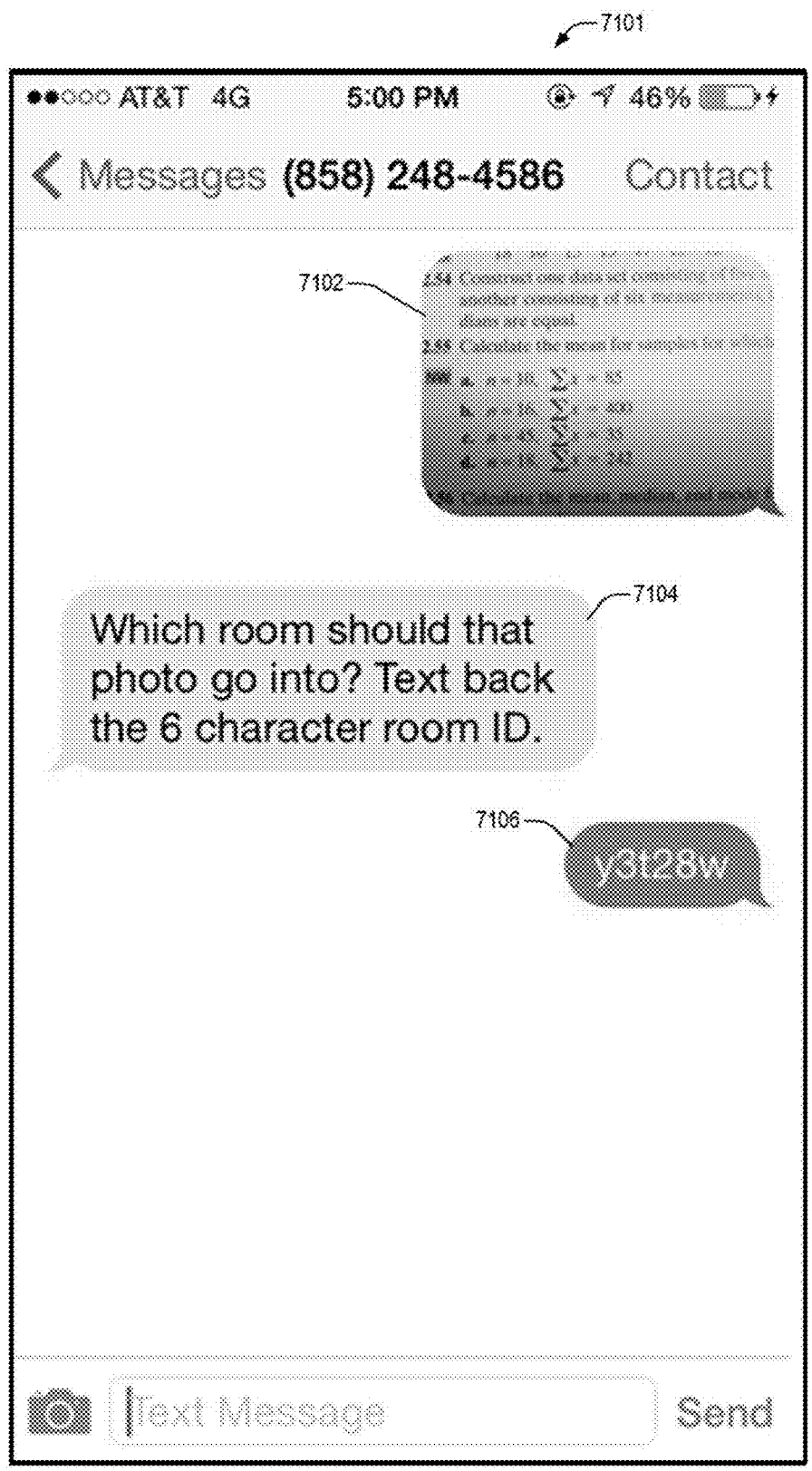
Figure 72:
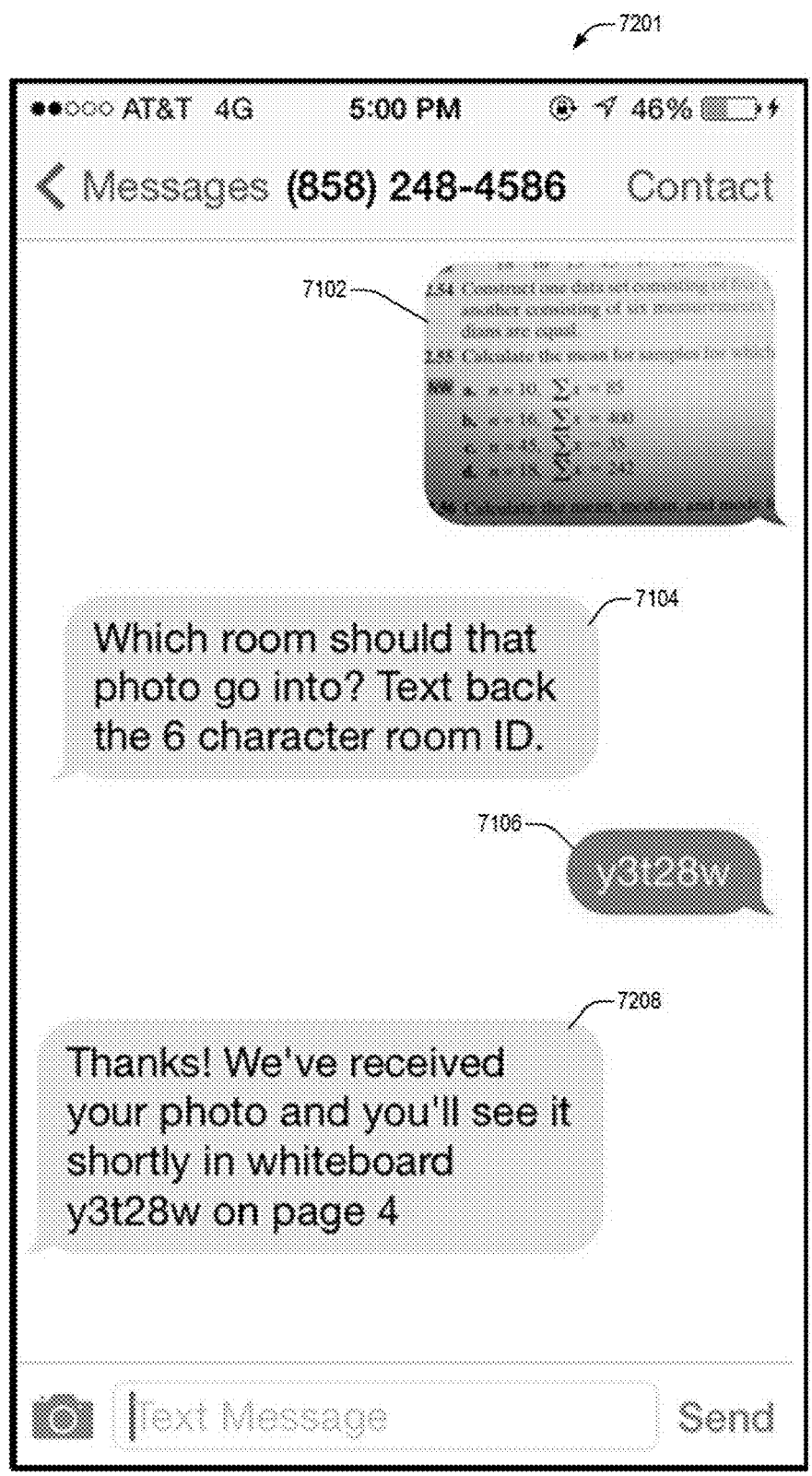
Figure 73:
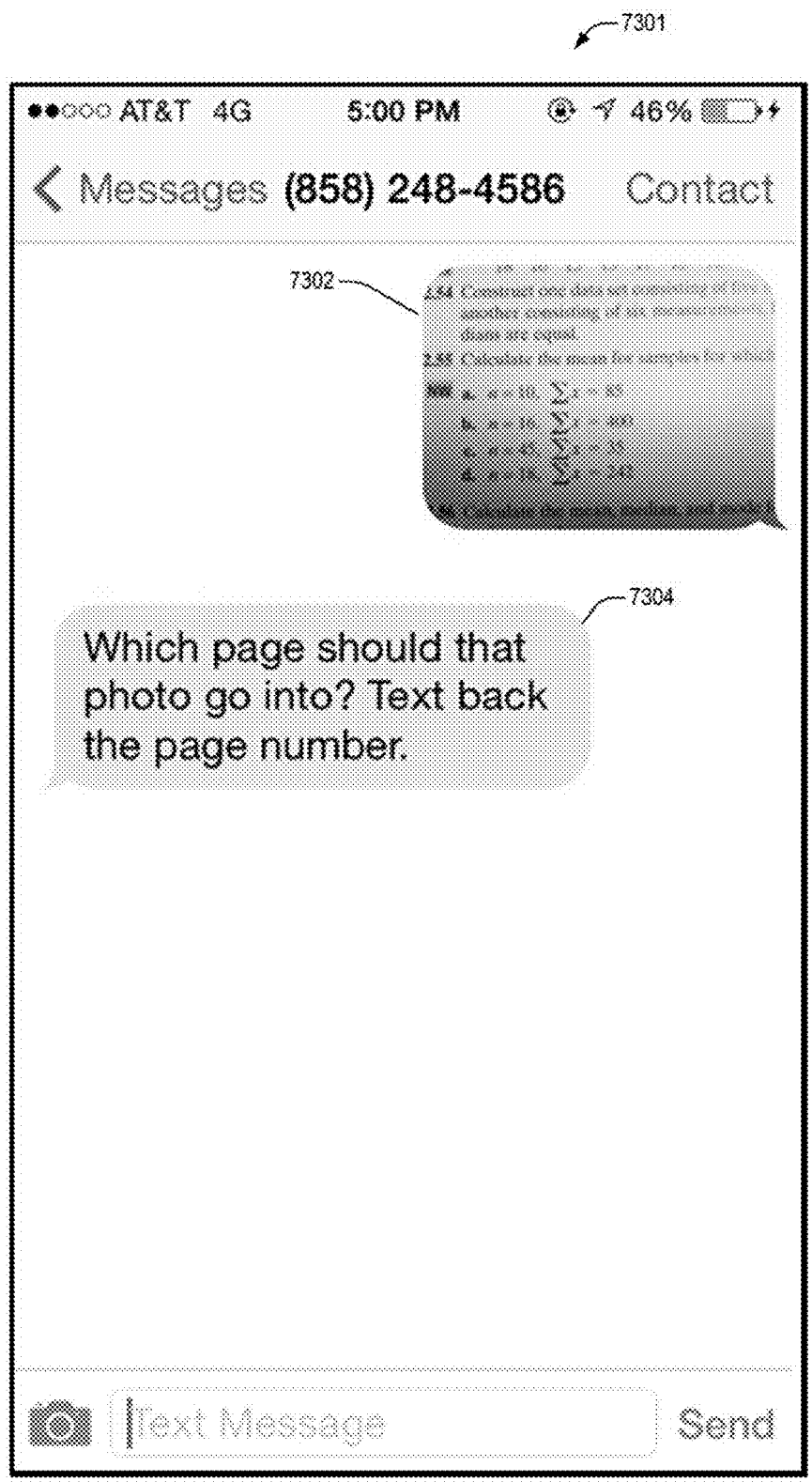

User captures image (e.g., of Textbook Page A, see FIG. 52) using smartphone and may text image to specified phone number (e.g., which may correspond to the server/system hosting the webinar) (See, e.g., FIGS. 71-73).

The system/server receiving the texted image may then perform one or more actions to cause the received image to be posted in the appropriate webinar room. (see, e.g., FIGS. 39-40).

Figure 39:
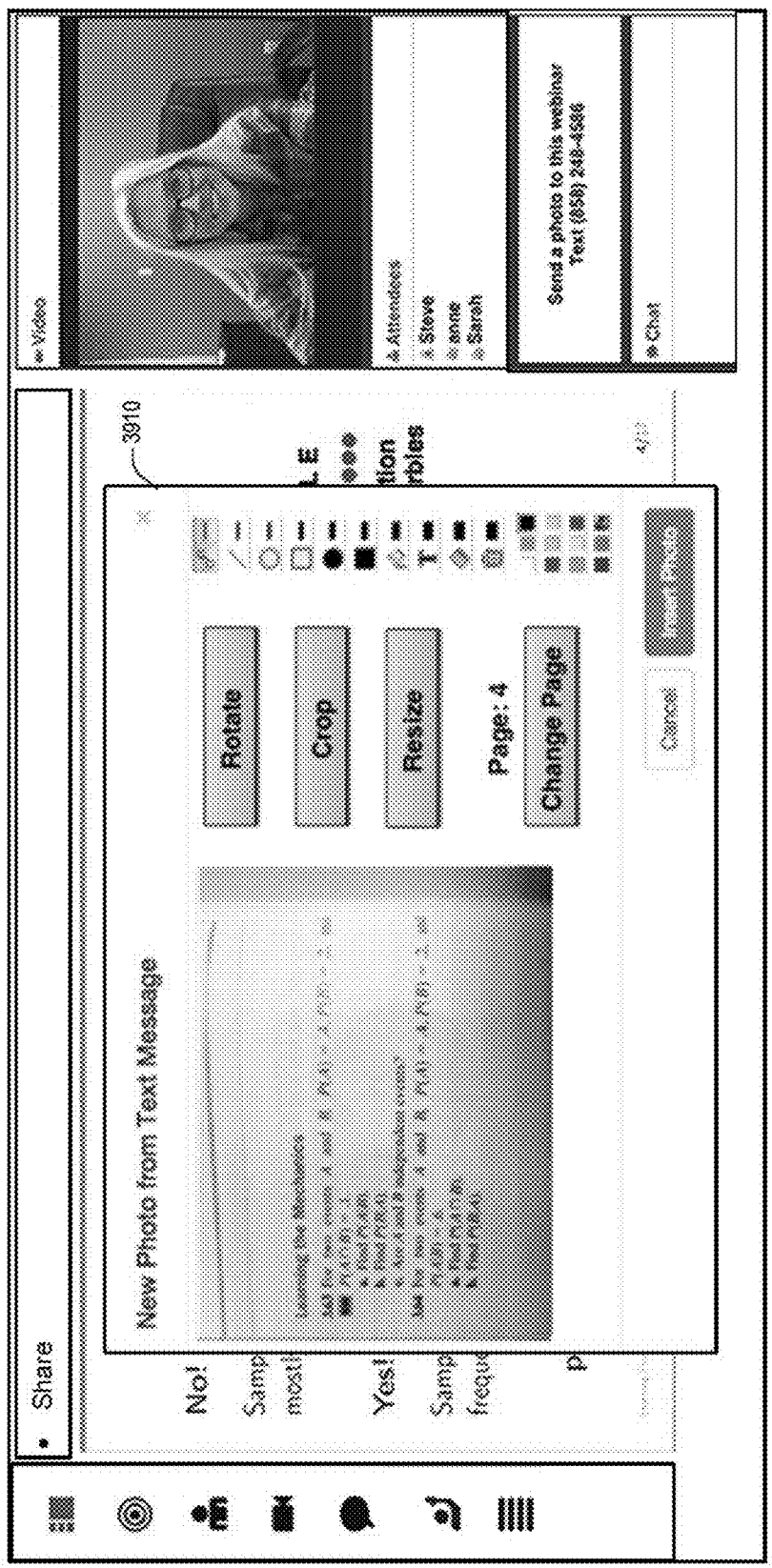

OCD_ADOBECONNECT_2—As illustrated in the example screenshot GUI of FIG. 39:

Continuing from FIG. 38—

Once the photo is received at the backend system (e.g., backend OCD server), the backend system displays a GUI (e.g., overlay GUI 3910) which shows the received image and which is configured or designed to enable the user that sent the photo to crop, edit, or annotate the image before inserting, or change destination, or cancel insertion.

In some embodiments, the photo may be inserted immediately with no overlay GUI shown. In some embodiments, any user (e.g., participating in the webinar) is able to edit, annotate, resize, or crop the photo after it is inserted.

Once inserted, the photo is visible in the webinar to all participants/users.

Figure 40:
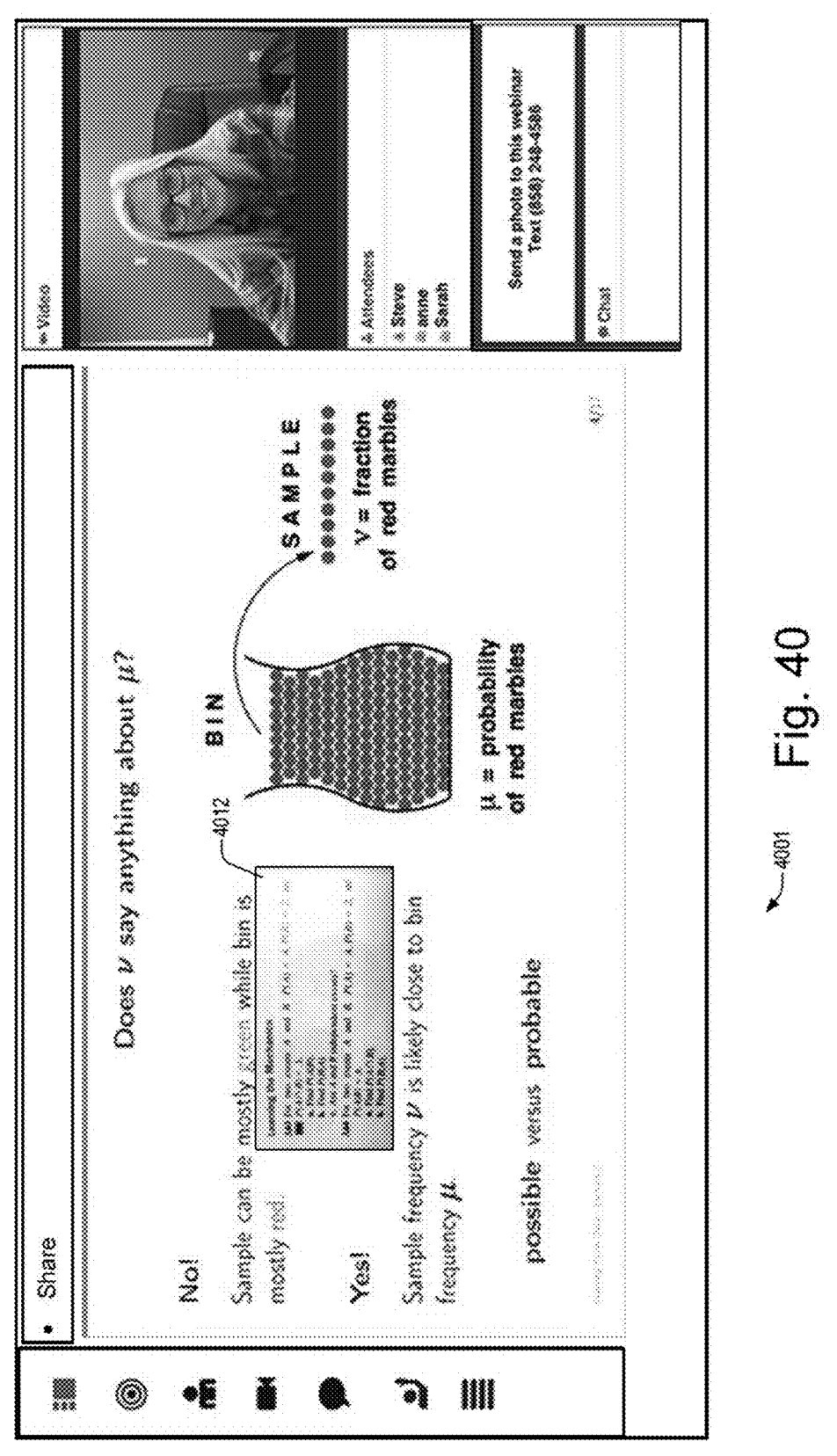

OCD_ADOBECONNECT_3—As illustrated in the example screenshot GUI of FIG. 40:

Continuing from FIG. 39—

The received Message-to-Post image is inserted into the webinar display forum (e.g., as shown at 4012), and is visible to all participants.

In one embodiment, the image may be moved, annotated, cropped, resized, deleted, or edited by any participant.

FIGS. 71-76 illustrate example screenshots of messaging techniques which may be used for facilitating activities relating to Message-to-Post functionality implemented in different types OCD Environments.

OCD_PHONE_1—As illustrated in the example screenshot GUI of FIG. 71:

It is assumed that the user has captured an image (e.g., of Textbook Page A, see FIG. 52) using a smartphone and has texted the image (7102) to a specified phone number (e.g., which may correspond to the server/system hosting the OCD Room).

In one embodiment, the server can generate and send a reply text message (7104) asking the sender to identify the specific OCD Room where the received image should be displayed.

The user replies via text (7106) with a code (e.g., "y3t28w") identifying the OCD Room where the received image should be displayed.

In other embodiments, other types of identifiers may be used to identify the specific OCD Room where the received image should be displayed, which, for example, may include, but are not limited to, one or more of the following (or combinations thereof):

the name of the OCD Room,
the web address (e.g., URL) of the OCD Room,
room identifier,
user/participant ID (which may be used by the OCD server to identify the appropriate OCD Room);
and/or other identifiers which may be used to uniquely identify a specific OCD Room where the received Message-to-Post image is to be displayed.

OCD_PHONE_2—As illustrated in the example screenshot GUI of FIG. 72:

Continuing from FIG. 71—

After insertion of the received image into the appropriate OCD Room, the server generates and sends a confirmation text message 7208 back to the user's mobile device, providing confirmation of the OCD Room ("y3t28w") and page number ("page 4") where the received image was inserted.

In some embodiments, the OCD server may automatically and/or dynamically identify (e.g., in real-time) the page number of the OCD Room that the user is currently viewing, and paste the image into the identified page. In other embodiments, the OCD server may paste image to a new page of the OCD Room, or may insert the image into a page of the OCD Room specified by the user/sender.

OCD_PHONE_3—As illustrated in the example screenshot GUI of FIG. 73:

It is assumed that the user has captured an image (e.g., of Textbook Page A, see FIG. 52) using a smartphone and has texted the image (7302) to a specified phone number (e.g., which may correspond to the server/system hosting the OCD Room).

After receiving the texted image, the OCD server may generate and send a reply text message back to the user/sender asking the user to identify the page number (of the OCD Room) where the image is to be inserted/displayed.

The user may provide the requested information to the OCD server via reply text message.

Figure 74:
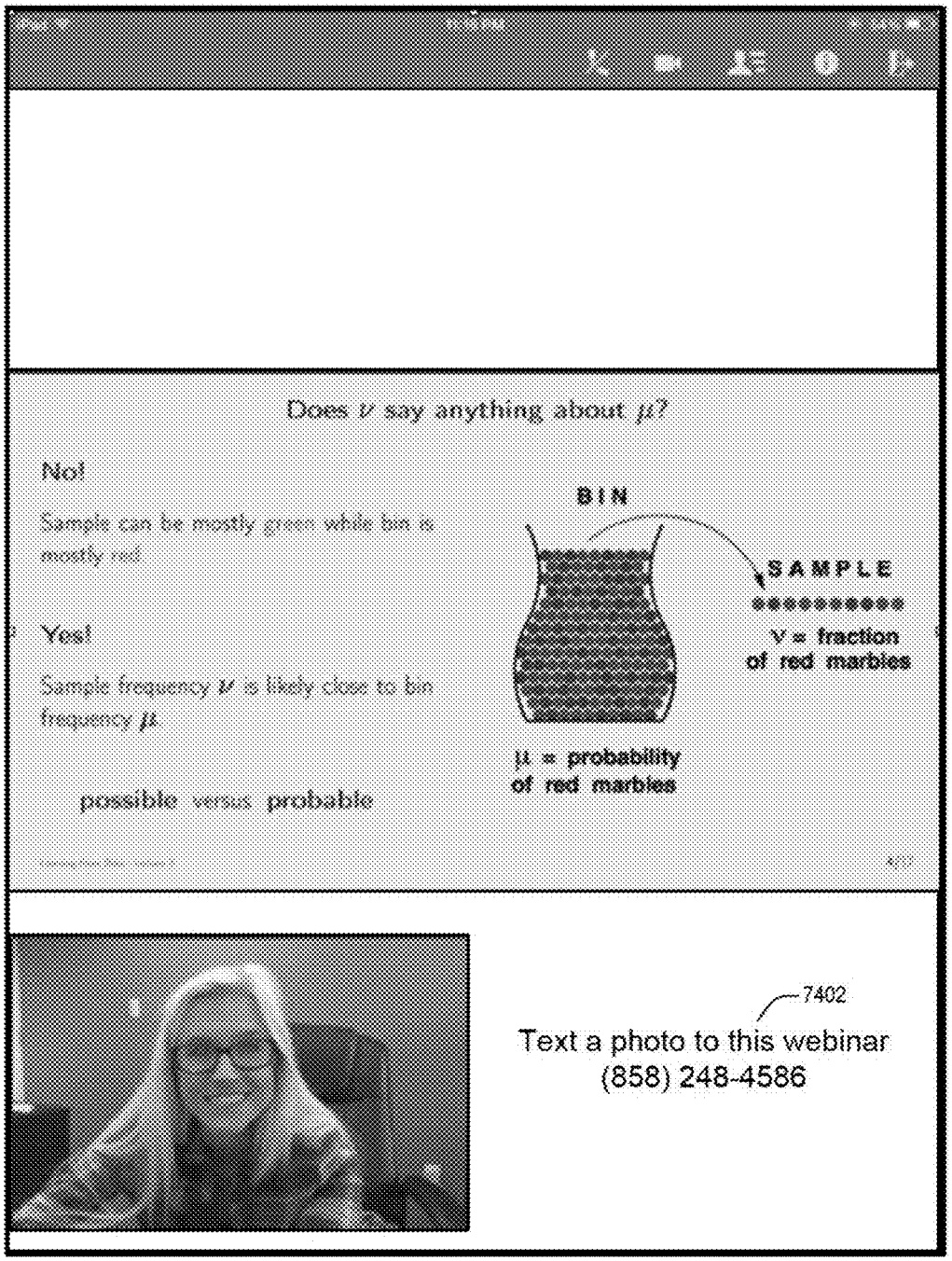
Figure 75:
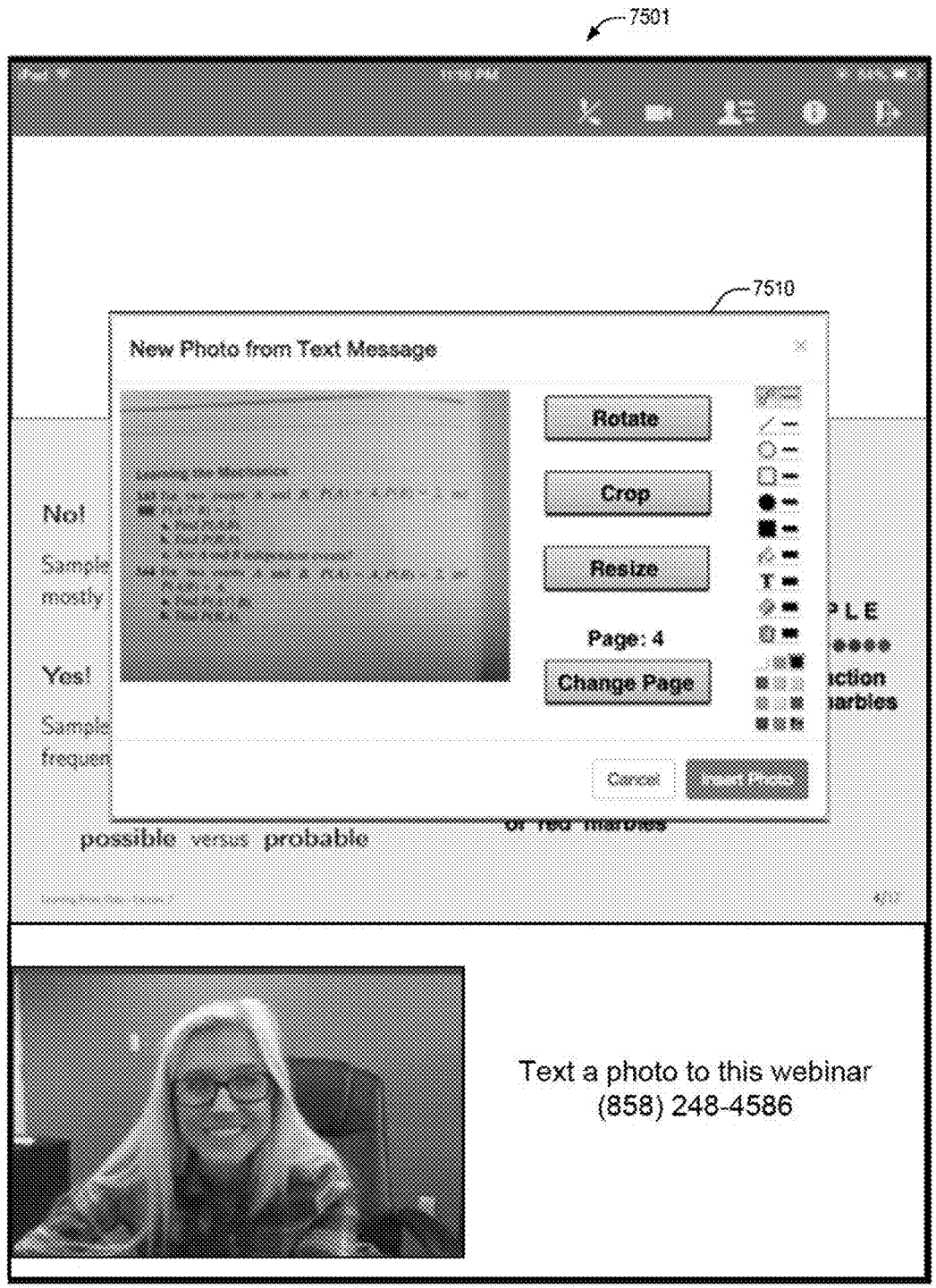

FIGS. 74-76 illustrate example screenshots of various GUIs which may be used for facilitating activities relating to Message-to-Post functionality implemented in online collaborative webinar and/or presentation environments, such as, for example, webinar and/or video conferencing services offered by Webex, Adobe Connect, Skype, Google hangouts, and the like.

OCD_WEBEX_1—As illustrated in the example screenshot GUI of FIG. 74:
  In a Webex Presentation GUI 7401, a message 7402 may be displayed to participants which includes a Message-to-Post phone number that participants can use to send images via text message from their mobile devices to the server hosting the webinar. (e.g., "Text a photo to this webinar (858) 248-4586")
  The Message-to-Post phone number can be universal (same for all webinars) or specific to the discussion room. If the number is universal, the backend system may recognize which discussion the user is participating in based on identifying features as described previously (e.g., phone number, IP address, phone MAC address, etc.) and/or by participants entering a room-specific code.
  User captures image (e.g., of Textbook Page B, see FIG. 53) using smartphone and may text image to specified phone number (e.g., which may correspond to the server/system hosting the webinar) (See, e.g., FIGS. 71-73).
  The system/server receiving the texted image may then perform one or more actions to cause the received image to be posted in the appropriate webinar room. (see, e.g., FIGS. 75-76)

OCD_WEBEX_2—As illustrated in the example screenshot GUI of FIG. 75:
  Continuing from FIG. 74—
  Once the photo is received at the backend system (e.g., OCD server), the OCD server displays a GUI (e.g., overlay GUI 7510) which shows the received image and which is configured or designed to enable the user that sent the photo to crop, edit, or annotate the image before inserting, or change destination, or cancel insertion.
  In some embodiments, the photo may be inserted immediately with no overlay GUI shown. In some embodiments, any user (e.g., participating in the webinar) is able to edit, annotate, resize, or crop the photo after it is inserted.
  Once inserted, the photo is visible in the webinar to all participants/users.

OCD_WEBEX_3—As illustrated in the example screenshot GUI of FIG. 76
  Continuing from FIG. 75—
  The received Message-to-Post image is inserted into the webinar display forum (e.g., as shown at 7612), and is visible to all participants.
  In one embodiment, the image may be moved, annotated, cropped, resized, deleted, or edited by any participant.

FIGS. 41-51, 54-55, 86-87, and 90-101 illustrate example screenshots of various GUIs which may be used for facilitating activities relating to Message-to-Post functionality implemented in synchronous online collaborative tutorial and/or whiteboard environments which may include audio, video, text chat, and/or combinations thereof.

OCD Example B: User Sends Photo to Collaborative Tutorial/Whiteboard Room Using Message-to-Post 1. Collaborative tutorial/whiteboard room GUI displays Message-to-Post phone number that can receive or accept photos, videos, documents, and/or other attachments via text message. In one embodiment, the Message-to-Post phone number is unique for each tutorial/whiteboard room. In another embodiment, the Message-to-Post phone number is the same for all tutorial/whiteboard rooms served by the OSES Server. In another embodiment, the Message-to-Post phone number is the same, but in the interface each user is given a unique code to include in the text message when sending the photo or other content via text.
2. User takes/captures a photo or image on user's mobile device, and sends the photo to the Message-to-Post phone number via text message.
3. Backend server (e.g., OSES Server) receives the photo sent to the tutorial/whiteboard room phone number, and identifies the sender's phone number.
4. Determine User: In at least one embodiment, the OSES Server may determine or identify the user who sent the photo. For example, in determining or identifying the user who sent the photo, the OSES Server may perform one or more of the following activities/analysis:
  If it is determined that the sender phone number matches a known user's phone number, then that user is determined to have sent the photo.
  If it is determined that the received text message included a unique code (e.g., as described in Step 1 above), the OSES Server may determine the user's identity using the unique code.
  In one embodiment, the OSES Server sends a text message reply asking for user identifying information, such as sender's name, email address, or user ID. The sender's reply is then used to determine the user that sent the photo.
  In one embodiment, if the user is still undetermined, then the user identity may be left undetermined.
5. Determine Room: The OSES Server may determine or identify which tutorial/whiteboard room ("OCD Room") to place or insert the received photo. For example, in determining or identifying which specific OCD Room the received photo is to be placed, the OSES Server may perform one or more of the following activities/analyses:
  If it is determined that the identified user is currently participating in (or logged into) only one OCD Room, then that OCD Room is the identified OCD Room.
  In one embodiment, if the user is participating in multiple OCD Rooms, then each of these OCD Rooms may be considered as candidates for selecting the identified room. In some embodiments, the received image may be inserted into one or more of the candidate OCD Rooms.
  If the Message-to-Post phone number is different for each OCD Room, then the Message-to-Post phone number associated with the received, texted photo may be used to determine the identified OCD Room where the received photo is to be placed.
  If the OSES Server is unable to successfully determine or identify the target OCD Room (where the received image/photo is to be placed), then the OSES Server may generate and send a reply text message requesting the sender to provide additional information for identifying which OCD Room to place the received photo. In one embodiment, the user may reply via text message with the short alphanumeric code that uniquely identifies the target OCD Room.
  In one embodiment, if the user is still undetermined at this point, then a randomly selected user that is currently in the identified room may be selected as the identified user who sent the image/photo.
6. Determine Page: The OSES Server may determine or identify which page in the OCD Room to place the photo. For example, in determining or identifying the specific page of the OCD Room to place the received photo/image, the OSES Server may perform one or more of the following activities/analyses:

In one embodiment, the OSES Server identifies (e.g., in real-time) the page of the OCD Room which the user is currently viewing, and identifies that page as the target page for inserting the received photo/image.

In another embodiment, the first page may be automatically identified as the default target page.

If the OCD Room includes only a single page, that page is identified as the target page.

In another embodiment, the OSES Server may display an overlay GUI (e.g., as part of the OCD Room GUI being displayed on the user's system) asking the identified user to identify which page to use as the target page. In some embodiments, the overlay GUI may be presented to all users or participants in the OCD Room. In other embodiments, the overlay GUI may be displayed only to the user/participant who is identified as the sender of the Message-to-Post image/photo.

In another embodiment, instead of determining a page, the photo/image is added to a "Files" or "Uploads" section of the OCD Room interface, available for the identified user to annotate, edit, and/or insert at a later time. In other embodiments, the saved photo can be annotated, edited, and/or inserted at a later time by any user/participant in the OCD Room.

In another embodiment, the OSES Server may generate and send a reply text message requesting the sender to provide additional information for identifying the specific page of the OCD Room to place the received photo. In one embodiment, the user may reply via text message with the short alphanumeric code that uniquely identifies the target page of an OCD Room.

7. Inserting the Image/Photo.

In one embodiment, the OSES Server may cause a Whiteboard Editor GUI to be displayed to the user which provides the user with the ability to annotate and/or edit (e.g., crop, draw on, resize, apply filters, etc.) the received image/photo before it is inserted into an OCD Room. (see, e.g., FIGS. 39, 75) In some embodiments, the user can annotate and/or edit the photo and save a copy of the edited photo/whiteboard canvas into a "Files" section of the OCD Room (e.g., saved for later insertion into one or more OCD Rooms).

In at least one embodiment, the displayed Whiteboard Editor GUI (and/or other displayed GUI) may be configured or designed to enable the user to initiate and/or perform other actions such as, for example, one or more of the following (or combinations thereof):
cancel insertion;
change the target OCD Room where the photo/image is to be inserted;
change the target page where the photo/image is to be inserted;
and/or other activities described and/or referenced herein.

The OSES Server inserts the received photo into the identified target page of the target OCD Room.

In one embodiment, the OSES Server may insert the photo at a default location (e.g., near the center) of the OCD Room GUI (as displayed at the user's system). (see, e.g., FIGS. 40, 76)

In one embodiment, the photo is automatically resized to not exceed the minimum and/or maximum preferred dimensions associated with the area dimensions of the OCD Room GUIs displayed at each of the systems of the OCD Room users/participants.

In at least one embodiment, the OSES Server may scan and analyze the received image and automatically perform one or more of the following operations (or combinations thereof):

Detect and parse mathematical equation(s) which are identified in the received photo/image, and display the identified mathematical equation(s) as an editable math object (e.g., rather than an image). This math object may be edited to add variables, apply solvers, etc., and/or to automatically generate graphs for detected equations.

Perform OCR on the received image/photo to recognize any alphanumeric characters, and convert such recognized alphanumerical characters into editable text.

Detect and parse chemical formula(s) which are identified in the received photo/image, and display the identified chemical formula(s) as an editable formula object (e.g., rather than an image). This formula object may be edited to add variables, apply solvers, etc., and/or to automatically generate models of detected chemical compounds.

Detect and parse spreadsheet tables which are identified in the received photo/image, and convert such recognized spreadsheet tables into editable spreadsheet tables.

etc.

Once the photo (and/or related objects/contents) is inserted into a given OCD Room, it may be visible to all (or selected) users in the OCD Room.

Collaborative Online Tutorial Features and Environments

FIGS. 41-51, 54-55, 86-87, and 90-101 illustrate example screenshots of various Collaborative Online Tutorial GUIs which may be configured or designed to provide various features and/or advantages over conventional online tutorial environments.

For example, a conventional online tutorial room is typically configured or designed to provide users with a flat, unbounded shared workspace where users can scroll in any direction (within the shared workspace) to view and/or interact with displayed content. However, such conventional, unbounded work spaces typically do not include any reference points for enabling users to orient themselves and their respective, relative positions within the shared work space. This often results in users becoming "lost" or disoriented within the shared workspace of the online tutorial room.

In contrast, at least some embodiments of the Collaborative Online Tutorial rooms described herein are configured or designed to support one or more pages of shared workspace within a given Collaborative Online Tutorial room. Such pages are used to partition the substantially infinite amount shared workspace (of a given Collaborative Online Tutorial room) into easily identifiable regions (e.g., distinctly identifiable pages), which facilitates and improves user interaction and orientation within the shared workspace of the Collaborative Online Tutorial room.

In at least some embodiments (as illustrated, for example, in FIG. 49) a Collaborative Online Tutorial Room GUI (4901) (or other OCD Room GUIs) may include Page Navigation buttons 4920 and/or other features which may be configured or designed to provide various types of functionality, such as, for example, one or more of the following (or combinations thereof):

Enabling users to navigate to desired pages of the Collaborative Online Tutorial room;

Enabling a user to identify which pages other users/ participants are currently viewing;

Clicking a page button (e.g., 4921) causes all (or selected) users/participants in the Collaborative Online Tutorial room to automatically navigate to the selected page (e.g., Page 4).

Clicking the "Add Page" button/icon 4929 causes a new page to be added to the shared work space of the Collaborative Online Tutorial room. In some embodiments, clicking the "Add Page" button causes a new page to be created in the Collaborative Online Tutorial room, and causes all (or selected) users/participants in the Collaborative Online Tutorial room to be automatically navigated to the new page.

Hovering over an existing page button and clicking "delete" (e.g., from a pop-up menu) may cause the removal of the selected page for from the Collaborative Online Tutorial room (e.g., if user has sufficient permissions to perform this operation), and may also cause the automatic renumbering of the remaining pages of the Collaborative Online Tutorial room.

Automated synchronization of participant/user navigation—In at least some embodiments, the Collaborative Online Tutorial room (and/or other types of OCD Rooms) may include functionality for enabling automated synchronization of participant/user navigation. For example, in one embodiment, when a first user of the OCD Room navigates from one page of the OCD Room to another page of the OCD Room, the OSES Server may detect such first user navigation, and may automatically cause navigation of the other user(s)/participant(s) to be mirrored, in synchronization, with the navigation activity of the first user. In this way, such automated synchronization of user navigation helps to ensure that all participants/users of the OCD Room are on the same page, and are viewing the same thing, thereby eliminating distinctions and/or differences between "presenter screens", "user screens" and "viewer screens". Example embodiments of the automated navigation synchronization feature(s) are illustrated, for example, in FIGS. 49 and 50. The feature of automated synchronization of participant/user navigation may be particularly useful in online Peer-Peer tutoring environments, where it may be desirable for the tutee (rather than the tutor) to control at least a portion of the tutorial navigation. In at least some embodiments, the automated navigation synchronization feature may be selectively enabled and/or disabled by one or more users/participants in the OCD Room. For example, a user may choose to temporarily disable the automatic navigation synchronization feature in order to review content of other pages in the OCD Room without affecting the display and/or navigation of the other concurrent users/participants in the OCD Room).

Ability to automatically and/or dynamically determine and display information relating to different users'/participants' display screen sizes. For example, in at least one embodiment (as shown, for example, in FIGS. 86, 87), the backend server may identify the current participants in a given OCD Room, and identify or determine the approximate viewable display screen size for each respective, identified participant of the OCD Room in order to determine the relatively smallest viewable display screen size from among the identified OCD Room participants. The backend server may then display to each (or selected) identified participant(s), the viewable display screen size boundaries (and associated participant information) corresponding to the approximate dimensions of the relatively smallest viewable display screen size of the current OCD Room participants. For example, as illustrated in the example embodiment of FIG. 86, a dashed box 8611 is displayed on the user's display to indicate the boundaries of the other user's page viewport. In some embodiments, the displayed screen size boundary may be automatically and/or dynamically adjusted/resized based on detected event(s)/condition(s) such as, for example, one or more of the following (or combinations thereof):

Participants joining and/or exiting OCD Room;

Change of participant screen size detected (e.g., user resized browser or switched display device orientation);

Change in participant device detected;

etc.

Ability to show participants of an OCD Room each others' available and viewable work space (e.g., as determined by each user's display screen size), and ability to synchronize participant navigation to help facilitate all participants synchronously viewing the same page of the OCD Room. It will be appreciated that, in at least one embodiment, without the pagination feature of the OCD Room (e.g., partitioning the shared work space of a given OCD Room into distinctly identifiable pages), implementation of the screen size display boundary feature may be rendered substantially ineffective because one participant might be viewing a different region of the "infinite" shared work space, and may not see the displayed screen size display boundary box (corresponding to that of another participant). However, via use of the OCD Room pagination feature, with the pages serving as boundaries, it becomes possible to effectively show the OCD Room participants each others' available and viewable work space boundaries, thereby assisting and improving collaborative online interaction among the various participants of the OCD Room.

It will be appreciated that the various features of the OCD Room GUIs (including Collaborative Online Tutorial GUIs) described herein may provide various benefits and advantages over conventional online tutorial environments, such as, for example, one or more of the following (or combinations thereof):

User(s)/Participant(s) can link, view, and/or refer to specific pages of the OCD Room (e.g., a tutor can say: "let's go back to the problem on page 2" instead of "let's scroll back").

OCD Room pages are intuitive and map to mental models for subject topics and textbook chapters.

User(s)/Participant(s) may be automatically and dynamically maintained in continuous synchronization with respect to OCD Room/page navigation (e.g., the current page being viewed/displayed to each user/participant). No time wasted re-orienting someone who is lost.

Easy to add, reorder, and delete pages, and all the data is kept in sync between all user(s)/participant(s).

User(s)/participant(s) always know which page they're on.

User(s)/participant(s) may efficiently use the substantially infinite amount of shared work space of an OCD Room by creating/adding as many new pages, as desired.

Insertion, display, and moving of images may be handled much more elegantly.

There are no "lost" or distorted images due to disparate screen sizes of user(s)/participant(s).

The peer-peer collaboration configuration of the Collaborative Online Tutorial rooms enable tutors and tutees to easily switch off leading the tutorial session without having to assign designations such as presenter, viewer, leader, etc.

Tutors are able to determine (e.g., in real-time) if a student is looking back at another problem (e.g., on a different page of the OCD Room). This helps prevent situations where a tutor continues on with a given tutorial topic without the tutee following along or without the tutee paying attention.

COLLABORATIVE TUTORIAL WEBINAR_1_START—As illustrated in the example screenshot GUI of FIG. 41:

In an online, collaborative tutorial session, it is assumed that 2 users have entered the collaborative tutorial room. A Tutorial Room GUI (e.g., 4101) is displayed to each user/participant in Tutorial Room. The Tutorial Room GUI includes display of Message-to-Post instructions (4110) which include a Message-to-Post phone number which participants can use to send photo(s) to via text message. (e.g., "Send photos to this whiteboard by texting (858) 248-4586")

In this example, it is assumed that one of the participants uses her mobile phone to capture an image (e.g., of Textbook Page A, FIG. 52), and sends the image via text message to the Message-to-Post phone number (e.g., which may correspond to the OCD server/system hosting the online, collaborative tutorial session).

Figure 42:
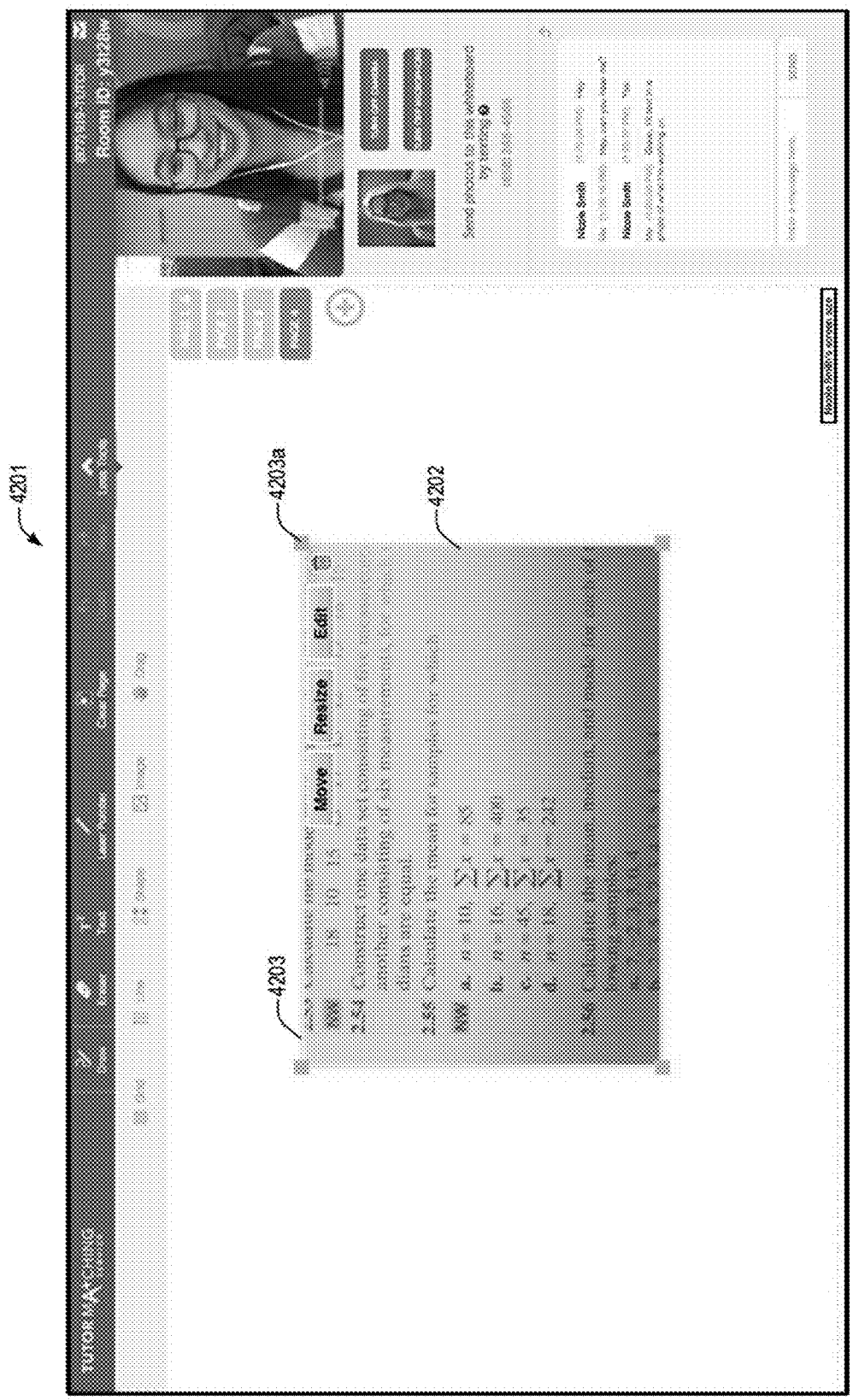

COLLABORATIVE TUTORIAL SESSION_2_PHOTO_INSERTED—As illustrated in the example screenshot GUI of FIG. 42:

Continuing from FIG. 41—

A user has texted a photo to the Message-to-Post phone number shown on the tutorial/whiteboard interface.

Once the photo is received at the backend system (e.g., backend OCD server), the backend system may initiate or perform one or more activities/operations (e.g., as described in OCD Example B (above), and/or described elsewhere herein) to cause the received image to be inserted into the correct tutorial room and the current page that the sending user is viewing.

The inserted image (e.g., 4202) may be displayed via a GUI which shows the received image and is configured or designed to enable one or more of the tutorial session participants to crop, move, resize, edit, or annotate the image. The image is visible to all users, and any user can now interact with it.

In some embodiments where a high-resolution image is to be inserted, the OSES Server may automatically and/or dynamically resize the inserted/displayed image to fit both users' screen resolutions. As illustrated in the example embodiment of FIG. 42, the inserted image 4202 may be placed at a default location within the Tutorial Room GUI, such as, for example, at or near the center of the page.

When the image 4202 is selected, a bounding box (e.g., 4203) may be automatically displayed which includes user selectable/draggable points (e.g., 4203*a*) of the bounding box for enabling a user to move the image and/or to manipulate the displayed dimensions of the image. In some embodiments, when a user clicks on (or hovers the mouse cursor over) the inserted image, an Image Editor GUI may be displayed (e.g., via overlay layer) which enables the user to move, resize, edit, annotate, save, and/or delete the image.

Figure 43:

COLLABORATIVE TUTORIAL SESSION_3_IMAGE_MOVED—As illustrated in the example screenshot GUI of FIG. 43:

Continuing from FIG. 42—

In this particular example screenshot, it is assumed that a first user has moved the inserted image to a different location within the Tutorial Room GUI.

The change is visible to all other users in real-time.

Figure 44:
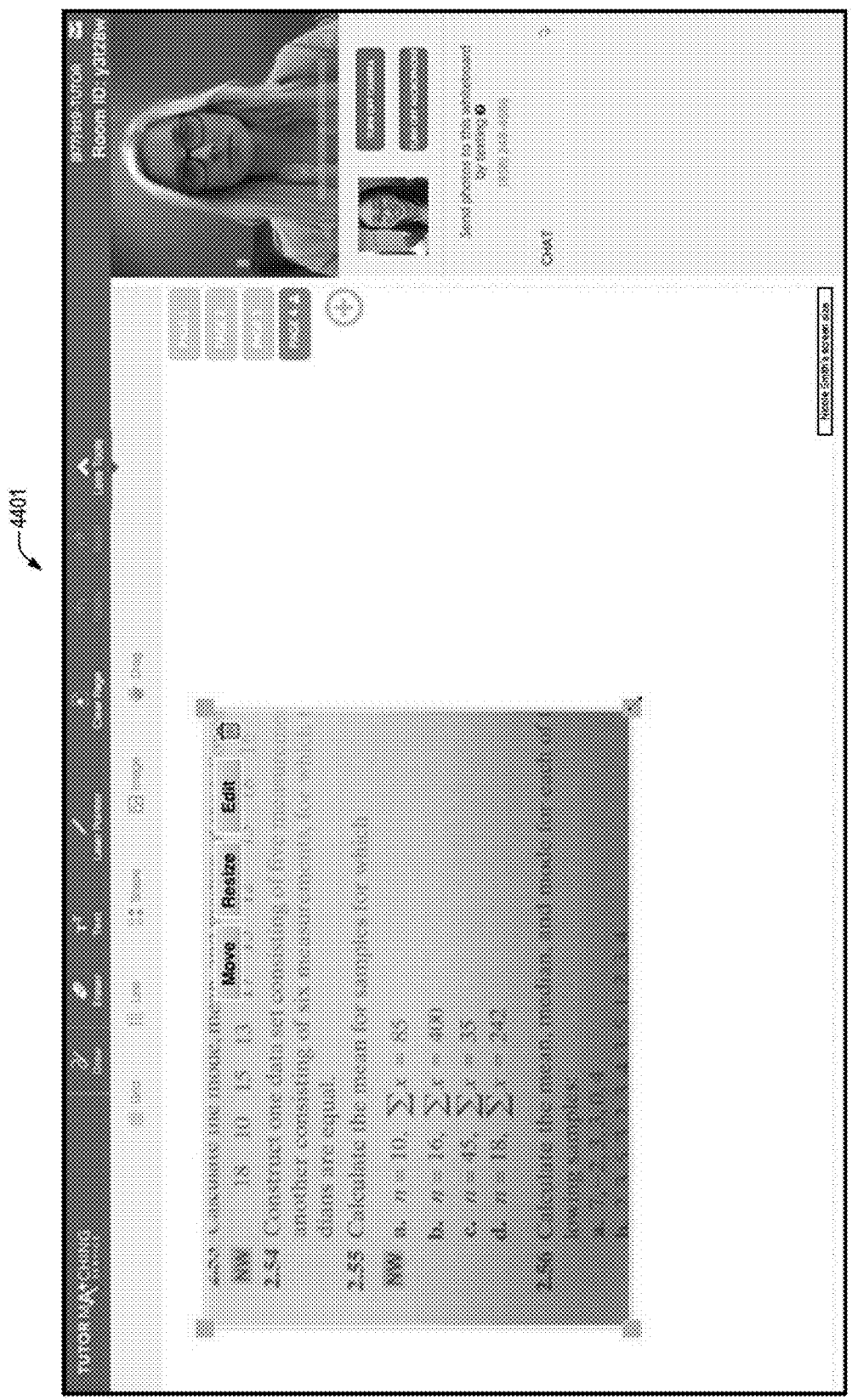

COLLABORATIVE TUTORIAL SESSION 4_IMAGE_RESIZED_BY_OTHER_USER—As illustrated in the example screenshot GUI of FIG. 44:

Continuing from FIG. 43—

In this particular example screenshot, it is assumed that a second user has resized the image. The change is visible to all other users in real-time. Note that hovering over a draggable corner may cause the mouse cursor to change to an arrow to indicate that the image can be resized.

Figure 45:
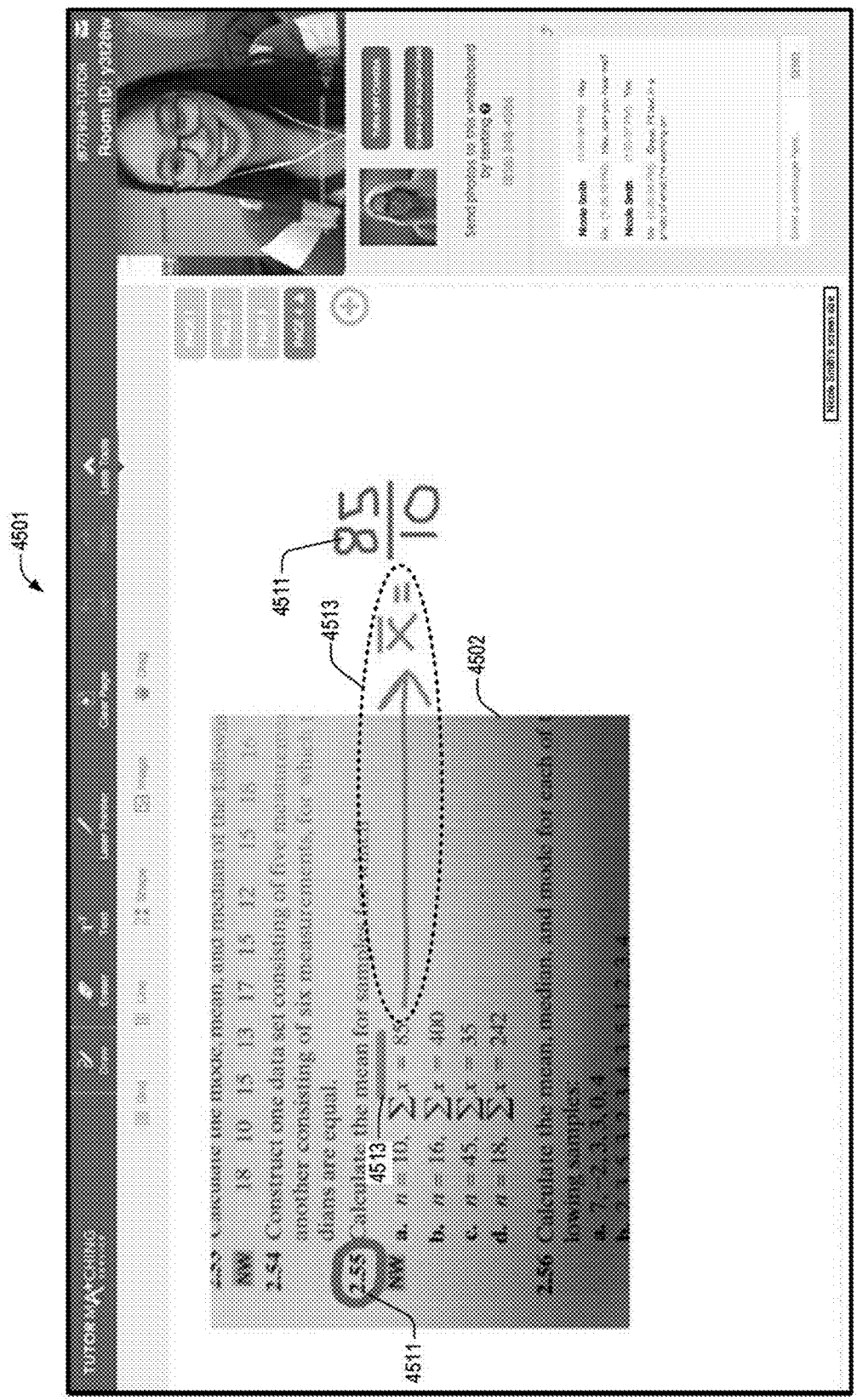

COLLABORATIVE TUTORIAL SESSION_5_1_DRAW ON TOP OF IMAGE AS SEEN BY ONE USER—As illustrated in the example screenshot GUI of FIG. 45:

Continuing from FIG. 44—

One or more of the tutorial session participants may add annotations and/or drawings on top of, behind, and/or adjacent to the image to collaborate, with drawings being synced in real-time. In this example, one user has chosen to annotate using green ink (e.g., 4513), while another user has chosen to annotate using blue ink (e.g., 4511). In some embodiments, it is not required for users to annotate using different colors. In other embodiments, users may be required to annotate using different colors.

2 example screenshot GUIs are provided (e.g., FIGS. 45, 46) to illustrate that the changes are synced and visible to all participants in the tutorial session:

FIG. 45: —Screenshot of Tutorial Room GUI displayed at tutor's computer system.

Figure 46:
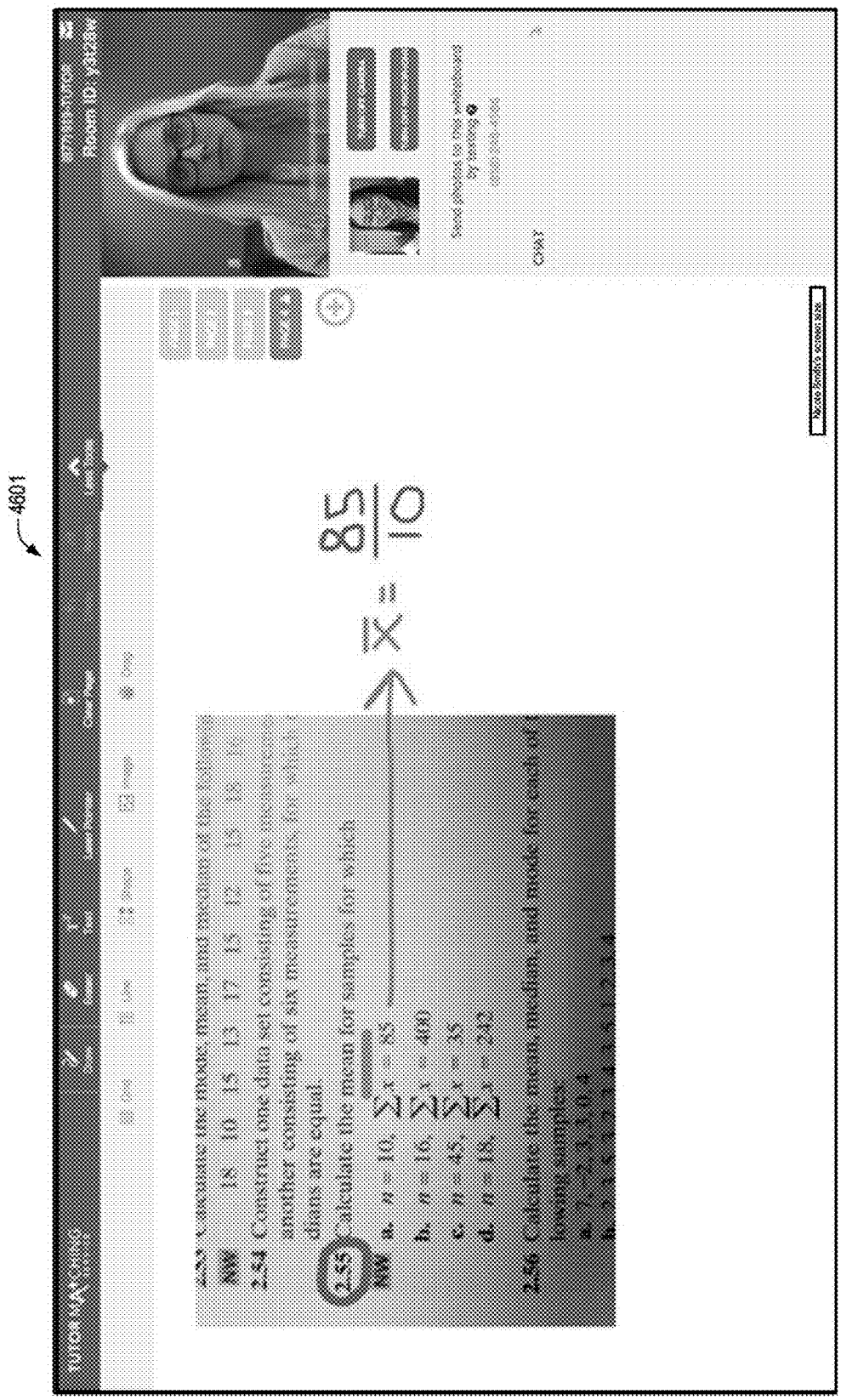

FIG. 46: —Screenshot of Tutorial Room GUI displayed at tutee's computer system.

COLLABORATIVE TUTORIAL SESSION_5_2_DRAW ON TOP OF IMAGE AS SEEN BY OTHER USER—As illustrated in the example screenshot GUI of FIG. 46:

Continuing from FIG. 45—

Annotations and/or drawings have been added to the tutorial whiteboard canvas.

The changes are synced and visible to all participants in the tutorial session (e.g., synchronously in real-time)

Figure 47:
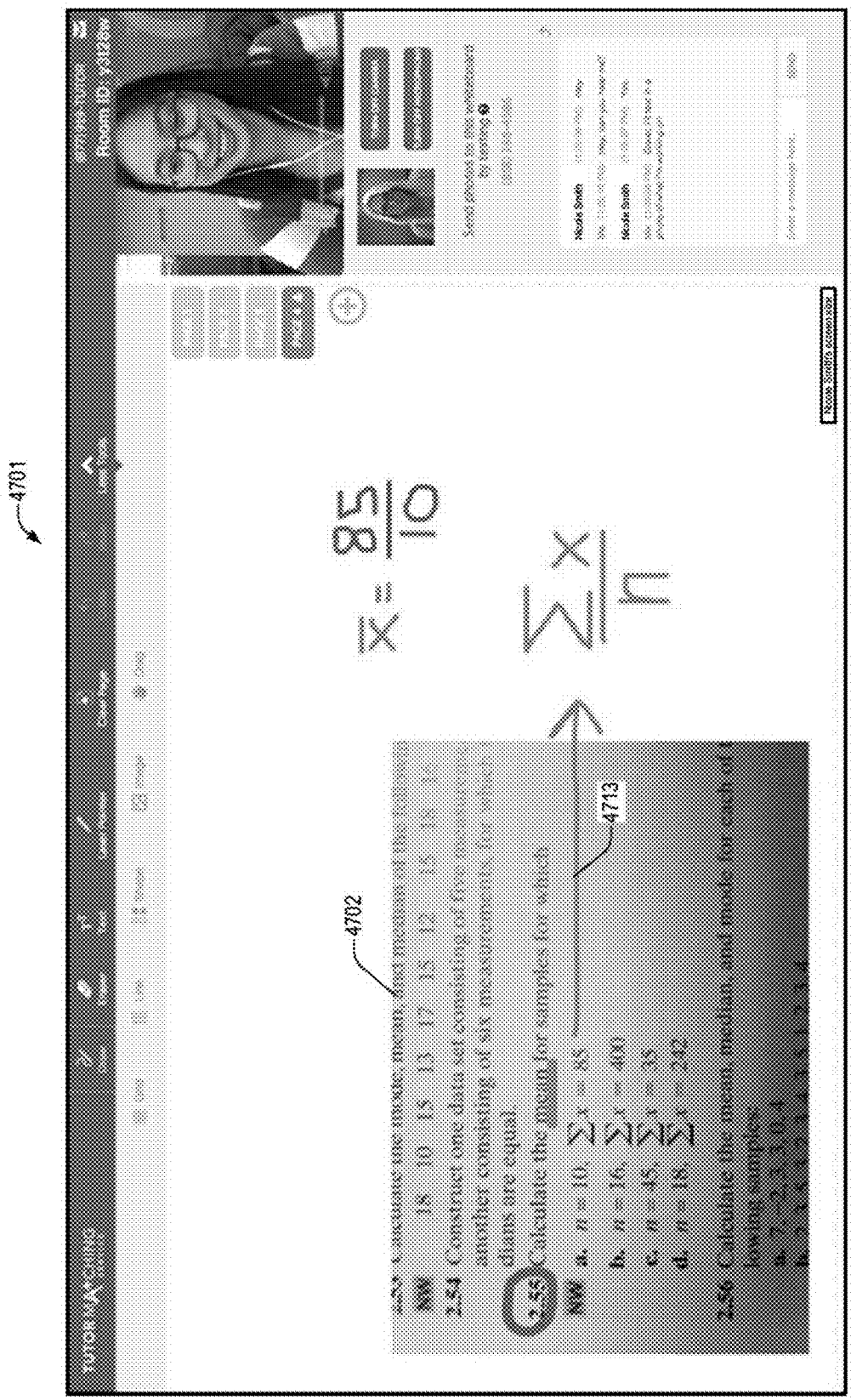

COLLABORATIVE TUTORIAL SESSION_6_MOVE DRAWING ALONG WITH IMAGE—As illustrated in the example screenshot GUI of FIG. 47:

A user has moved the image 4702 to a new location within the Tutorial Room GUI. In one embodiment, moving the image causes any annotations/drawings on top of the image to be moved along with the associated image. Such features may be automatically detected, tracked, and/or implemented by the OSES Server (and/or other service hosting the online, collaborative tutorial session).

For example, as illustrated in the example embodiment of FIG. 47, because the green arrow 4713 overlaps with a part of the image, the green arrow 4713 is moved relative with the moved image even though a portion of the green arrow exists outside the image.

Figure 49:
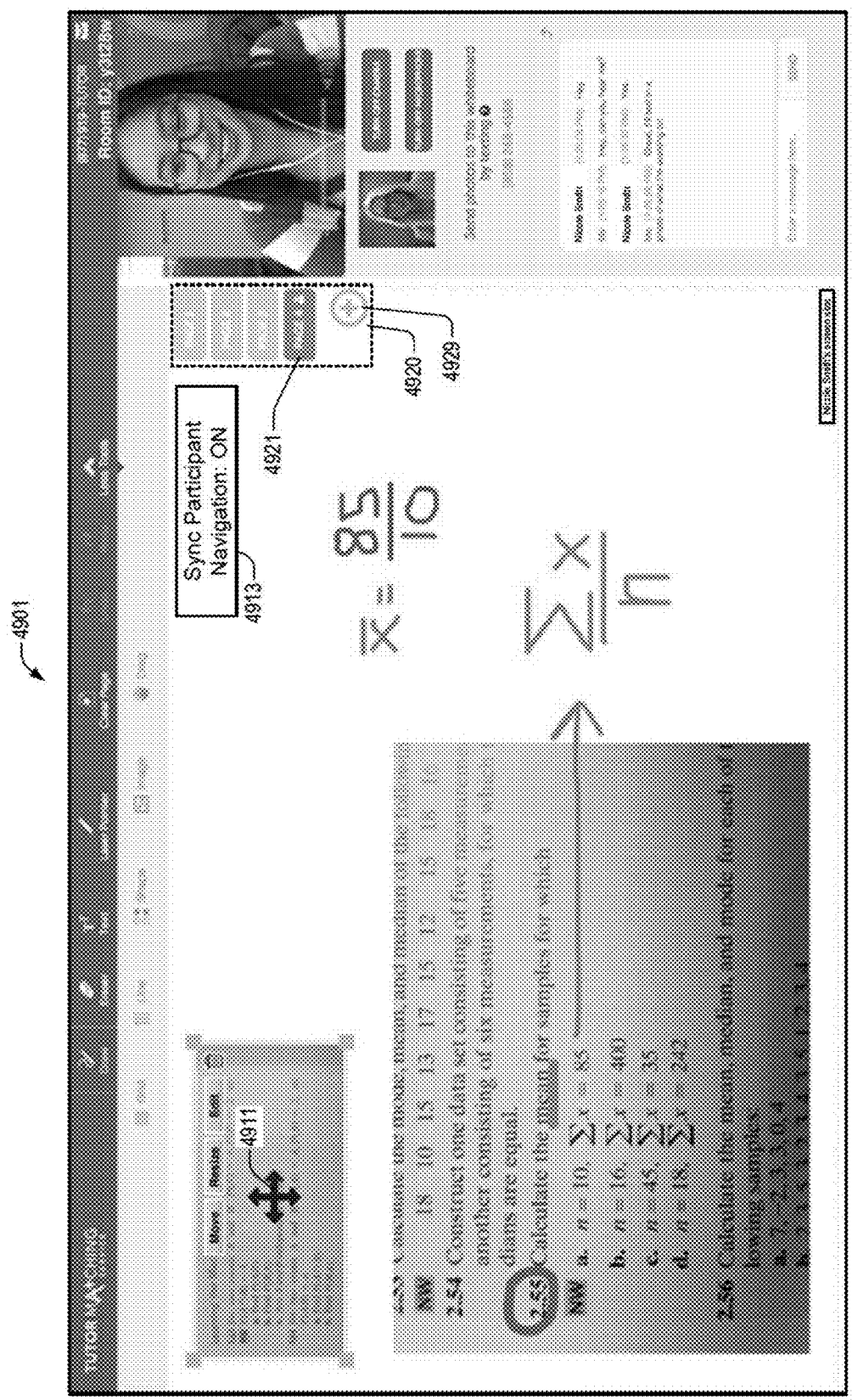
Figure 50:
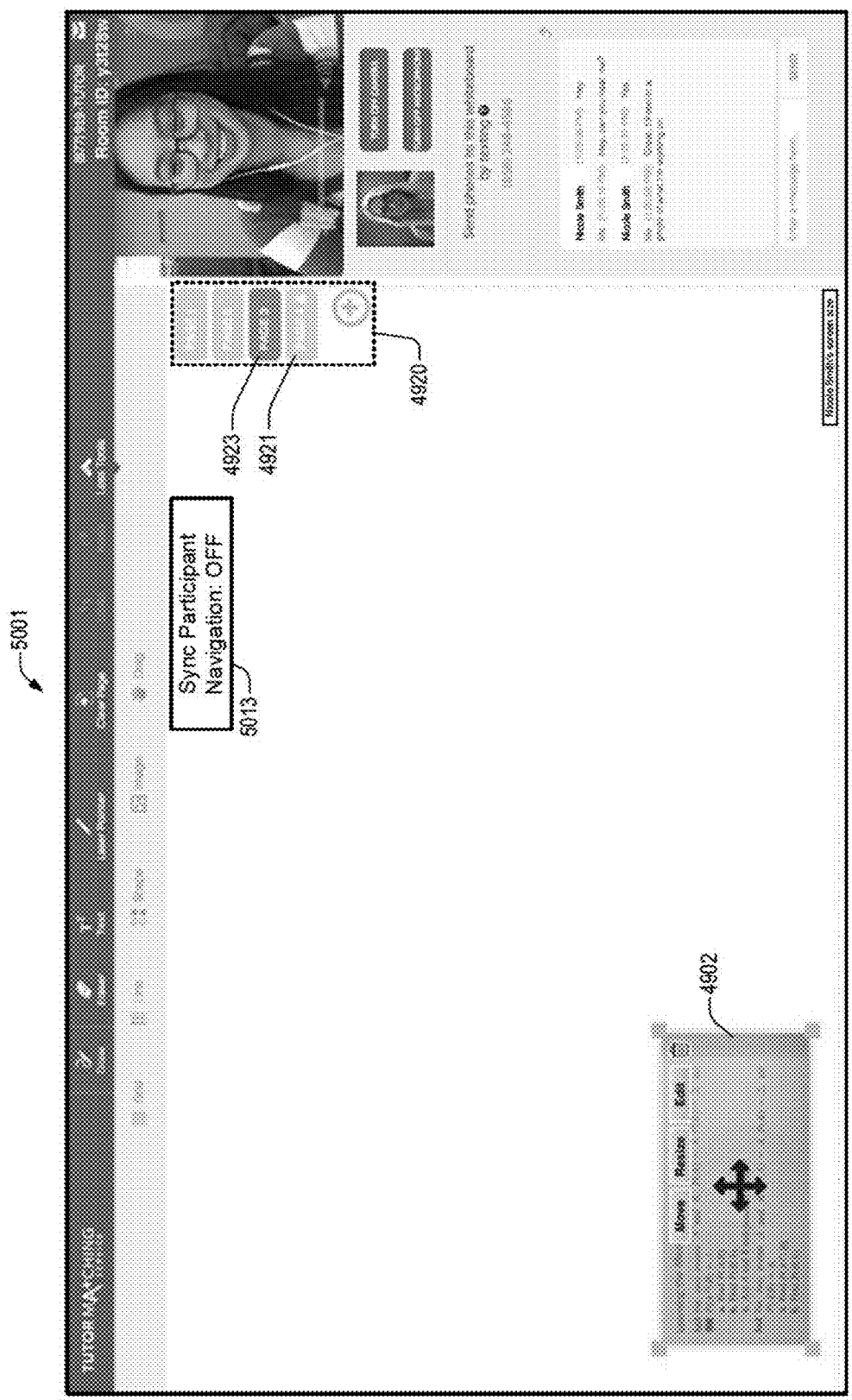

COLLABORATIVE TUTORIAL SESSION_8_1_DRAGGING BETWEEN PAGES START—As illustrated in the example screenshot GUI of FIG. 49:

The screenshots of FIGS. 49 and 50 illustrate the features of a user dragging an image from one page to another by clicking and holding the mouse cursor.

In one embodiment, an icon 4911 appears over the image while it is being dragged.

As illustrated in the example embodiment of FIG. 49, Tutorial Room GUI page buttons 4920 indicate the total number of pages in the tutorial room session (e.g., 4 pages total). Tutorial Room GUI page buttons 4920 may also indicate the current page (e.g., 4921) that the user is currently viewing, and may also indicate the current page(s) that the other user(s) is/are currently viewing.

Sync Participant Navigation (4913): ON

Page Navigation buttons 4920 may be provided for facilitating page navigation, new page creation, page re-ordering, page deletion, and/or other aspects described and/or referenced herein. In the specific example embodiment of FIG. 49, the Page Navigation buttons 4920 are shown anchored at the top right of the OCD Room GUI, however, in other embodiments, the Page Navigation buttons 4920 may be configured or designed to be anchored or docked to other locations of the OCD Room GUI and/or may be configured or designed to be displayed in a floating (e.g., movable) window.

COLLABORATIVE TUTORIAL SESSION_8_2_DRAGGING BETWEEN PAGES FINISH—As illustrated in the example screenshot GUI of FIG. 50:

Continuing from FIG. 49:

In the specific example embodiment of FIG. 50, the image 4902 has been moved from Page 4 of the tutorial room (e.g., FIG. 49) to Page 3 of the tutorial room.

As illustrated in the example embodiment of FIG. 50, the Tutorial Room GUI page buttons 4920 indicate that the user is currently viewing Page 3 (e.g., 4923), and that the other user is currently viewing Page 4 (4921) of the tutorial room.

In this particular screenshot GUI, it is assumed that Sync Participant Navigation (5013) has been switched to "OFF" (for purposes of illustration).

Dynamic Determination and Display of Available/Viewable Work Space Boundaries of Other User(s)

One feature of Collaborative Online Tutorial rooms (and/or other types of OCD Rooms) described herein relates to the ability to automatically and/or dynamically determine and display information relating to different users'/participants' display screen sizes. This feature is illustrated, for example, in FIGS. 86 and 87, and is also illustrated and described in greater detail with respect to the flow diagrams of FIGS. 88 and 89.

Figure 86:
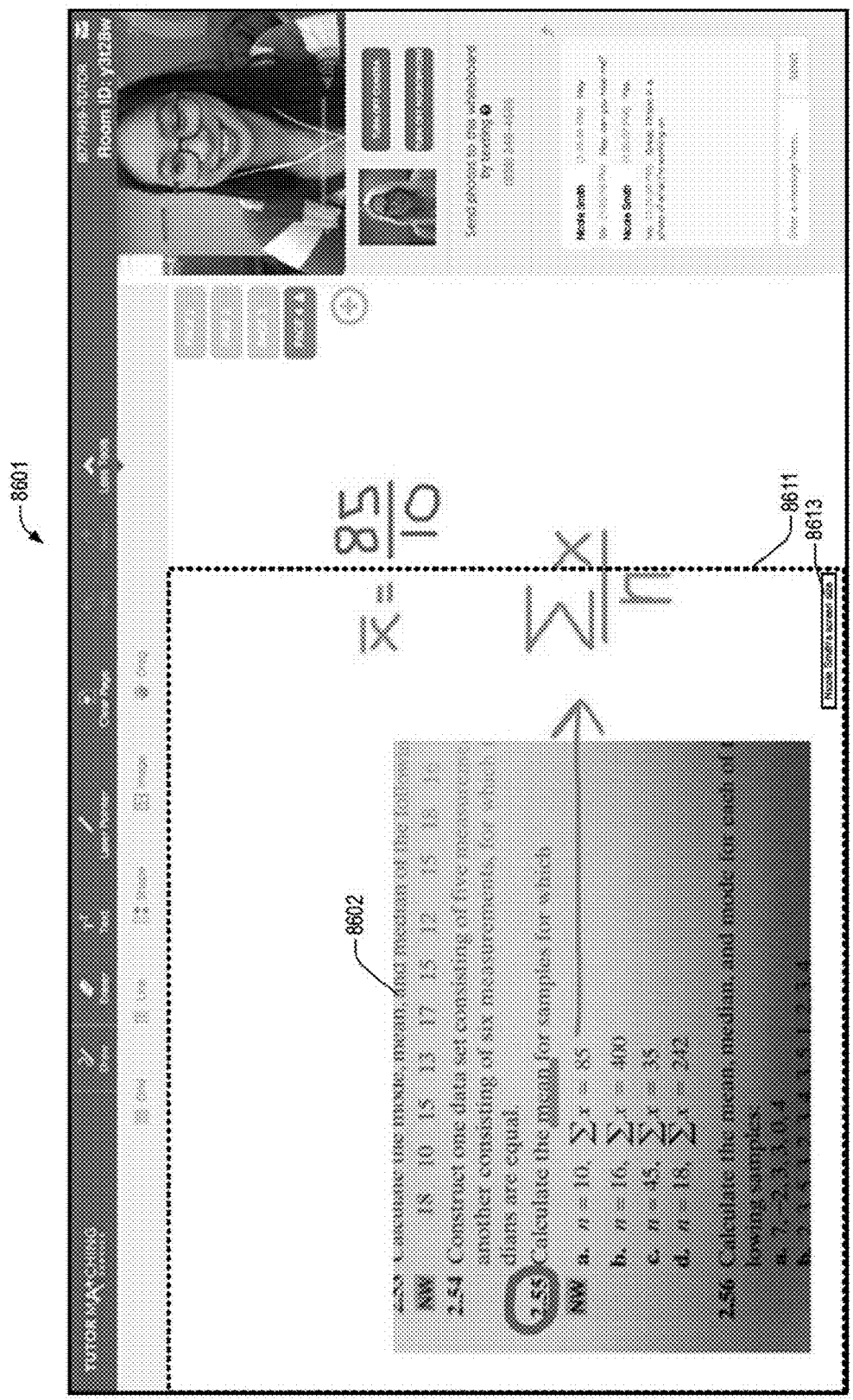
Figure 87:
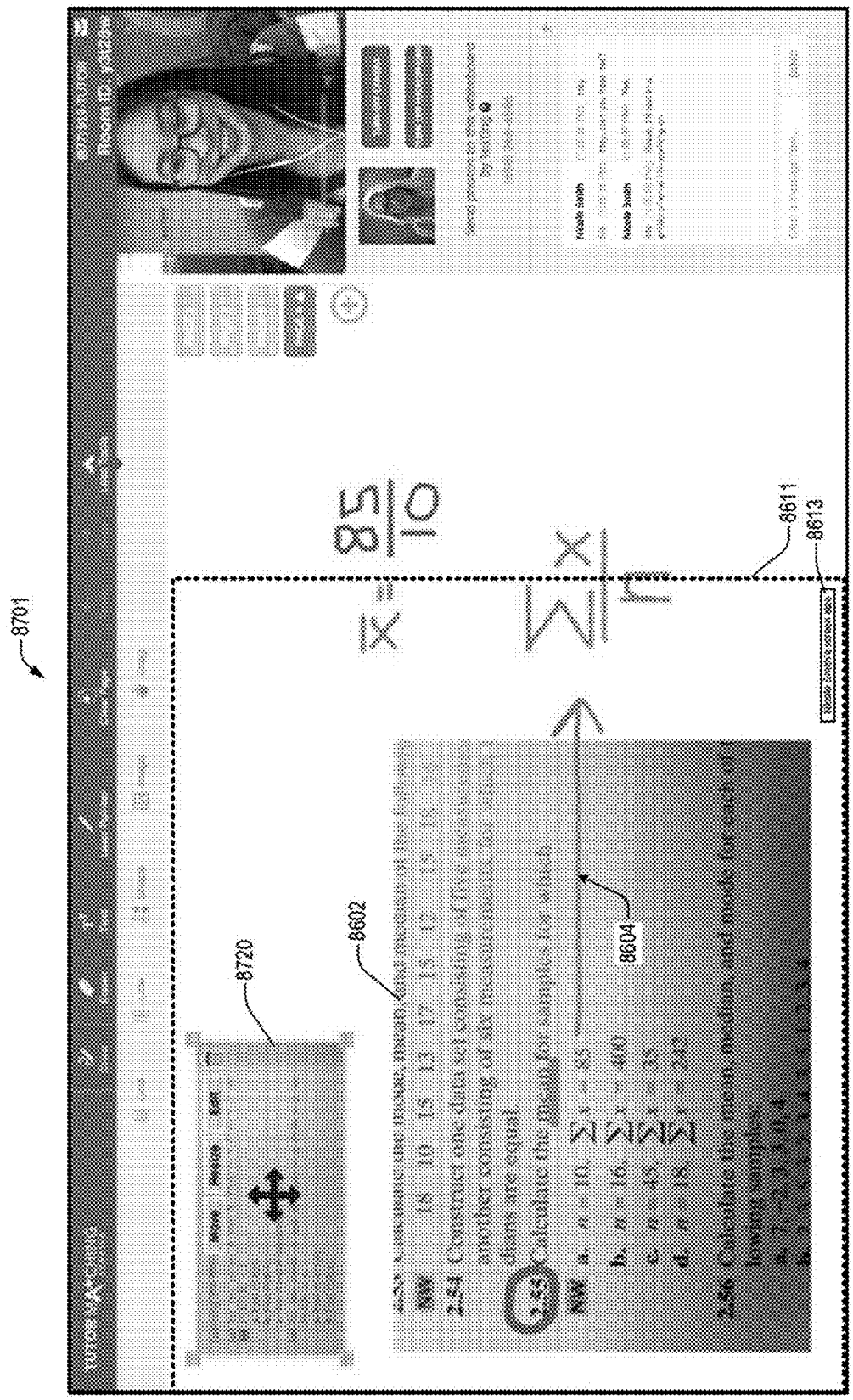

FIGS. 86 and 87 illustrate example screenshots of Collaborative Online Tutorial Room GUIs in accordance with specific embodiments. In the specific example embodiment of FIG. 86 it is assumed that a collaborative, online tutorial session is taking between two participants in a Collaborative Online Tutorial Room. It is further assumed in this example that each user has a different, respective screen size for displaying the shared workspace of the Collaborative Online Tutorial Room, and further assumed that the backend server is configured or designed to determine the respective viewable screen size region of each participant in the Collaborative Online Tutorial Room. As illustrated in the example embodiment of FIG. 86, the Collaborative Online Tutorial Room GUI 8601 may display a bordered region 8611 which represents the viewable display screen size boundary of the other participant in the Collaborative Online Tutorial Room. Additionally, the backend server may also display information (e.g., 8613) identifying the participant that is associated with the bordered screen size region 8611. These visual aids greatly facilitate the collaborative interactions of the participants during the tutorial session. For example, the participant viewing the Collaborative Online Tutorial Room GUI 8601 may use the displayed bordered screen size region 8611 to quickly and easily identify (e.g., via visual observation) which portions of displayed content (e.g., images, annotations, text, etc.) of the Collaborative Online Tutorial Room page are currently displayed or visible on the other participant's screen (e.g., the portions of content within bordered region 8611), and which portions of content are not currently displayed or visible on the other participant's screen.

In at least some embodiments, as illustrated, for example, in FIG. 87, when a new image is to be inserted onto a page of the Collaborative Online Tutorial Room (e.g., via Message-to-Post, moving an image from one page to another, etc.), the backend server may automatically insert the new image (e.g., 8720) at a selected location (e.g., an empty region) within the bordered screen size region 8611, which represents the viewable display screen size boundary corresponding the relatively smallest viewable display screen size of the current participants of the Collaborative Online Tutorial Room.

Figure 88:
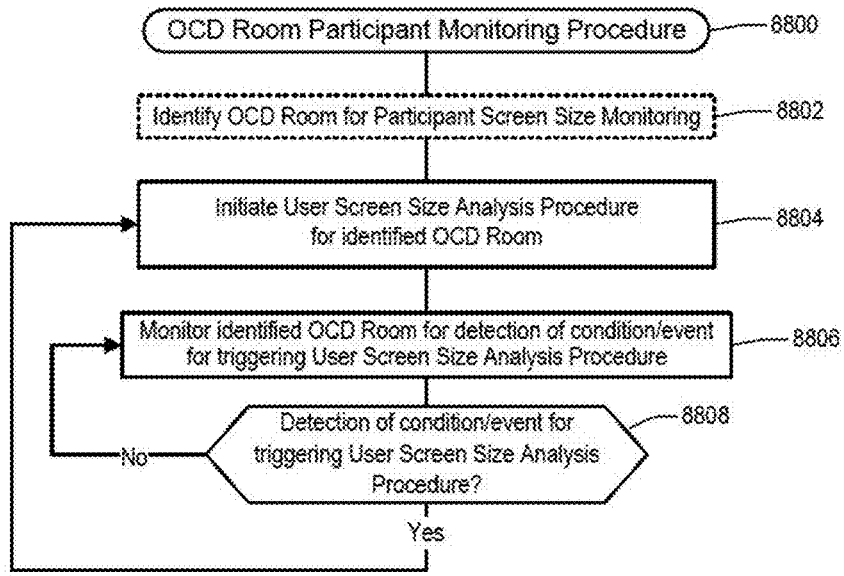
Figure 89:
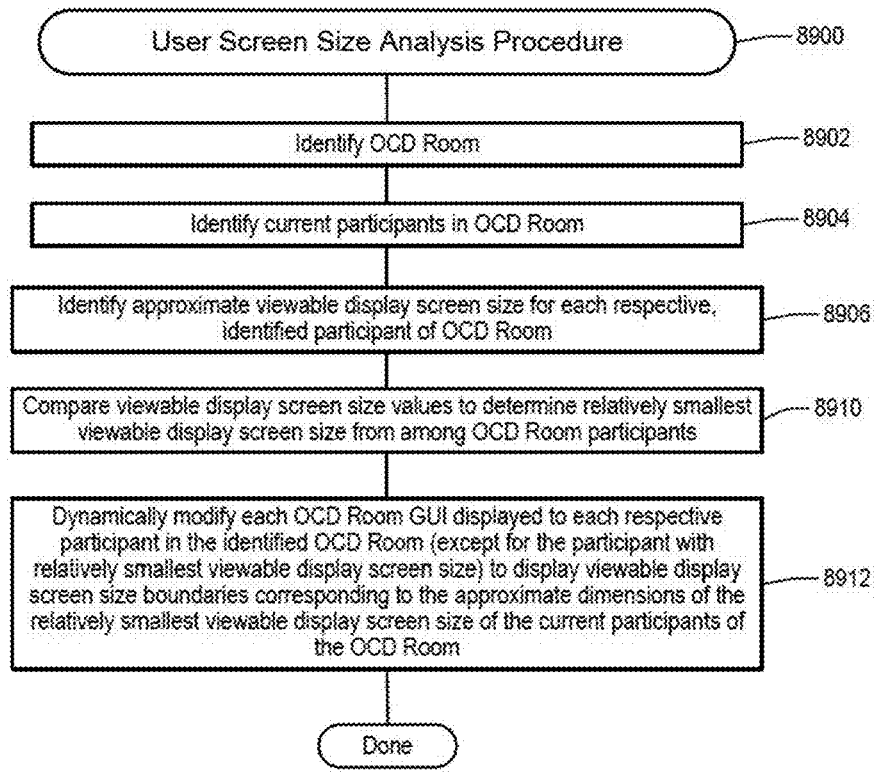

FIGS. 88 and 89 show example flow diagrams illustrating various actions and operations which may be implemented (e.g., at the backend server) to provide various functionality relating to the dynamic determination and display of available/viewable work space boundaries of OCD Room user(s)/participant(s).

FIG. 88 shows an example flow diagram of an OCD Room Participant Monitoring Procedure 8800 in accordance with a specific embodiment.

As shown at 8802, the backend server may select and identify an OCD Room for Participant Screen Size Monitoring.

As shown at 8804, an instance of the User Screen Size Analysis Procedure (e.g., such as that illustrated in FIG. 89) may be automatically initiated for the identified OCD Room to thereby enable the backend server to determine and display a screen size region border which represents the viewable display screen size boundary corresponding the relatively smallest viewable display screen size of the current participants of the OCD Room.

Thereafter, as shown at 8806 and 8808, the identified OCD Room may be monitored for detection of subsequent condition(s)/event(s) which may trigger the User Screen Size Analysis Procedure to be performed again on the identified OCD Room. For example, in some embodiments, the displayed screen size boundary may be automatically and/or dynamically adjusted/resized (e.g., via execution of the User Screen Size Analysis Procedure) based on various detected event(s)/condition(s) such as, for example, one or more of the following (or combinations thereof):

Participants joining and/or exiting OCD Room;

Change of participant screen size detected (e.g., user resized browser or switched display device orientation);

Change in participant device detected;

Etc.

FIG. 89 shows an example flow diagram of a User Screen Size Analysis Procedure 8900 in accordance with a specific embodiment.

As shown at 8902, the backend server may identify the specific OCD Room to be analyzed.

As shown at 8904, the backend server may automatically identify each of the current participant(s) in the identified OCD Room.

As shown at 8906, the backend server may automatically identify and/or determine the approximate viewable display screen size for each respective, identified participant of the identified OCD Room.

As shown at 8910, the backend server may automatically compare the viewable display screen size values to identify or determine the relatively smallest viewable display screen size from among the identified OCD Room participants.

As shown at 8912, the backend server may automatically and dynamically modify each OCD Room GUI displayed to each respective participant in the identified OCD Room (in some embodiments, not including the OCD Room GUI displayed to the participant with the relatively smallest viewable display screen size) to display the viewable display screen size boundaries (e.g., 8611, FIG. 86) corresponding to the relatively smallest viewable display screen size of the current participants of the OCD Room.

Collaborative Tutorial Session: Dragging Between Pages

Additional Embodiments

Figure 90:
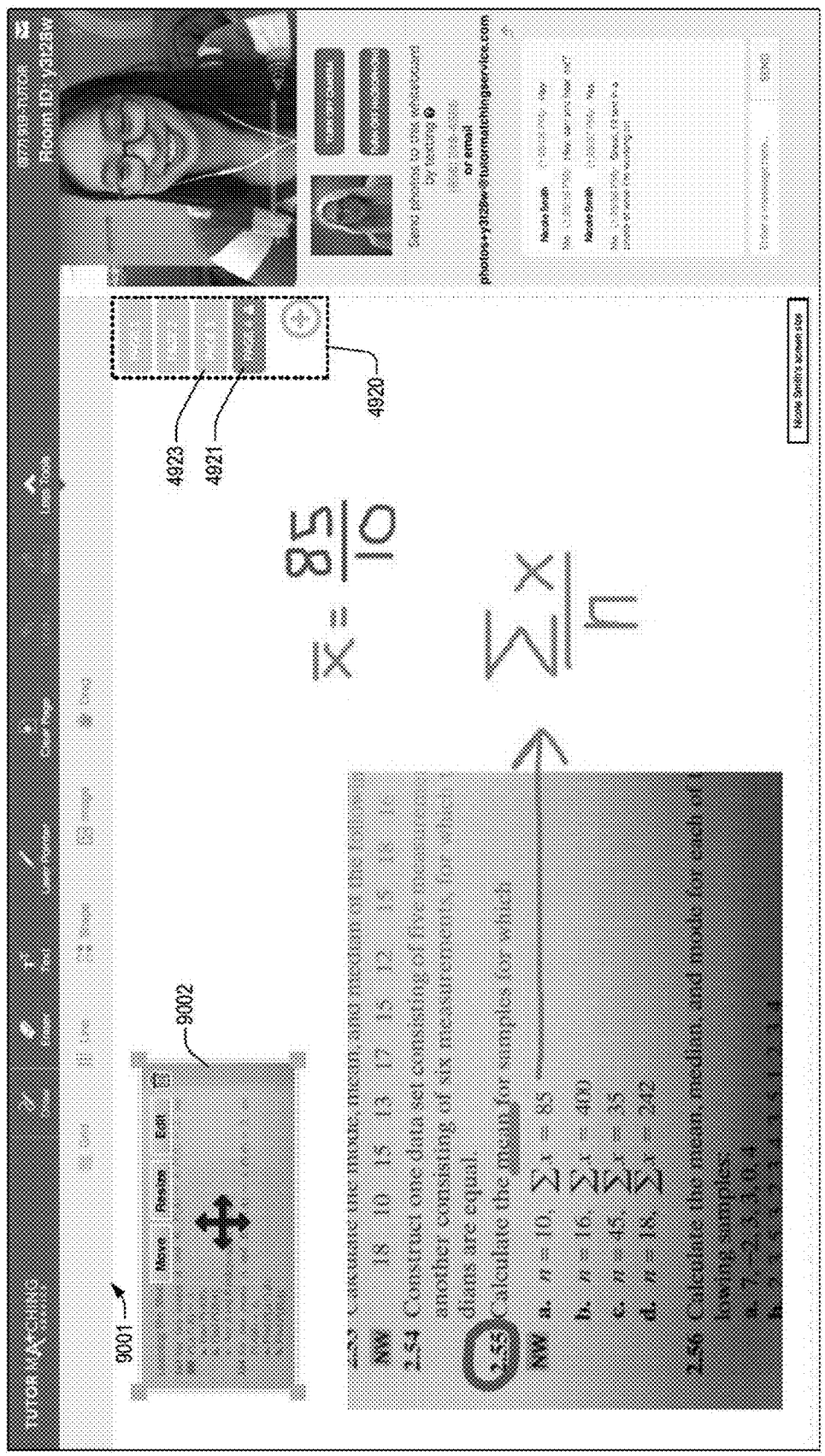
Figure 91:
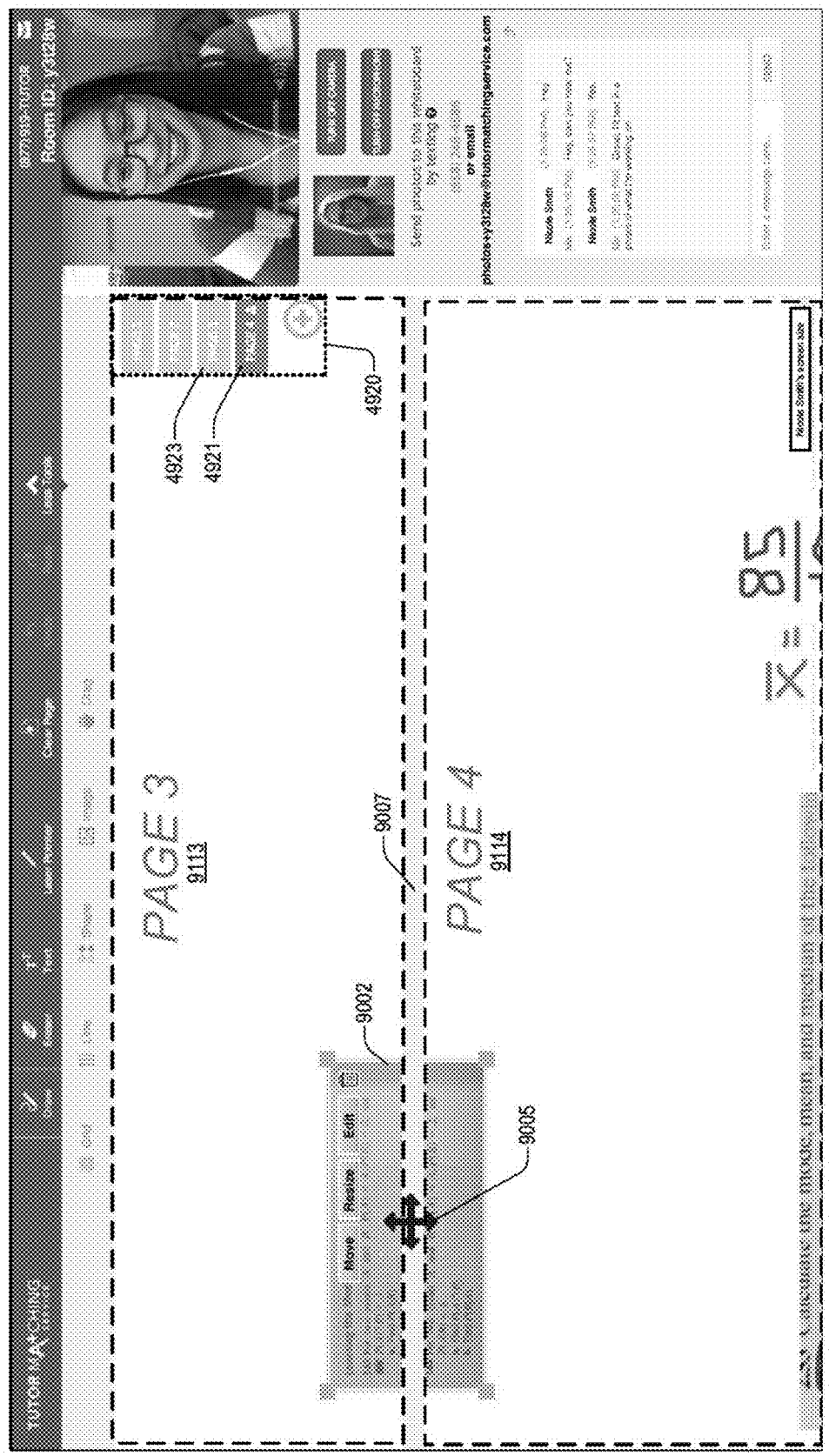
Figure 92:
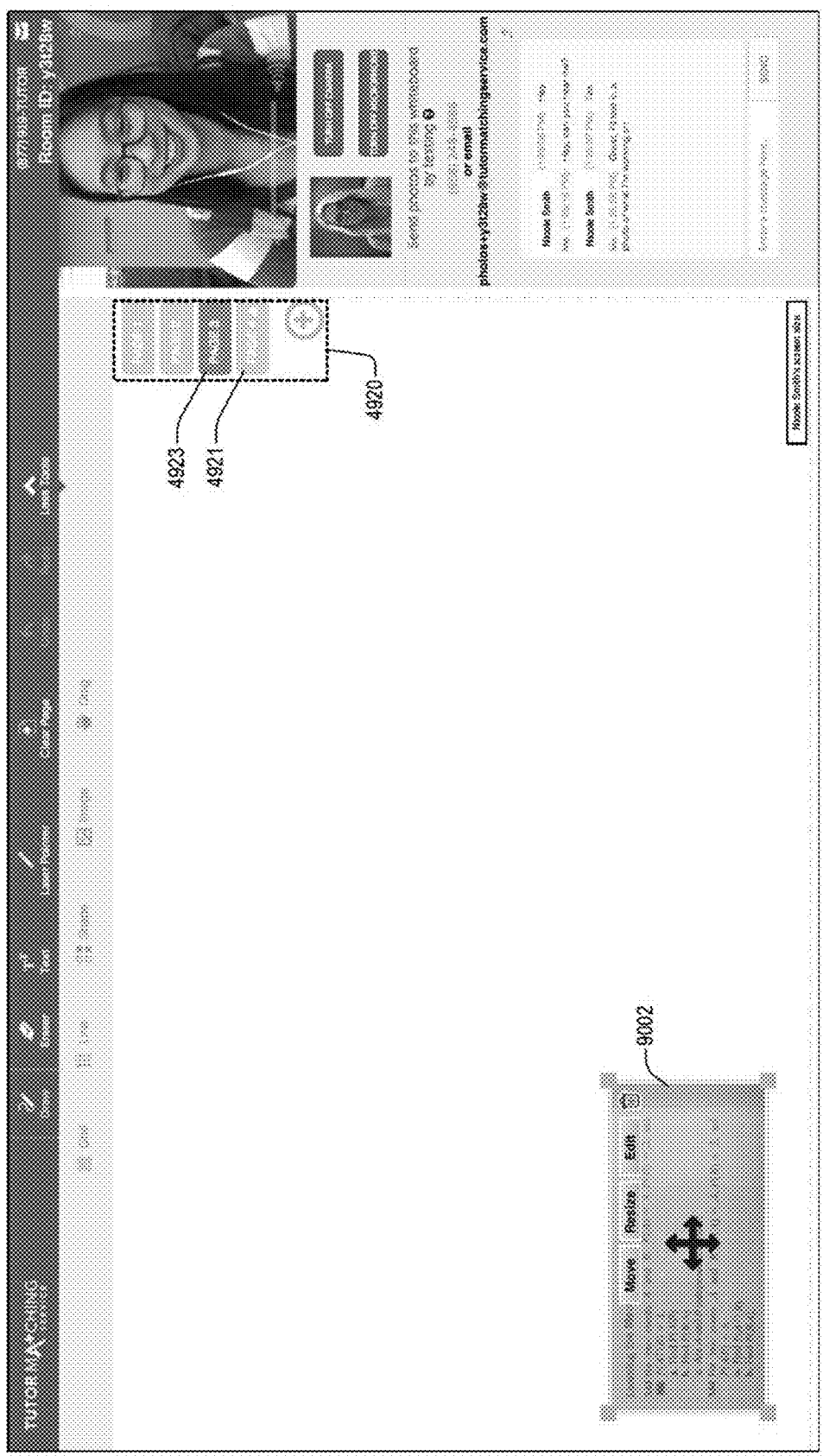
Figure 93:
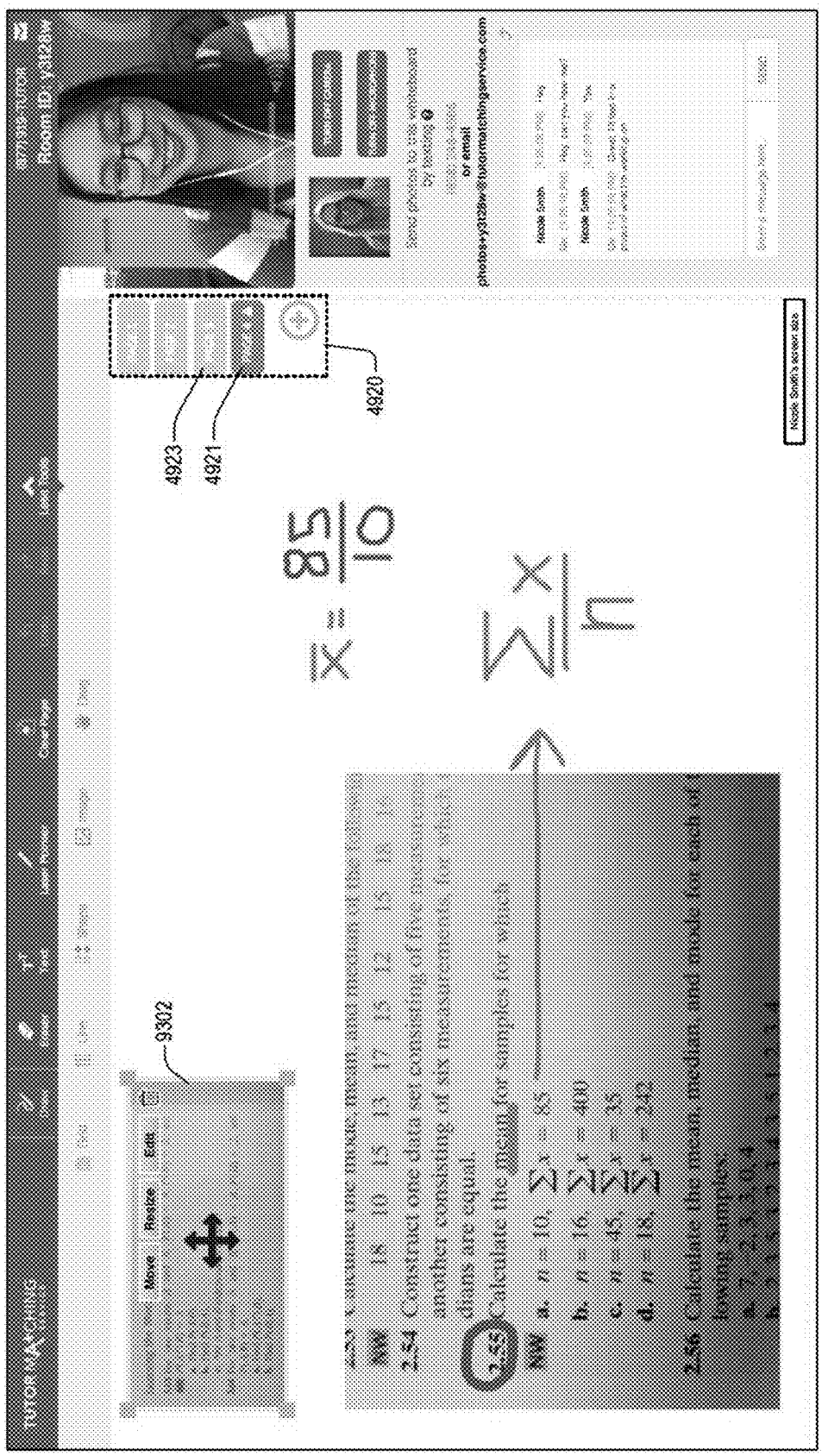

FIGS. 90-101 show various screenshot GUIs illustrating different techniques which may be used for moving images and/or other content between pages of a collaborative tutorial session. For example, FIGS. 90-92 show a series of example screenshot GUIs illustrating one technique by which a user or participant of an OCD Room (e.g., collaborative tutorial session) may move an inserted or displayed image from one page of the OCD Room to another page of the OCD Room. As illustrated in the example screenshot GUIs of FIGS. 90-92, a participant of the OCD Room may click on a displayed image 9002 (FIG. 90) to select the image for moving, and then drag the selected image up/down (or left/right) to cause the selected image to be moved to a different page of the OCD Room. In the present example, it is assumed that the selected image 9002 is currently displayed on page 4 of the OCD Room, and that a participant desires to move the selected image to page 3 of the OCD Room by dragging/moving the selected image 9002 upward (e.g., towards the top border 9001 of the displayed OCD Room page). As illustrated in the example embodiment of FIG. 91, when the selected image is dragged close to the top page border, a page divider object 9007 may be automatically displayed. The page divider object 9007 serves as a visual aid to assist the user in moving the selected image to the new page. In this example, it is assumed that the user continues to move the image 9002 from page 4 (9114), across the page divider 9007, and into page 3 (9113) of the OCD Room. Once the selected image has been successfully dragged into the region of page 3 (9113), the user may release selection of the image to complete the image move operation. The OSES Server may then take appropriate action to cause the moved image to be displayed on page 3 of the OCD Room, as illustrated, for example, in FIG. 92. In other embodiments (not shown), the user may continue to move or drag the selected image 9002 across page 3, and into page 2 or page 1. Similarly, in other embodiments (not shown), the user may move or drag the selected image down to cause the selected image 9002 to be moved from page 4 to page 5 (or any subsequent page, as desired).

Figure 94:
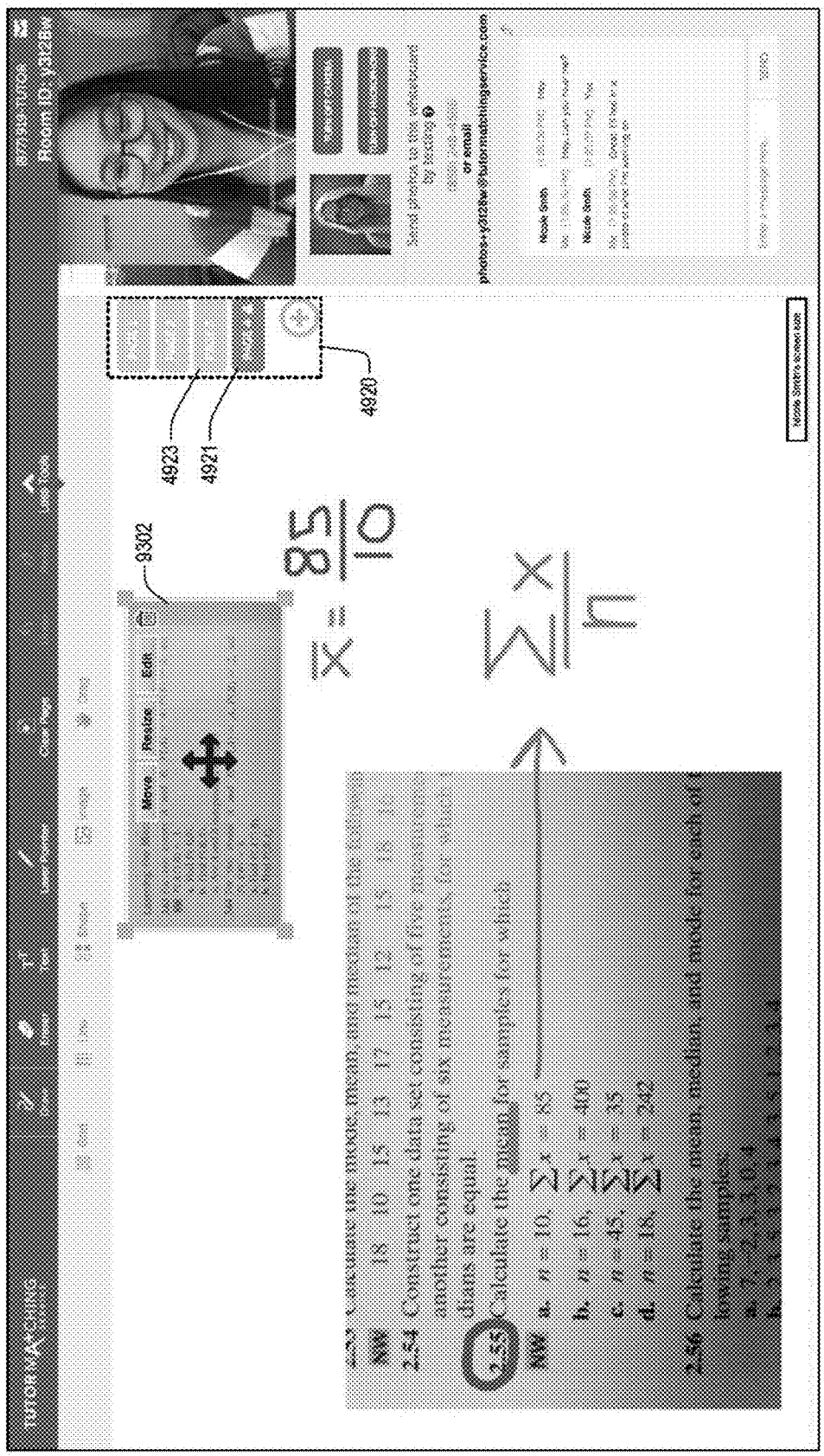
Figure 95:
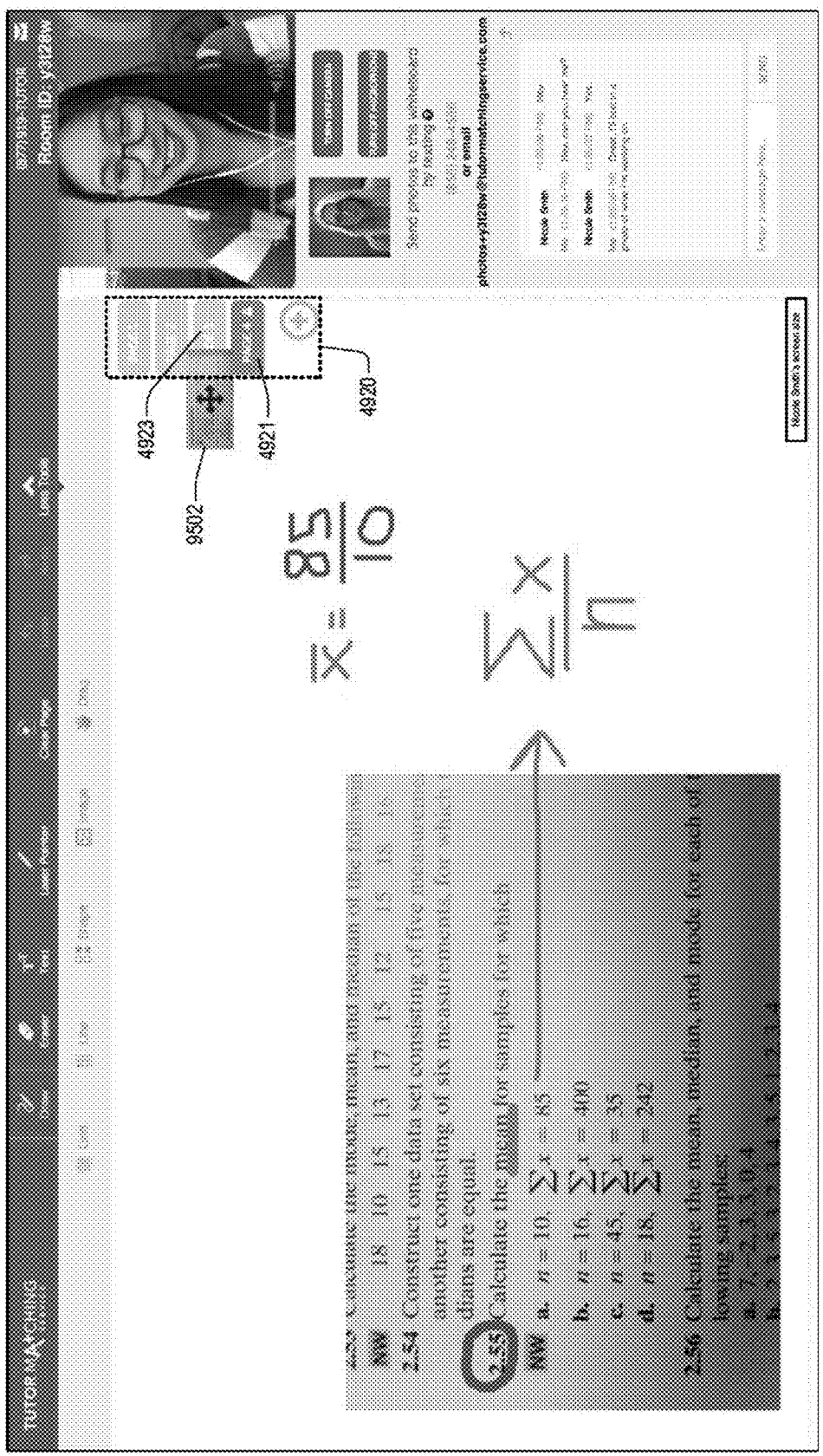
Figure 96:
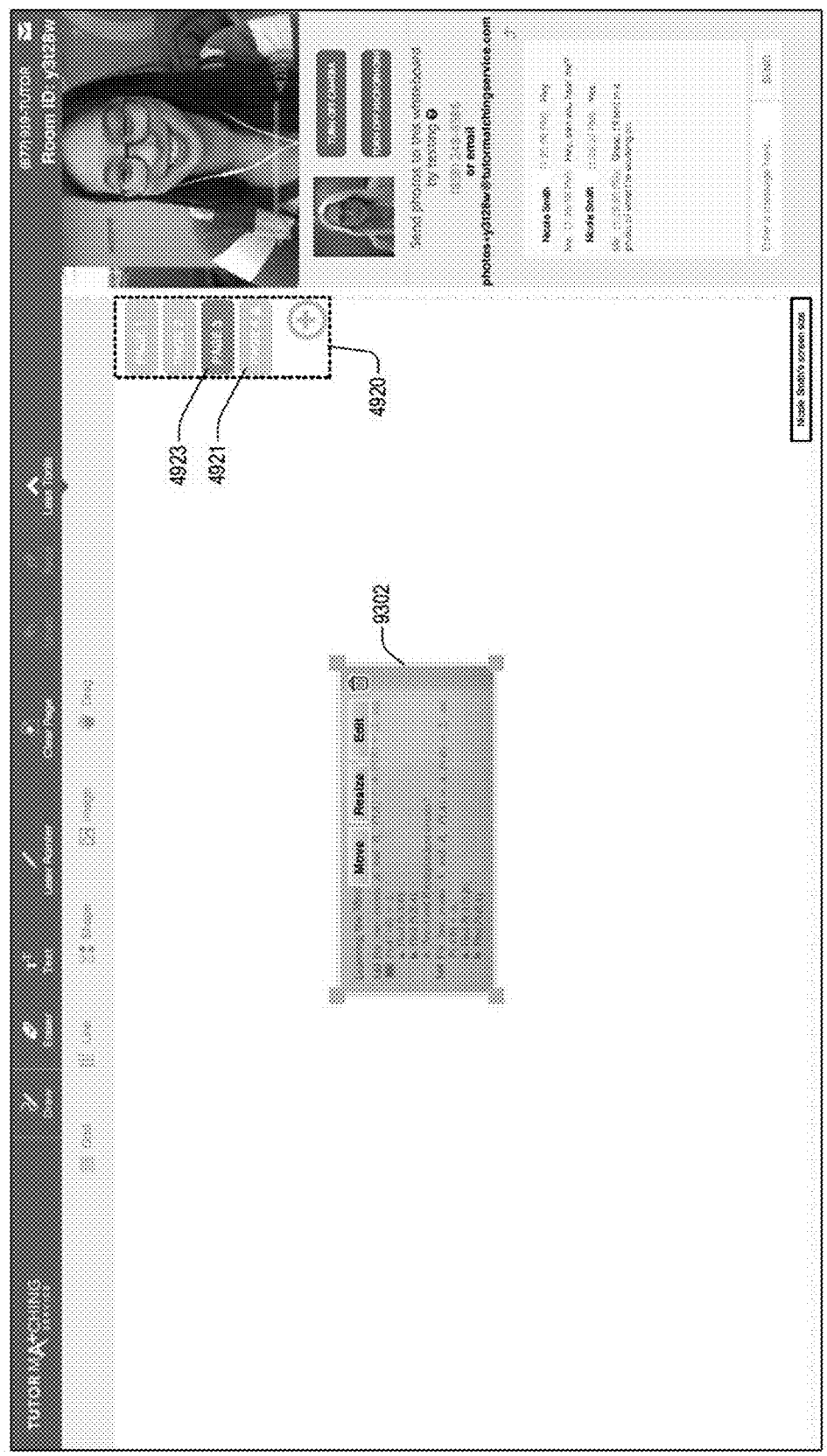
Figure 97:
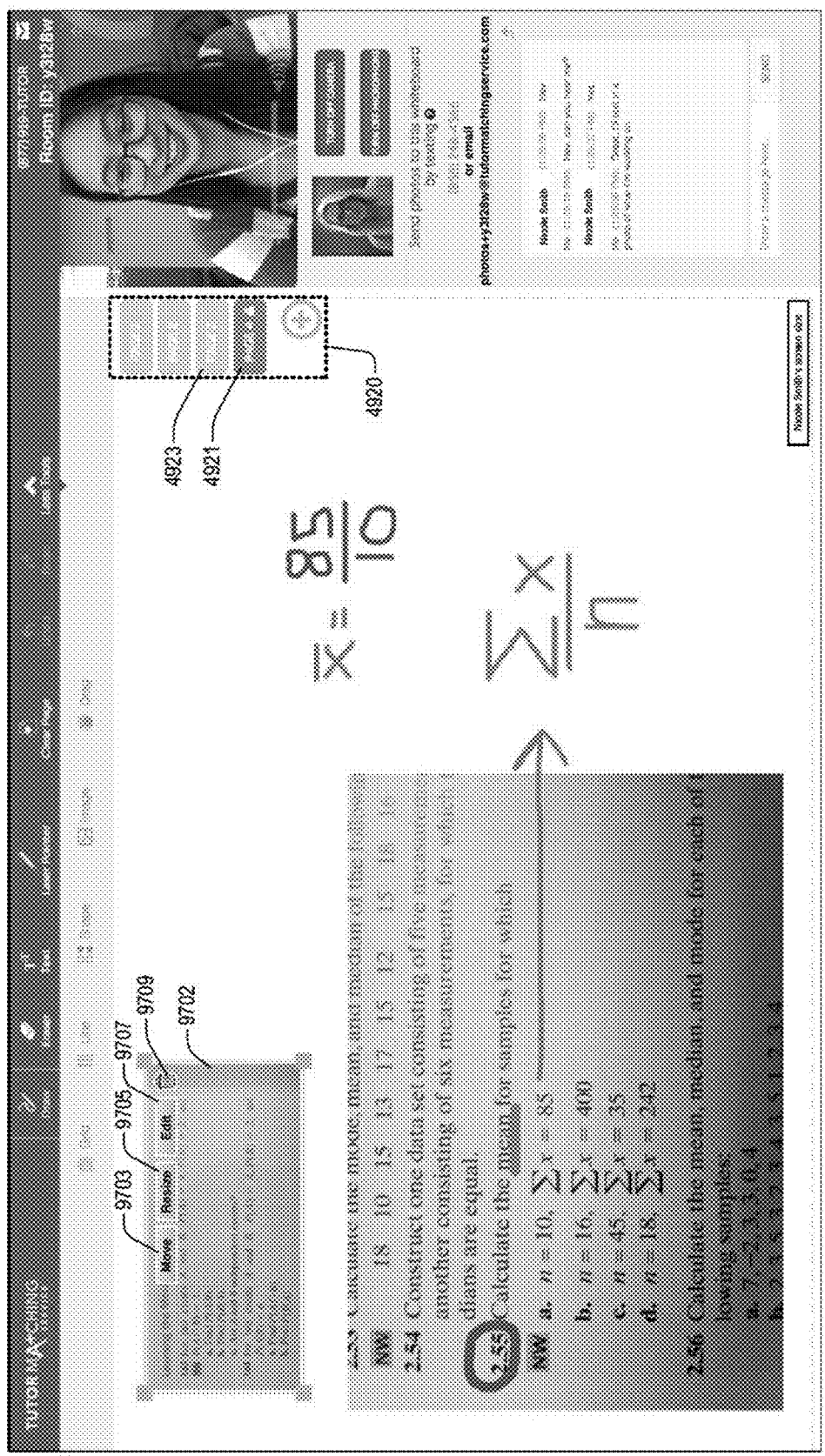
Figure 98:
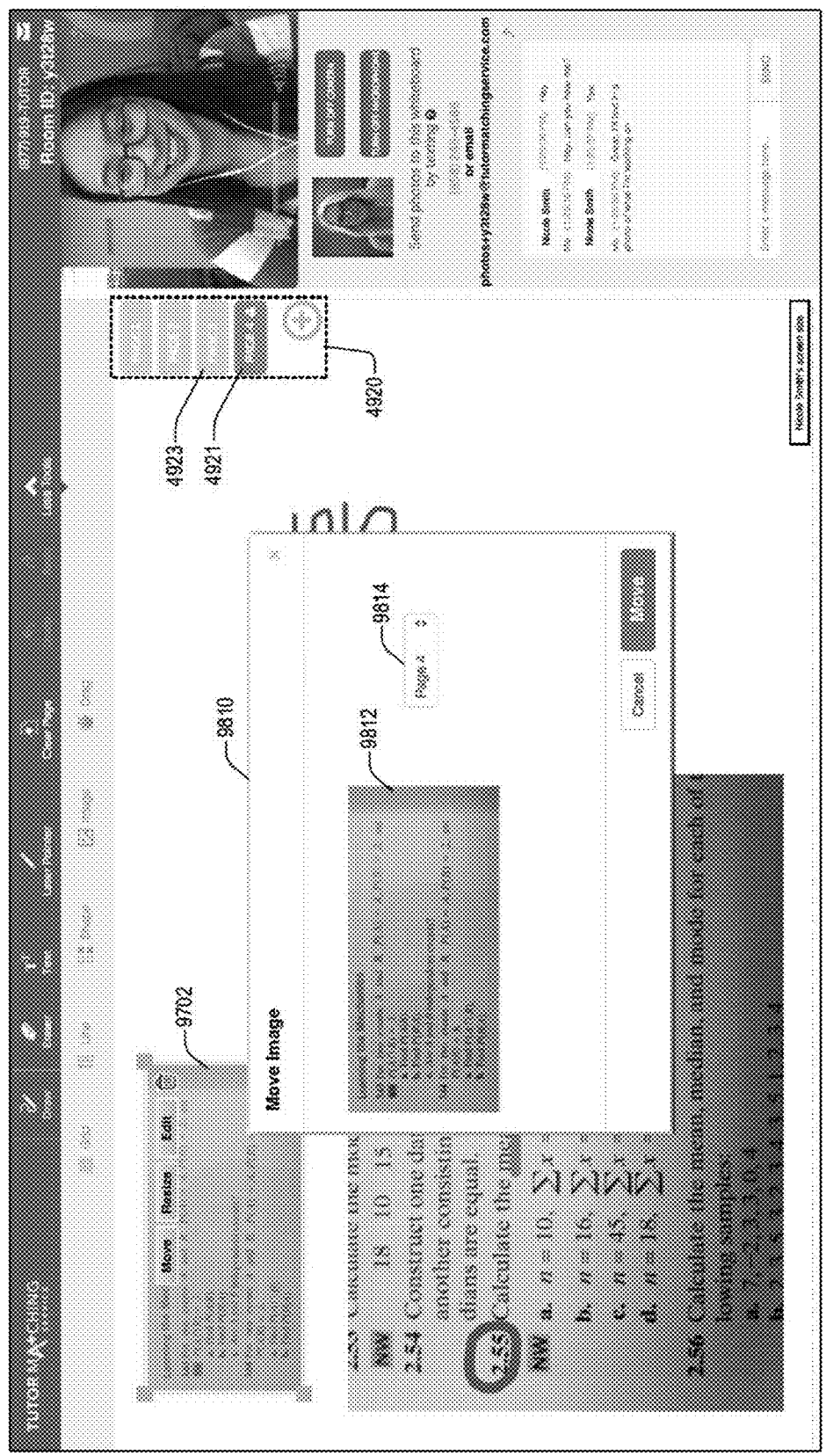

FIGS. 93-96 show a series of example screenshot GUIs illustrating another technique by which users or participants of an OCD Room (e.g., collaborative tutorial session) may move an inserted or displayed image from one page of the OCD Room to another page of the OCD Room. As illustrated in the example screenshot GUIs of FIGS. 93-96, a participant of the OCD Room may click on a displayed image 9302 (FIG. 93) to select the image for moving, and then drag and drop selected image into a desired page icon/button (e.g., Page 3, 4923) to thereby cause the selected image 9302 to be moved to the desired page (e.g., Page 3) of the OCD Room. FIG. 94 illustrates the selected image 9302 being dragged towards the OCD Room Page Buttons 4920. In one embodiment, as illustrated in the example embodiment of FIG. 95, dragging the selected image over a page button (e.g., Page 3 Button, 4923) causes the selected image to shrink, indicating that it can be dropped into that page. Releasing the dragged image over a specific page button (e.g., Page 3 Button, 4923) causes the selected image to be moved to the selected page of the OCD Room. In one embodiment, the OSES Server may display the moved image at the center of the target page (Page 3), and may automatically navigate the user to that page.

FIGS. 97-101 show a series of example screenshot GUIs illustrating yet another technique by which users or participants of an OCD Room (e.g., collaborative tutorial session) may move an inserted or displayed image from one page of the OCD Room to another page of the OCD Room.

Figure 99:
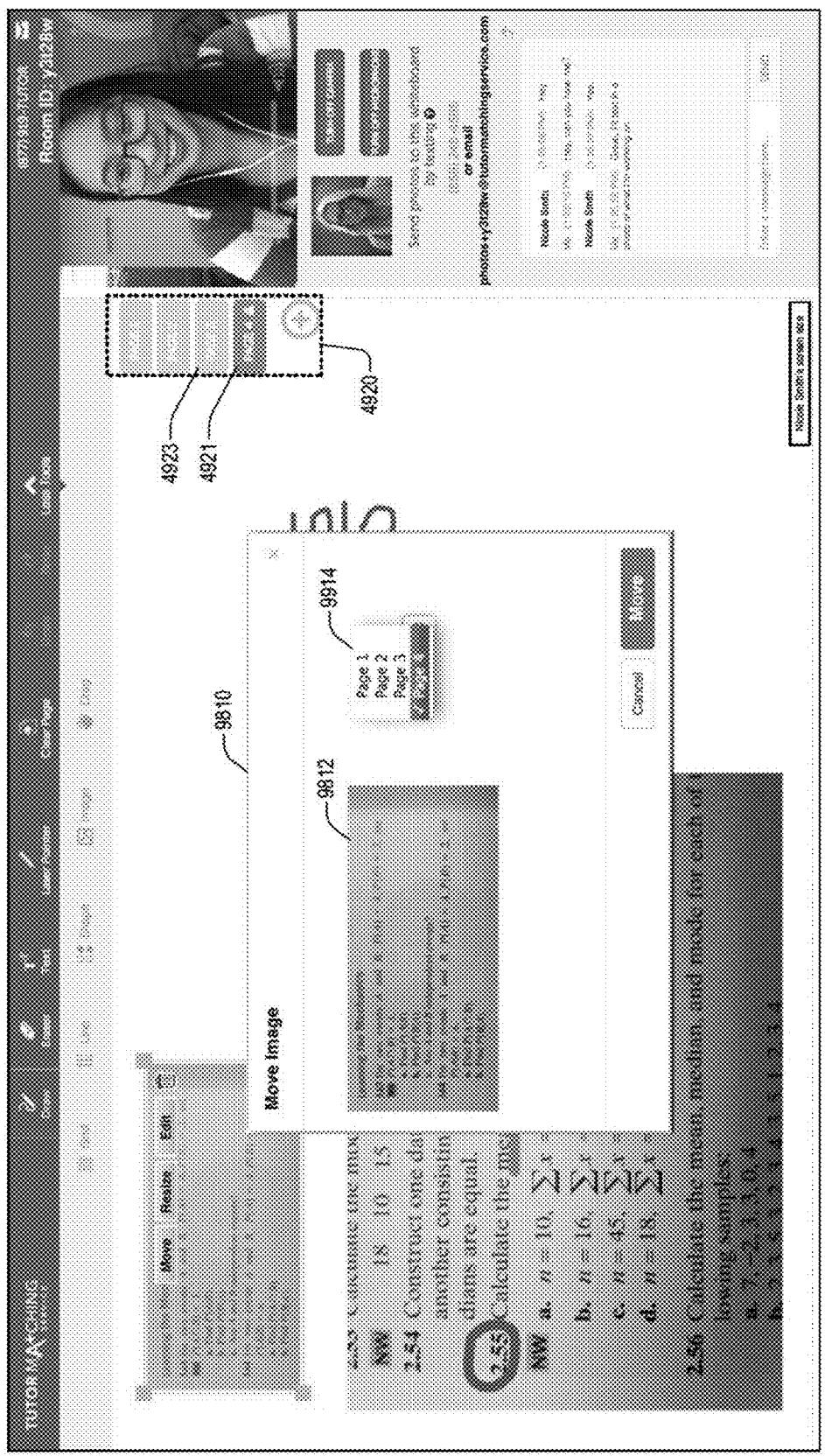
Figure 100:
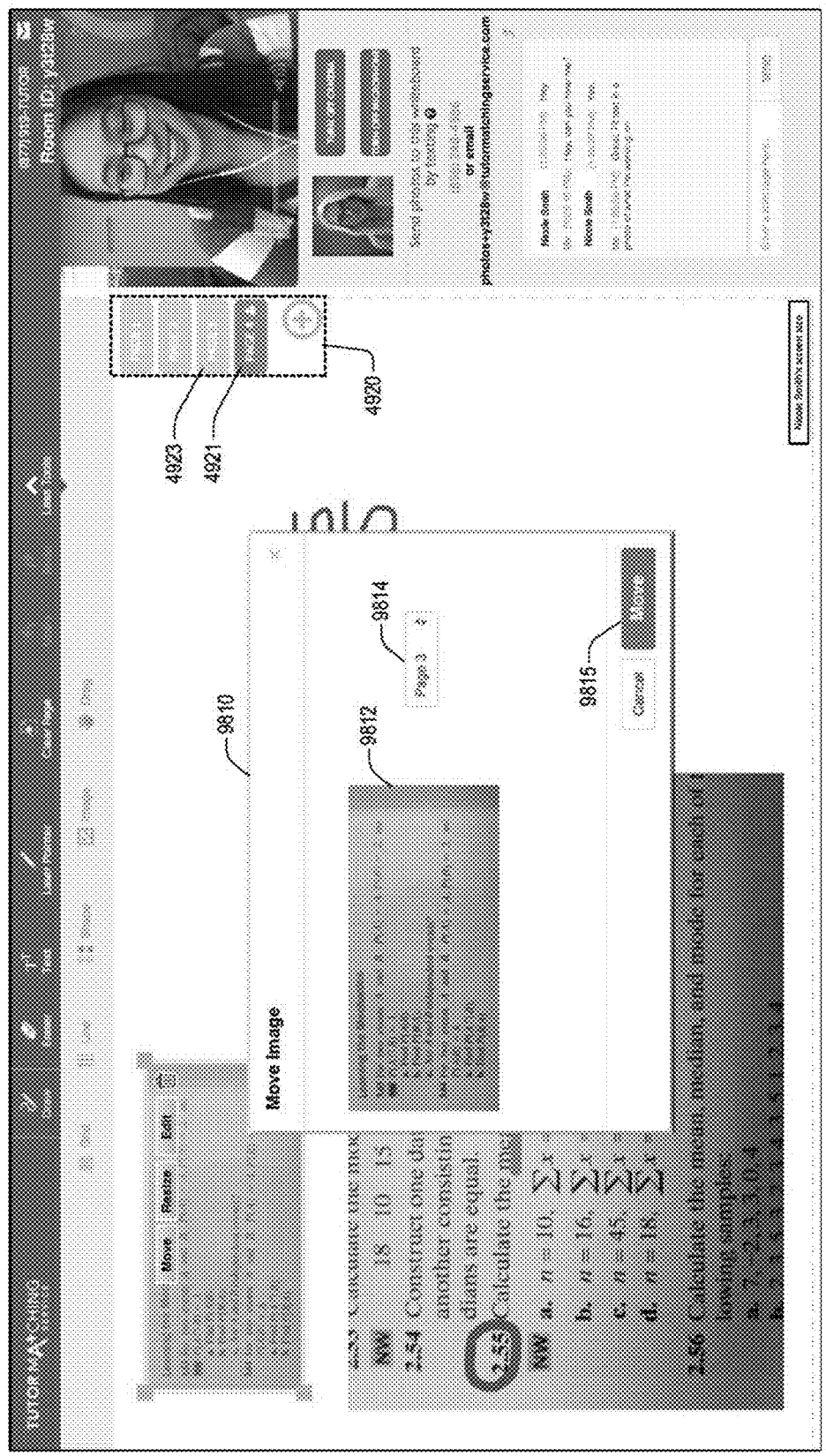

As illustrated in the example screenshot GUIs of FIGS. 97-101, a participant of the OCD Room may click on a displayed image 9702 (FIG. 93) to cause one or more action buttons (e.g., MOVE 9703, RESIZE 9705, EDIT 9707, DELETE 9709, etc.) to be dynamically displayed. In this particular example, it is assumed that the user clicks on the MOVE action button 9703. The OSES Server may respond by displaying a Move Image dialog box 9810, as illustrated, for example, in FIG. 98. In some embodiments, the Move Image dialog box 9810 may include a representation 9812 of the selected image to be moved. As illustrated in the example embodiment of FIG. 98, 99 the Move Image dialog box 9810 may include a Target Page GUI (9814, 9914) which may be configured or designed to enable the user to select or identify the target page to where the selected image is to be moved (e.g., as illustrated in FIG. 99). In one embodiment, the Target Page GUI may initially show, as a default target page value, the current page where the selected image is currently located/displayed (e.g., Page 4). In the present example, it is assumed that the user selects Page 3 is the target page, as illustrated, for example, in FIG. 100. The user may then click the Move button 9815 to cause the selected image to be moved to the identified target page (Page 3) of the OCD Room. In one embodiment, the OSES Server may display the moved image at the center of the target page (Page 3), and may automatically navigate the user to that page.

Figure 48:
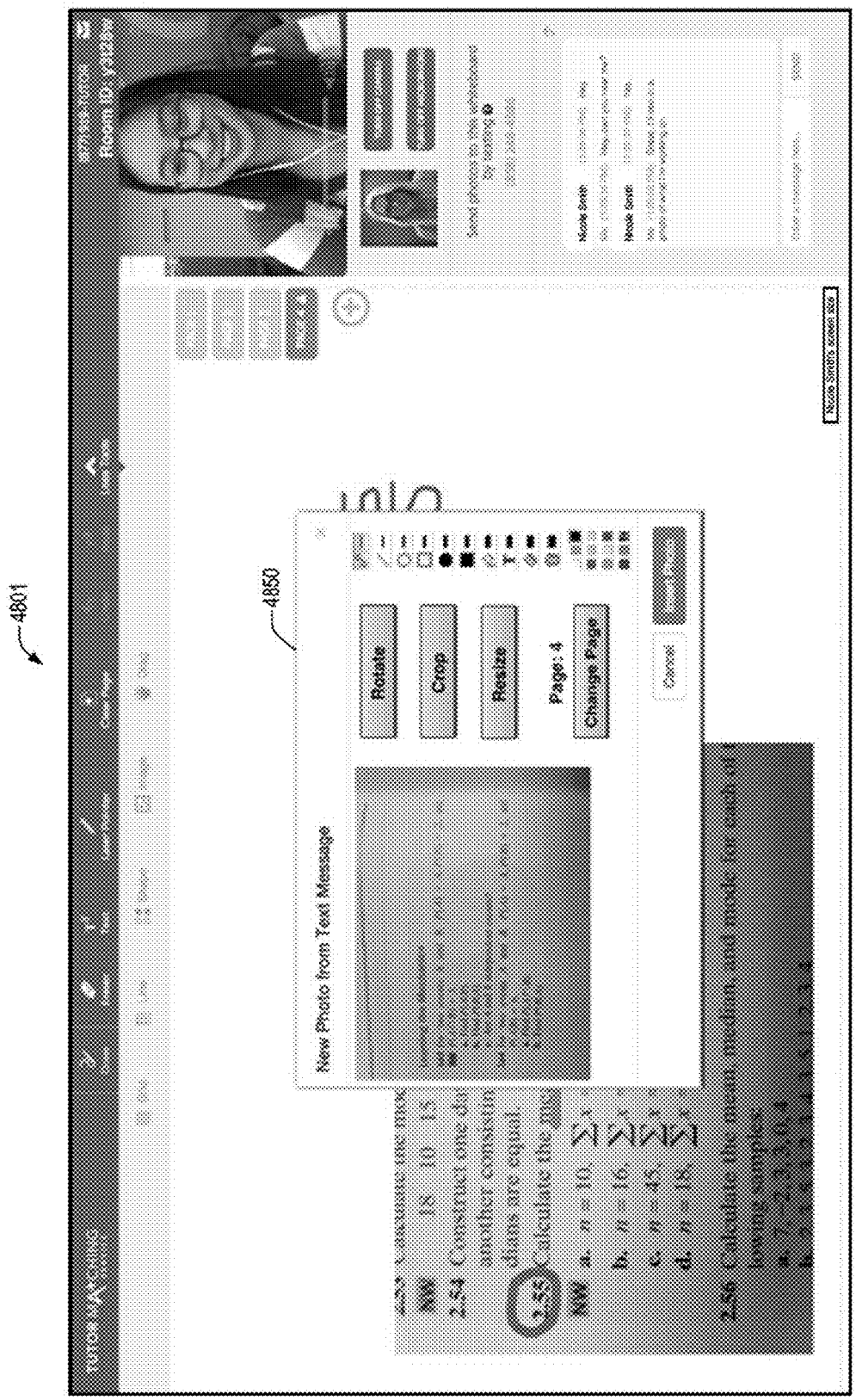

COLLABORATIVE TUTORIAL SESSION_7_OVERLAY GUI BEFORE INSERTION—As illustrated in the example screenshot GUI of FIG. 48:

As illustrated in the example embodiment of FIG. 48, the OSES Server may cause a Whiteboard Editor GUI 4850 to be displayed to the user, which provides the user with the ability to annotate and/or edit (e.g., rotate, crop, draw on, resize, apply filters, etc.) the received image/photo before it is inserted into an OCD Room.

In some embodiments, the user can annotate and/or edit the photo and save a copy of the edited photo/whiteboard canvas into a "Files" section of the OCD Room (e.g., saved for later insertion into one or more OCD Rooms).

In at least one embodiment, the displayed Whiteboard Editor GUI (and/or other displayed GUI) may be configured or designed to enable the user to initiate and/or perform other actions such as, for example, one or more of the following (or combinations thereof):
insert edited/annotated image;
insert original (non-edited) image;
undo image edits/annotations;
cancel insertion;
change the target OCD Room where the photo/image is to be inserted;
change the target page where the photo/image is to be inserted;
and/or other activities described and/or referenced herein.

In one embodiment, instead of directly inserting into the page, the OSES Server can show an Overlay GUI to the user that texted in the image.

Once the image is inserted into a page of the OCD Room, it may be viewable to other participants of the OCD Room.

Figure 51:
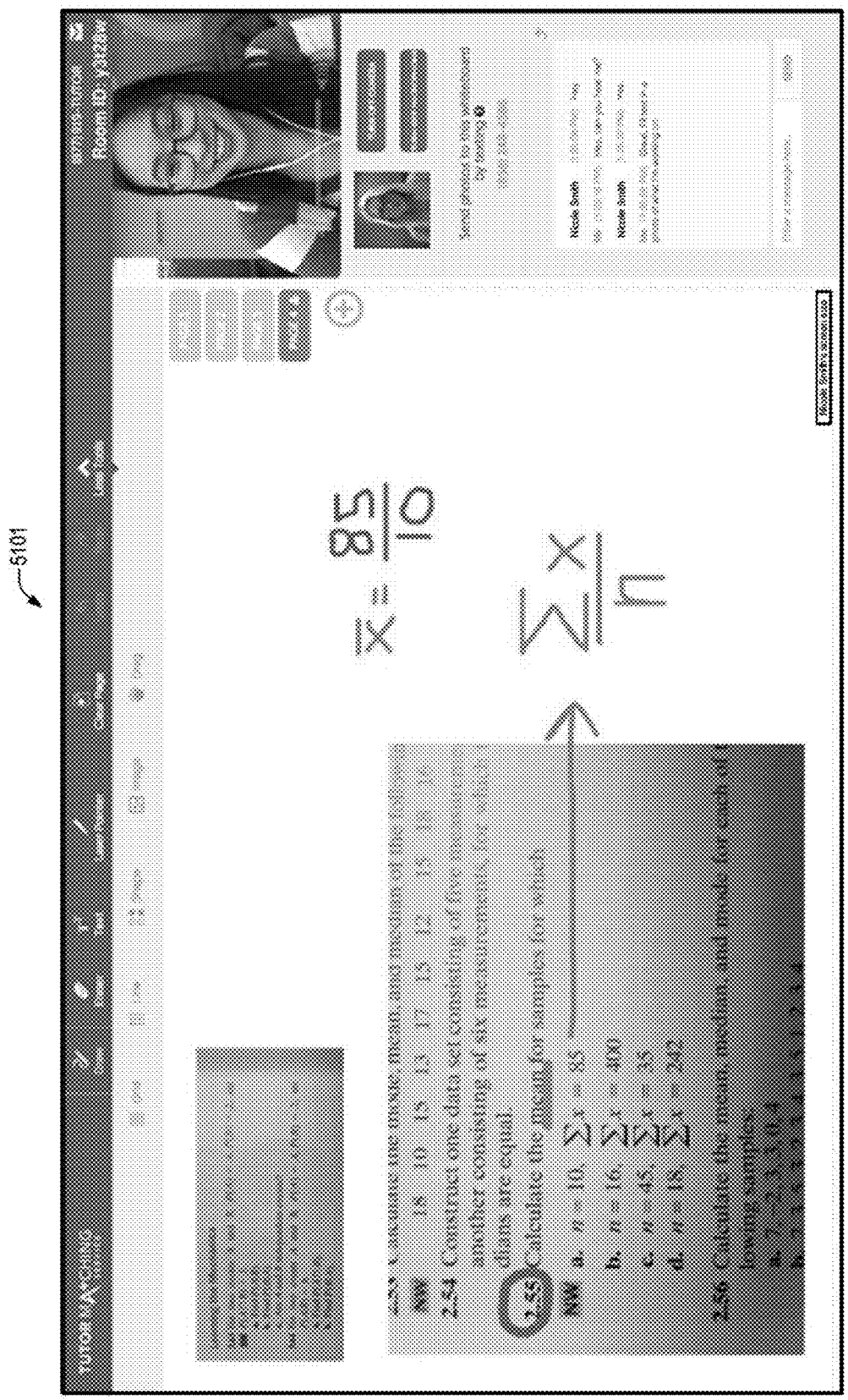

COLLABORATIVE TUTORIAL SESSION_9—As illustrated in the example screenshot GUI of FIG. 51:

As illustrated in the example embodiment of FIG. 51, multiple different images may be added (e.g., via Message-to-Post) to the same page, or to different pages of an OCD Room by the same and/or different users.

Additionally, in at least some embodiments, the user may use the image editor/annotation tools (e.g., from Whiteboard Editor GUI) to crop the image before inserting the image into the tutorial whiteboard canvas.

Email-to-Post Functionality Implemented in OCD Environments

Currently, it is significantly cumbersome for a user to cause a picture taken with the user's phone to be posted, via email, to an online discussion board or other collaborative online discussion medium which the user is concurrently participating in via the user's computer system. For example, using conventional techniques, such a process may require at least the following steps:
1) User takes the picture with her phone
2) User opens the email app on her phone
3) User attaches and may email the image to her own email address
4) User opens her email on her desktop/laptop computer
5) User finds the email from herself with the attached image
6) User downloads the image to her desktop
7) User goes back to her current discussion board, whiteboard, etc.
8) User clicks the upload image icon
9) User finds the saved image on her desktop and click upload However, using the Message-to-Post (e.g., Email-to-Post) techniques described herein, this process may be significantly simplified, and made to be more user-friendly/accessible. For example, in one embodiment, using the Email-to-Post techniques described herein, a user may cause a picture taken with the user's phone to be posted to an online discussion board (e.g., which the user is concurrently participating in via the user's computer) by simply performing the following steps:
1. Take the picture with her phone
2. Email the image to a designated email address (e.g. images@algebranation.com) which has been specifically set up to receive emailed images, and to post the received images into an appropriate collaborative online discussion medium.

According to various embodiments, different images, videos, documents, and/or other types of content may be remotely sent (e.g., from one or more user mobile devices) via email to a backend system (e.g., OSES Server) for posting/insertion into an appropriate collaborative online discussion medium (e.g., discussion thread, chat room, webinar, etc.).

In at least one embodiment, backend server (e.g., OSES Server, OCD Server, etc.) may automatically and/or dynamically process the received email message and associated image, identify the user (who sent the image) and target destination (of where the received image is to be posted/inserted), and automatically take appropriate action (e.g., on the backend) to cause the emailed image to be posted/inserted at the on the appropriate target destination, which, for example, may be a discussion wall thread, a whiteboard, an OCD Room, or other collaborative online discussion medium.

According to different embodiments, various different criteria may be used to automatically identify the user (who sent the image) and/or to identify the target destination (of where the received image is to be posted/inserted). Examples of such criteria may include, but are not limited to, one or more of the following (or combinations thereof):
the recipient email address;
the sender's email address;
IP address of the sender;
signature line of the email;
and/or other identification criteria described and/or referenced herein In one embodiment, a user can provide captioning information (e.g., comment, question, etc.) in the email subject line of the email associated with the image to be posted. In some embodiments, such captioning information may be included in the body of the email. Such captioning information may then be posted along with the received image to the identified target collaborative online discussion medium. In some embodiments, a user may provide other (e.g., pre-designated) instructions in the email subject line (e.g. new post, wall, edit, whiteboard, etc.), which the OSES Server (or other backed server) may interpret and process accordingly.

When the email message (e.g., with image attachment) is received at the backend server, the backend server may analyze and parse the email message in order to identify and/or determine where and how the image is to be posted, and what text (if any) should accompany the posted image. In this way, the server may not only determine where to post the image to the correct discussion board, whiteboard, OCD Room, etc., but may also determine how to post the image such as, for example:
post directly to a current discussion,
start a new discussion,
open in a new or existing whiteboard for a user to edit prior to posting,
etc.

FIGS. 77-85 illustrate example screenshots of various GUIs which may be used for facilitating activities relating to Email-to-Post functionality implemented in different types OCD Environments. In the example screenshots of FIGS. 77-85, it is assumed that a user is utilizing a smartphone to perform the various Email-to-Post communications illustrated and described. However, it will be appreciated that in other embodiments, a user may utilize a tablet (e.g., such as an iPad) or personal computer to perform the various Email-to-Post communications illustrated and described herein. Additionally, although the illustrative examples of FIGS. 77-85 are described with respect to Email-to-Post functionality implemented in different types OCD Environments, it will be appreciated such descriptions are not limited only to OCD Environments, and that that similar Email-to-Post functionality (as described herein) may also be applied to other collaborative online discussion environments such as, for example, OSES Environments and/or other collaborative online discussion mediums described and/or referenced herein.

Figure 77:
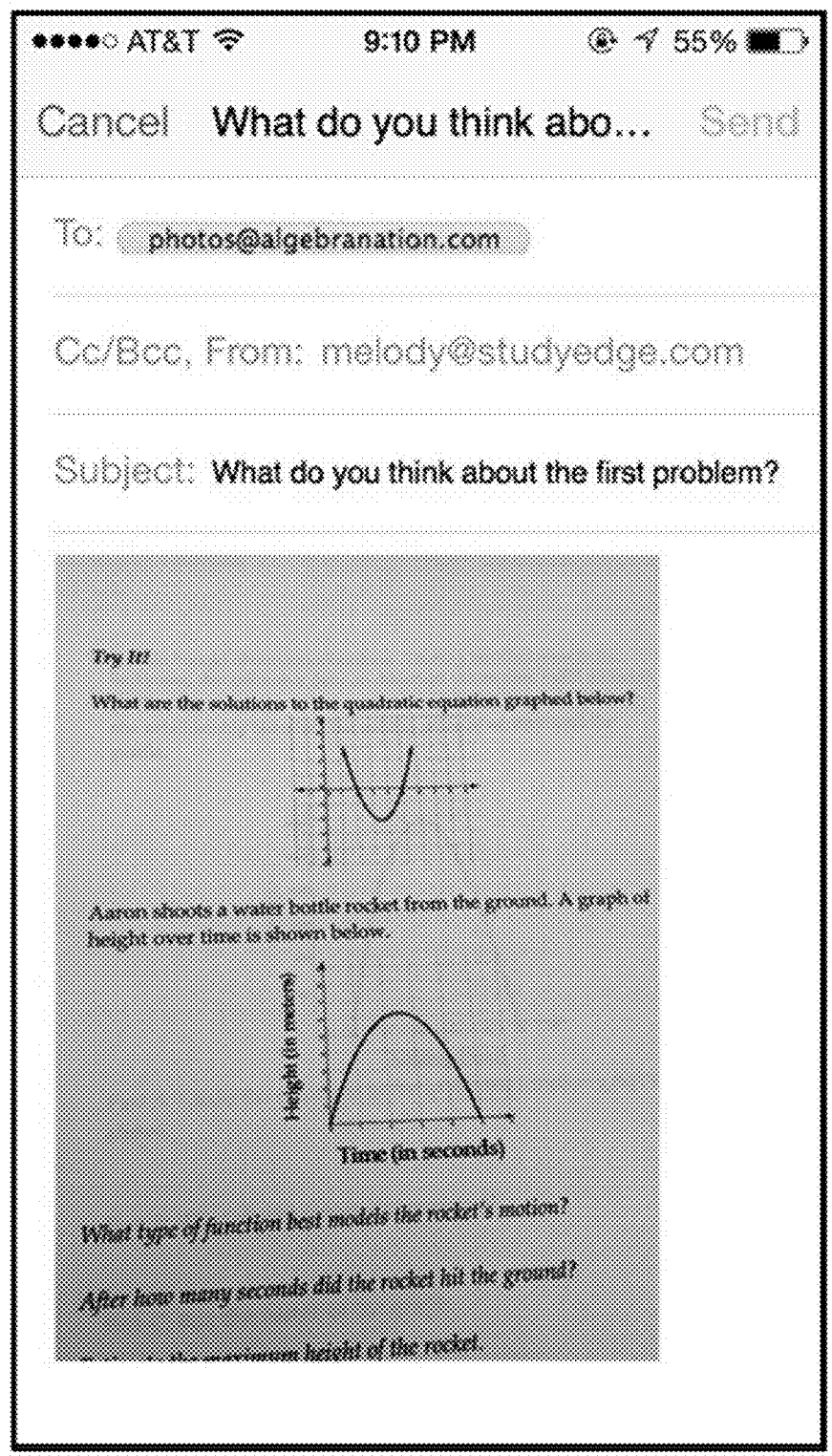

EMAIL TO POST 1—As illustrated in the example screenshot GUI of FIG. 77:

FIG. 77 shows an example screenshot illustrating how the Email-to-Post email's subject line may be used as the caption or text annotation to be posted in association with the image which is to be posted in a designated online tutorial/whiteboard room (e.g., associated with the user who sent the Email-to-Post email).

In this example, it is assumed that a user captures an image (e.g., using a PC camera, via scanner, via user's smartphone, via digital camera, etc.), and creates an email message which includes the captured image (e.g., as an attachment, or inserted into the body of the email), and which is addressed to a designated Email-to-Post email address (e.g. images@algebranation.com). In one embodiment, the user may email the image directly from a smartphone to the designated Email-to-Post email address.

On the backend, the OCD system recognizes incoming email address as belonging to existing user, verifies that the user is signed in, identifies the user's recent activities (e.g., which discussion threads the user has recently viewed/interacted with, last post location, etc.) in the Online Social Education System (e.g., discussion forum, Interactive Study Wall, OCD Room, etc.), and determines a selected location (e.g., discussion thread/OCD Room page, etc.) to post the received image. In at least one embodiment, at least a portion of these automated backend Email-to-Post procedures are similar to those described previously with respect to MMS-to-post (Message-to-Post) backend matching procedures.

In this embodiment, the subject line content (e.g., "What do you think about the first problem?") is used by the OCD server as the captioning for the image. According to different embodiments, the subject line may be optional or required.

If user's email address is not detected in system, email reply may be sent to originating address with information on how to link email account with account so user can engage in Email-to-Post operations.

If user is not signed into account, email reply is sent to originating address with prompt for user to log-in/sign-in.

Figure 78:
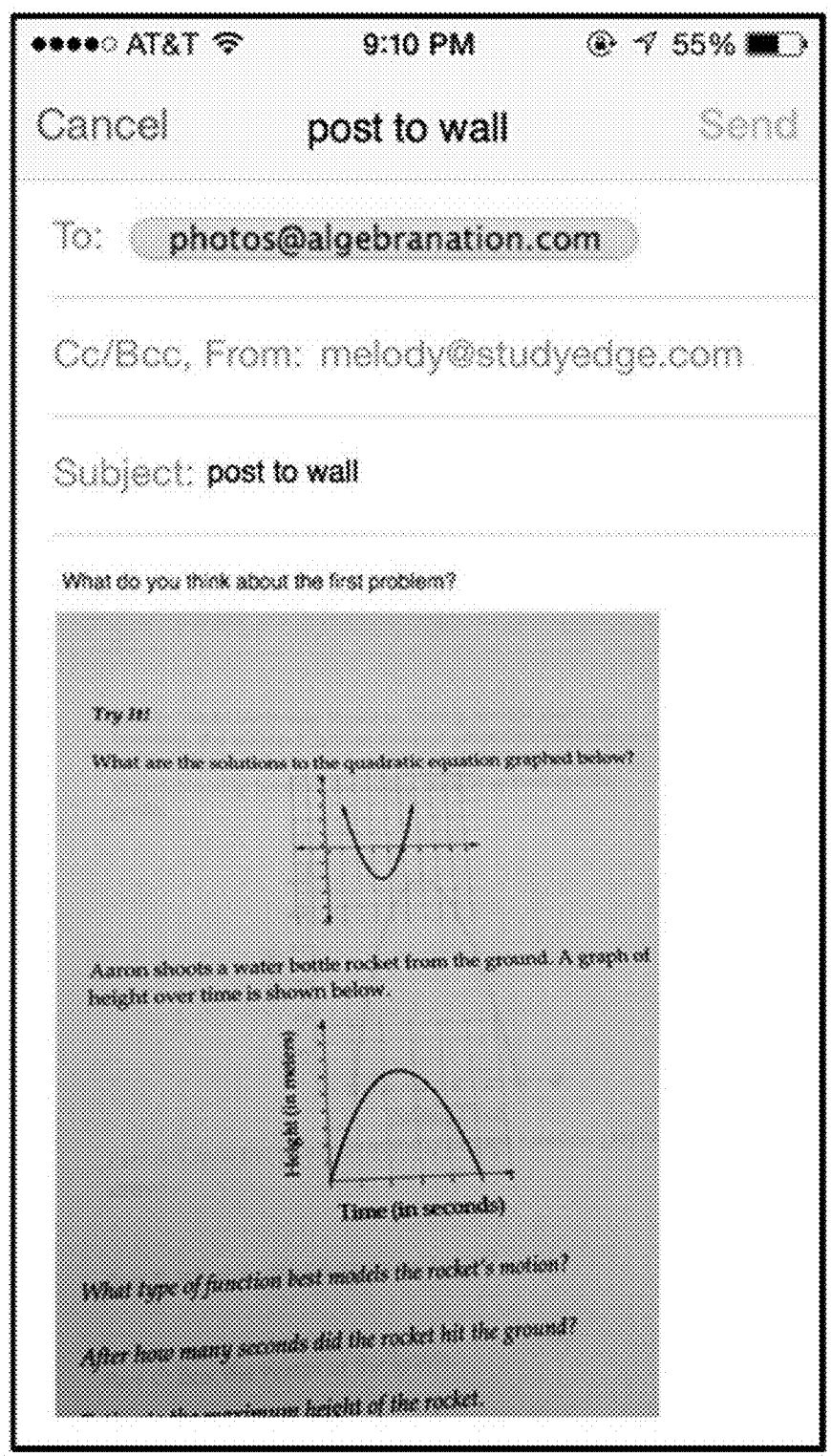

EMAIL TO POST 2—As illustrated in the example screenshot GUI of FIG. 78:

In this example, it is assumed that a user's smartphone captures an image, and creates an email message which includes the captured image (e.g., as an attachment, or inserted into the body of the email), and which is addressed to a designated Email-to-Post email address (e.g. images@algebranation.com).

On the backend, the OCD system recognizes sender's email address as belonging to existing user, verifies that the user is signed in, identifies the user's recent activities (e.g., which discussion threads the user has recently viewed/interacted with, last post location, etc.) in the Online Social Education System (e.g., discussion forum, Interactive Study Wall, OCD Room, etc.), and determines a selected location (e.g., discussion thread/OCD Room page, etc.) to post the received image. In at least one embodiment, at least a portion of these automated backend Email-to-Post procedures are similar to those described previously with respect to MMS-to-post (Message-to-Post) backend matching procedures.

In this embodiment, the subject line includes user instructions "post to wall." This phrase (or any phrase or permutation of phrasing) indicates that user desires the image to be posted to current discussion board (e.g., the discussion board/thread that the user is currently engaging with (or has most recently engaged with). The subject line user instructions are identified and interpreted by the OCD server, and executed. In this example, the OCD server will post the image to the appropriate discussion board/thread.

In the specific example embodiment of FIG. 78, the user may include image caption information (e.g., text to accompany the posting of the image such as "What do you think about the first problem?") in the body of the Email-to-Post email message, which may be used by the OCD server as the captioning for the image, or as a comment to be posted in association with the posting of the image.

According to different embodiments, this subject line instruction can be optional or required.

Figure 79:
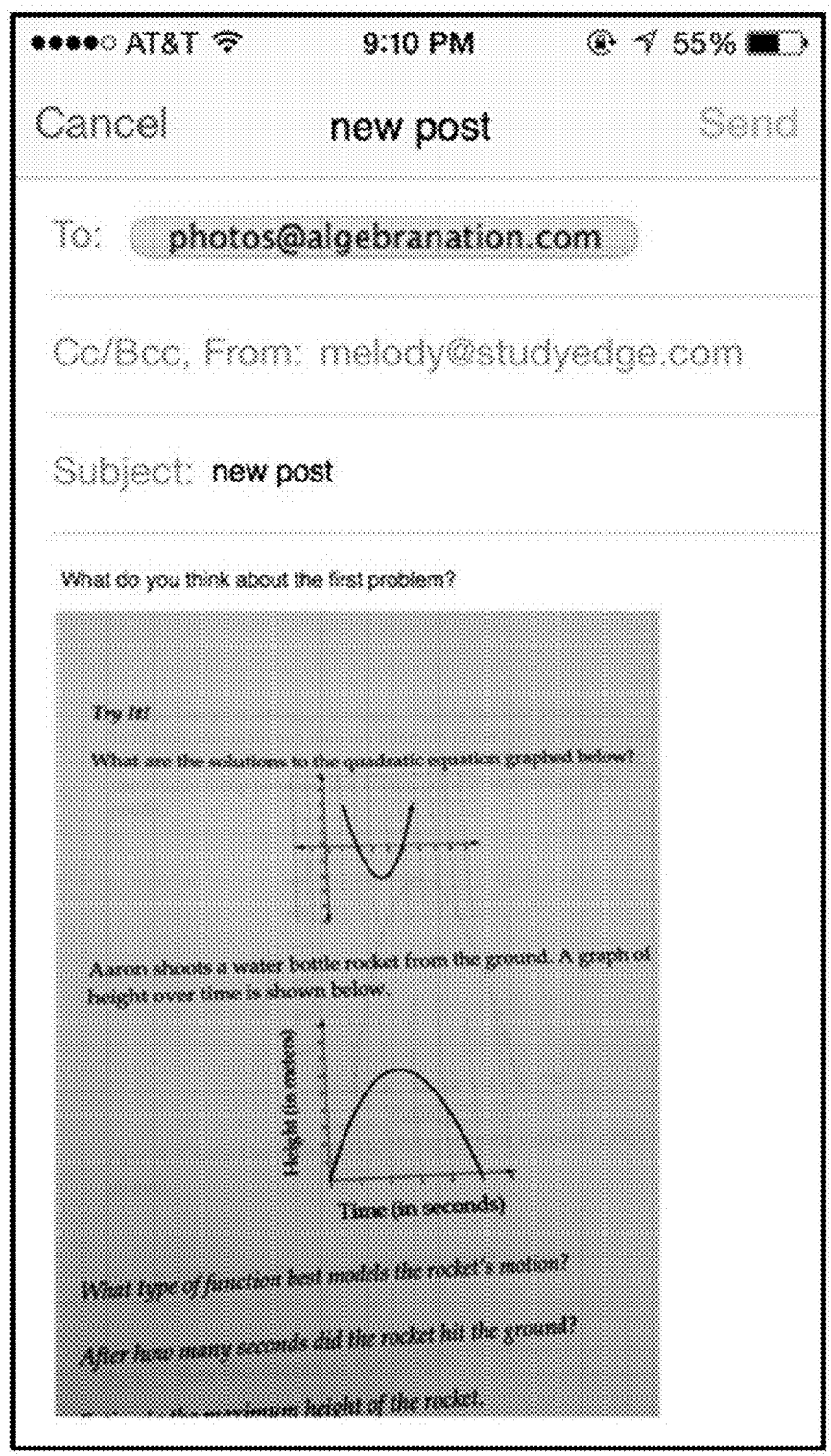

EMAIL TO POST 3—As illustrated in the example screenshot GUI of FIG. 79:

In this example, it is assumed that a user's smartphone captures an image, and creates an email message which includes the captured image (e.g., as an attachment, or inserted into the body of the email), and which is addressed to a designated Email-to-Post email address (e.g. images@algebranation.com). In one embodiment, the user may email the image directly from a smartphone to the designated Email-to-Post email address.

On the backend, the OCD system recognizes sender's email address as belonging to existing user, verifies that the user is signed in, identifies the user's recent activities (e.g., which discussion threads the user has recently viewed/interacted with, last post location, etc.) in the Online Social Education System (e.g., discussion forum, Interactive Study Wall, OCD Room, etc.), and determines a selected location (e.g., discussion thread/OCD Room page, etc.) to post the received image. In at least one embodiment, at least a portion of these automated backend Email-to-Post procedures are similar to those described previously with respect to MMS-to-post (Message-to-Post) backend matching procedures.

In this embodiment, the subject line includes user instructions "new post." This phrase (or any phrase or permutation of phrasing) indicates that user wants the image to begin a new post on current discussion board (e.g., the discussion board that the user is currently engaging with (or has most recently engaged with). The subject line user instructions are identified and interpreted by the OCD server, and executed.

In the specific example embodiment of FIG. 78, the user may include image caption information (e.g., text to accompany the posting of the image such as "What do you think about the first problem?") in the body of the Email-to-Post email message, which may be used by the OCD server as the captioning for the image, or as a comment to be posted in association with the posting of the image.

In this example, the OCD server will post the image as a new post to the appropriate discussion board, along with the identified captioning/comment text.

Figure 80:
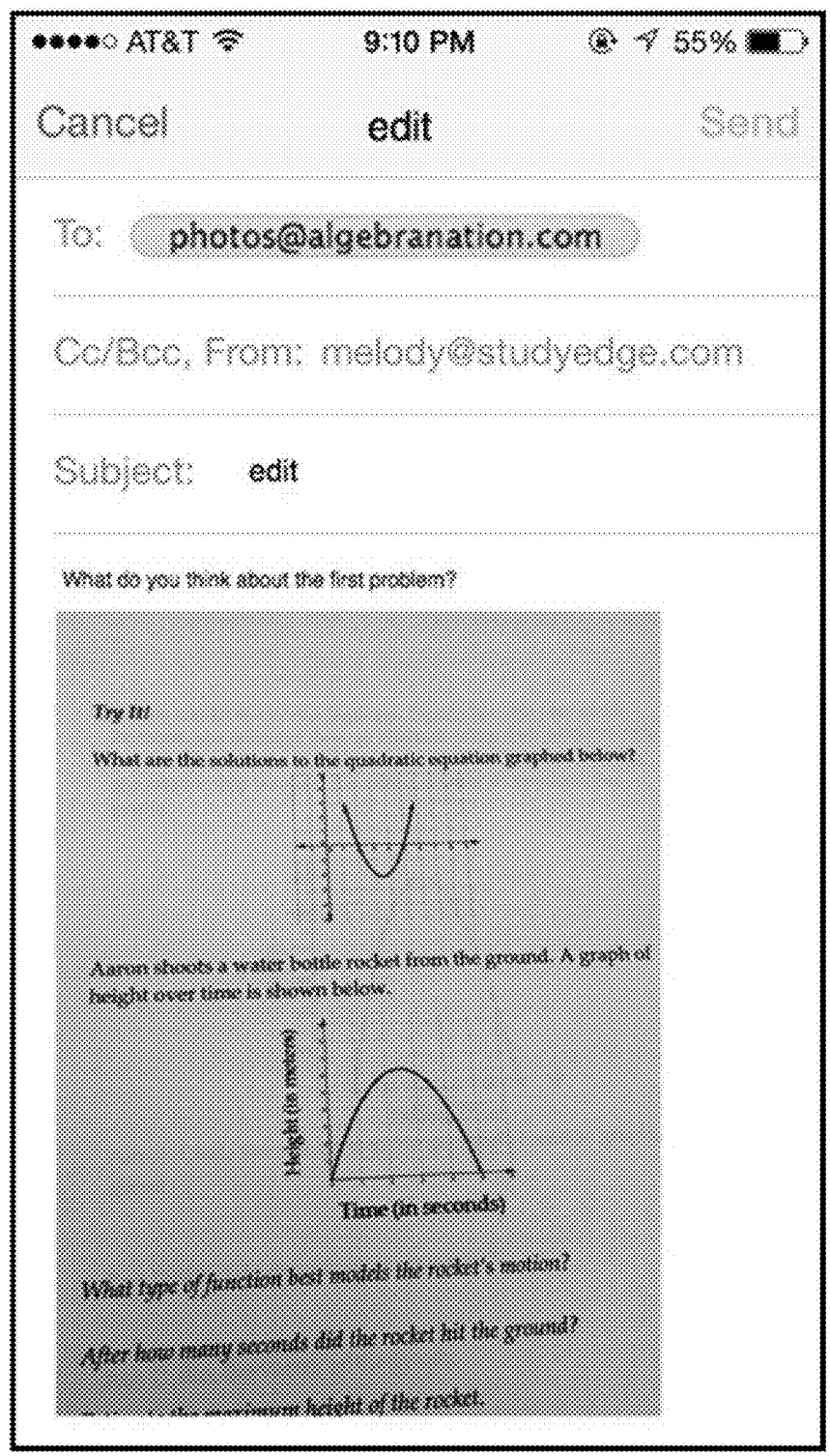

EMAIL TO POST 4—As illustrated in the example screenshot GUI of FIG. 80:

In this example, it is assumed that a user's smartphone captures an image, and creates an email message which includes the captured image (e.g., as an attachment, or inserted into the body of the email), and which is addressed to a designated Email-to-Post email address (e.g. images@algebranation.com). In one embodiment, the user may email the image directly from a smartphone to the designated Email-to-Post email address.

On the backend, the OCD system recognizes sender's email address as belonging to existing user, verifies that the user is signed in, identifies the user's recent activities (e.g., which discussion threads the user has recently viewed/interacted with, last post location, etc.) in the Online Social Education System (e.g., discussion forum, Interactive Study Wall, OCD Room, etc.), and determines a selected location (e.g., discussion thread/ OCD Room page, etc.) to post the received image. In at least one embodiment, at least a portion of these automated backend Email-to-Post procedures are similar to those described previously with respect to MMS-to-post (Message-to-Post) backend matching procedures.

In this embodiment, the subject line includes user instructions "edit." This phrase (or any phrase or permutation of phrasing) indicates that user wants the image to be loaded in a Whiteboard GUI so that user can edit the image, draw, annotate, and/or make notes on the image before posting on discussion board. The subject line user instructions are identified and interpreted by the OCD server, and executed.

In the specific example embodiment of FIG. 80, the user may include image caption information (e.g., text to accompany the posting of the image such as "What do you think about the first problem?") in the body of the Email-to-Post email message, which may be used by the OCD server as the captioning for the image, or as a comment to be posted in association with the posting of the image.

In this example, the OCD server will load the image to be loaded in a Whiteboard GUI so that user can edit the image, draw, annotate, and/or make notes on the image before posting on discussion board. After user editing/ annotation is completed, image may be posted to the appropriate discussion board/thread along with the identified captioning/comment text.

Figure 81:
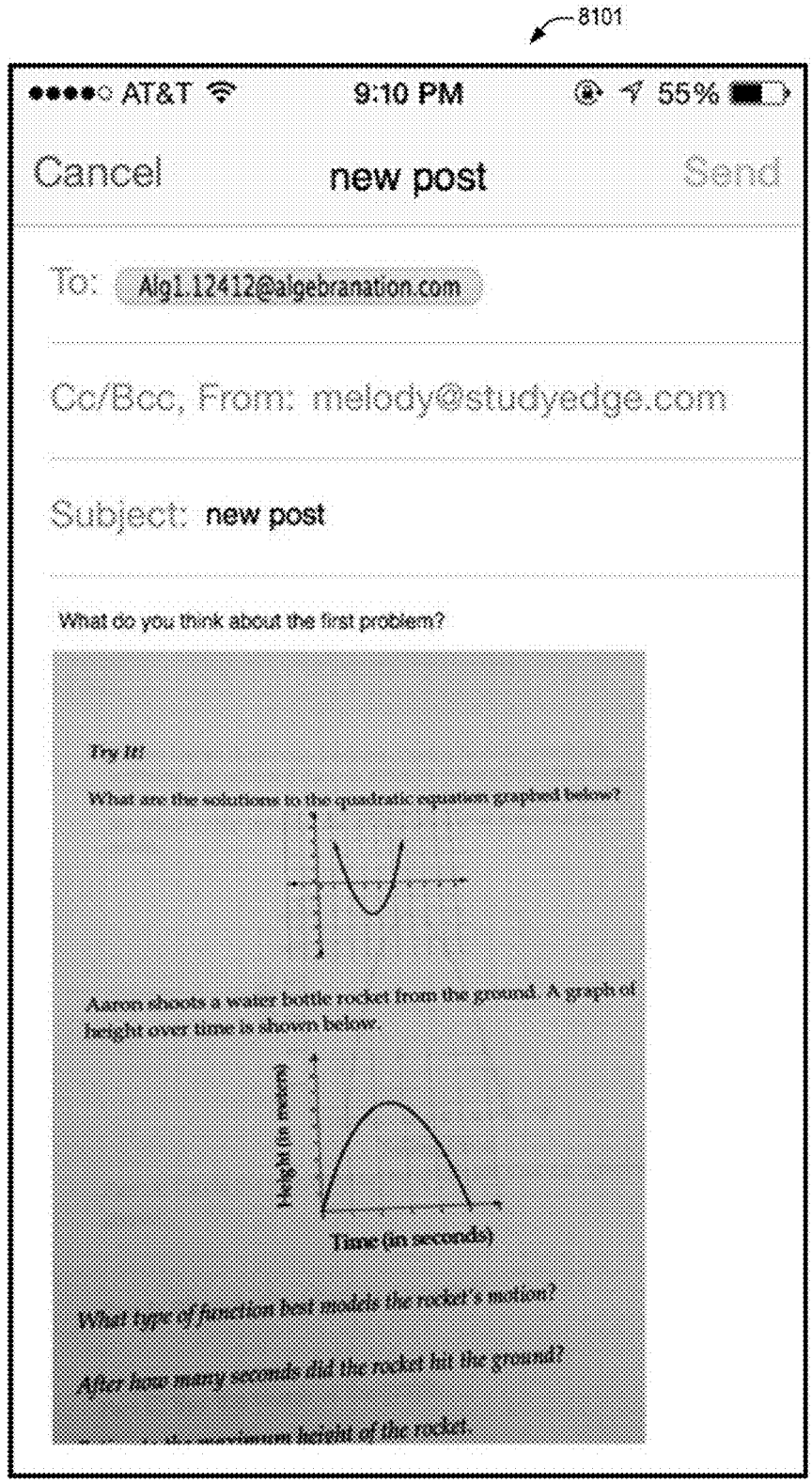

EMAIL TO POST 5—As illustrated in the example screenshot GUI of FIG. 81:

User can email image directly from smartphone to a specific email address (e.g., Alg1.12412@algebranation.com) that is unique to a given:

discussion wall,
discussion thread,
OCD Room,
user,
and/or other collaborative online discussion medium.

In one embodiment, the OSES Server may recognize the sender's email address as associated with a particular user wall and posts image under the name of the identified user.

In one embodiment, the OSES Server may recognize the recipient email address as associated with a particular discussion wall and posts image to identified discussion wall (e.g., under the name of the identified user).

Figure 82:
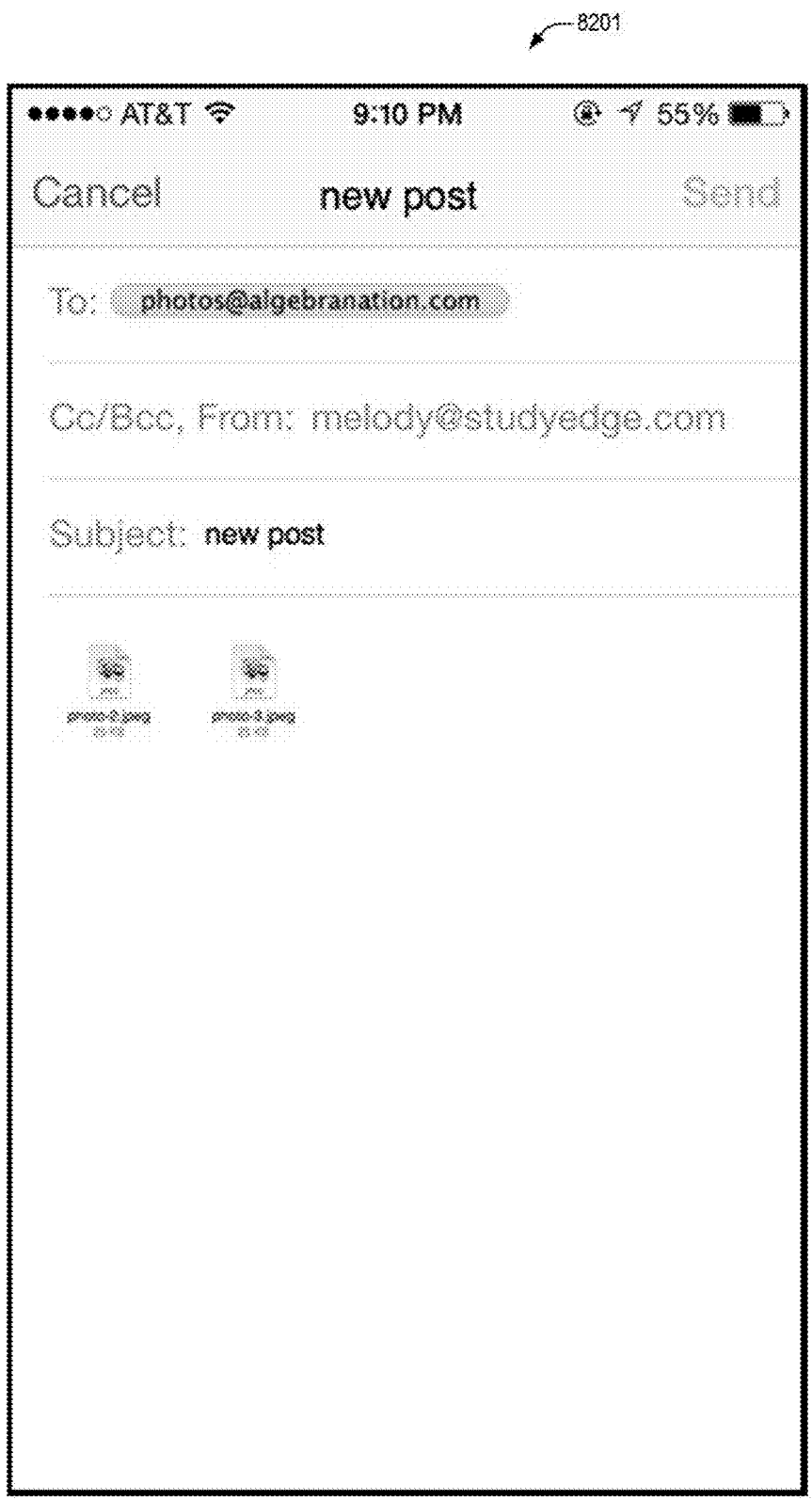

EMAIL TO POST 6—As illustrated in the example screenshot GUI of FIG. 82:

User may send more than 1 image using a single Email-to-Post email message

In one embodiment, all images attached to an Email-to-Post email may be added to a discussion wall and/or OCD Room.

In other embodiments, the OCD server may cause the emailed images will to pop up on the user's display, and user can select and provide instructions to the system regarding which images are to be posted, where one or more images are to be posted (e.g., which discussion board, thread, forum, page, etc.), and how one or more images are to be posted and/or otherwise handled (e.g., posted as new post, posted as reply to existing post, post to be edited/annotated in whiteboard before posting, etc.).

FIGS. 54-55, and 83-85 illustrate example screenshots of various GUIs which may be used for facilitating activities relating to Message-to-Post functionality implemented in online collaborative tutorial and/or whiteboard environments.

Figure 54:
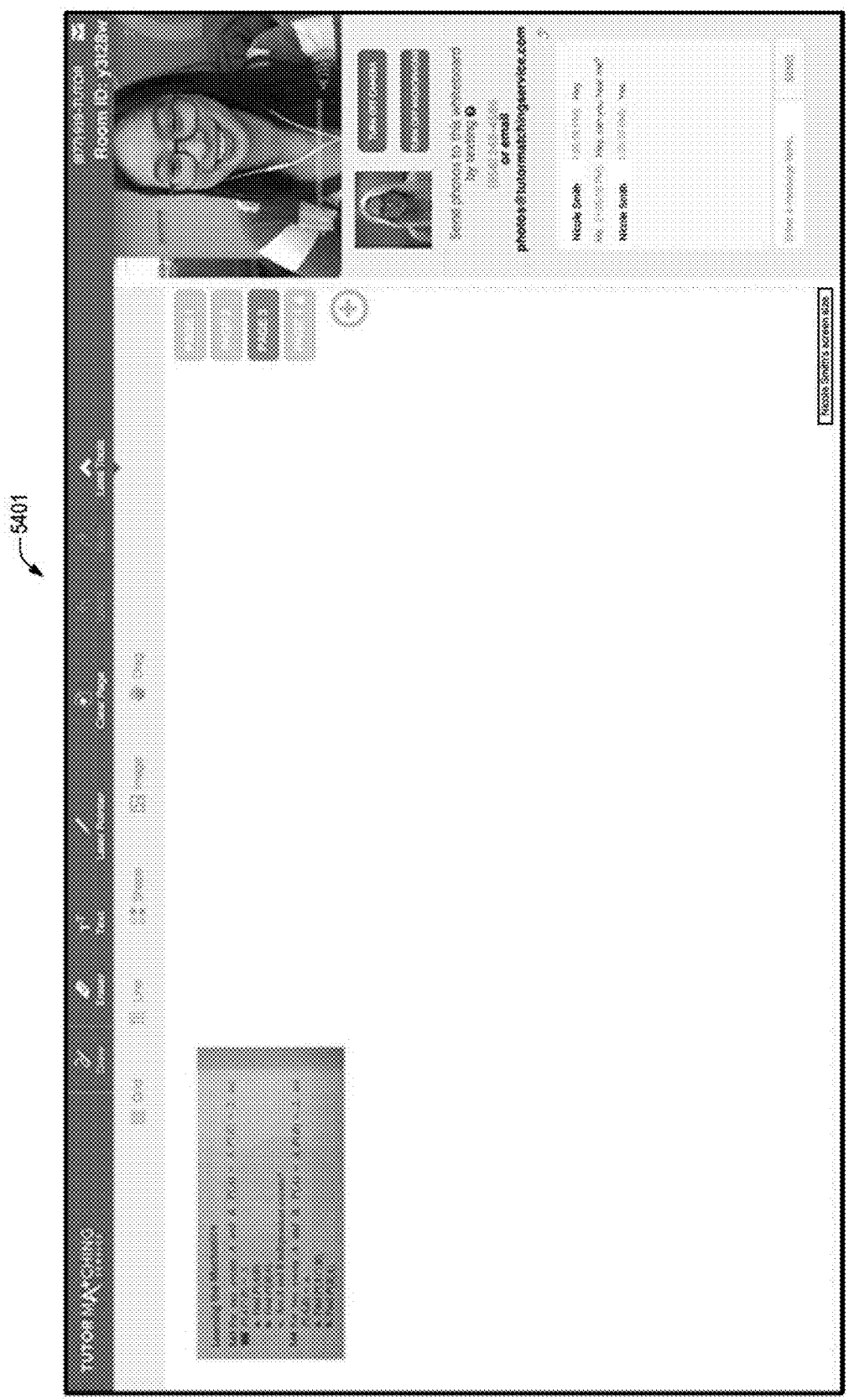

WB_10_WHITEBOARD_EMAIL—As illustrated in the example screenshot GUI of FIG. 54:

A user can email one or more images to an email address (e.g. photos@tutormatchingservice.com)

The OCD server determines the user based on the sender's email address, and the intended room and whiteboard page using a similar process as MMS-to-post (text-to-post)

In one embodiment, after the OCD server determines the intended whiteboard (and optionally page number), an overlay GUI may be shown in the whiteboard room allowing the user to annotate, edit, caption, resize, crop the image, etc. The user may also change the intended page number (e.g., page of online forum where image is to be posted) or cancel image insertion.

Figure 55:
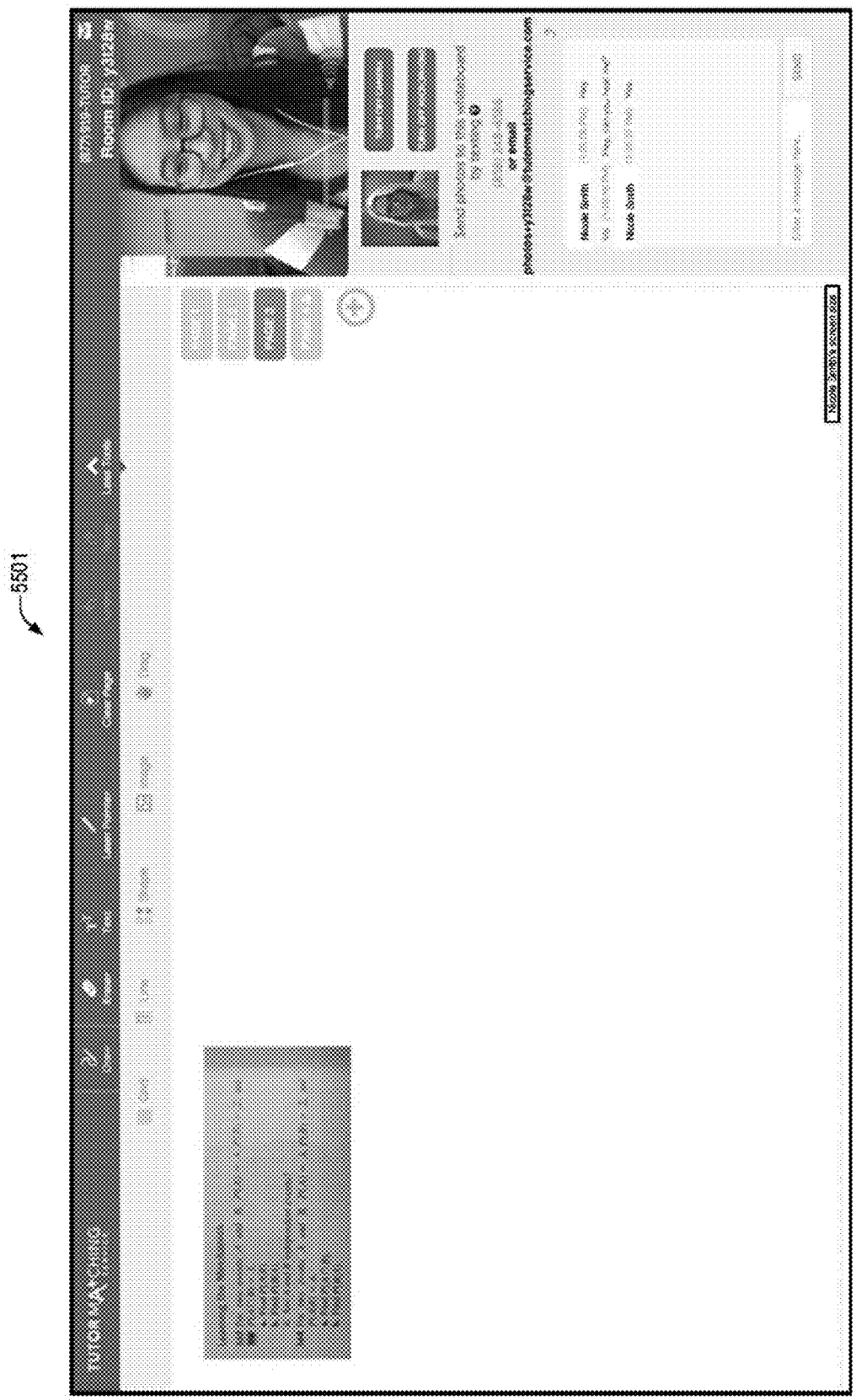

WB_11_WHITEBOARD_EMAIL—As illustrated in the example screenshot GUI of FIG. 55:

In this embodiment, the email address includes the whiteboard room ID (e.g., y3t28w) so the OCD server can easily determine the intended online tutorial room to post the image.

In another embodiment, the email address includes the whiteboard room ID and the viewer's user ID, so the OCD server can easily determine both intended online tutorial room to post the image and the ID user of the user who sent the Email-to-Post email.

In one embodiment, the displayed email address may be constructed as a "mailto:" URL. When clicked, this URL opens a new blank email to be composed, with the "To:" already filled. In one embodiment, the "Subject:" line is also filled with the whiteboard room ID and/or the current page number.

In one embodiment, if the sender's email address does not match a known user, then the OCD server sends a reply asking for the intended whiteboard room and page number. In one embodiment, the reply includes information about how to link the email address with a known account, or how to create a new account.

In another embodiment, the email address includes a cryptographic hash that includes the OCD Room ID and user ID. This hash is verified on the OCD server to prevent spamming.

Figure 83:
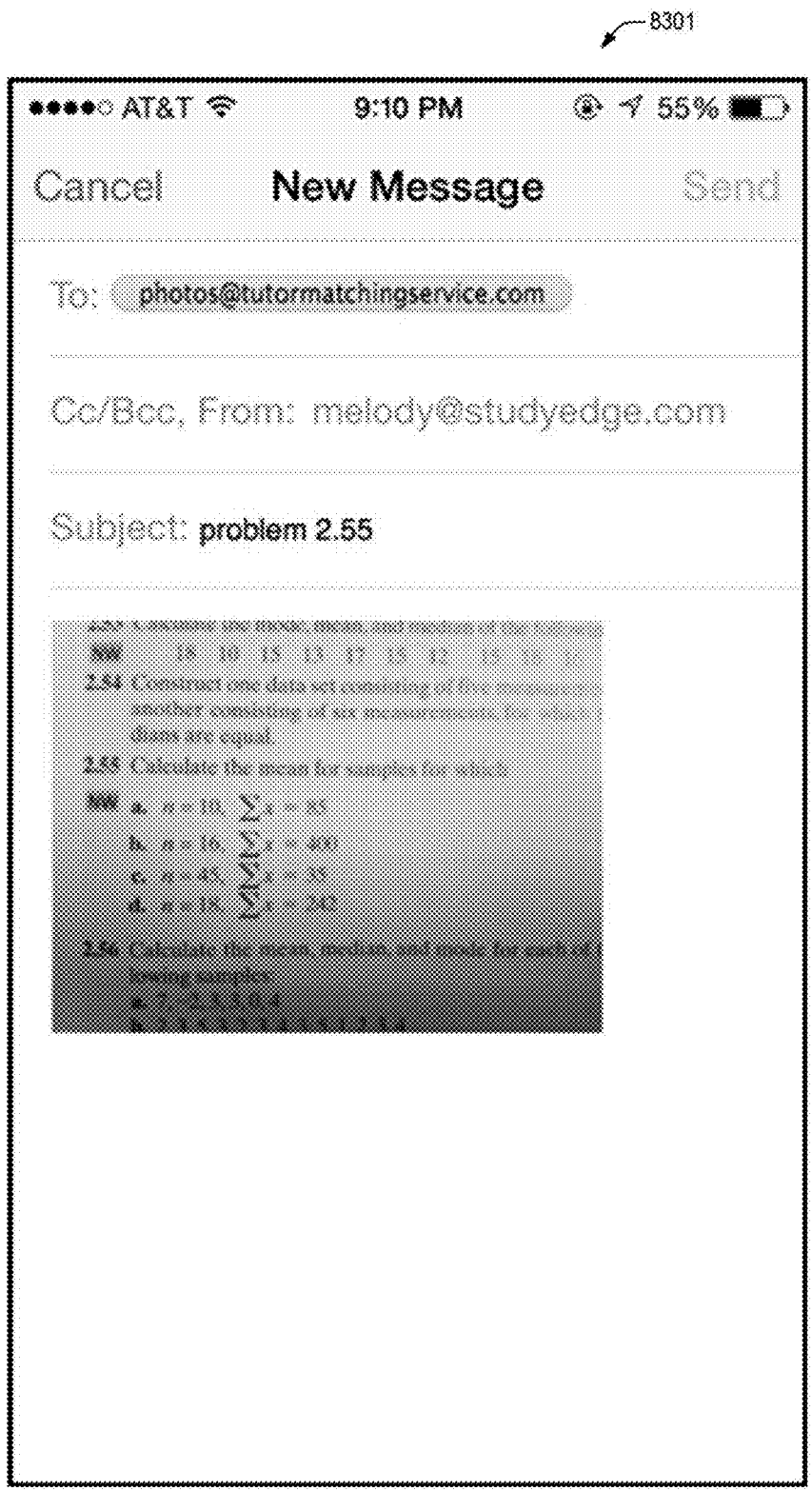

WB_12_EMAIL—As illustrated in the example screenshot GUI of FIG. 83:

This figure shows an example screenshot illustrating how the Email-to-Post email's subject line may be used as the caption or text annotation to be posted in association with the image which is to be posted in a designated online tutorial/whiteboard room (e.g., associated with the user who sent the Email-to-Post email).

Figure 84:
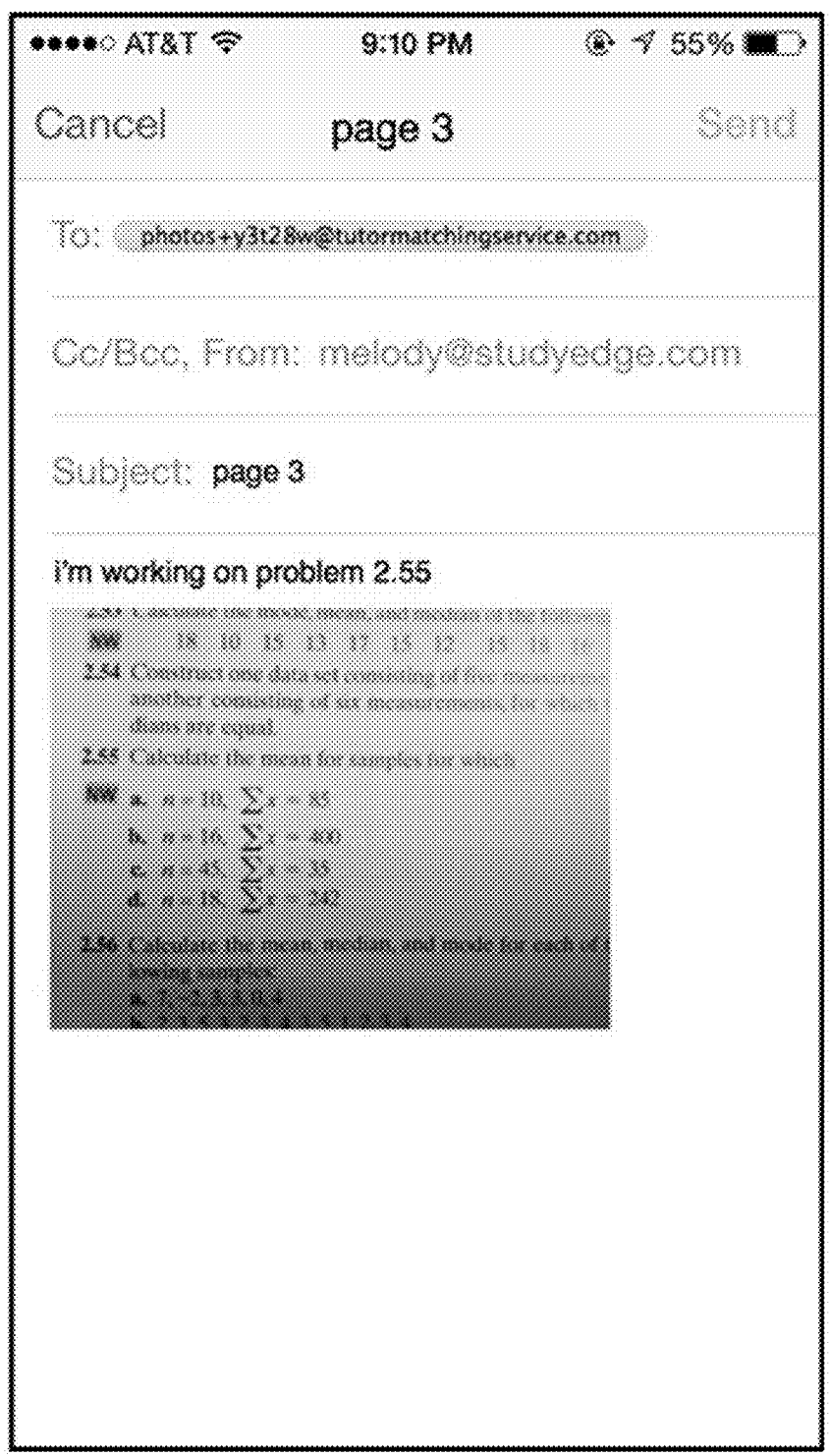

WB_13_EMAIL—As illustrated in the example screenshot GUI of FIG. 84:

In one embodiment, the Email-to-Post's email's subject line may indicate the intended page (e.g., page 3) to insert the image, and any text in the email's body (e.g., I'm working on problem 2.55) may be used as the image's caption or annotation to be posted in association with the posting of the image.

In this example, the OCD server may process the received Email-to-Post email and attached image, and post the image to page 3 of the online tutorial/whiteboard room associated with the user who sent the Email-to-Post email.

WB_14_EMAIL—As illustrated in the example screenshot GUI of FIG. 85:

In one embodiment, the email's subject line may indicate the intended tutorial/whiteboard room ID (e.g., y3t28w), and any text in the email's body (e.g., I'm working on problem 2.55) may be used as the image's caption or annotation to be posted in association with the posting of the image.

In this example, the OCD server may process the received Email-to-Post email and attached image, and post the image to the tutorial/whiteboard room corresponding to ID y3t28w.

Figure 2:
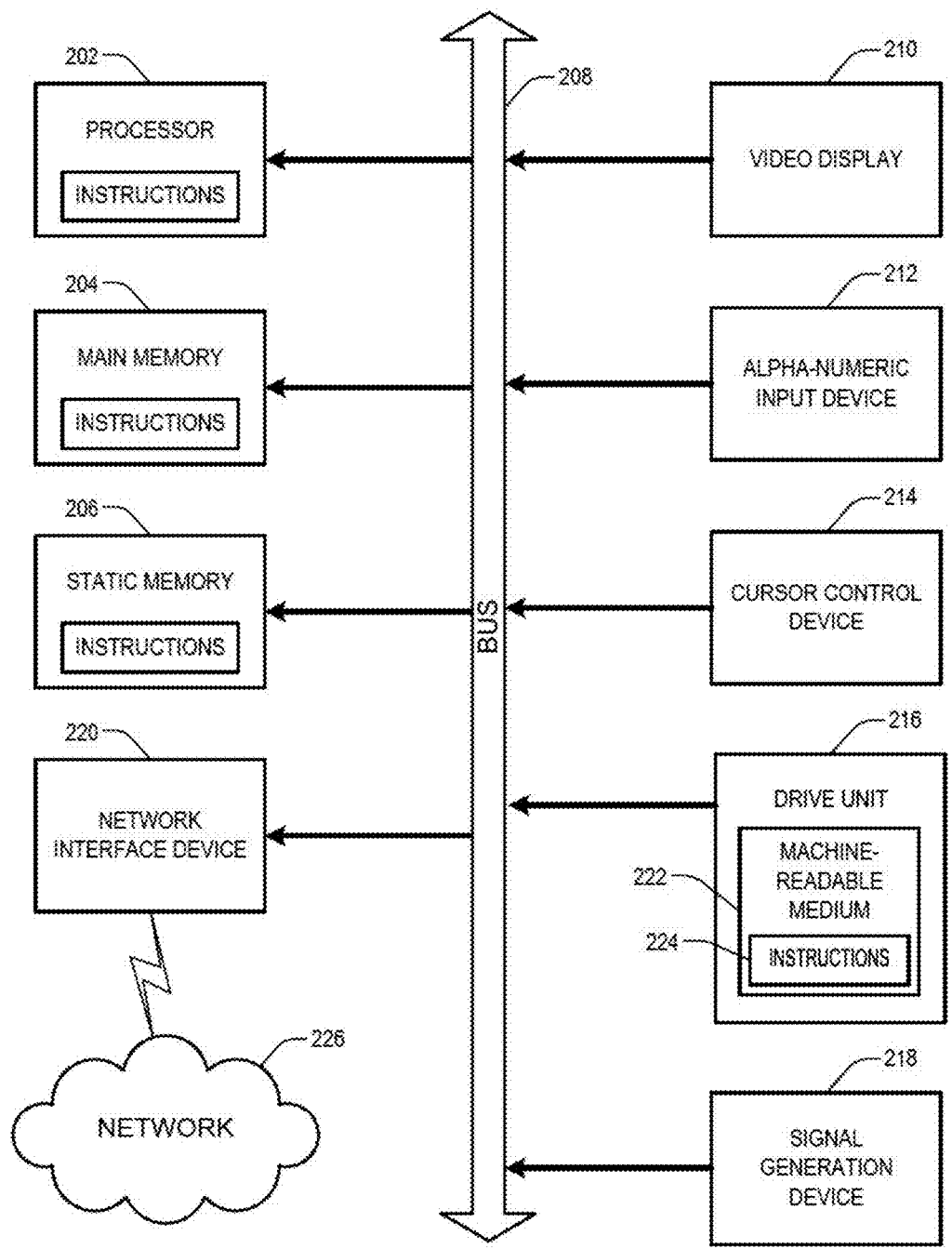
FIG. 2 shows a diagrammatic representation of machine in the exemplary form of a client (or end user) computer system.

FIG. 2 shows a diagrammatic representation of machine in the exemplary form of a client (or end user) computer system 200 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 200 includes a processor 202 (e.g., a central processing unit (CPU), a graphics processing unit (GPU) or both), a main memory 204 and a static memory 206, which communicate with each other via a bus 208. The computer system 200 may further include a video display unit 210 (e.g., a liquid crystal display (LCD) or a cathode ray tube (CRT)). The computer system 200 also includes an alphanumeric input device 212 (e.g., a keyboard), a user interface (UI) navigation device 214 (e.g., a mouse), a disk drive unit 216, a signal generation device 218 (e.g., a speaker) and a network interface device 220.

The disk drive unit 216 includes a machine-readable medium 222 on which is stored one or more sets of instructions and data structures (e.g., software 224) embodying or utilized by any one or more of the methodologies or functions described herein. The software 224 may also reside, completely or at least partially, within the main memory 204 and/or within the processor 202 during execution thereof by the computer system 200, the main memory 204 and the processor 202 also constituting machine-readable media.

The software 224 may further be transmitted or received over a network 226 via the network interface device 220 utilizing any one of a number of well-known transfer protocols (e. g., HTTP).

While the machine-readable medium 222 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. Although an embodiment of the present invention has been described with reference to specific exemplary embodiments, it may be evident that various modifications and changes may be made to these embodiments without departing from the broader spirit and scope of the invention. Accordingly, the specification and annotations/drawings are to be regarded in an illustrative rather than a restrictive sense.

According to various embodiments, Client Computer System 200 may include a variety of components, modules and/or systems for providing various types of functionality. For example, in at least one embodiment, Client Computer System 200 may include a web browser application which is operable to process, execute, and/or support the use of scripts (e.g., JavaScript, AJAX, etc.), Plug-ins, executable code, virtual machines, HTML5 vector-based web animation (e.g., Adobe Flash), etc.

In at least one embodiment, the web browser application may be configured or designed to instantiate components and/or objects at the Client Computer System in response to processing scripts, instructions, and/or other information received from a remote server such as a web server. Examples of such components and/or objects may include, but are not limited to, one or more of the following (or combinations thereof):

UI Components such as those illustrated, described, and/or referenced herein.

Database Components such as those illustrated, described, and/or referenced herein.

Processing Components such as those illustrated, described, and/or referenced herein.

Other Components which, for example, may include components for facilitating and/or enabling the Client Computer System to perform and/or initiate various types of Online Social Education operations, activities, functions such as those described herein.

Figure 3:
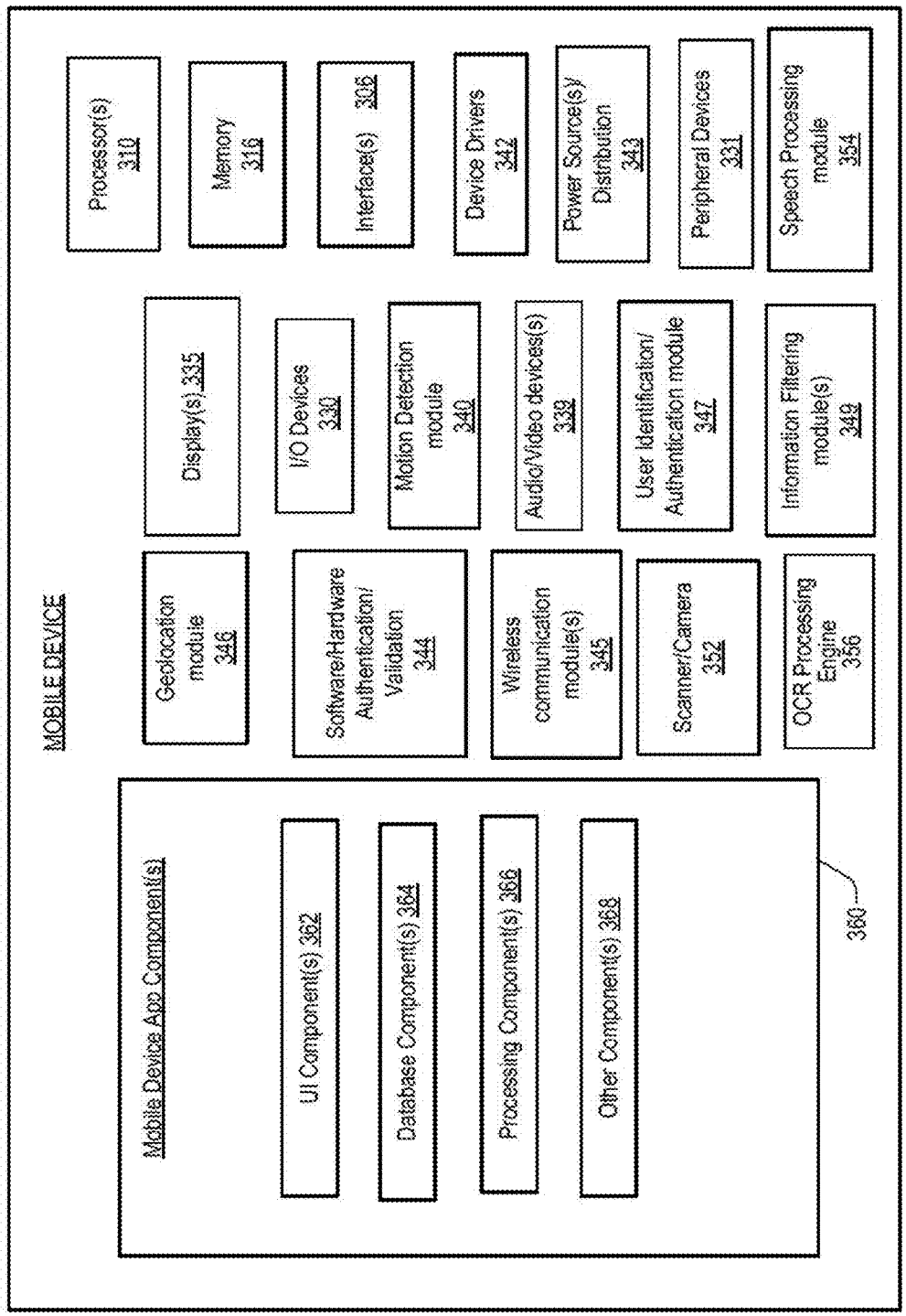
FIG. 3 is a simplified block diagram of an example client system in accordance with a specific embodiment.

FIG. 3 is a simplified block diagram of an example client system 300 in accordance with a specific embodiment. In at least one embodiment, the client system may include Online Social Education Mobile Device App Component(s) which have been configured or designed to provide functionality for enabling or implementing at least a portion of the various Online Social Education techniques at the client system.

According to specific embodiments, various aspects, features, and/or functionalities of the Mobile Device may be performed, implemented and/or initiated by one or more of the following types of systems, components, systems, devices, procedures, processes, etc. (or combinations thereof):

Processor(s) 310
Device Drivers 342
Memory 316
Interface(s) 306
Power Source(s)/Distribution 343
Geolocation module 346
Display(s) 335
I/O Devices 330
Audio/Video devices(s) 339
Peripheral Devices 331
Motion Detection module 340
User Identification/Authentication module 347
Mobile Device App Component(s) 360
UI Component(s) 362
Database Component(s) 364
Processing Component(s) 366
Software/Hardware Authentication/Validation 344
Wireless communication module(s) 345
Information Filtering module(s) 349
Speech Processing module 354
Scanner/Camera 352
OCR Processing Engine 356
etc.

As illustrated in the example of FIG. 3 Mobile Device 300 may include a variety of components, modules and/or systems for providing various functionality. For example, as illustrated in FIG. 3, Mobile Device 300 may include Mobile Device Application components (e.g., 360), which, for example, may include, but are not limited to, one or more of the following (or combinations thereof):

UI Components 362 such as those illustrated, described, and/or referenced herein.
Database Components 364 such as those illustrated, described, and/or referenced herein.
Processing Components 366 such as those illustrated, described, and/or referenced herein.
Other Components 368 which, for example, may include components for facilitating and/or enabling the Mobile Device to perform and/or initiate various types of Online Social Education operations, activities, functions such as those described herein.

In at least one embodiment, the Mobile Device Application component(s) may be operable to perform and/or implement various types of Online Social Education/Interactive Study Wall functions, operations, actions, and/or other features such as, for example, one or more of those described and/or referenced herein.

According to specific embodiments, multiple instances or threads of the Mobile Device Application component(s) may be concurrently implemented and/or initiated via the use of one or more processors and/or other combinations of hardware and/or hardware and software. For example, in at least some embodiments, various aspects, features, and/or functionalities of the Mobile Device Application component(s) may be performed, implemented and/or initiated by one or more systems, components, systems, devices, procedures, processes, etc. (or combinations thereof) described and/or referenced herein.

According to different embodiments, one or more different threads or instances of the Mobile Device Application component(s) may be initiated in response to detection of one or more conditions or events satisfying one or more different types of minimum threshold criteria for triggering initiation of at least one Online Social Education feature, action or operation of the Mobile Device Application component(s). Various examples of conditions or events which may trigger initiation and/or implementation of one or more different threads or instances of the Mobile Device Application component(s) may include, but are not limited to, one or more types of conditions and/or events described or referenced herein.

In at least one embodiment, a given instance of the Mobile Device Application component(s) may access and/or utilize information from one or more associated databases. In at least one embodiment, at least a portion of the database information may be accessed via communication with one or more local and/or remote memory devices. Examples of different types of data which may be accessed by the Mobile Device Application component(s) may include, but are not limited to, one or more different types of data, metadata, and/or other information described and/or referenced herein.

According to different embodiments, Mobile Device 300 may further include, but is not limited to, one or more of the following types of components, modules and/or systems (or combinations thereof):

At least one processor 310. In at least one embodiment, the processor(s) 310 may include one or more commonly known CPUs which are deployed in many of today's consumer electronic devices, such as, for example, CPUs or processors from the Motorola or Intel family of microprocessors, etc. In an alternative embodiment, at least one processor may be specially designed hardware for controlling the operations of the client system. In a specific embodiment, a memory (such as non-volatile RAM and/or ROM) also forms part of CPU. When acting under the control of appropriate software or firmware, the CPU may be responsible for implementing specific functions associated with the functions of a desired network device. The CPU preferably accomplishes all these functions under the control of software including an operating system, and any appropriate applications software.

Memory 316, which, for example, may include volatile memory (e.g., RAM), non-volatile memory (e.g., disk memory, FLASH memory, EPROMs, etc.), unalterable memory, and/or other types of memory. In at least one implementation, the memory 316 may include functionality similar to at least a portion of functionality implemented by one or more commonly known memory devices such as those described herein and/or generally known to one having ordinary skill in the art. According to different embodiments, one or more memories or memory modules (e.g., memory blocks) may be configured or designed to store data, program instructions for the functional operations of the client system and/or other information relating to the functionality of the various Online Social Education techniques described herein. The program instructions may control the operation of an operating system and/or one or more applications, for example. The memory or memories may also be configured to store data structures, metadata, timecode synchronization information, audio/visual media content, asset file information, keyword taxonomy information, advertisement information, and/or information/data relating to other features/functions described herein. Because such information and program instructions may be employed to implement at least a portion of the Online Social Education techniques described herein, various aspects described herein may be implemented using machine readable media that include program instructions, state information, etc. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Interface(s) 306 which, for example, may include wired interfaces and/or wireless interfaces. In at least one implementation, the interface(s) 306 may include functionality similar to at least a portion of functionality implemented by one or more computer system interfaces such as those described herein and/or generally known to one having ordinary skill in the art. For example, in at least one implementation, the wireless communication interface(s) may be configured or designed to communicate with selected electronic game tables, computer systems, remote servers, other wireless devices (e.g., PDAs, cell phones, player tracking transponders, etc.), etc. Such wireless communication may be implemented using one or more wireless interfaces/protocols such as, for example, 802.11 (WiFi), 802.15 (including Bluetooth™), 802.16 (Wi-Max), 802.22, Cellular standards such as CDMA, CDMA2000, WCDMA, Radio Frequency (e.g., RFID), Infrared, Near Field Magnetics, etc.

Device driver(s) 342. In at least one implementation, the device driver(s) 342 may include functionality similar to at least a portion of functionality implemented by one or more computer system driver devices such as those described herein and/or generally known to one having ordinary skill in the art.

At least one power source (and/or power distribution source) 343. In at least one implementation, the power source may include at least one mobile power source (e.g., battery) for allowing the client system to operate in a wireless and/or mobile environment. For example, in one implementation, the power source 343 may be implemented using a rechargeable, thin-film type battery. Further, in embodiments where it is desirable for the device to be flexible, the power source 343 may be designed to be flexible.

Geolocation module 346 which, for example, may be configured or designed to acquire geolocation information from remote sources and use the acquired geolocation information to determine information relating to a relative and/or absolute position of the client system.

Motion detection component 340 for detecting motion or movement of the client system and/or for detecting motion, movement, gestures and/or other input data from user. In at least one embodiment, the motion detection component 340 may include one or more motion detection sensors such as, for example, MEMS (Micro Electro Mechanical System) accelerometers, that can detect the acceleration and/or other movements of the client system as it is moved by a user.

User Identification/Authentication module 347. In one implementation, the User Identification module may be adapted to determine and/or authenticate the identity of the current user or owner of the client system. For example, in one embodiment, the current user may be required to perform a log in process at the client system in order to access one or more features. Alternatively, the client system may be adapted to automatically determine the identity of the current user based upon one or more external signals such as, for example, an RFID tag or badge worn by the current user which provides a wireless signal to the client system for determining the identity of the current user. In at least one implementation, various security features may be incorporated into the client system to prevent unauthorized users from accessing confidential or sensitive information.

One or more display(s) 335. According to various embodiments, such display(s) may be implemented using, for example, LCD display technology, OLED display technology, and/or other types of conventional display technology. In at least one implementation, display(s) 335 may be adapted to be flexible or bendable. Additionally, in at least one embodiment the information displayed on display(s) 335 may utilize e-ink technology (such as that available from E Ink Corporation, Cambridge, Mass.), or other suitable technology for reducing the power consumption of information displayed on the display(s) 335.

One or more user I/O Device(s) 330 such as, for example, keys, buttons, scroll wheels, cursors, touchscreen sensors, audio command interfaces, magnetic strip reader, optical scanner, etc.

Audio/Video device(s) 339 such as, for example, components for recording, editing, and/or displaying audio/visual media which, for example, may include cameras, speakers, microphones, media presentation components, wireless transmitter/receiver devices for enabling wireless audio and/or visual communication between the client system 300 and remote devices (e.g., radios, telephones, computer systems, etc.). For example, in one implementation, the audio system may include componentry for enabling the client system to function as a cell phone or two-way radio device.

Other types of peripheral devices 331 which may be useful to the users of various client systems, such as, for example: PDA functionality; memory card reader(s); fingerprint reader(s); image projection device(s); social networking peripheral component(s); etc.

Information filtering module(s) 349 which, for example, may be adapted to automatically and dynamically generate, using one or more filter parameters, filtered information to be displayed on one or more displays of the mobile device. In one implementation, such filter parameters may be customizable by the player or user of the device. In some embodiments, information filtering module(s) 349 may also be adapted to display, in real-time, filtered information to the user based upon a variety of criteria such as, for example, geolocation information, contextual activity information, and/or other types of filtering criteria described and/or referenced herein.

Wireless communication module(s) 345. In one implementation, the wireless communication module 345 may be configured or designed to communicate with external devices using one or more wireless interfaces/protocols such as, for example, 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetics, etc.

Software/Hardware Authentication/validation components 344 which, for example, may be used for authenticating and/or validating local hardware and/or software components, hardware/software components residing at a remote device, game play information, wager information, user information and/or identity, etc.

Scanner/Camera Component(s) (e.g., 352) which may be configured or designed for use in scanning identifiers and/or other content from other devices and/or objects such as for example: mobile device displays, computer displays, static displays (e.g., printed on tangible mediums), etc.

OCR Processing Engine (e.g., 356) which, for example, may be operable to perform image processing and optical character recognition of images such as those captured by a mobile device camera, for example.

Speech Processing module (e.g., 354) which, for example, may be operable to perform speech recognition, and may be operable to perform speech-to-text conversion.

Etc.

Figure 4:
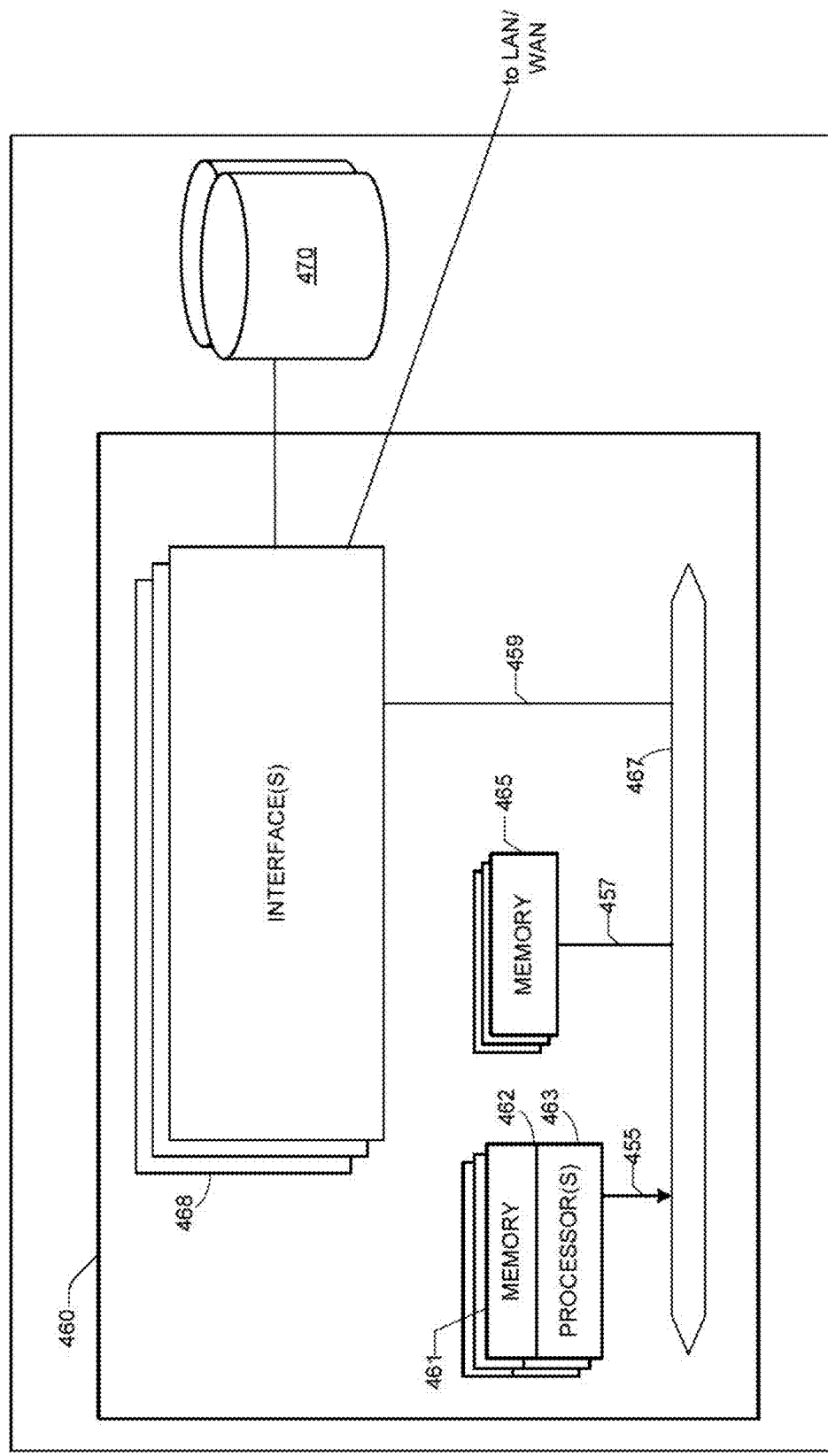
FIG. 4 illustrates an example embodiment of a server system which may be used for implementing various aspects/features described herein.

FIG. 4 illustrates an example embodiment of a server system 480 which may be used for implementing various aspects/features described herein. In at least one embodiment, the OCD server system 480 includes at least one network device 460, and at least one storage device 470 (such as, for example, a direct attached storage device). In one embodiment, server system 480 may be suitable for implementing at least some of the Online Social Education techniques described herein.

In according to one embodiment, network device 460 may include a master central processing unit (CPU) 462, interfaces 468, and a bus 467 (e.g., a PCI bus). When acting under the control of appropriate software or firmware, the CPU 462 may be responsible for implementing specific functions associated with the functions of a desired network device. For example, when configured as a server, the CPU 462 may be responsible for analyzing packets; encapsulating packets; forwarding packets to appropriate network devices; instantiating various types of virtual machines, virtual interfaces, virtual storage volumes, virtual appliances; etc. The CPU 462 preferably accomplishes at least a portion of these functions under the control of software including an operating system (e.g. Linux), and any appropriate system software (such as, for example, AppLogic™ software).

CPU 462 may include one or more processors 463 such as, for example, one or more processors from the AMD, Motorola, Intel and/or MIPS families of microprocessors. In an alternative embodiment, processor 463 may be specially designed hardware for controlling the operations of server system 480. In a specific embodiment, a memory 461 (such as non-volatile RAM and/or ROM) also forms part of CPU 462. However, there may be many different ways in which memory could be coupled to the OSES Server. Memory block 461 may be used for a variety of purposes such as, for example, caching and/or storing data, programming instructions, etc.

The interfaces 468 may be typically provided as interface cards (sometimes referred to as "line cards"). Alternatively, one or more of the interfaces 468 may be provided as on-board interface controllers built into the OSES Server motherboard. Generally, they control the sending and receiving of data packets over the network and sometimes support other peripherals used with the OCD server system 480. Among the interfaces that may be provided may be FC interfaces, Ethernet interfaces, frame relay interfaces, cable interfaces, DSL interfaces, token ring interfaces, Infiniband interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like. Other interfaces may include one or more wireless interfaces such as, for example, 802.11 (WiFi) interfaces, 802.15 interfaces (including Bluetooth™), 802.16 (WiMax) interfaces, 802.22 interfaces, Cellular standards such as CDMAn Interfaces, CDMA2000 interfaces, WCDMAn Interfaces, TDMAn Interfaces, Cellular 3G interfaces, etc.

Generally, one or more interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 462 to efficiently perform routing computations, network diagnostics, security functions, etc.

In at least one embodiment, some interfaces may be configured or designed to allow the OCD server system 480 to communicate with other network devices associated with various local area network (LANs) and/or wide area networks (WANs). Other interfaces may be configured or designed to allow network device 460 to communicate with one or more direct attached storage device(s) 470.

Although the OSES Server shown in FIG. 4 illustrates one specific network device described herein, it is by no means the only network device architecture on which one or more embodiments can be implemented. For example, an architecture having a single processor that handles communications as well as routing computations, etc. may be used. Further, other types of interfaces and media could also be used with the network device.

Regardless of network device's configuration, it may employ one or more memories or memory modules (such as, for example, memory block 465, which, for example, may include random access memory (RAM)) configured to store data, program instructions for the general-purpose network operations and/or other information relating to the functionality of the various Online Social Education techniques described herein. The program instructions may control the operation of an operating system and/or one or more applications, for example. The memory or memories may also be configured to store data structures, and/or other specific non-program information described herein.

Because such information and program instructions may be employed to implement the OSES Servers/methods described herein, one or more embodiments relates to machine readable media that include program instructions, state information, etc. for performing various operations described herein. Examples of machine-readable storage media include, but are not limited to, magnetic media such as hard disks, floppy disks, and magnetic tape; optical media such as CD-ROM disks; magneto-optical media such as floptical disks; and hardware devices that may be specially configured to store and perform program instructions, such as read-only memory devices (ROM) and random access memory (RAM). Some embodiments may also be embodied in transmission media such as, for example, a carrier wave travelling over an appropriate medium such as airwaves, optical lines, electric lines, etc. Examples of program instructions include both machine code, such as produced by a compiler, and files containing higher level code that may be executed by the computer using an interpreter.

Figure 5:
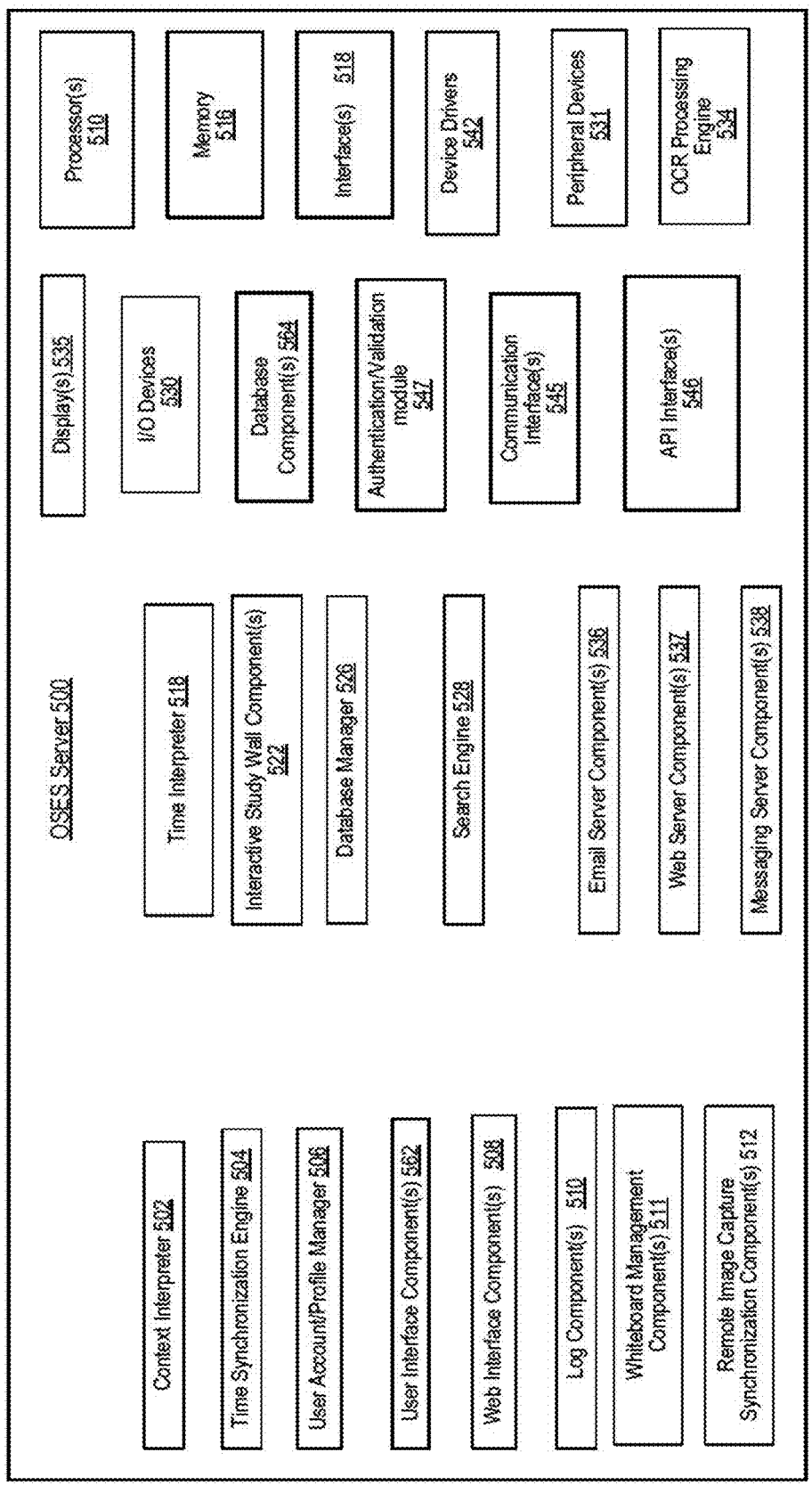
FIG. 5 illustrates an example of a functional block diagram of an Online Social Education System in accordance with a specific embodiment.

FIG. 5 illustrates an example of a functional block diagram of an Online Social Education System in accordance with a specific embodiment.

In at least one embodiment, the Online Social Education System may be operable to perform and/or implement various types of Online Social Education functions, operations, actions, and/or other features, such as, for example, one or more of those described and/or referenced herein.

In at least one embodiment, the Online Social Education System may include a plurality of components operable to perform and/or implement various types of Online Social Education functions, operations, actions, and/or other features such as, for example, one or more of the following (or combinations thereof):

Context Interpreter (e.g., 502) which, for example, may be operable to automatically and/or dynamically analyze contextual criteria relating to a detected set of event(s) and/or condition(s), and automatically determine or identify one or more contextually appropriate response(s) based on the contextual interpretation of the detected event(s)/condition(s). According to different embodiments, examples of contextual criteria which may be analyzed may include, but are not limited to, one or more of the following (or combinations thereof):
location-based criteria (e.g., geolocation of client device, geolocation of agent device, etc.)
time-based criteria
identity of user(s)
user profile information
transaction history information
recent user activities
proximate business-related criteria (e.g., criteria which may be used to determine whether the client device is currently located at or near a recognized business establishment such as a bank, gas station, restaurant, supermarket, etc.)
etc.

Time Synchronization Engine (e.g., 504) which, for example, may be operable to manages universal time synchronization (e.g., via NTP and/or GPS)

Search Engine (e.g., 528) which, for example, may be operable to search for transactions, logs, items, accounts, options in the Online Social Education databases Configuration Engine (e.g., 532) which, for example, may be operable to determine and handle configuration of various customized configuration parameters for one or more devices, component(s), system(s), process(es), etc.

Time Interpreter (e.g., 518) which, for example, may be operable to automatically and/or dynamically modify or change identifier activation and expiration time(s) based on various criteria such as, for example, time, location, transaction status, etc.

Authentication/Validation Component(s) (e.g., 547) (password, software/hardware info, SSL certificates) which, for example, may be operable to perform various types of authentication/validation tasks such as, for example, one or more of the following (or combinations thereof):
verifying/authenticating devices,
verifying/authenticating users,
verifying passwords, passcodes, SSL certificates, biometric identification information, and/or other types of security-related information
verify/validate activation and/or expiration times
etc.

In one implementation, the Authentication/Validation Component(s) may be adapted to determine and/or authenticate the identity of the current user or client system. For example, in one embodiment, the current user may be required to perform a log in process at the mobile client system in order to access one or more features. In some embodiments, the mobile client system may include biometric security components which may be operable to validate and/or authenticate the identity of a user by reading or scanning The user's biometric information (e.g., fingerprints, face, voice, eye/iris, etc.). In at least one implementation, various security features may be incorporated into the mobile client system to prevent unauthorized users from accessing confidential or sensitive information.

Interactive Study Wall Component(s) (e.g., 522) which, for example, may be operable to perform and/or implement various types of Interactive Study Wall functions, operations, actions, and/or other features, such as, for example, one or more of those described and/or referenced herein.

White Board Management Component(s) (e.g., 511) which, for example, may be operable to perform and/or implement various types of whiteboard functions, operations, actions, and/or other features, such as, for example, one or more of those described and/or referenced herein.

OCR Processing Engine (e.g., 534) which, for example, may be operable to perform image processing and optical character recognition of images such as those captured by a mobile device camera, for example.

Database Manager (e.g., 526) which, for example, may be operable to handle various types of tasks relating to database updating, database management, database access, etc.

Log Component(s) (e.g., 510) which, for example, may be operable to generate and manage transactions history logs, system errors, connections from APIs, etc.

Web Interface Component(s) (e.g., 508) which, for example, may be operable to facilitate and manage communications and transactions with Online Social Education web portal(s).

API Interface(s) (e.g., 546) which, for example, may be operable to facilitate and manage communications and transactions with API Interface(s) to Online Education Server System(s) and/or other system(s)/network(s).

OCR Processing Engine (e.g., 534) which, for example, may be operable to perform image processing and optical character recognition of images such as those captured by a mobile device camera, for example.

At least one processor 510. In at least one embodiment, the processor(s) 510 may include one or more commonly known CPUs which are deployed in many of today's consumer electronic devices, such as, for example, CPUs or processors from the Motorola or Intel family of microprocessors, etc. In an alternative embodiment, at least one processor may be specially designed hardware for controlling the operations of the mobile client system. In a specific embodiment, a memory (such as non-volatile RAM and/or ROM) also forms part of CPU. When acting under the control of appropriate software or firmware, the CPU may be responsible for implementing specific functions associated with the functions of a desired network device. The CPU preferably accomplishes all these functions under the control of software including an operating system, and any appropriate applications software.

Memory 516, which, for example, may include volatile memory (e.g., RAM), non-volatile memory (e.g., disk memory, FLASH memory, EPROMs, etc.), unalterable memory, and/or other types of memory. In at least one implementation, the memory 516 may include functionality similar to at least a portion of functionality implemented by one or more commonly known memory devices such as those described herein and/or generally known to one having ordinary skill in the art. According to different embodiments, one or more memories or memory modules (e.g., memory blocks) may be configured or designed to store data, program instructions for the functional operations of the mobile client system and/or other information relating to the functionality of the various Mobile Transaction techniques described herein. The program instructions may control the operation of an operating system and/or one or more applications, for example. The memory or memories may also be configured to store data structures, metadata, identifier information/images, and/or information/data relating to other features/functions described herein. Because such information and program instructions may be employed to implement at least a portion of the Online Social Education System techniques described herein, various aspects described herein may be implemented using machine readable media that include program instructions, state information, etc. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Interface(s) 518 which, for example, may include wired interfaces and/or wireless interfaces. In at least one implementation, the interface(s) 518 may include functionality similar to at least a portion of functionality implemented by one or more computer system interfaces such as those described herein and/or generally known to one having ordinary skill in the art.

Device driver(s) 542. In at least one implementation, the device driver(s) 542 may include functionality similar to at least a portion of functionality implemented by one or more computer system driver devices such as those described herein and/or generally known to one having ordinary skill in the art.

One or more display(s) 535. According to various embodiments, such display(s) may be implemented using, for example, LCD display technology, OLED display technology, and/or other types of conventional display technology. In at least one implementation, display(s) 535 may be adapted to be flexible or bendable. Additionally, in at least one embodiment the information displayed on display(s) 535 may utilize e-ink technology (such as that available from E Ink Corporation, Cambridge, Mass.), or other suitable technology for reducing the power consumption of information displayed on the display(s) 535.

Email Server Component(s) 536, which, for example, may be configured or designed to provide various functions and operations relating to email activities and communications.

Web Server Component(s) 537, which, for example, may be configured or designed to provide various functions and operations relating to web server activities and communications.

Messaging Server Component(s) 538, which, for example, may be configured or designed to provide various functions and operations relating to text messaging and/or other social network messaging activities and/or communications.

Etc.

Although several example embodiments of one or more aspects and/or features have been described in detail herein with reference to the accompanying drawings, it is to be understood that aspects and/or features are not limited to these precise embodiments, and that various changes and modifications may be effected therein by one skilled in the art without departing from the scope of spirit of the invention(s) as defined, for example, in the appended claims.

It is claimed:

1. A computer-implemented method for facilitating posting of at least one media file to a first computer implemented electronic collaborative canvas whiteboard associated with a first online collaborative session, the computer-implemented method comprising causing at least one processor to execute instructions stored in non-transient memory to:

cause a first collaborative session graphical user interface to be displayed to a first user via a first computing device, the first computing device being configured to remotely access the first electronic collaborative canvas whiteboard and being further configured to display content of the first electronic collaborative canvas whiteboard via the first collaborative session graphical user interface;

cause a second collaborative session graphical user interface to be displayed to a second user via a second computing device, the second computing device being configured to remotely access the first electronic collaborative canvas whiteboard and being further configured to display content of the first electronic collaborative canvas whiteboard via the second collaborative session graphical user interface;

provide a first virtual messaging address for enabling a first remote user to post a first media file to the first electronic collaborative canvas whiteboard via texting or emailing the first media file to the first virtual messaging address;

receive, at a first server system, a first electronic message which includes the first media file, the first electronic message originating from a first mobile device associated with the first remote user, the first electronic message including routing information indicating the first virtual messaging address as a destination of the first electronic message, the first media file including first media file content, wherein the first mobile device is different from the first and second computing devices, and wherein, when the first electronic message is received at the first server system, the first mobile device is not configured to retrieve content presented at the first electronic collaborative canvas whiteboard;

identify, via processing of the first electronic message at the first server system, the first electronic collaborative canvas whiteboard as an intended destination where the first media file is to be posted; and cause the first media file content to be displayed at the first electronic collaborative canvas whiteboard, wherein the displayed first media file content is presented as an image object of the first electronic collaborative canvas whiteboard which can be viewed, manipulated, and/or annotated using at least one device which is configured to access content presented at the first electronic collaborative canvas whiteboard.

2. The computer-implemented method of claim 1 wherein the first online collaborative session corresponds to a peer-to-peer on-line tutoring session configured to support real-time, two-way audio and video communications between the first user and the second user via the first and second collaborative session graphical user interfaces.

3. The computer-implemented method of claim 1 further comprising causing the at least one processor to execute instructions stored in the memory to:

determine, via processing of the first electronic message at the first server system, a first set of identifier information associated with the first remote user;

identify, using at least the first set of identifier information, a target electronic collaborative canvas whiteboard where the first media file is to be posted;

before allowing the first media file content to be displayed at the first electronic collaborative canvas whiteboard:

(i) determine if the identified first remote user is authorized to post content to the identified target electronic collaborative canvas whiteboard;

(ii) if it is determined that the identified first remote user is authorized to post content to the identified target electronic collaborative canvas whiteboard, permit the first media file to be posted to the identified target electronic collaborative canvas whiteboard; and (iii) if it is determined that the identified first remote user is not authorized to post content to the identified target electronic collaborative canvas whiteboard, prevent the first media file from being posted to the identified target electronic collaborative canvas whiteboard.

4. The computer-implemented method of claim 1
wherein the first virtual messaging address corresponds to a first email address, and
wherein the first electronic message corresponds to a first email message.

5. The computer-implemented method of claim 1
wherein the first virtual messaging address corresponds to a first text message address and
wherein the first electronic message corresponds to a first text message.

6. The computer-implemented method of claim 1
wherein the first electronic message does not include information explicitly identifying the target electronic collaborative canvas whiteboard where the first media file is to be posted.

7. The computer-implemented method of claim 1
wherein the first media file content includes image content captured by a camera component of the first mobile device.

8. The computer-implemented method of claim 1 wherein the first online collaborative session corresponds to an online collaborative session selected from a group consisting of:

an educational discussion wall associated with an academic subject; and a collaborative education session that includes at least one of a tutor, an instructor and a teacher and at least one of a student and a tutee.

9. The computer-implemented method of claim 1 further comprising causing the at least one processor to execute instructions stored in the memory to:

receive, at the first server system, a second electronic message which includes the second media file, the second electronic message originating from a second mobile device associated with the second remote user, the second electronic message including routing information indicating the first virtual messaging address as a destination of the second electronic message, the second media file including second media file content, wherein the second mobile device is different from the second computing device, and wherein, when the second electronic message is received at the second server system, the second mobile device is not configured to display content presented at the second electronic collaborative canvas whiteboard;

determine, via processing of the second electronic message at the first server system, a second set of identifier information associated with the second remote user;

identify, via processing of the second electronic message at the second server system, the first electronic collaborative canvas whiteboard as an intended destination where the second media file is to be posted;

determine if the identified second remote user is authorized to post content to the first electronic collaborative canvas whiteboard before allowing the second media file content to be displayed at the first electronic collaborative canvas whiteboard; and if it is determined that the identified second remote user is authorized to post content to the first electronic collaborative canvas whiteboard, cause the second media file content to be displayed at the second electronic collaborative canvas whiteboard, wherein the displayed second media file content is presented as an image object of the second electronic collaborative canvas whiteboard which can be viewed, manipulated, and/or annotated using at least one device which is configured to access content presented at the first electronic collaborative canvas whiteboard.

10. The computer-implemented method of claim 9
wherein the first virtual messaging address corresponds to a first email address,
wherein the first electronic message corresponds to a first email message, and
wherein the second electronic message corresponds to a second email message.

11. The computer-implemented method of claim 9
wherein the first virtual messaging address corresponds to a first text message address,
wherein the first electronic message corresponds to a first text message, and
wherein the second electronic message corresponds to a first text message.

12. A computer-implemented system for facilitating posting of at least one media file to a first computer implemented electronic collaborative canvas whiteboard associated with a first online collaborative session, the computer-implemented system comprising: at least one processor;
a non-transient memory storing a plurality of instructions; the at least one processor being operable to execute the plurality of instructions stored in the memory to:
cause a first collaborative session graphical user interface to be displayed to a first user via a first computing device, the first computing device being configured to remotely access the first electronic collaborative canvas whiteboard and being further configured to display content of the first electronic collaborative canvas whiteboard via the first collaborative session graphical user interface;
cause a second collaborative session graphical user interface to be displayed to a second user via a second computing device, the second computing device being configured to remotely access the first electronic collaborative canvas whiteboard and being further configured to display content of the first electronic collaborative canvas whiteboard via the second collaborative session graphical user interface;
provide a first virtual messaging address for enabling a first remote user to post a first media file to the first electronic collaborative canvas whiteboard via texting or emailing the first media file to the first virtual messaging address;
receive, at a first server system, a first electronic message which includes the first media file, the first electronic message originating from a first mobile device associated with the first remote user, the first electronic message including routing information indicating the first virtual messaging address as a destination of the first electronic message, the first media file including first media file content, wherein the first mobile device is different from the first and second computing devices, and wherein, when the first electronic message is received at the first server system, the first mobile device is not configured to retrieve content presented at the first electronic collaborative canvas whiteboard;
identify, via processing of the first electronic message at the first server system, the first electronic collaborative canvas whiteboard as an intended destination where the first media file is to be posted; and
cause the first media file content to be displayed at the first electronic collaborative canvas whiteboard, wherein the displayed first media file content is presented as an image object of the first electronic collaborative canvas whiteboard which can be viewed, manipulated, and/or annotated using at least one device which is configured to access content presented at the first electronic collaborative canvas whiteboard.

13. The computer-implemented system of claim 12 wherein the first online collaborative session corresponds to a peer-to-peer on-line tutoring session configured to support real-time, two-way audio and video communications between the first user and the second user via the first and second collaborative session graphical user interfaces.

14. The computer-implemented system of claim 12 being further operable to cause the at least one processor to execute instructions stored in the memory to:
determine, via processing of the first electronic message at the first server system, a first set of identifier information associated with the first remote user;
identify, using at least the first set of identifier information, a target electronic collaborative canvas whiteboard where the first media file is to be posted;
before allowing the first media file content to be displayed at the first electronic collaborative canvas whiteboard:
(i) determine if the identified first remote user is authorized to post content to the identified target electronic collaborative canvas whiteboard;
(ii) if it is determined that the identified first remote user is authorized to post content to the identified target electronic collaborative canvas whiteboard, permit the first media file to be posted to the identified target electronic collaborative canvas whiteboard; and
(iii) if it is determined that the identified first remote user is not authorized to post content to the identified target electronic collaborative canvas whiteboard, prevent the first media file from being posted to the identified target electronic collaborative canvas whiteboard.

15. The computer-implemented system of claim 12 wherein the first virtual messaging address corresponds to a first email address, and
wherein the first electronic message corresponds to a first email message.

16. The computer-implemented system of claim 12 wherein the first virtual messaging address corresponds to a first text message address, and
wherein the first electronic message corresponds to a first text message.

17. The computer-implemented system of claim 12 wherein the first electronic message does not include information explicitly identifying the target electronic collaborative canvas whiteboard where the first media file is to be posted.

18. The computer-implemented system of claim 12 wherein the first media file content includes image content captured by a camera component of the first mobile device.

19. The computer-implemented system of claim 12 wherein the first online collaborative session corresponds to an online collaborative session selected from a group consisting of:
an educational discussion wall associated with an academic subject;
a collaborative education session that includes at least one of a tutor, an instructor and a teacher and at least one of a student and a tutee.

20. The computer-implemented system of claim 12 being further operable to cause the at least one processor to execute instructions stored in the memory to:
receive, at the first server system, a second electronic message which includes the second media file, the second electronic message originating from a second mobile device associated with the second remote user, the second electronic message including routing information indicating the first virtual messaging address as a destination of the second electronic message, the second media file including second media file content, wherein the second mobile device is different from the second computing device, and wherein, when the second electronic message is received at the second server system, the second mobile device is not configured to display content presented at the second electronic collaborative canvas whiteboard;
determine, via processing of the second electronic message at the first server system, a second set of identifier information associated with the second remote user;
identify, via processing of the second electronic message at the second server system, the first electronic collaborative canvas whiteboard as an intended destination where the second media file is to be posted;

determine if the identified second remote user is authorized to post content to the first electronic collaborative canvas whiteboard before allowing the second media file content to be displayed at the first electronic collaborative canvas whiteboard; and if it is determined that the identified second remote user is authorized to post content to the first electronic collaborative canvas whiteboard, cause the second media file content to be displayed at the second electronic collaborative canvas whiteboard, wherein the displayed second media file content is presented as an image object of the second electronic collaborative canvas whiteboard which can be viewed, manipulated, and/or annotated using at least one device which is configured to access content presented at the first electronic collaborative canvas whiteboard.

21. The computer-implemented system of claim 20
wherein the first virtual messaging address corresponds to a first email address,
wherein the first electronic message corresponds to a first email message, and
wherein the second electronic message corresponds to a second email message.

22. The computer-implemented system of claim 20
wherein the first virtual messaging address corresponds to a first text message address,
wherein the first electronic message corresponds to a first text message, and
wherein the second electronic message corresponds to a first text message.

23. A non-transitory computer usable medium for use in a computer network for facilitating posting of at least one media file to a first computer implemented electronic collaborative canvas whiteboard associated with a first online collaborative session, the computer network including at least one processor, the computer usable medium having computer readable code embodied therein, the computer readable code comprising:

computer code to cause a first collaborative session graphical user interface to be displayed to a first user via a first computing device, the first computing device being configured to remotely access the first electronic collaborative canvas whiteboard and being further configured to display content of the first electronic collaborative canvas whiteboard via the first collaborative session graphical user interface;

computer code to cause a second collaborative session graphical user interface to be displayed to a second user via a second computing device, the second computing device being configured to remotely access the first electronic collaborative canvas whiteboard and being further configured to display content of the first electronic collaborative canvas whiteboard via the second collaborative session graphical user interface;

computer code to cause provide a first virtual messaging address for enabling a first remote user to post a first media file to the first electronic collaborative canvas whiteboard via texting or emailing the first media file to the first virtual messaging address;

computer code to receive, at a first server system, a first electronic message which includes the first media file, the first electronic message originating from a first mobile device associated with the first remote user, the first electronic message including routing information indicating the first virtual messaging address as a destination of the first electronic message, the first media file including first media file content, wherein the first mobile device is different from the first and second computing devices, and wherein, when the first electronic message is received at the first server system, the first mobile device is not configured to retrieve content presented at the first electronic collaborative canvas whiteboard;

determine, via processing of the first electronic message at the first server system, a first set of identifier information associated with the first remote user;

identify, via processing of the first electronic message at the first server system, the first electronic collaborative canvas whiteboard as an intended destination where the first media file is to be posted;

determine if the identified first remote user is authorized to post content to the first electronic collaborative canvas whiteboard before allowing the first media file content to be displayed at the first electronic collaborative canvas whiteboard; and if it is determined that the identified first remote user is authorized to post content to the first electronic collaborative canvas whiteboard, cause the first media file content to be displayed at the first electronic collaborative canvas whiteboard, wherein the displayed first media file content is presented as an image object of the first electronic collaborative canvas whiteboard which can be viewed, manipulated, and/or annotated using at least one device which is configured to access content presented at the first electronic collaborative canvas whiteboard.

* * * * *